United States Patent [19]
Huang et al.

[11] Patent Number: 6,120,241
[45] Date of Patent: *Sep. 19, 2000

[54] APPARATUS FOR SELECTING PACKAGE FROM A LINE OF ACCUMULATED PACKAGES

[75] Inventors: Pao-Ter Huang, Alpharetta, Ga.; Christopher Chunsheng Cai, New Fairfield, Conn.

[73] Assignee: United Parcel Service of America, Inc., Atlanta, Ga.

[ * ] Notice: This patent is subject to a terminal disclaimer.

[21] Appl. No.: 09/268,029

[22] Filed: Mar. 15, 1999

Related U.S. Application Data

[62] Division of application No. 08/756,675, Nov. 26, 1996, Pat. No. 5,908,283.

[51] Int. Cl.[7] .............................. B65B 27/00; B65G 1/18
[52] U.S. Cl. .................. 414/801; 414/799; 364/478.05; 364/478.06
[58] Field of Search ...................................... 414/799, 801, 414/902, 21; 901/2, 6, 8, 49; 198/502.2, 370.01; 364/478.05, 478.06

[56] References Cited

U.S. PATENT DOCUMENTS

| | | |
|---|---|---|
| Re. 33,416 | 10/1990 | Konishi et al. . |
| 2,947,405 | 8/1960 | Fenton . |
| 3,003,254 | 10/1961 | Pattison . |
| 3,436,968 | 4/1969 | Unger et al. . |
| 3,485,339 | 12/1969 | Miller et al. . |
| 3,515,254 | 6/1970 | Gary . |
| 3,531,002 | 9/1970 | Lemelson . |
| 3,581,071 | 5/1971 | Payseure . |
| 4,239,434 | 12/1980 | Gannon . |
| 4,242,025 | 12/1980 | Thibault . |
| 4,287,459 | 9/1981 | Dahlstrom . |
| 4,419,384 | 12/1983 | Kane et al. . |
| 4,521,966 | 6/1985 | Karlsson . |
| 4,536,852 | 8/1985 | Hosel . |
| 4,557,386 | 12/1985 | Buckley et al. . |
| 4,604,704 | 8/1986 | Eaves et al. . |
| 4,621,331 | 11/1986 | Iwata . |
| 4,635,988 | 1/1987 | Potters et al. . |
| 4,641,271 | 2/1987 | Konishi et al. ........................... 364/478 |
| 4,685,054 | 8/1987 | Manninen . |
| 4,687,107 | 8/1987 | Brown et al. . |
| 4,692,876 | 9/1987 | Tenma et al. ............................ 364/513 |
| 4,715,773 | 12/1987 | Parker et al. . |
| 4,729,713 | 3/1988 | Takaichi et al. . |
| 4,744,595 | 5/1988 | Tonning et al. . |
| 4,746,255 | 5/1988 | Roccabianca et al. . |
| 4,750,132 | 6/1988 | Pessina et al. . |
| 4,753,357 | 6/1988 | Miyoshi et al. . |
| 4,772,170 | 9/1988 | Oldfield . |
| 4,780,830 | 10/1988 | Omi et al. . |
| 4,786,229 | 11/1988 | Henderson . |
| 4,792,049 | 12/1988 | Janoick et al. . |
| 4,796,357 | 1/1989 | Smith . |
| 4,831,561 | 5/1989 | Utsumi . |
| 4,832,204 | 5/1989 | Handy et al. . |
| 4,835,450 | 5/1989 | Suzuki . |
| 4,835,702 | 5/1989 | Tanaka . |
| 4,858,974 | 8/1989 | Stannek . |
| 4,866,824 | 9/1989 | Falk et al. . |
| 4,900,219 | 2/1990 | Azzopardi et al. . |
| 4,914,460 | 4/1990 | Caimi et al. . |
| 4,939,676 | 7/1990 | Worsley et al. . |
| 4,969,107 | 11/1990 | Mizutani . |

(List continued on next page.)

FOREIGN PATENT DOCUMENTS 0 415 771 A2   3/1991   European Pat. Off. .

*Primary Examiner*—Gregory A. Morse
*Attorney, Agent, or Firm*—Jones & Askew LLP

[57] ABSTRACT

An apparatus for selecting individual packages from an accumulated package line, which measures one common dimension of a plurality of packages, combines the packages together in line contract, establishes an "actual line error" by comparing the actual overall length of the line to a theoretical length, and assigns portions of this actual line error to different packages in the line, depending on their location in the line.

6 Claims, 85 Drawing Sheets

U.S. PATENT DOCUMENTS

| | | |
|---|---|---|
| 4,969,109 | 11/1990 | Mizuno et al. |
| 4,974,164 | 11/1990 | Lewis et al. |
| 4,976,584 | 12/1990 | Focke . |
| 5,024,575 | 6/1991 | Anderson . |
| 5,050,090 | 9/1991 | Golub et al. |
| 5,088,878 | 2/1992 | Focke et al. |
| 5,098,254 | 3/1992 | Becicka et al. |
| 5,163,808 | 11/1992 | Tsubone et al. |
| 5,175,692 | 12/1992 | Mazouz et al. .......................... 414/902 |
| 5,203,671 | 4/1993 | Cawley et al. .......................... 414/902 |
| 5,220,511 | 6/1993 | Speckhart et al. |
| 5,249,131 | 9/1993 | Kato . |
| 5,260,694 | 11/1993 | Remahl . |
| 5,292,219 | 3/1994 | Merin et al. |
| 5,297,924 | 3/1994 | Neri et al. .............................. 414/799 |
| 5,301,544 | 4/1994 | Smith . |
| 5,308,221 | 5/1994 | Shimokoshi et al. |
| 5,331,118 | 7/1994 | Jensen . |
| 5,340,950 | 8/1994 | Brandorff et al. |
| 5,348,440 | 9/1994 | Focke . |
| 5,374,830 | 12/1994 | Pryor . |
| 5,383,760 | 1/1995 | Cawley et al. |
| 5,501,571 | 3/1996 | Van Durrett et al. ................. 414/786 |

(a)

(b)

|  | CORNER # | ORIGIN | BOUNDED BY |
|---|---|---|---|
| BEFORE PLACEMENT | 1 | 00 | OABC DEFG |
| AFTER PLACEMENT | 2 | H | HABI JEFK |
|  | 3 | L | LMBC NPFG |
|  | 4 | Q | QRST DEFG |

| | CORNER # | ORIGIN | BOUNDED BY |
|---|---|---|---|
| BEFORE PLACEMENT | 2 | H | HABI JEFK |
| | 3 | L | LMBC NPFG |
| | 4 | Q | QRST DEFG |
| AFTER PLACEMENT IN CORNER 2 | 3 | L | LMBC NPFG |
| | 4 | Q | QRST DEFG |
| | 5 | W | WMIB PFKZ |
| | 6 | Y | YRSX JEFK |
| AFTER MERGING | 3 | L | LMBC NPFG |
| | 4 | Q | QRST DEFG |

(CORNER 5 MERGED INTO CORNER 3)

(CORNER 6 MERGED INTO CORNER 4)

POSITION A - FRONT FLUSHING
POSITION B - FRONT AND LEFT FLUSHING
POSITION C - NO FLUSH
POSITION D - RIGHT FLUSH
POSITION E - SHIFTED

PACKAGES C AND D BOTH HAVE FRONT GAP
BETWEEN THEMSELVES AND FRONT PALLET BOUNDARY

PACKAGES A AND B HAVE NO FRONT GAP

PACKAGES A AND C BOTH HAVE SAME RIGHT GAP
BETWEEN THEMSELVES AND RIGHT PALLET BOUNDARY

PACKAGES B AND D HAVE NO FRONT GAP

PLACING PACKAGE ADDS NEW SURFACE TO EXISTING CORNERS

BASIC FLUSHING DECISION

FRONT FLUSHING DECISION (RIGHT FLUSHING DECISION)

ALTERNATIVE SELECTION SEQUENCES

BOX SUPPORTING RELATIONSHIP TREE

EFFECTIVE SUPPORT SURFACE WHEN SUPPORTED BY SINGLE PACKAGE

EFFECTIVE SUPPORT SURFACE WHEN SUPPORTED BY MULTIPLE PACKAGES

RECTANGLE APPROXIMATE FOR EFFECTIVE SUPPORT SURFACE

FOUR BOUNDARY EDGES OF A POLYGON

FOUR ADDITIONAL VERTICES

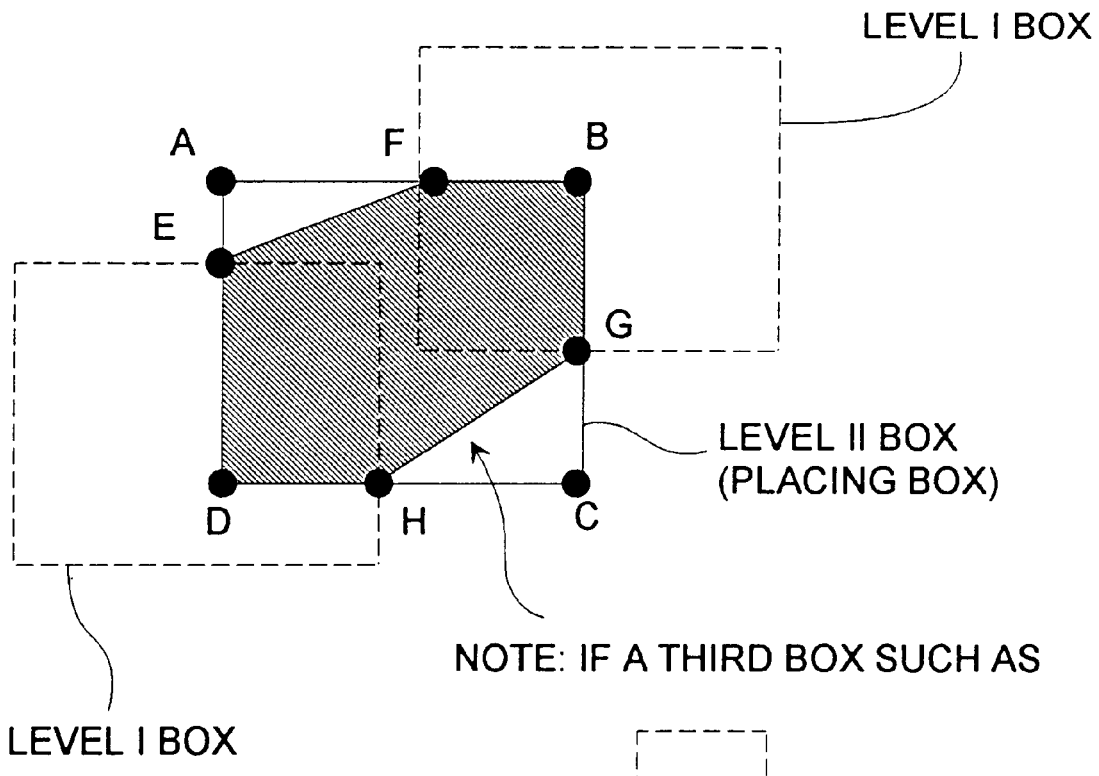
NOTE: IF A THIRD BOX SUCH AS IS LOCATED IN THE "CORNER" DEFINED BY THE TWO LEVEL I BOXES, IF PT "X" EXTENDS OUTSIDE THE DIAGONAL LINE HG, PT X BECOMES AN ADDITIONAL VERTICES (SEE FIG 9)
RE: DIRECT SUPPORT SURFACE POLYGON
*FIG. 39*

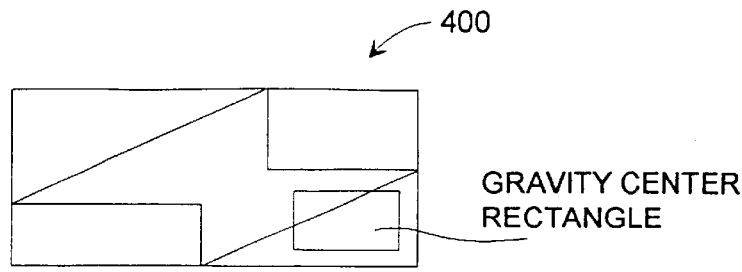
FIG. 40
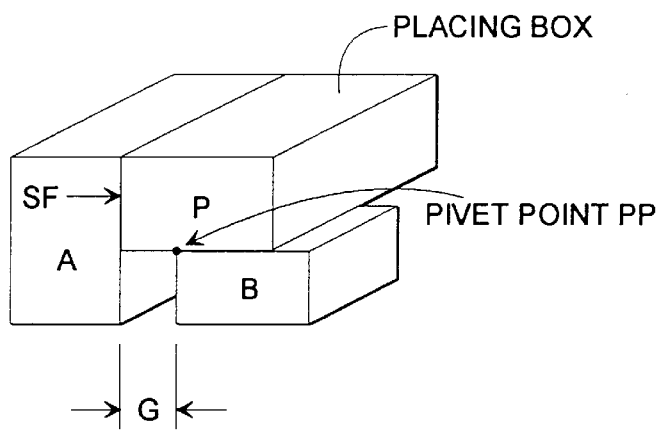
FIG. 41
PACKAGE A PROVIDES SIDE FORCE SF AGAINST PLACING PACKAGE P, WHICH MAY BE SUFFICIENT TO PREVENT PACKAGE P FROM FALLING OFF PACKAGE B ABOUT PIVOT POINT PP.
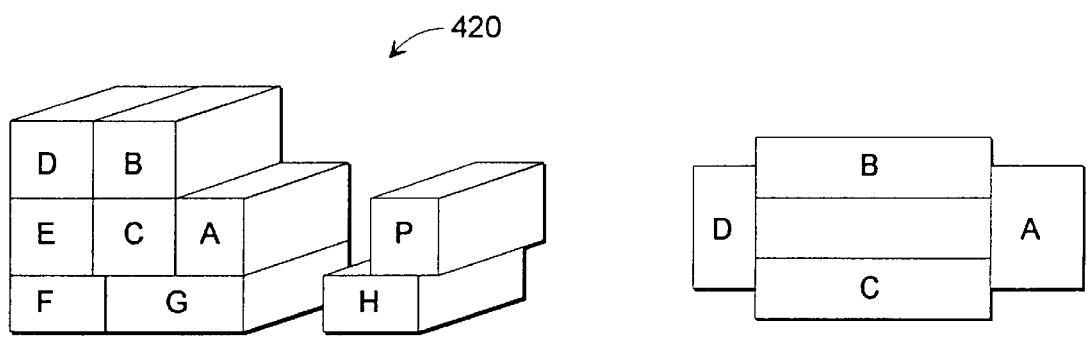
FIG. 42
RE: SIDE WEIGHT PROPAGATION
FIG. 43

| | | |
|---|---|---|
| $W_1$ LEVEL INDEX | LEVEL TO ALL NEIGHBORS BONUS: | 1600 |
| | LEVEL TO BACK NEIGHBOR BONUS: | 1100 |
| | BLOCK BACK PENALTY: | -4000 |
| | ABOVE NEIGHBOR PENALTY: | -2600 |
| | BELOW NEIGHBOR PENALTY: | -600 |
| $W_2$ TAPERING INDEX | TAPERING INDEX PENALTY: | -800 *TAPERING INDEX |

$W_3$ { POTENTIAL LEVEL PACKAGES:     100 *POTENTIAL LEVELING PACKAGES COUNT (APPLICABLE WHEN START A NEW SHELF OR SUB-SHELF)

$W_6$ { PACKAGE GROUP AREA:     50 *VOLUME/AVERAGE VOLUME (APPLICABLE WHEN STARTING NEW SHELF, PACKAGE IS NEAR BOUNDARY, OR PACKAGE TO COVER A GAP, ETC.)

$W_7$ { PACKAGE GROUP VOLUME:     50 *VOLUME/APPLICABLE VOLUME (APPLICABLE WHEN STARTING NEW SHELF, PACKAGE IS NEAR BOUNDARY, OR PACKAGE TO COVER A GAP, ETC.)

$W_8$ { DIMENSIONAL COVERAGE RATION BONUS:     400 *DIMENSIONAL COVERAGE RATIO (FRONT/BACK AND LEFT/RIGHT)

$W_4$ { NEIGHBOR ALIGNMENT BONUS:     100 *NUMBER OF ALIGNMENTS $W_5$ { AREA FILL BONUS:     200 *CORNER AREA FILL RATIO (APPLICABLE FOR SMALL CORNER)

$W_9$ { SURFACE BRIDGE:     50 *NUMBER OF SURFACE BRIDGING * NUMBER OF TOWERING INDEX $W_{11}$ { BLOCK VOLUME PENALTY:     -60 *BLOCKED VOLUME/AVERAGE VOLUME $W_{10}$ { BLOCK AREA PENALTY:     -60 *BLOCKED AREA/AVERAGE AREA $W_{13}$ { PACKAGE OLD AGE BONUS:     8 *PACKAGE AGE (APPLICABLE WHEN AGE IS ABOVE AN AGE THRESHOLD SUCH AS 10)

$W_{15}$ { PACKAGE WEIGHT BONUS/PENALTY:     400 *(PACKAGE WEIGHT - WEIGHT THRESHOLD) /(MAX WEIGHT - WEIGHT THRESHOLD) *DISTANCE TO HEIGHT THRESHOLD /MAXIMUM DISTANCE (APPLICABLE WHEN PACKAGE WEIGHT IS ABOVE WEIGHT THRESHOLD)

$W_{12}$ { NEIGHBOR GAP PENALTY:     -800 *CORNER AND TOP GAPS/ AVERAGE PACKAGE WIDTH

| | | |
|---|---|---|
| $W_{14}$ | CORNER HEIGHT: | -2000 #CORNER HEIGHT *PALLET HEIGHT |
| | CORNER BACK DISTANCE PENALTY: | -60 *CORNER DISTANCE TO BACK BOUNDARY *PALLET DEPTH /MAX(PALLET DEPTH, PALLET LENGTH) |
| | CORNER SIDE DISTANCE PENALTY: | -60 *CORNER DISTANCE TO LEFT BOUNDARY *PALLET LENGTH /MAX(PALLET DEPTH, PALLET LEGTH) |

$W_{16}$ { DISTANCE TO CEILING PENALTY:     -800 *DISTANCE TO CEILING/ AVERAGE PACKAGE HEIGHT (APPLICABLE WHEN PACKAGE IS ON THE TOP LAYER OF THE STACK)

APPENDIX OF WEIGHING FACTORS $W_i$ IN PERFORMANCE INDEX (SEE FOG 46)

*FIG. 47*

FRONT VIEW

TOP VIEW (BIRD'S EYE VIEW)

A: INITIALLY IN BUFFER THERE ARE 4 BOXES WHOSE HIEGHT ARE AS SHOWN IN THE FIGURE

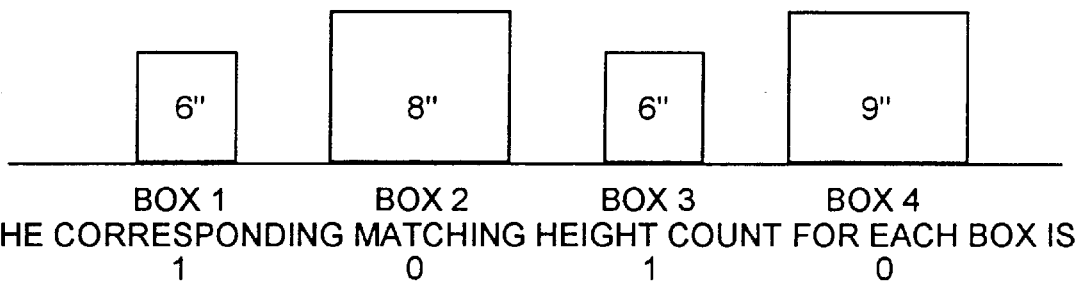

BOX 1    BOX 2    BOX 3    BOX 4
THE CORRESPONDING MATCHING HEIGHT COUNT FOR EACH BOX IS
  1         0         1         0

B: WHEN BOX 3 IS REMOVED FROM THE BUFFER

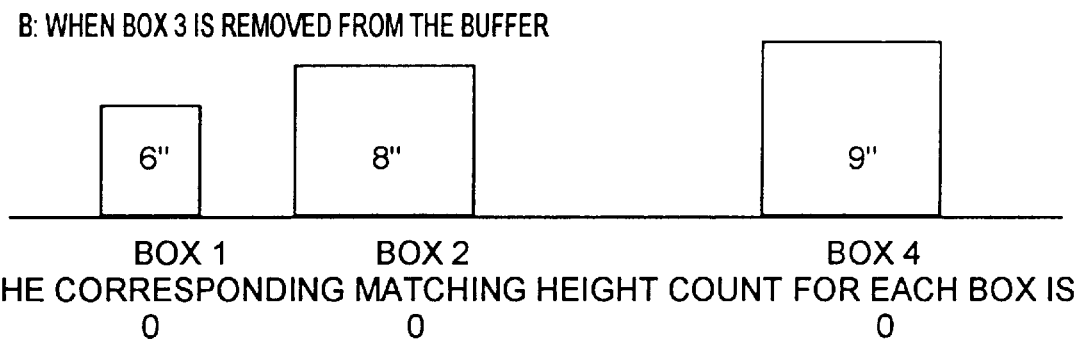

BOX 1    BOX 2              BOX 4
THE CORRESPONDING MATCHING HEIGHT COUNT FOR EACH BOX IS
  0         0                    0

C: AFTER BOX 5 IS ADDED TO THE BUFER

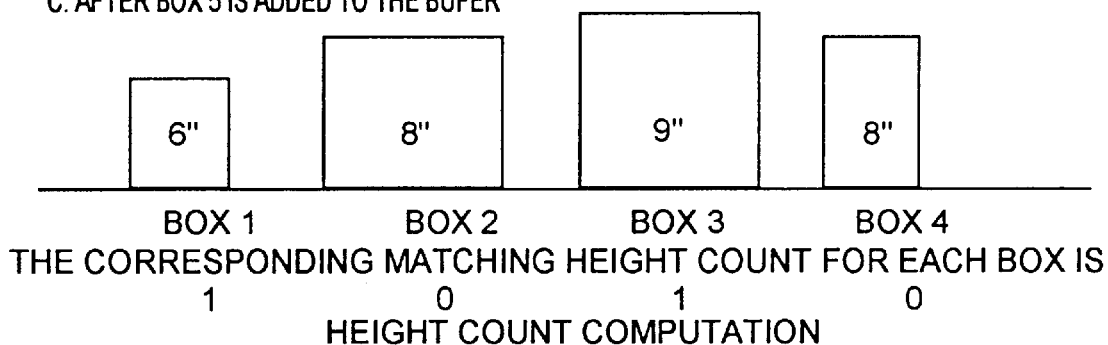

BOX 1    BOX 2    BOX 3    BOX 4
THE CORRESPONDING MATCHING HEIGHT COUNT FOR EACH BOX IS
  1         0         1         0
HEIGHT COUNT COMPUTATION

*FIG. 49*

RELATIVE HEIGHT CHECK

NEIGHBOR BOX HAS SIDE OVERLAP WITH PLACING BOX

PLACING BOX LEVELS WITH NEIGHBOR

RELATIVE HEIGHT THRESHOLD

BLOCK A LOWER :CORNER    APPENDIX B:

RULE1: EXCESSIVEBLOCKING $W_A$ -AVERAGEWIDTH OF ALL BOXES IN STACK AND BUFFER $D_1$ -MINIMUM BLOCKED HORIZONTAL LENGTH IN LOWER CORNER SURFACES

IF:
  $D_1 > W_A / 3$

THEN:
  TAPERING INDEX: $D_1 / (W_A / 3)$

STACKING RULES

BLOCK A LOWER CORNER:
RULE 2: BLOCK A POSSIBLE UNDER PLACEMENT $H_A$ – AVERAGE HEIGHT OF ALL BOXES IN STACK AND BUFFER
$W_M$ – MINIMUM WIDTH OF ALL BOXES IN BUFFER
$W_A$ – AVERAGE WIDTH OF ALL BOXES IN STACK AND BUFFER
$A_A$ – AVERAGE AREA OF ALL BOXES IN STACK AND BUFFER

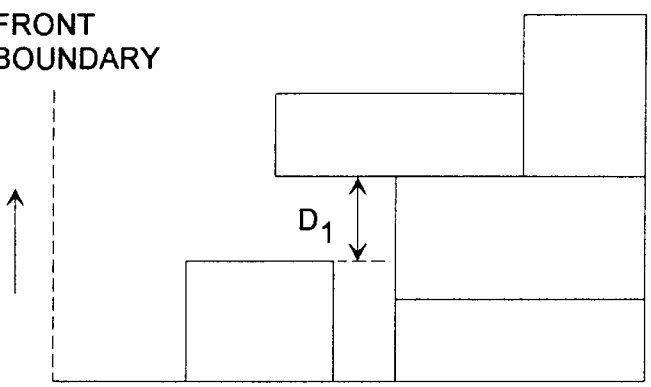

FRONT
BOUNDARY

CONDITION FOR BEING MOST POSSIBLE TO
PLACE A BOX IN A LOWER CORNER:
    CORNER'S MIN. DIMENSION $\geq W_A$ AND
    CORNER'S MIN. DIMENSION $\geq W_M$ AND
    CORNER'S MIN. SURFACE DIMENSION $> 0.6 W_A$
    AND CORNER'S SURFACE AREA $> 0.6 A_A$

IF:
BEFORE BOX IS PLACED:
IT IS POSSIBLE TO PLACE
A BOX IN A LOWER CORNER
AND $D_1 < 1.7 H_A$ AND

AFTER BOX IS PLACED
MOST LIKELY IT IS NOT
POSSIBLE TO PLACE BOX
ON TOP OF UNDERSURFACE

THEN
    TAPER INDEX 1

CONDITION FOR BEING MOST LIKELY NOT POSSIBLE TO PLACE BOX
IN LOWER CORNER AFTER PLACING BOX
    CORNER'S UNBLOCKED MIN. DIMENSION $< 0.9 W_A$ OR
    CORNER'S UNBLOCKED MIN. DIMENSION $< W_M$ OR
    CORNER'S UNBLOCKED MIN. SURFACE DIMENSION $< 0.6 W_A$ OR
    CORNER'S UNCLOCKED SURFACE AREA $< 0.6 A_A$ $D_1$ – SHOULDER HEIGHT

STACKING RULES

BOUNDARY CORNER CHECK

SLENDER BOX:
RULE 3: SLENDER BOX AT CORNERSTONE

FRONTVIEW
(ALONG Z AXIS)

IF
BOX IS PLACED AT CORNERSTONE
POSITION AND $D_1 < W_A$ AND
$D_2 > W_A$

THEN
TAPERING INDEX: 2

$W_A$ - AVERAGE WIDTH OF ALL BOXES IN STACK AND BUFFER
CORNERSTONE -- VERY FIRST BOX INA NEW SHELF
$D_1$ -- TOTAL WIDTH OF A LEVELING BOX GROUP
$D_2$ -- SUPPORTING SURFACE SPAN

STACKING RULES

SLENDER BOX:
RULE 4: A SLENDER BOX $_B$ IS POSITIONED AT LOCATIONS OTHER THAN CORNERSTONE

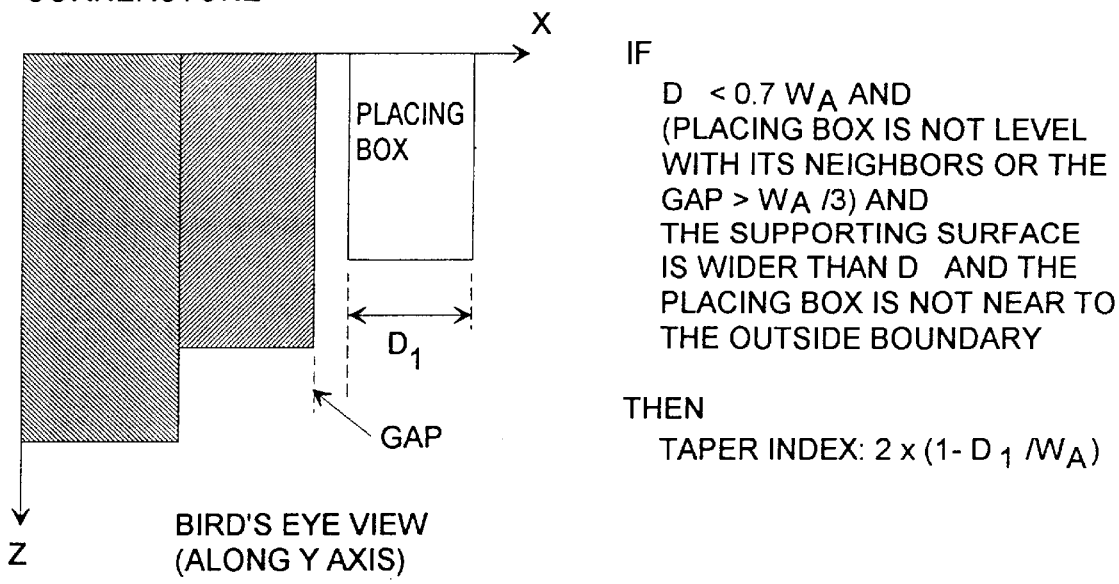

IF
  $D < 0.7 W_A$ AND
  (PLACING BOX IS NOT LEVEL WITH ITS NEIGHBORS OR THE GAP $> W_A /3$) AND
  THE SUPPORTING SURFACE IS WIDER THAN D AND THE PLACING BOX IS NOT NEAR TO THE OUTSIDE BOUNDARY

THEN
  TAPER INDEX: $2 \times (1 - D_1 / W_A)$

BIRD'S EYE VIEW (ALONG Y AXIS)

$W_A$ - AVERAGE WIDTH OF ALL BOXES IN STACK AND BUFFER
$D_1$ -- WIDTH OF A POSSIBLE LEVELING BOX GROUP

STACKING RULES
FIG. 60

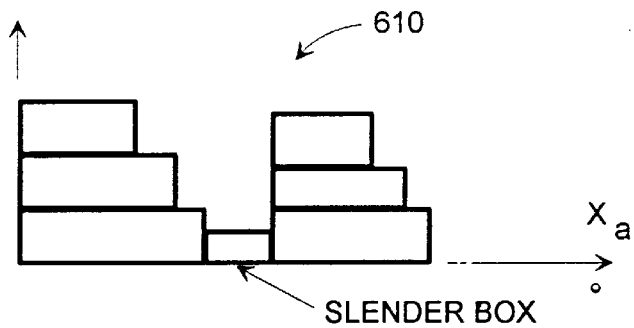

FIG. 61A

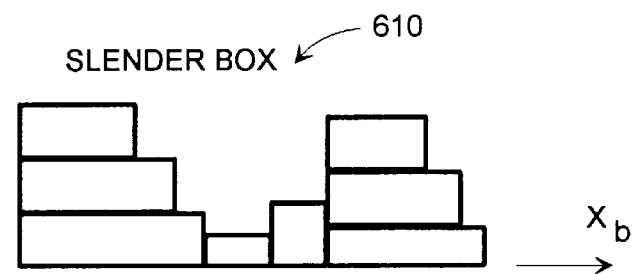

FIG. 61B

FIND A MATCHING BOX

SLENDER BOX AMPLIFIES A GAP

STAIRCASE:
RULE 5: POTENTIAL STAIRCASE ON THE SIDE

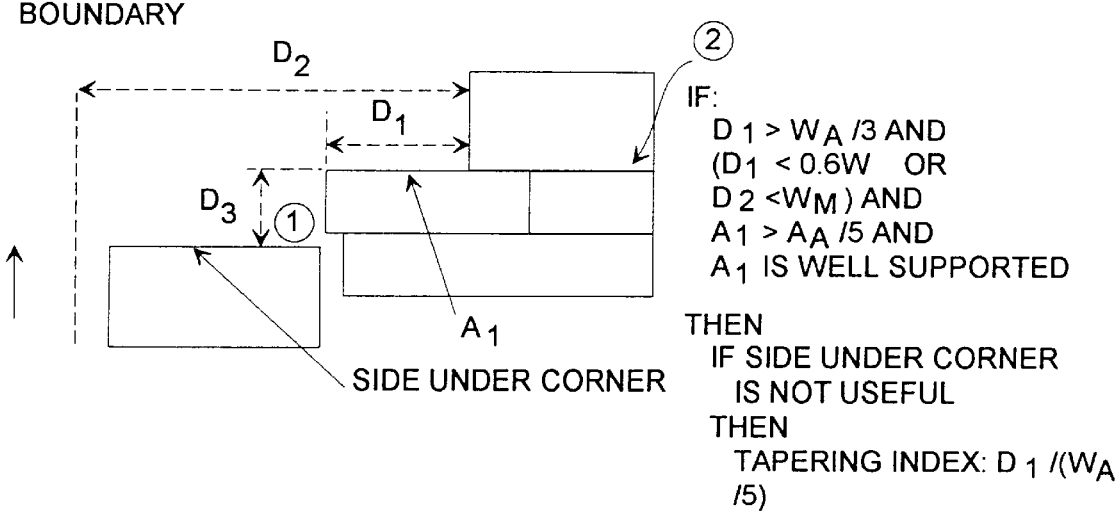

IF:
$D_1 > W_A/3$ AND
$(D_1 < 0.6W$ OR
$D_2 < W_M)$ AND
$A_1 > A_A/5$ AND
$A_1$ IS WELL SUPPORTED

THEN
  IF SIDE UNDER CORNER
    IS NOT USEFUL
  THEN
    TAPERING INDEX: $D_1/(W_A/5)$
  ELSE
    OF $D_3 < H_M$
    THEN
      TAPERING INDEX:
      $0.5 \times D_1/(W_A/5)$ $D_1$ – MIN. SURFACE DIMENSION ON THE SIDE OF PLACING BOX
$D_2$ – MIN. REMAINING CORNER DIMENSION
$D_3$ – RELATIVE SHOULDER HEIGHT
$A_1$ – REMAINING SURFACE
$W_A$ – AVERAGE WIDTH OF ALL BOXES IN STACK AND BUFFER
$W_M$ – MINIMUM WIDTH OF ALL BOXES IN BUFFER
$H_M$ – MINIMUM HEIGHT OF ALL BOXES IN BUFFER
$A_A$ – AVERAGE AREA OF ALL BOXES IN STACK AND BUFFER

STACKING RULES
*FIG. 64*

STAIRCASE:
RULE 6: THERE EXISTS A BIG GAP IN THE MIDDLE OF A NEARBY CORNER
SURFACES AND CURRENT PLACEMENT LEAVES USELESS
SPACE ON THE SAME SIDE

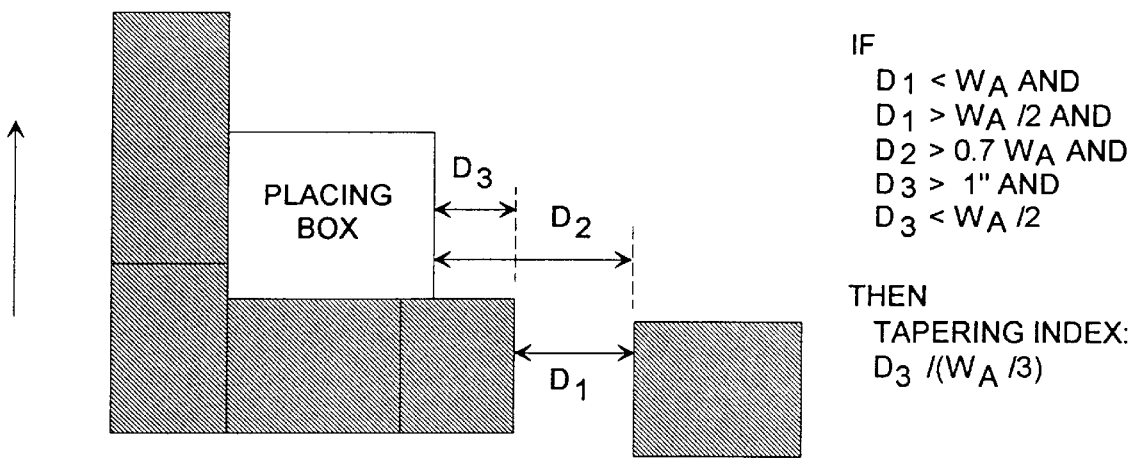

IF
   $D_1 < W_A$ AND
   $D_1 > W_A/2$ AND
   $D_2 > 0.7 W_A$ AND
   $D_3 > 1"$ AND
   $D_3 < W_A/2$

THEN
   TAPERING INDEX:
   $D_3/(W_A/3)$ $D_1$ -- GAP IN CORNER SURFACE ON THE SIDE
$D_2$ -- DISTANCE TO NEXT CORNER SURFACE
$D_3$ -- MIN. DIMENSION OF REMAINING SURFACE
$W_A$ -- AVERAGE WIDTH OF ALL BOXES IN STACK AND BUFFER

STACKING RULES

FIG. 65

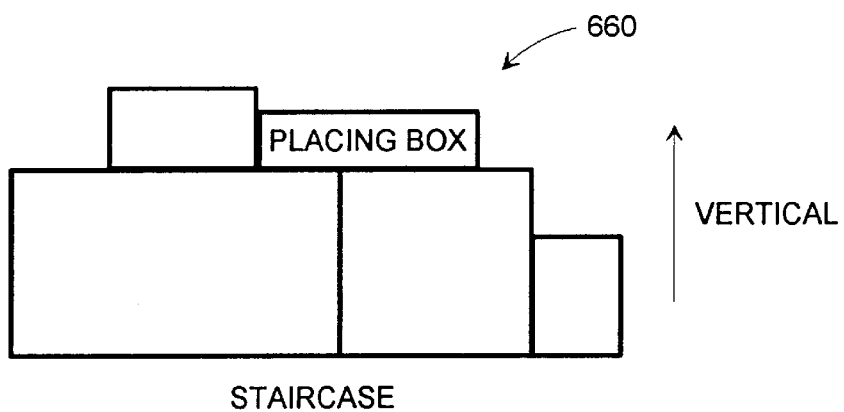

STAIRCASE

FIG. 66

STACKING RULES

BOUNDARY:
RULE 8: TOO MUCH SURFACE SPACE COULD BECOME WASTEFUL ON RIGHT BOUNDARY

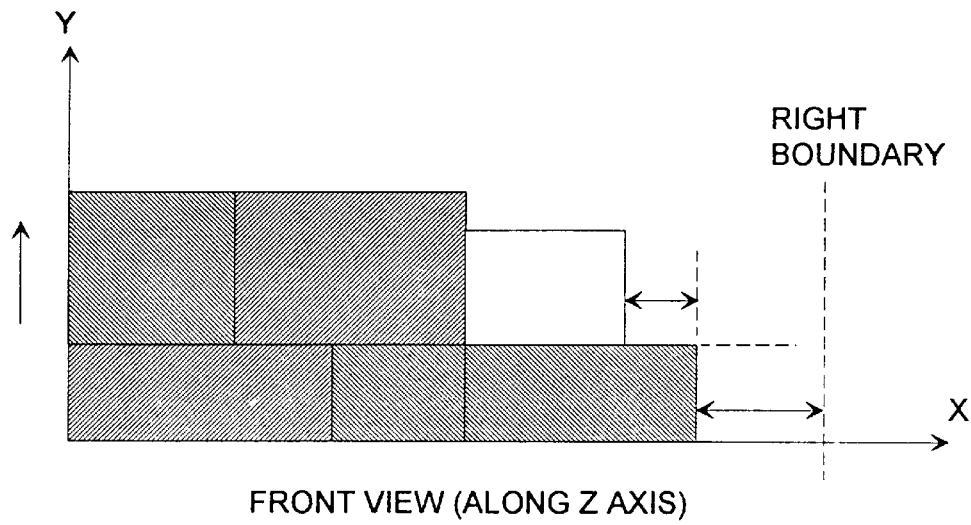

FRONT VIEW (ALONG Z AXIS)

IF
   *BOX IS CLOSE TO RIGHT BOUNDARY AND
   NO BOX CAN BE PLACED ON THE RIGHT OF
      PLACING BOX   TO MATCH ITS HEIGHT AND
   $D_1 > W_A/3$

THEN
   TAPERING INDEX: $1.7 \times D_1 / W_A / 3$

*BOX IS CONSIDERED AS CLOSE TO RIGHT BOUNDARY WHEN $D_2 < L_A$ OR
   $(D_2 < 1.5 L_A$ AND
   $D_1 < L_A$ AND
   THE LOWER CORNER ASSOCIATED WITH $D_2$
   IS NOT USEFUL)

$D_1$ IS THE MINIMUM DIMENSION OF SURFACE AFTER PLACING BOX
$D_2$ – DISTANCE TO RIGHT BOUNDARY
$L_A$ – AVERAGE LENGTH OF ALL BOXES IN STACK AND BUFFER

STACKING RULES

*FIG. 68*

BOUNDARY:
RULE 9: BLOCKING RIGHT CORNER AT BOUNDARY SO A POSSIBLE SIDE
    PLACEMENT MAY BE LOST

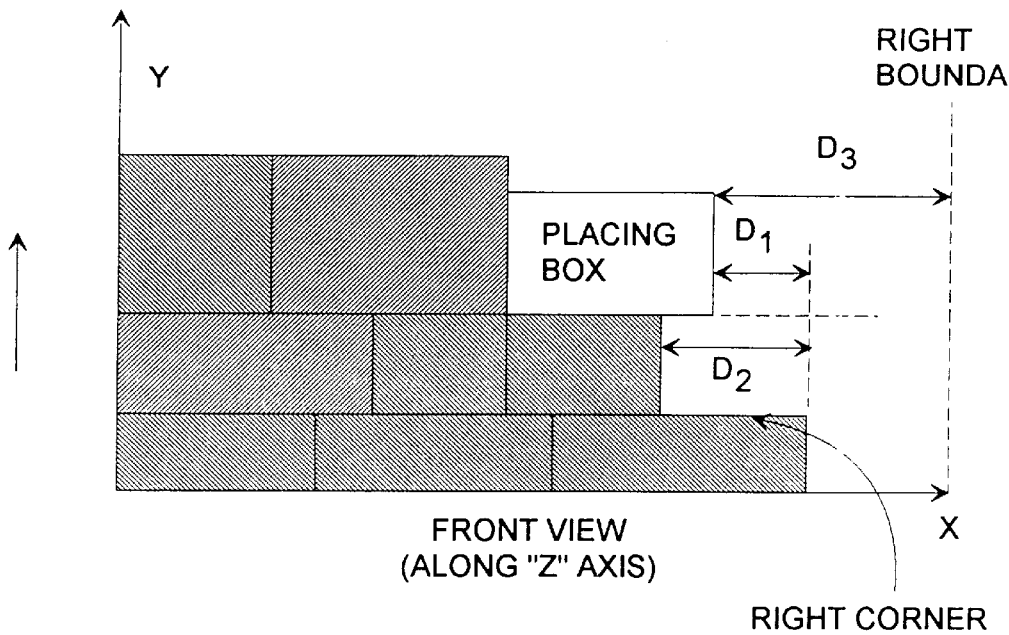

IF
　*PLACING BOX IS CLOSE TO RIGHT BOUNDARY
　AND
　NO BOX CAN BE PLACED ON THE RIGHT OF
　　　PLACING BOX B TO MATCH ITS HEIGHT AND
　$D_1 > 0.4\, W_A$ AND
　RIGHT CORNER MAY BE USEFUL AND
　$D_2 > 0.75\, W_A$

THEN
　TAPERING INDEX: 1.5

$D_1$ -- MIN. DIMENSION OF UNBLOCKED SURFACE PORTION AT
　　　RIGHT CORNER
$D_2$ -- MIN. SURFACE DIMENSION OF RIGHT CORNER
$D_3$ -- DISTANCE TO RIGHT BOUNDARY

*PLACING BOX IS CLOSE TO RIGHT BOUNDARY WHEN $D_3 < L_A$
$W_A$ - AVERAGE WIDTH OF ALL BOXES IN STACK AND BUFFER
$L_A$ - AVERAGE LENGTH OF ALL BOXES INSTACK AND BUFFER

*FIG. 69*

UNRECOVERABLE RIGHT BOUNDARY
(VIEWED ALONG Z AXIS)

BACK CORNER AT BOUNDARY

WIDE GAP
RULE 10: EXCESSIVE WIDE GAP WHEN PLACING BOX IS NOT
           NEAR THE FRONT BOUNDARY

FRONT BOUNDARY

BIRD'S EYE VIEW
(ALONG Y AXIS)

$D_1$ -- DISTANCE TO LEFT NEIGHBOR
$D_2$ -- DISTANCE TO RIGHT CORNER BOUNDARY
$D_3$ -- DISTANCE TO BACK CORNER BOUNDARY
$W_A$ - AVERAGE WIDTH OF ALL BOXES IN STACK AND BUFFER
$MIN(D_1, D_2)$ -- THE LESSER OF $D_1$ AND $D_2$

STACKING RULES

BACK ALIGNMENT

BOX GROUP BOUNDARY

SIDE FRONT CORNER FIT (A)

POTENTIAL RIGHT BOX (B)
POTENTIAL RIGHT PLACEMENT

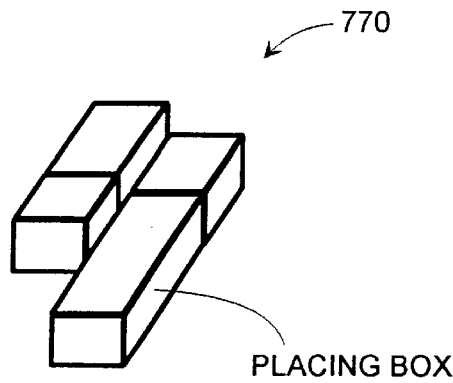
BOX OVEREXTENDS BEYOND SIDE NEIGHBORS
FIG. 79
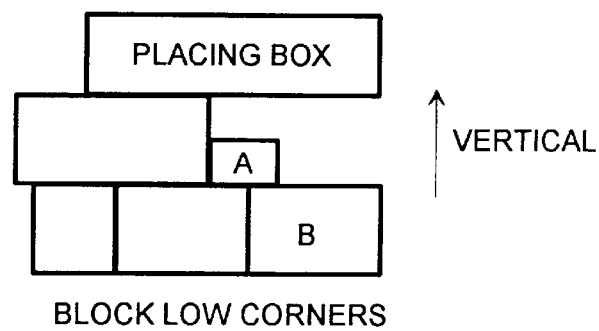
BLOCK LOW CORNERS
FIG. 80
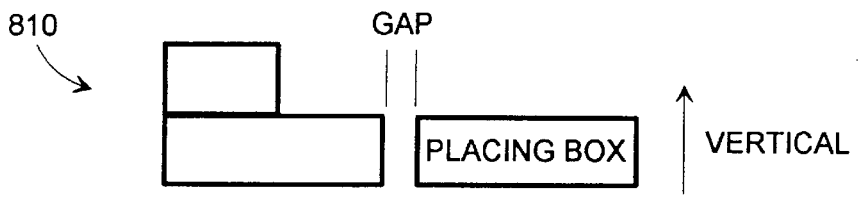
FIG. 81
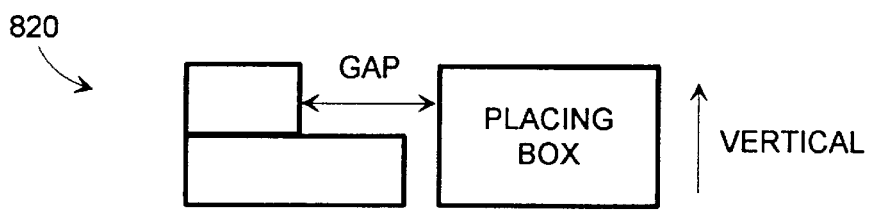
GAP TO NEIGHBOR BOX
FIG. 82

FIG. 84 AVERAGE VOLUME EFFICIENCY BASED PARAMETER SEARCH

SOFTWARE MODULES INTERACTION

BUFFER LIFT HEIGHT COMPUTATION

RE: WEIGHT PASSING FROM LAYER TO LAYER

RE: WEIGHT PROPAGATION

TASK ARRANGEMENT

⟶ NORMAL CASE
┈┈▷ EXCEPTIONAL CASE

STACK TASK EXECUTION FLOW CHART

PLAN TASK EXECUTION FLOW CHART

TRAJECTORY TASK EXECUTION FLOW CHART

COMBINED MOVING RECTANGULAR OBJECT DEFINITION

PERIPHERAL DEVICES TASK EXECUTION FLOW CHART

APPARATUS FOR SELECTING PACKAGE FROM A LINE OF ACCUMULATED PACKAGES

CROSS-REFERENCE TO PRIOR RELATED APPLICATIONS

This application is a Divisional of application Ser. No. 08/756,675, filed Nov. 26, 1996 now U.S. Pat. No. 5,908,283.

TECHNICAL FIELD

This invention relates in general to package handling, and more particularly relates to a method and apparatus for receiving packages of random size and stacking the packages in a stable configuration upon a pallet or other suitable location, such that the entire pallet and its contents thereon may be shipped to a remote destination.

BACKGROUND OF THE INVENTION

In the prior art, it is generally known to provide methods and apparatuses for stacking individual packages (which may also be referred to as "boxes") into one or more groups, in order that the groups of packages may be commonly transported to a remote location. Such prior art apparatuses tend to be grouped into "random" and "non-random" palletizing systems.

U.S. Pat. No. 5,1745,692 to Mazouz, entitled "Method and Apparatus for Randomly Arriving Mixed Size and Content Parcels", discloses a method and apparatus for stacking parcels with the use of a circular "carousel"-type conveyor 2 which accepts packages and stacks them upon pallets such as 6. Certain "attribute factors" are used to select a parcel, such as toxicity, drop tests, crushability, fragility and content. An important part of the Mazouz disclosure appears to be the use of "voxels", which are of "unit length". The "largest common voxel" is determined for modeling purposes.

Although prior art such as Mazouz includes advantages, needs always exist for improvements over the prior art which provide improved accuracy and efficiency of pallet stacking, which is provided by the present invention.

SUMMARY OF THE INVENTION

The present invention overcomes deficiencies in the prior art by providing a method and apparatus for measuring, accumulating, and palletizing packages which provides improved stacking efficiency in a time-efficient manner.

Therefore it is an object of the present invention to provide an improved method and apparatus for handling packages.

It is a further object of the present invention to provide an improved method and apparatus for stacking packages in a stable manner.

It is a further object of the present invention to provide an improved method and apparatus for stacking packages received in a random manner.

It is a further object of the present invention to provide an improved method and apparatus for stacking packages which is adaptable for a wide range of package dimensions.

It is a further object of the present invention to provide an improved method and apparatus for stacking packages which is efficient in its use of time and space.

It is a further object of the present invention to provide an improved method and apparatus for identifying the "center position" of a package which is on an accumulator conveyor.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 39 is an illustrative top plan view of a plurality of stacked packages (some shown in phantom), illustrating the concept of the use of a Direct Support Surface Polygon under the present invention.

FIG. 40 illustrates a model 400 showing the possibility that a gravity center rectangle may fall outside of a Direct Support Surface Polygon.

FIG. 41 illustrates a "side force" concept.

FIG. 42 illustrates a package stack 420.

FIG. 43 illustrates side weight propagation within a package group 430.

FIG. 47 is a list of weighing factors used in the performance index according to the present invention.

FIGS. 49A–49C illustrates height count computation.

FIG. 57 is a side illustrative plan view of a plurality of stacked packages, with a proposed "Placing Package" being evaluated on the basis of whether it will block a possible under placement.

FIG. 60 illustrates slender box checking when the placing box is not at a cornerstone, resulting in a value $2(1-(D_1/$ $W_A$)) being summed into the equation shown in FIG. 54 if certain criteria apply.

FIGS. 61A–61B illustrate the results of a slender package creating a gap in a stack 610.

FIG. 64 illustrates the calculation of a "staircase" portion of the tapering index factor, which is summed as shown in FIG. 54 before a threshold is applied.

FIG. 65 illustrates the calculation of another value ($D_3/W_A/3$) which can be added into the "staircase" portion of the tapering index factor which is itself added into the performance index as shown in FIG. 46.

FIG. 66 illustrates staircase stacking in a stack 660.

FIG. 68 illustrates the concept of stacking rules as they relate to right boundary spaces in the model shown as 680.

FIG. 69 illustrates another stacking rule relating to stacking boundaries, which if satisfied would result in a value at 1.5 being added into the tapering index calculation.

FIG. 79 illustrates a stack 770 in which the placing box overextends beyond side neighbors, which relate to the dimensional coverage ratio.

FIG. 80 shows a stack 800 in which a placing box blocks low corners which are the corners above boxes A and B.

FIGS. 81 and 82 shows a gap to neighbor boxes in stacks 810, 820, respectively.

DETAILED DESCRIPTION OF THE PREFERRED EMBODIMENT

Figure 1:
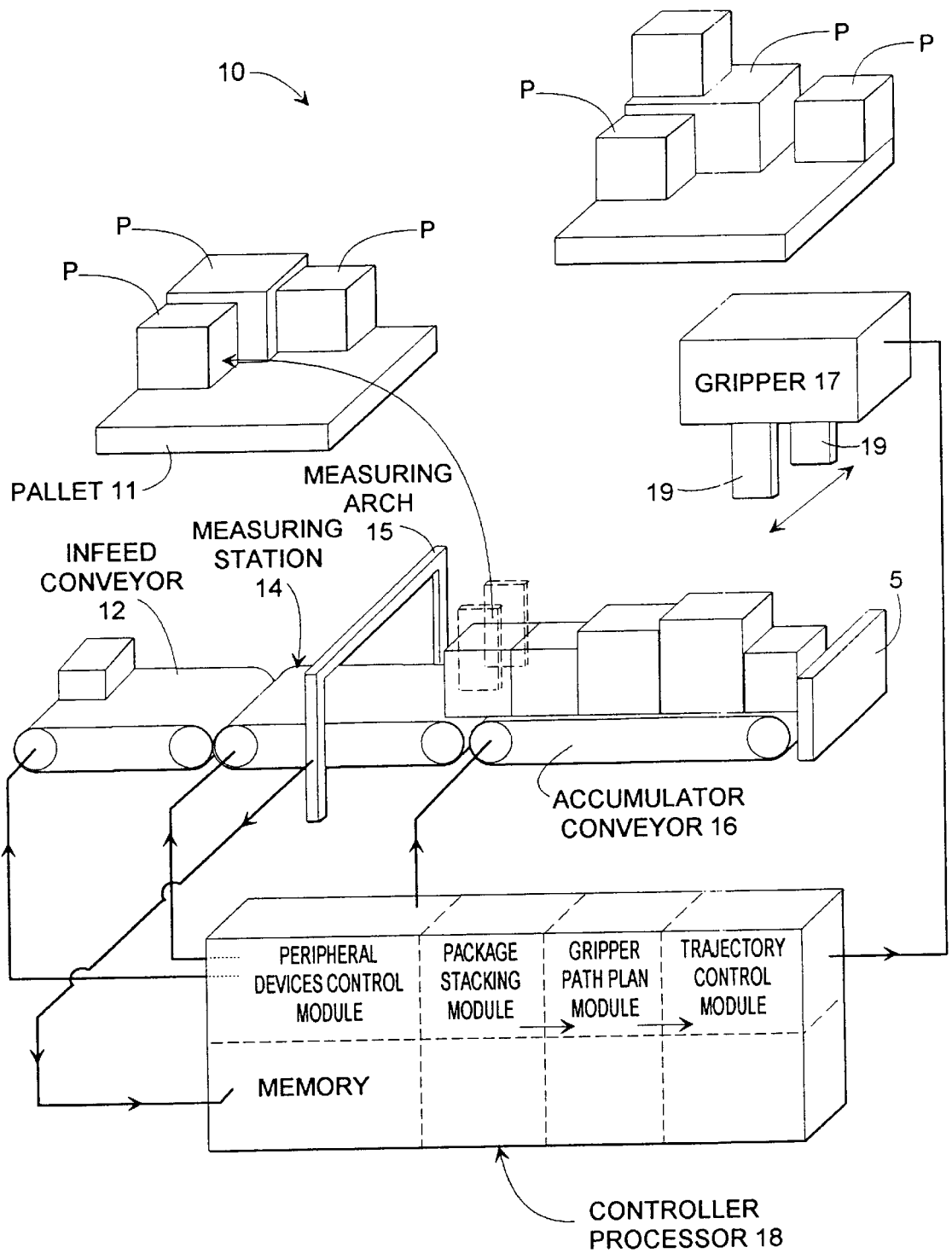
FIG. 1 is an illustrative view of an apparatus 10 according to the present invention, which includes an accumulator conveyor, an infeed conveyor, a measuring conveyor, a gripper, and a central processor. Pallets having packages stacked therein are likewise shown.

Here is a general outline of the detailed description.
I. GENERAL OPERATION
II. MORE DETAILED DISCUSSION
  A. RECEIVE IN RANDOM
  B. MEASURE
  C. ACCUMULATE
  D. PALLETIZE
    1. Execute Package Stacking Decision
      A) Corner-Based Modeling
        1) Model Setup
          a) Create Corners
          b) Use of Surfaces in Corner Record
          c) Establish Neighbor Lists
          d) Establish Package List w/address 2) Model Updating
   a) Adding new corners
   b) Updating existing corners
   c) Merge redundant corners
   d) Update corner surf, neighbor list
B) Establish all possible placements
   1) General Placement Options; Flushing and Shifting
   2) Front Flushing
   3) Side Flushing
   4) Shifting
C) Check Stability
   1) Check percentage of surface support
   2) Compute gravity center region
   3) Check boundary of effective Supporting Surface
   4) Check side support
   5) Check Dist of DSSurface
   6) Compare GCRegion re DSPolygon
D) Placement Evaluation
   1) General discussion
   2) Tapering Index Factor
      Under Blocking
      Slender package check
      Staircase check
      Boundary check
      Wide Gap check
      Summation
      Relative height threshold
   3) Level Index Factor
      LEVEL ALL
      LEVEL SIDE
      BELOW
      ABOVE
      BLOCK BACK
   4) Other Factors
      Potential level package count
      Grouping
         area fill ratio
         package area
         package volume
         dimensional coverage
         alignment
      Surface bridging
      Blocked area
      Blocked volume
      Gap to neighbor
      Package age
      Potential field
      Package weight
      Ceiling distance
   5) Performance Index Summation
   6) Determination and Tuning of Parameters
E) Execute Multi-Loop Decision Process
   1) Loop Nesting Variation
   2) Short Cuts
2. Picking (and Placement) of Packages with Gripper
   a) Gripper configuration
   b) Error correction
3. Efficient Placement and Pick Path Planning
   a) Modeling
   b) Placement Path Configuration
   c) Pick Path
   d) Via Positions Generally
   e) Buffer Departure/Approach Height
   f) Pallet Departure/Approach Height
   g) Single Pallet Collision Search
   h) Single Package Collision Search
   i) Collision Package Inspection and Convexing Check
   j) Check for Adjacent Via Position
   k) Forward Check
   l) Backward Check
   m) Add Lower Tolerance
4. Place
E. TIMING EFFICIENCY
   1. Robot Motion Planning
   2. Timing arrangement
   3. One-package-ahead planning
   4. Multi-tasking
F. ERROR CORRECTION
III. CONCLUSION
I. General Operation The present invention relates in general to the palletizing of packages of arbitrary size and weight. The invention contemplates the receipt of individual packages where distribution of package size and weight is purely at random, with each package possibly different from every other package. Preferably, all packages are rectangular in shape, and composed of compliant material such as corrugated cardboard or solid material such as plywood. In using a overhead gantry-type robot to palletize such packages, the invented arrangement method will yield a simple mechanical configuration, will improve package pick-place cycle time and yield better pallet volume utilization efficiency.

A particular right rectangular package such as those typically passed through the mails is delivered at random to the stacking apparatus according to the present invention along with a number of similar randomly-received packages. These packages are measured, weighed, and accumulated in line on a buffer conveyor. Based upon a predetermined set of stacking principles, a package is then selected from the line of packages on the accumulator and stacked along with other packages upon a pallet. If room permits, another randomly received package is measured and placed upon the accumulator conveyor, and once again the stacking principles are called upon to select the "best" package for placement on the pallet. This process continues until the destination pallet(s) are full or no more packages can be stacked under the predetermined stacking guidelines.

In order to determine which package to select from the accumulator conveyor and to determine where to place it on the pallet, a model (which can be computer-based) is constructed of the packages already on the pallet. This is done by use of outside package measurements taken before the packages were placed. This model includes the use of a plurality of "corners" (which are essentially right rectangular spaces) which combine to compose the remaining space on the pallet. Corners can overlap.

Now that the corners are defined it is now desired to define a plurality of "potential package placements" also which may be referred to as "candidate package placements", or generally as "package placements". A particular package is selected for evaluation at a particular orientation within a particular corner. A check is first made as to whether the package will even fit into the corner at that orientation. If it will not, another orientation is selected. If the package will not fit within the corner regardless of its orientation, another corner will be selected and the process repeated until a corner is located which will accept the package at some predetermined orientation, or until all possible orientation/corner combinations for the given package have been exhausted. At that point a new package is selected, and the process is repeated.

If a package/orientation combination is discovered which will fit within the boundaries of a corner, and if the corner is large enough relative to the package, two or more different potential package placements within the corner can be generated by processes known as flushing and shifting. As each of these potential package placements are generated, each is evaluated under a stability check in an effort to find a stable potential package placement. If no flushing and shifting is possible within the corner, the single package/orientation/corner combination is evaluated under the stability check.

The stability check provides a "stable" versus "unstable" determination for potential package placements available within each particular package/orientation/corner combination. This analysis is partially based on the amount of actual and effective lower surface support the package would have if it was actually placed in the package/orientation/corner combination under evaluation, and also evaluates the amount of side support which would be provided to the package by other adjacent (already placed) packages. Another part of the stability analysis relates to package corner and edge support.

Once a particular potential package placement is identified as being stable, this placement is then evaluated under a performance index, and a performance index value for that particular package/orientation/corner combination is calculated and stored.

Other package/orientation/corner combinations are likewise evaluated for stability, and if stable are likewise evaluated under the performance index. The package/orientation/corner combination having the highest performance index is the one which is chosen to be actually "executed", i.e., the chosen package actually gets removed from the accumulator conveyor by the gripper and transferred by the gripper to the chosen corner at the chosen orientation, such that the best "package placement" has been selected.

During each "pick and place" cycle of the gripper, the gripper (assumed here to have just placed a package) then moves along a "pick path" to pick a selected package from the accumulator conveyor, and then moves along a "placement path" to place the package at its selected location. These "pick" and "placement" paths (of the gripper and package, respectively) will differ for each cycle. For purposes of time efficiency, the pack and place paths are each planned out according to the present invention to minimize their distances. Under the present invention, these paths are restricted to lying in separate vertical planes, that is, the package (or gripper) will only go up or down or horizontal when being moved toward its destination with no movement to either side. To plan such paths an evaluation is made of potential obstructions (typically stacked packages) between beginning and ending positions along the "pick" or "placement" paths. This evaluation includes a determination of obstructions (typically stacked packages) intersecting a vertical plane intersecting the ends of the paths, and the establishment of acceptable "via positions" which are just clear of (i.e., above) the obstructions. Scanning processes are used to discard some of the via positions to establish a preferred pick (or placement) path which is convex along its length. This results in noninterfering pick and place paths which approach the minimum distance between their ends, given the paths' vertical plane limitation.

When the gripper picks up a package from among other packages within the "package line" on the accumulator conveyor, it is advantageous to know where the package actually is within the package line. An accumulative error correction analysis is thus made to accommodate the difference between where the package "should" be in the package line (based on upstream measurements), and where it actually may be due to package line compression or other factors. This error correction is done by comparing the actual length of the package line (measured by a sensor) to the "nominal" length of the package line (the mathematical summation of the lengths of the packages on the accumulator as measured upstream by the measuring station). By knowing the relative position of the "selected" package within the accumulated package line, and by knowing the total accumulated error between the actual (measured) overall package line length and the nominal (calculated) overall package line length, a portion of the total accumulated error is applied to the selected package. The gripper is then sent to the spot at which the package would be if no package deformation existed, with the accumulated error correction also being applied to accommodate package deformation or other actual errors.

Under one embodiment of the present invention, a single processor is used to process information relating to many different tasks discussed above, such as the stack task, robot path planning task, trajectory task, peripheral devices tasks, a printing task, and an error detection task. Under the present invention these tasks are prioritized such that the trajectory task takes the highest priority, followed by the error task, peripheral devices task, plan task, stack task, and print task. Whenever a high priority task is done, CPU time is immediately shifted to a task with lower priority.

Referring now to FIG. 1, one package palletizing apparatus 10 according to the present invention includes of the following components: an infeeding conveyor 12, a measuring conveyor 14 (including a measuring arch 15), an accumulator conveyor 16, an overhead-gantry type robotic package gripper 17, and a system controller 18.

The infeeding conveyor 12 justifies and singulates packages denoted generally as P. The measuring conveyor 14 measures the size and weight of incoming packages P. The accumulator conveyor 16 (which may be a roller-type conveyor) accepts measured packages and places them in direct line contact against an end stop S.

The overhead-type package gripper 17 (having grip members generally denoted as 19) picks up packages one at a time from the accumulator conveyor 16 and places them on a pallet according to an evaluative process described in detail below. In one preferred embodiment of the invention, only two package orientations are utilized for its placement on the pallet: the first orientation is the same as in the accumulator, and the other one is rotated by 90 degrees around a vertical axis.

Figure 3:
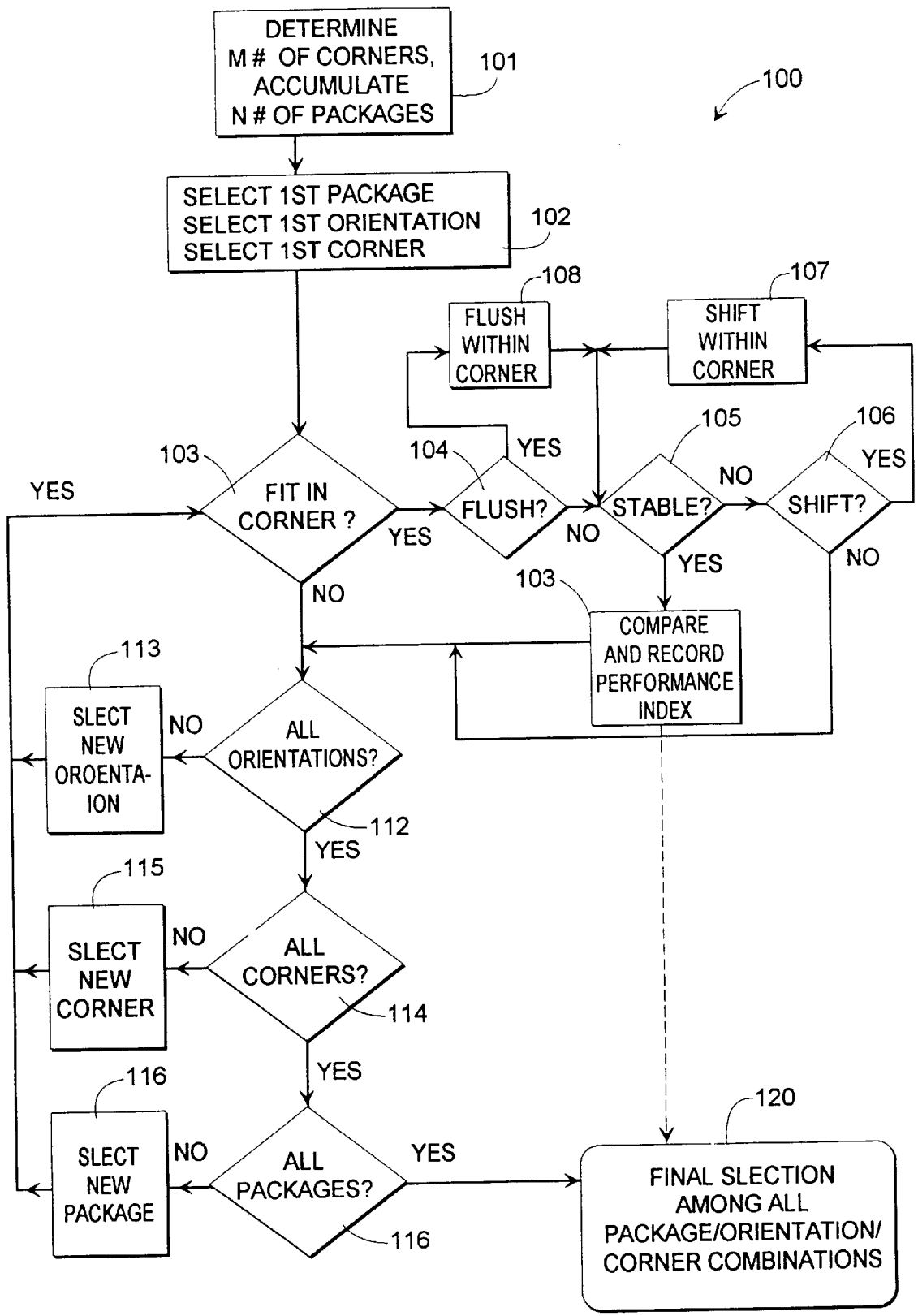
FIG. 3 is a flow diagram illustrating package and data flow within the apparatus according to the present invention.
Figure 4:
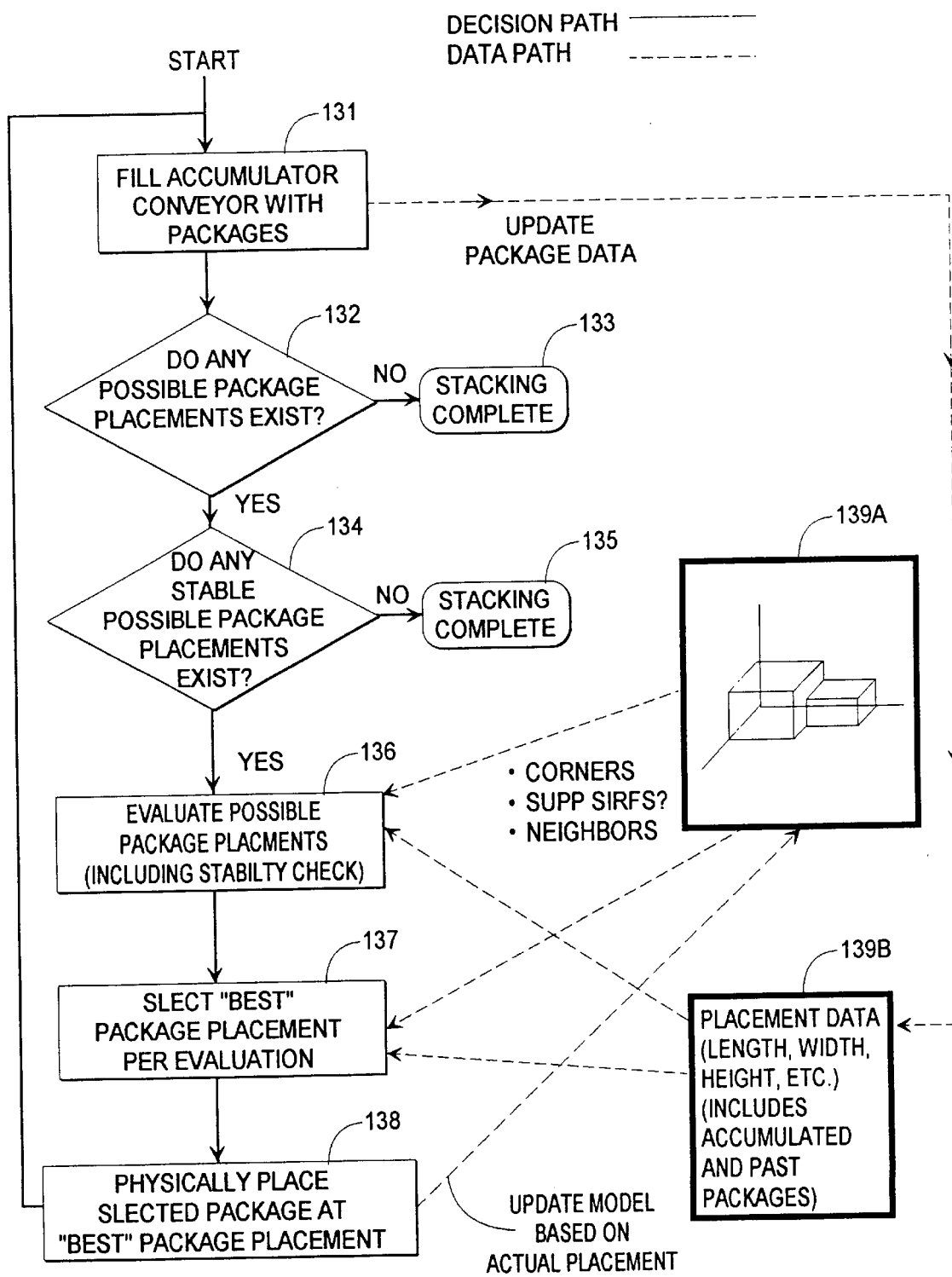
FIG. 4 is a data path/decision path interactive flow chart illustrating a method according to the present invention.

Referring now to FIG. 3, in one preferred embodiment of the present invention, all components of the setup shown in FIG. 1 may be controlled by a controller 20 including a VME bus controller such as 22 running a multi-tasking realtime operating system. Control software for the infeed conveyor 12, the measuring conveyor 14, the accumulator conveyor 16, the overhead-type package gripper 17, and stacking algorithms runs on a Motorola or other suitable CPU based processor. The processor (which may also be referred to as a controller) communicates with multi-axis servo controllers such as known in the art to control the infeeding conveyor 12, the measuring station 14, the accumulator conveyor 16, and the overhead-type package gripper 17. It also can interface with an analog I/O board to collect data such as weight from load cells, which in one embodiment of the present invention can reside in the measuring station.

Referring now again to FIG. 1, packages flow into the palletizing apparatus 10 from the infeed conveyor 12. After going across the measuring conveyor 14, packages are then fed into the accumulator conveyor 16. The overhead-type package gripper 17 picks a package from the accumulator conveyor 16 and places it on a waiting pallet such as 11. Within the system controller 18, measured package data is stored in computer memory, where stacking algorithms search for the best placement plan for the measured packages. The placement plan dictates which package is to be picked from the accumulator, where it is to be placed on the pallet, and which package orientation will be used.

Information regarding all stacked packages is stored in computer memory. During the search, the controller 18 references a geometric model of the stack, and develops a stack plan. After obtaining a stack plan, the controller 18 then starts motion planning, which searches for a path of the gripper and package that is collision free and has a minimum travel distance for each pick and place cycle. Using such paths, the controller will guide the robot through a series of package stack cycles which will result in a completely filled pallet.

A. Random Receipt of Packages

It is important to understand that the present invention addresses a particular situation where packages widely differing in size and shape are received in a purely random manner. This random supply may be provided by an external supply conveyor such as known in the art (not shown), or may also be provided by allowing the infeed conveyor 12 shown in FIG. 1 to be accessible to allow manual introduction of random packages as known in the art.

B. Package Measurement

After the packages are placed on the infeeding conveyor 12, they are conveyed therefrom to a measuring conveyor 14 (See FIG. 1), where needed information such as package height, width, length, and weight may be obtained, unless such information is already known by previous measurement.

After such measurements are taken by the measuring station 14, they are stored in the system's memory, for use as described later in this application. For example, the "common outside length dimension" is taken for all the packages, which can be used to estimate the actual length and location of the packages when accumulated in line contact on the accumulator conveyor.

C. Package Accumulation

Continuing in reference to FIG. 1, the accumulator conveyor 16 (which may also be referred to as a "buffer" conveyor) is an apparatus that accumulates multiple packages in a location which is randomly accessible to the overhead-type package gripper 17.

The accumulator conveyor 16 may be as known in the art. Generally, however, the accumulator conveyor 16 serves as a buffer to allow the stacking algorithms to have multiple choices in picking a package. Size and weight information concerning packages in the accumulator conveyor 16 is available for use in the stacking decision processes. The package finally selected will correspond to one which is believed to yield high stacking volume efficiency while still being stable in the stack immediately after placement and after complete palletizing. It may therefore be understood that providing a number of package choices via the accumulator conveyor 16 available is very important in achieving maximum pallet volume utilization efficiency.

Figure 2:
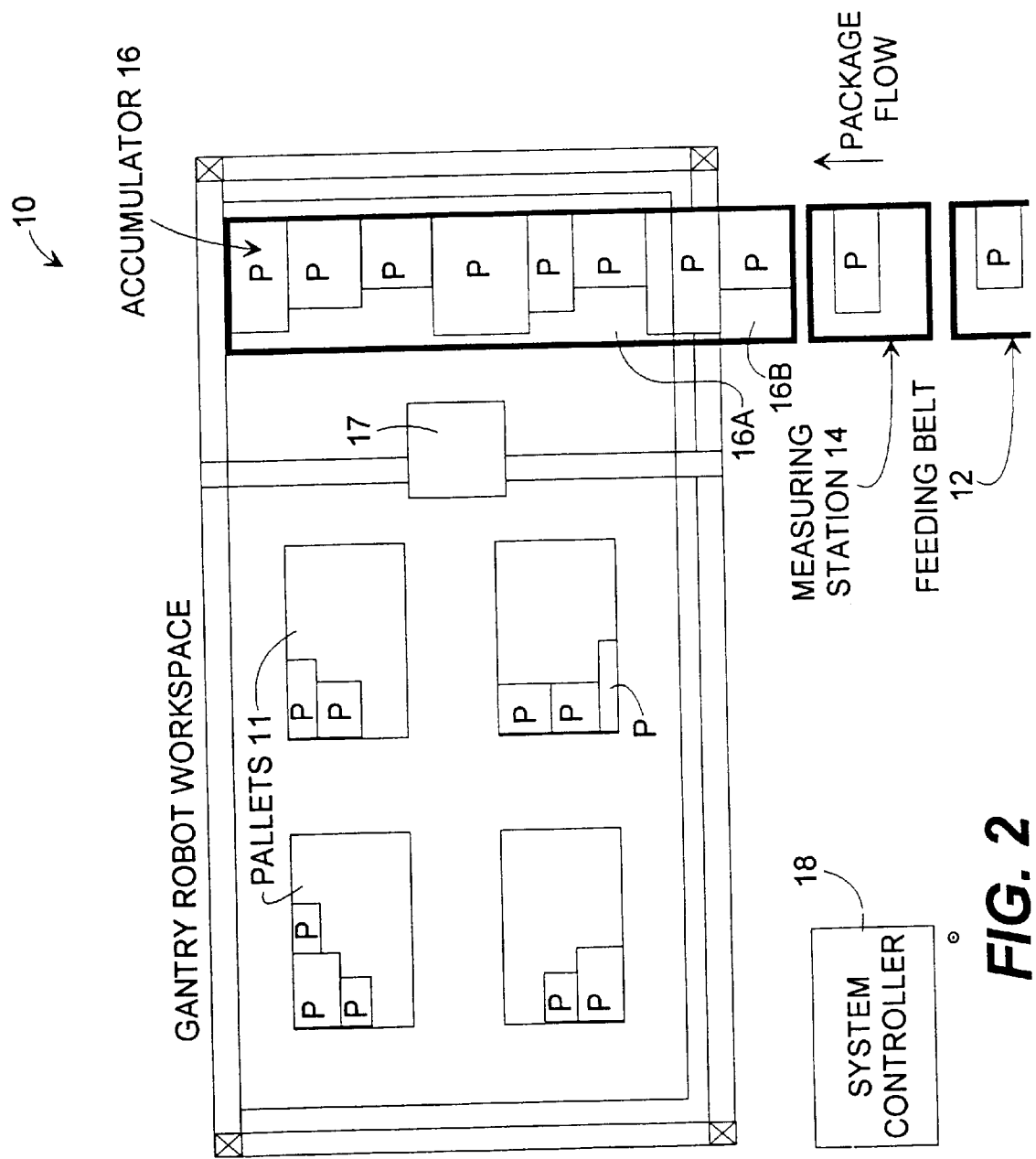
FIG. 2 is a top plan view of a multiple pallet layout being supplied by a feeding belt.

As shown in FIG. 2, the roller-type accumulator conveyor 16 is partitioned into two parts: a pre-buffer section 16A and a buffer section 16B. The buffer section 16B is within the reach of the overhead-type package gripper 17, whereas the pre-buffer section 16A is not.

Also as shown best in FIG. 2, all packages in the accumulator conveyor 16 are preferably side justified on one side of the accumulator conveyor 16, such that all packages have one side substantially aligned along a common plane. Adjacent packages are furthermore preferably in mutual or "line" contact. Any package in the buffer section 16B can be randomly picked up from the top by the overhead-type package gripper 18. Since the width is known for each package in the accumulator conveyor 16, the center position of a selected package in the buffer 16B can be computed as the summation of all the preceding package widths, plus one half of the selected package width, with error correction also possibly being provided as discussed in detail below.

As discussed above, the pre-buffer section 16A of the accumulator of FIG. 2 is beyond the reach of the package gripper 17, and contains one or more packages upstream of the accumulator conveyor 16. In one embodiment of the invention, the geometric and weight information of the package in pre-buffer is also known, and used in stacking decision making as well. This additional package information allows two advantages. The first advantage is that in selecting a current package in buffer, information concerning pre-buffered packages can be used to assist the stacking selection. For example, a package in the pre-buffer may be almost identical to one in the buffer, and when combined, both packages can be efficiently stacked. In this situation, the decision to select the package in the buffer for stacking depends upon the existence of the other package in the pre-buffer. The second advantage of the use of a pre-buffer is that before accumulator package feeding is complete, the controller computer can start evaluating a next package selection for stacking.

Figure 5:
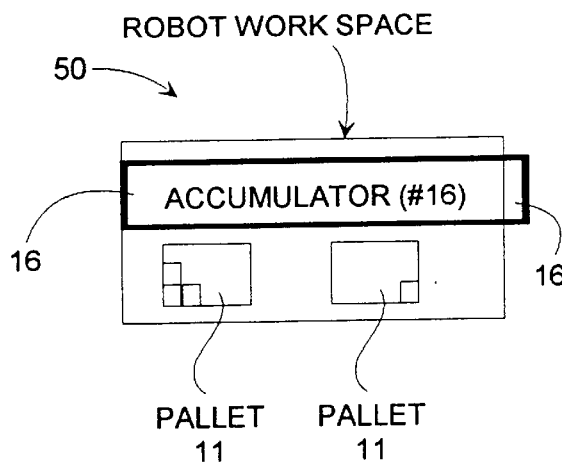
FIG. 5 is a top plan view illustrating a multiple pallet layout 50 having pallets on one side of an accumulator conveyor.
Figure 6:
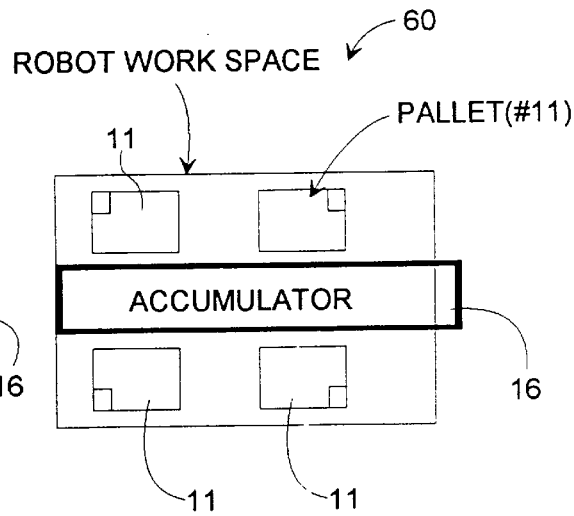
FIG. 6 is a top plan illustrative view of a multiple pallet layout 60 with pallets on either side of the accumulator conveyor.
Figure 7:
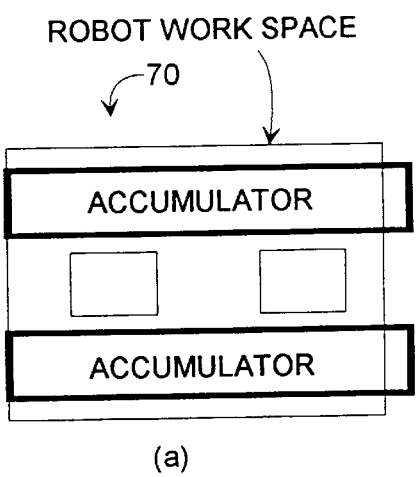
FIG. 7 is a top plan view illustrating a multiple accumulator conveyor layout 70 according to one embodiment of the present invention.
Figure 8:
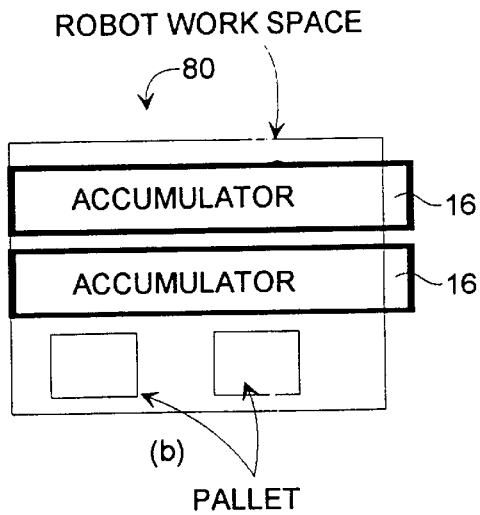
FIG. 8 is a top plan view illustrating a second multiple accumulator conveyor layout 80.

It should be understood that more than one pallet 11 may be stacked from one accumulator conveyor 16, as shown in FIGS. 5 and 6.

Simultaneous multiple pallet stacking offers two advantages. The first advantage is sorting capability. Multiple pallets might be shipped to different destinations. The mixed incoming packages could be sorted and stacked to these different pallets, with their destination obtained from bar-code or dense code scanning. Multiple pallet stacking achieves dual sorting and stacking purposes in one step. The second advantage is high pallet utilization. When multiple pallets are assigned to the same destination, the stacking algorithms can have more placement choices for a particular package. Better pallet utilization and volume efficiency will result from these additional choices.

The multiple pallets should be place as close to the buffer as possible. The layout of multiple pallets could be numerous, with pallets on one side of the accumulator as shown in FIG. 5, or on both sides of the accumulator as shown in FIG. 6.

Each cluster of multiple pallets can be organized into multiple rows and columns. FIG. 5 shows a single row of pallets on one side of the accumulator. FIG. 6 shows a configuration where there is a single row of pallets on both sides of accumulator. The distance between the buffer and pallet is an important determinant to the pick and place cycle time. The shorter the distance, the faster the cycle, since robot is required to travel less distance.

Figure 9:
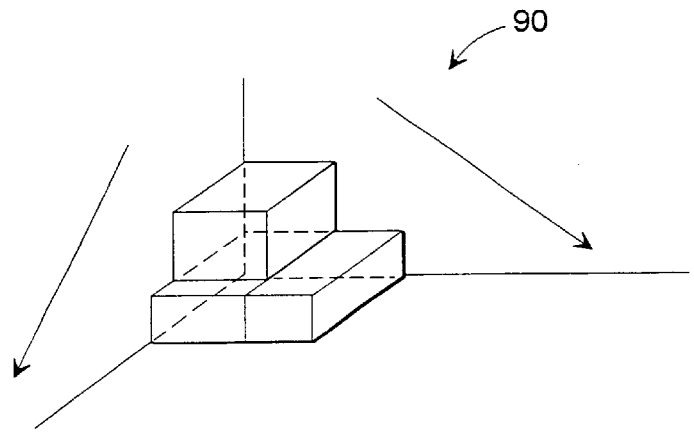
FIG. 9 is a pictorial illustrative view illustrating a pyramid stacking profile 90 practiced under the present invention.

The location for placing the first package in each pallet is chosen as far away from the buffer and other pallets as possible. From that starting package, each pallet will approximately follow the profile of a quarter pyramid. FIG. 9 illustrates a typical stacking profile 90. This arrangement will reduce the number of obstacles in the pick and place path for placing subsequent packages, with the able robot go in a straight line path to the target position in most instances.

During the middle of pallet stacking, some packages might be difficult to fit on the half-finished stack (packages that are too big, too long, etc.). These packages tend to stay in the non-feeding end of the accumulator. Those packages can be rejected, and the buffer refilled with fresh packages. This method could increase pallet stacking volume utilization efficiency. The rejected packages could be recycled back to the palletizing process, at which time, the stack shape might be totally different and allow the recycled packages to be stacked successfully.

D. Palletization

As previously discussed, once packages are on the accumulator conveyor 16, a decision is made based as to which package should be picked from the accumulator conveyor 16 and placed upon a pallet, within a waiting truck, or at another suitable stacking site. This "package stacking decision" may be based upon a predetermined set of rules established under the prior art, or a predetermined set of rules established under the present invention. Examples of predetermined sets of rules established under the prior art are set forth in U.S. Pat. No. 5,175,692 to Mazouz, hereinafter incorporated into this application by reference.

1. Execution of the Package Stacking Decision

As discussed above, a package stacking decision process can play an important role in a palletizing loading system. It decides which package to pick from those grouped on the accumulator conveyor, which orientation of the package will be used, and where the package will be placed in the stack.

One package stacking decision process according to the present invention can be understood as including five elements:

1) modeling based on "corner"-based principles;

2) establishing potential placement locations for all packages waiting on the accumulator, 3) checking the stability of the potential package placements; and 4) evaluation of the potential package placements based upon a predetermined performance index; and 5) selecting a package placement.

It should be understood that although much of the modeling done herein is done via computers, actual stacking could be conducted to create the model without departing from the present invention.

A) Corner-Based Modeling

1) Model Setup

Under one preferred embodiment of the present invention, focus is made upon "corners". All unfilled free space in the pallet is partitioned into individual corners, which may overlap each other. As discussed in detail elsewhere in this application, an evaluation is made as to which corner will receive which package based on a predetermined set of comparative parameters.

As discussed in later detail, each corner record has an origin, three length dimensions (height, width, and length), supporting surface locations and dimensions, and neighbor lists.

a) Corner Creation

Figure 10:
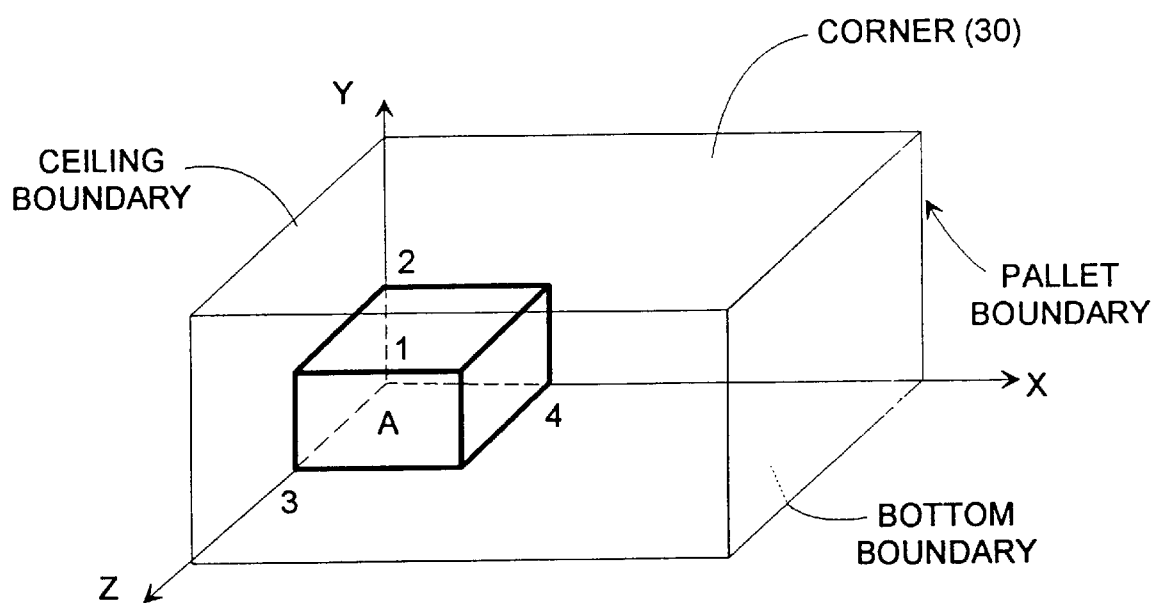
FIG. 10 is a pictorial three-dimensional illustration of a corner 30 according to the present invention, positioned within a three-dimensional coordinate system including mutually perpendicular axes X (horizontal), Y (vertical) and Z (horizontal).

Reference is now made to FIG. 10. It should be understood that a pallet has a bottom boundary (in plane XZ), a ceiling boundary parallel to and spaced above the bottom boundary, and four side boundaries. A corner 30 is computed as a rectangular free space with all sides common to either a pallet boundary, or at least partially common to existing package surfaces.

Figure 11:
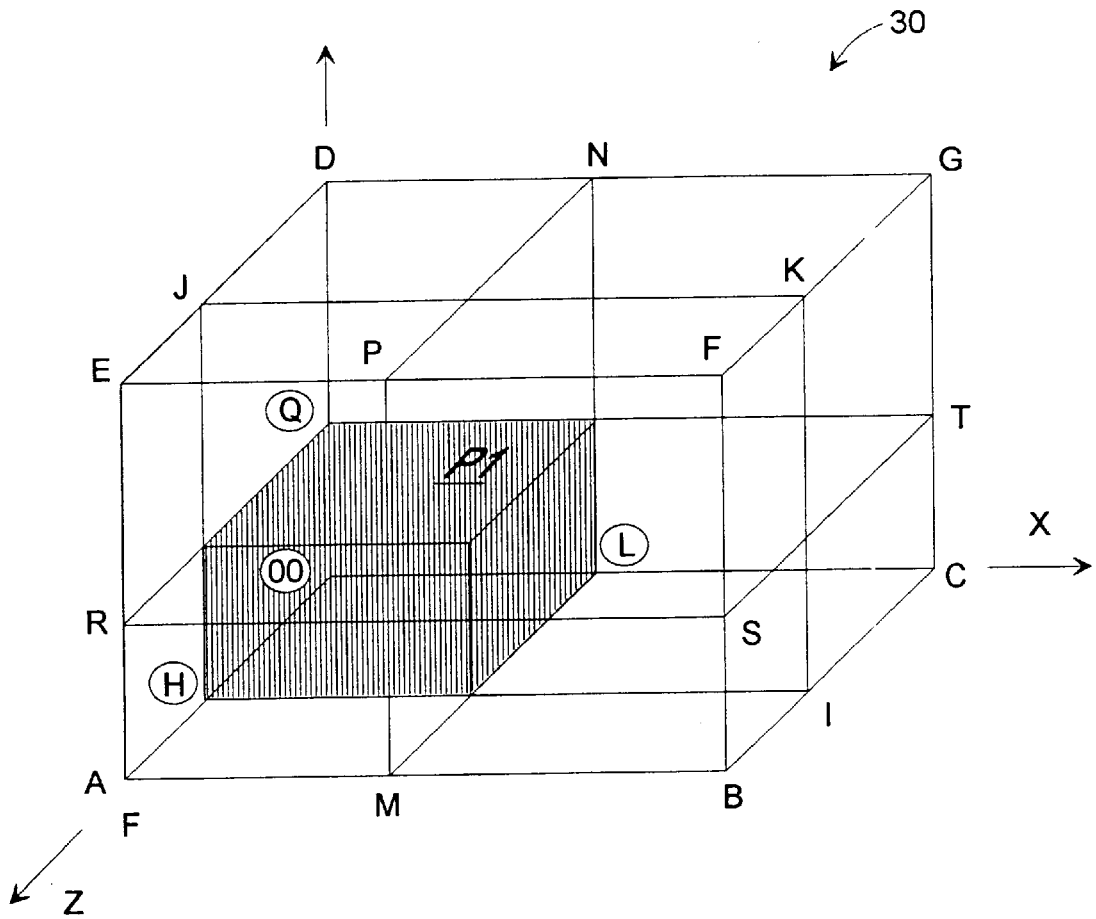
FIG. 11 is a view similar to that shown in FIG. 11, except that a prospective package "P1" has been considered for placement, and several corners have been created.
Figure 12:
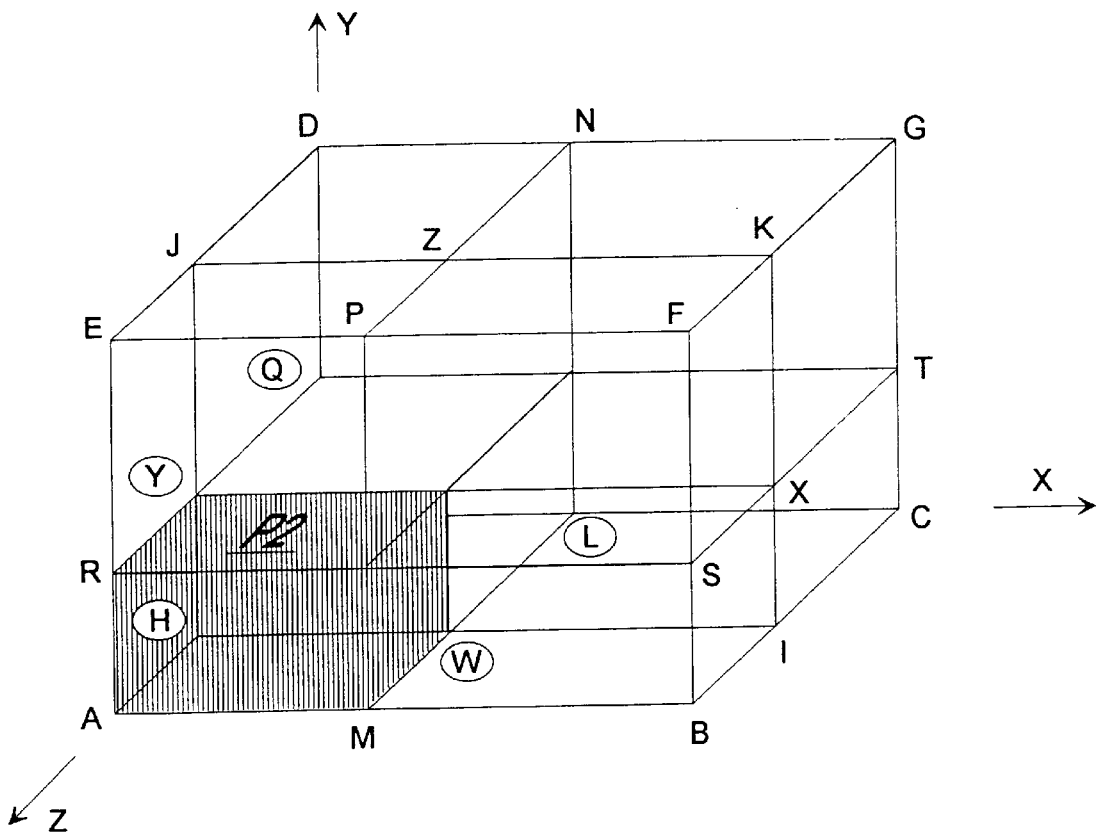
FIG. 12 is a view similar to FIGS. 11 and 10, except that another package "P2" has been added, and additional corners have been added.

Reference is now also made to FIG. 11. Initially, without any package placement, the whole space inside the pallet boundary is a rectangular free space. This is the very first corner and is noted as Corner 1 in FIG. 10. Once a package such as P1 in FIG. 11 is placed in Corner 1 (being the only available corner), the original Corner 1 disappears. The remaining free space of that corner is then subdivided into up to 6 partitions with respect to the package: below, above, to the back, to the front, to the left, and to the right. These free space partitions, to the extent they exist, will also be rectangular, and are referred to as child corners.

In some cases there will not be six child corners left over after a corner is utilized. For example, if a placed package touches a pallet boundary, the space between the boundary and the package is zero, and the corresponding child corner will be nulled. In FIG. 11, package P1 is placed against the left, back, and bottom boundary of the pallet, therefore only three new corners can be generated: one in the front (New Corner 2), one on the right (New Corner 3), and one above (New Corner 4). A complete set of corners (in this case now 2, 3, and 4) now spans the entire free space of stack. It may be noted that each of these three corners shares volume with and thus "intersects" each of the other two; therefore as may be seen later, it may be understood that a package once placed may lie within more than one corner.

b) Corner Supporting Surfaces; Bridgability

Under one embodiment of the A corner always has at least one "supporting surface". Some corners, such as those having a pallet floor surface as a supporting surface, have a single supporting surface covering the entire bottom boundary of the corner. However, one corner can have multiple supporting surfaces provided by the top surfaces of multiple packages, and it should therefor be understood that a corner's bottom boundary may not always include a supporting surface.

Figure 15A:
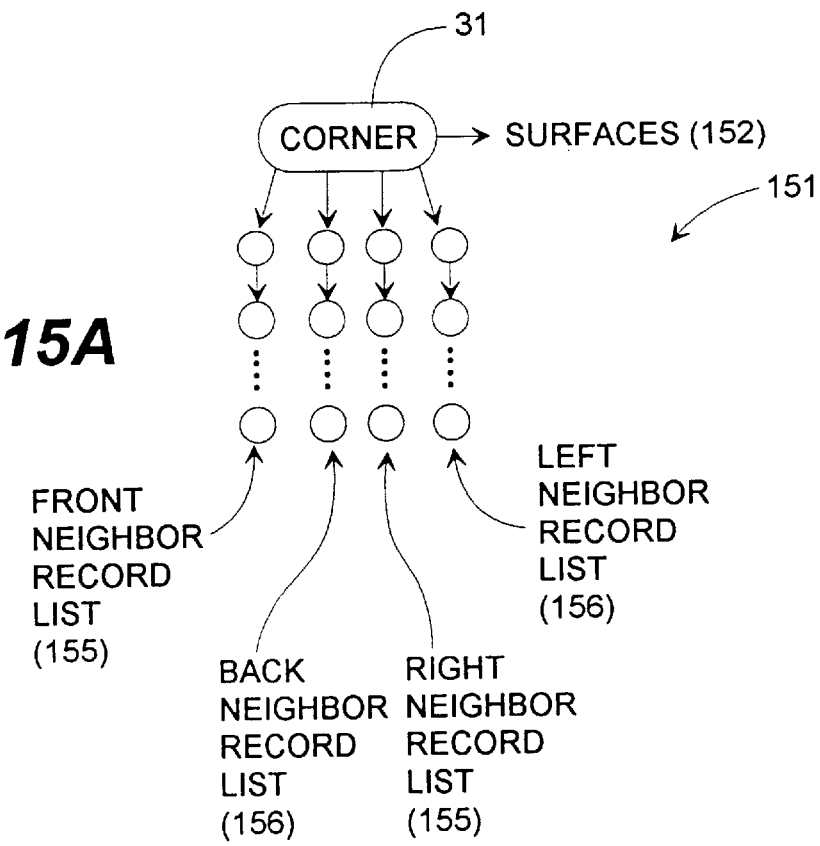
FIG. 15A is an illustrative view of a corner record 31, and the surfaces, and the front, back, right, and left neighbor lists which are associated with each corner under the present invention.

Referring now also to FIG. 15A, In the memory of the controlling processor, a corner record 31 is assigned to each corner 30 created under the model. In the corner record 31, supporting surface information is included, including all bridgeable surfaces (discussed elsewhere) within the corner boundary. Two surfaces are bridgeable if they can be used in combination to support a package. Under one embodiment of the present invention, two surfaces are considered to be able to support a package when the differences of their relative heights is within a pre-specified tolerance, such as ½ inch, and when the distance between the two surfaces is which a specified distance, such as half of the average package length of accumulated packages.

Figure 13:
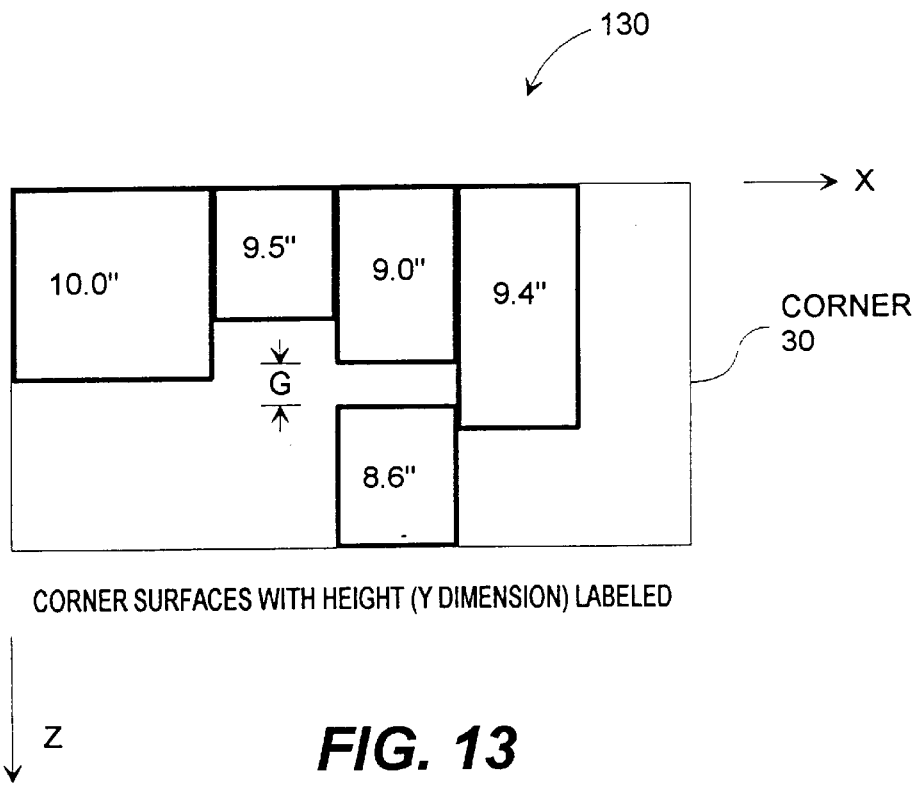
FIG. 13 is a top plan view of a corner, and supporting surfaces being considered for use within a corner.

FIG. 13 illustrates this concept. As may be seen, there are five surfaces within the boundary of the corner. Each surface is labeled in the figure with its height. It is assumed that the "G" is less than the average package length. Since neighboring relative heights are all within the bridging tolerance, (½ inch), then these five surfaces "belong" to one corner, and will be recorded in the corner record. In general, two neighboring surfaces, as long as they can be bridged either from left to right, or back to front, and both are in a corner boundary, will belong to the same corner.

Since all bridgeable surfaces are contained in a corner, it may be understood that during a search for a package placement among corners, it is only necessary to search one corner at a time.

The information regarding the above-referenced surfaces is contained within a corner record as shown in FIG. 15A.

c) Establishment of Neighbor Lists

Figure 14:
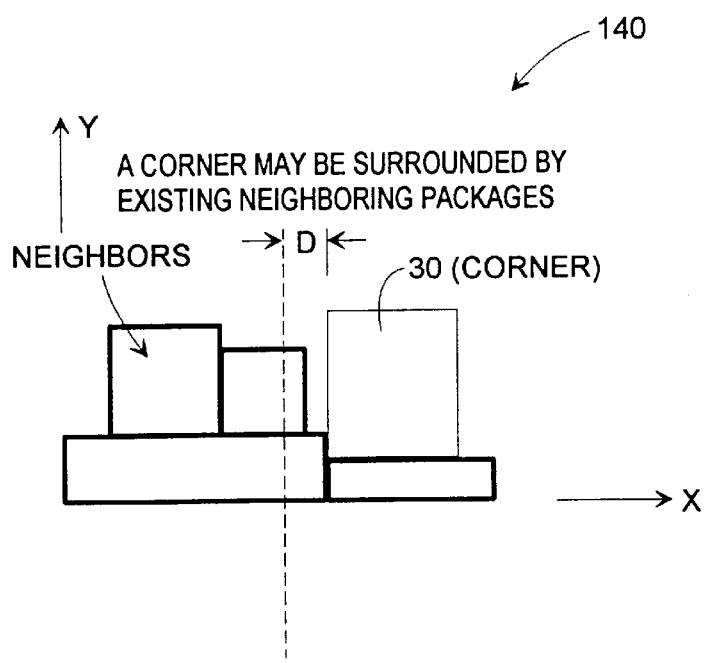
FIG. 14 is a side view illustrating the concept of neighboring packages.

As shown in FIG. 14, a corner may be surrounded by existing neighboring packages. There can be left and right neighbors, and back and front neighbors. As discussed in detail elsewhere, these neighbors are quite frequently referenced to in the search of near optimal placement. For computational efficiency, those neighboring packages are therefore separately tracked by each corner.

Figure 15B:
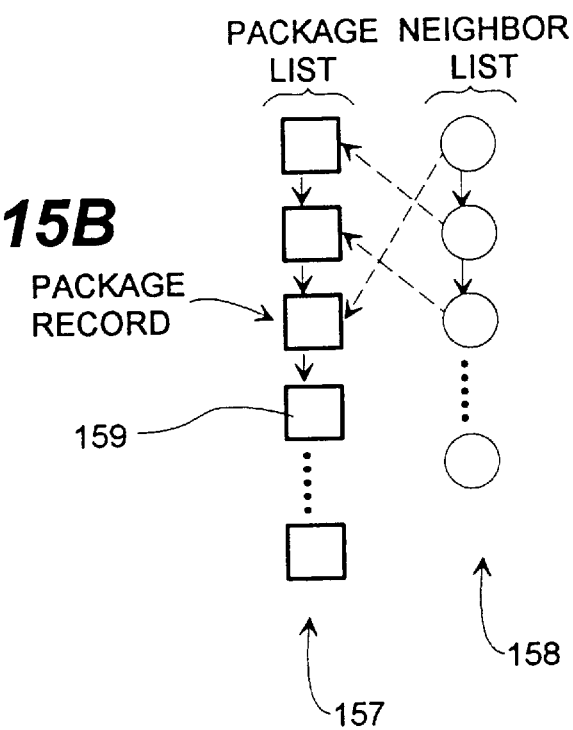
FIG. 15B is a illustrative view of two lists, a package list (which includes a number of package records and a neighbor list). Also illustrated is the ease of cross referencing provided intermediate these two lists.

As shown in FIG. 15A, a corner record 31, besides containing supporting surface information, contains four neighboring package lists: 1) a back neighbor list, 2) a left neighbor list, 3) a right neighbor list, and 4) a front neighbor list. Each element of a particular neighbor list contains a computer memory address with reference to a corresponding package record, stored in a separate package list (see FIG. 15B). The package list including individual package records each of which includes a particular packages information such as its location, size, and weight. In this way, there is only a need to include a single copy of a package record in the overall system, but the package record can be accessed very quickly whenever needed by accessing the package list.

d) Establishment of Package Lists with Address

Figure 16:
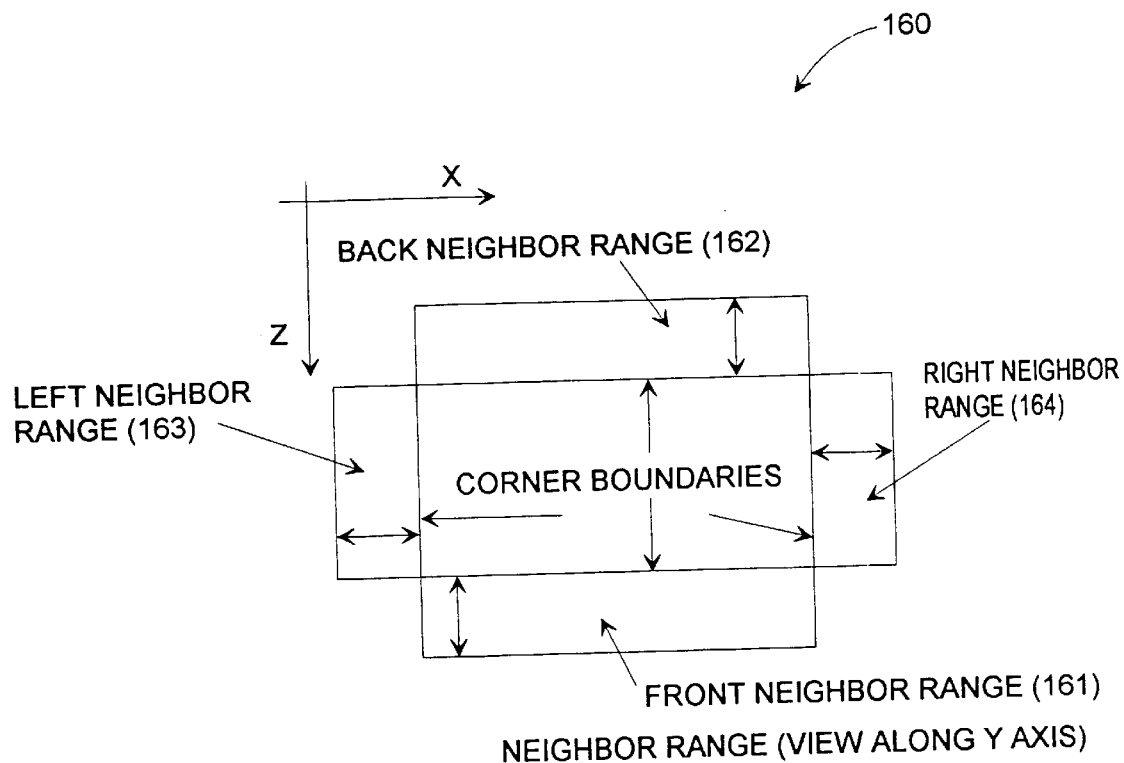
FIG. 16 is a top plan view (along the Y axis), illustrating the provision of a model 160 under the present invention of various neighbor ranges about the side periphery of the corners according to the present invention.

As shown in FIG. 16, to determine what packages qualify as "neighbors", for a given corner, four neighbor ranges are established: 1) back neighbor range, 2) left neighbor range, 3) right neighbor range, and 4) front neighbor range. For each neighboring package list, only a package which is within or intersects the corresponding neighbor range, and is inside the pallet boundary (in the case of multiple pallets) will have the address of its record registered in the corresponding neighbor list. As shown in FIG. 16, under one embodiment of the present invention, the width D of all of the neighbor ranges is chosen as the average package width, which is updated each time a new package gets into buffer. Such an updating arrangement is used to attempt to ensure that relevant information is stored.

In a typical situation up to 200 corners are available for placement (typically when the stack is half full).

2) Model Updating

After the geometric model for a pallet is created, it must be updated every time a package is placed thereon.

Figure 17:
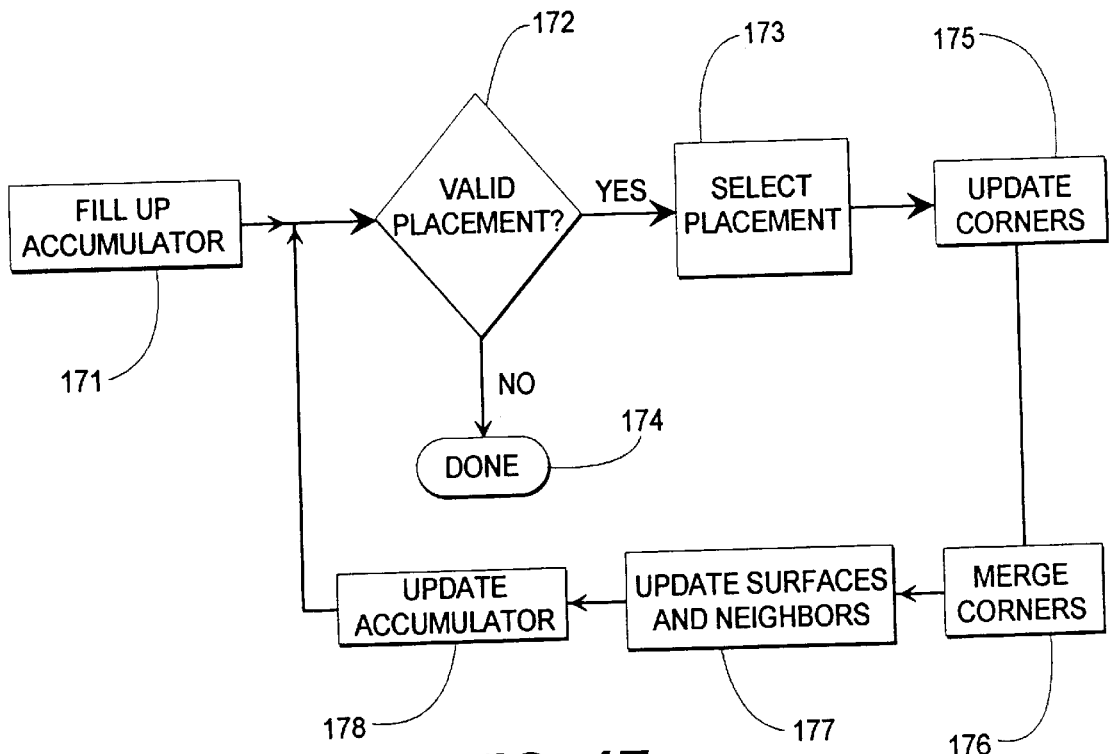
FIG. 17 is a flow chart illustrating the logic relating to geometry model updating. As may be seen, after the accumulator buffer is filled, a determination is made at step 172 whether a valid (acceptable under the defined stacking rules) placement for a package on the accumulator is available. If not, at step 174 the stacking process is complete (done). If a valid package placement is available, step 173 is conducted, which is to select the placement. Once the placement is made, at step 175 the corners are updated. Then at step 176, the corners are merged. Thereafter at step 177, the surfaces and neighbors are updated. Then at step 178 the accumulator is updated, whereupon the process is repeated.

Reference is now made to FIG. 17 or when a "valid placement" is found. During the stacking procedure, if the pallet is not full, the geometric model will be updated after actual package placement. Geometric model updating includes adding new corners, updating existing corners, merging corners, and updating surfaces. FIG. 17 is a flow chart illustrating the logic relating to geometry model updating. As may be seen, after the accumulator buffer is filled, a determination is made at step 172 whether a valid placement for a package on the accumulator is available. If not, at step 174 the stacking process is complete (done). If a valid placement is available, step 173 is conducted, which is to select the placement. Once the placement is made, at step 175 the corners are updated. Then at step 176, the corners are merged. Thereafter at step 177, the surfaces and neighbors are updated. Then at step 178 the accumulator is updated, whereupon the process is repeated.

a) Adding New Corners

Reference is now also made to FIG. 11. Initially, without any package placement, the whole space inside the pallet boundary is a rectangular free space. This is the very first corner and is noted as Corner 1 in FIG. 10. Once a package such as P1 in FIG. 11 is placed in Corner 1 (being the only available corner), the original Corner 1 disappears. The remaining free space of that corner is then subdivided into up to 6 partitions with respect to the package: below, above, to the back, to the front, to the left, and to the right. These free space partitions, to the extent they exist, will also be rectangular, and are referred to as child corners.

In some cases there will not be six child corners left over after a corner is utilized. For example, if a placed package touches a pallet boundary, the space between the boundary and the package is zero, and the corresponding child corner will be nulled. In FIG. 1, package P1 is placed against the left, back, and bottom boundary of the pallet, therefore only three new corners can be generated: one in the front (New Corner 2), one on the right (New Corner 3), and one above (New Corner 4). A complete set of corners (in this case now 2, 3, and 4) now spans the entire free space of stack. It may be noted that each of these three corners shares volume with and thus "intersects" each of the other two; therefore as may be seen later, it may be understood that a package once placed may lie within more than one corner.

b) Updating Intersected Corners

Figure 18A:
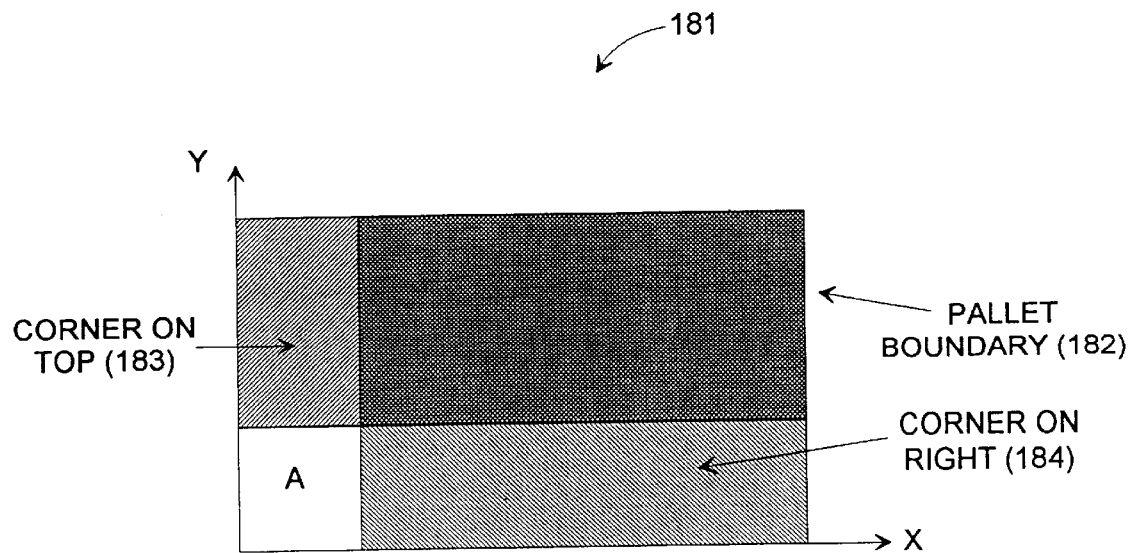
FIG. 18A is a view of the modeling technique including the use of corners according to the present invention, illustrating the creation of a corner on the right and top a just-placed package "A". The view is along the "Z" axis in the three-dimensional model.
Figure 18B:
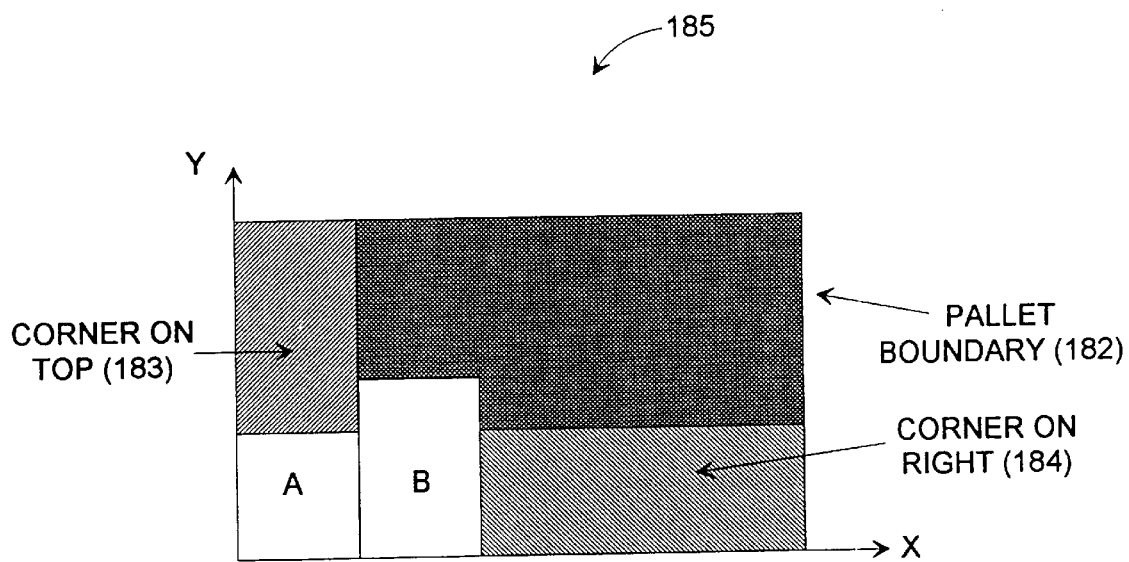
FIG. 18B is similar to FIG. 18A, except that another package "B" has been placed within the top and right corners discussed in relation to FIG. 18A.

Intersected corners are updated after a package is actually placed. As noted above, corners may intersect each other. In the example of FIG. 18A, the corner on the viewer's right of package A and the corner on the top on the package A intersect as shown in the double cross hatching area in FIG. 18A. As shown in FIG. 18B, if package B is placed on the right of package A, it may be seen that package B is higher than package A. Furthermore, package B not only sits at the corner on the right of package A, but also intersects with the corner on top of package A. Hence, after placing a package in a corner, the "receiving" corner must be deleted, and each intersected corner must also be updated.

c) Merging of Redundant Corners

To ensure minimum computer memory consumption and maximum computation efficiency, after each package stacking cycle, only "independent corners" will be maintained by a process known as "merging". For a given corner, only independent surfaces, and independent neighbors will be tracked. Such minimal set can be obtained as follows. First, after each package placement, generate all child corners for affected corners, and delete the original corner. With each child corner, ensure that only those surfaces and neighbor information relevant to the child corner will be inherited from the original corner. Third, merge all redundant corners. In the process of merging, check all the surfaces and neighbor information so that no redundant members will be recorded.

Figure 29A:
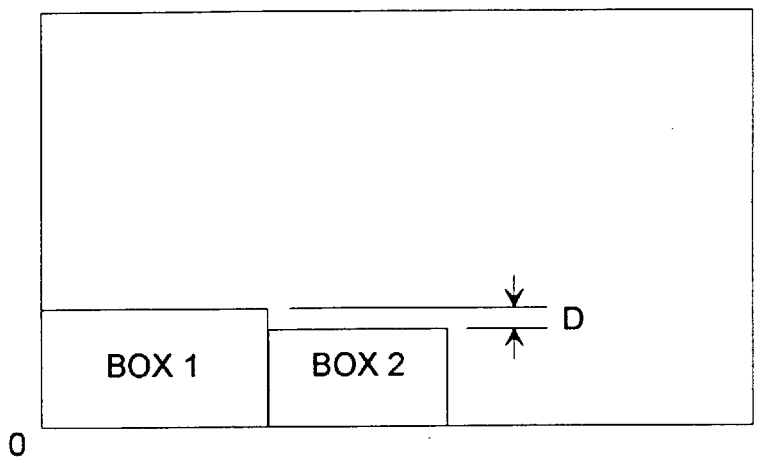
FIGS. 29A–29C illustrate concepts relating to corner merging.
Figure 29B:
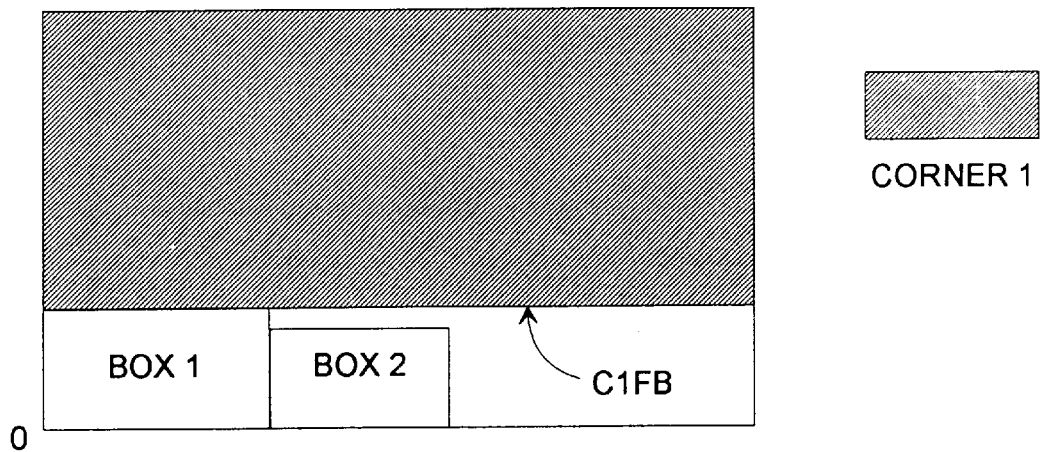
Figure 29C:
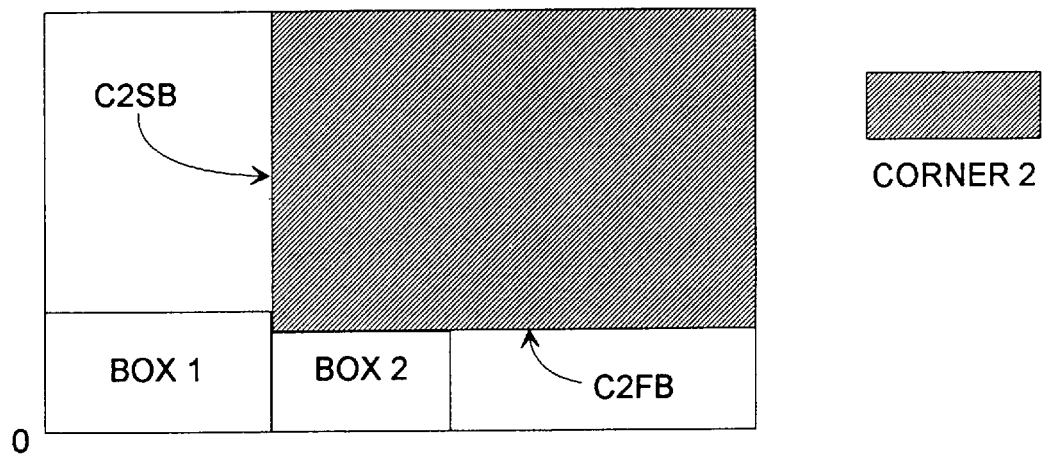

Reference is now made to FIGS. 29A–29C. Assume there are two corners, labeled as Corner 1 and Corner 2. Corner 1 has a floor boundary C1FB and Corner 2 has a floor boundary C2FB spaced apart a distance "d". Also assume that all side boundaries of Corner 2 are within or the same as those of Corner 1, as distance "d" is within a predetermined threshold. For example, Corner 2's side boundary C2SB is within Corner 1. The ceiling boundary of Corner 2 is the same in Corner 1. Then if Corner 1 and Corner 2 share two surfaces which are bridgeable (as the term was used with respect to that shown in FIG. 13), then Corner 2 will be merged to Corner 1. That is, any information (including surfaces, neighbors) Corner 2 possesses which has not yet been associated with Corner 1 will be consolidated to Corner 1, while any redundant information which Corner 2 possesses will be eliminated. Corner 2 itself (or actually, its record) will also be eliminated.

d) Updating of Corner Surfaces and Neighbor Lists

As may be understood, after a new package has been actually laid into place, it may become a new neighbor member, or provide a new supporting surface to existing corners. To accommodate these possibilities, a search is conducted until necessary enhancement of surfaces and neighbors are completed for every existing corner.

Figure 20:
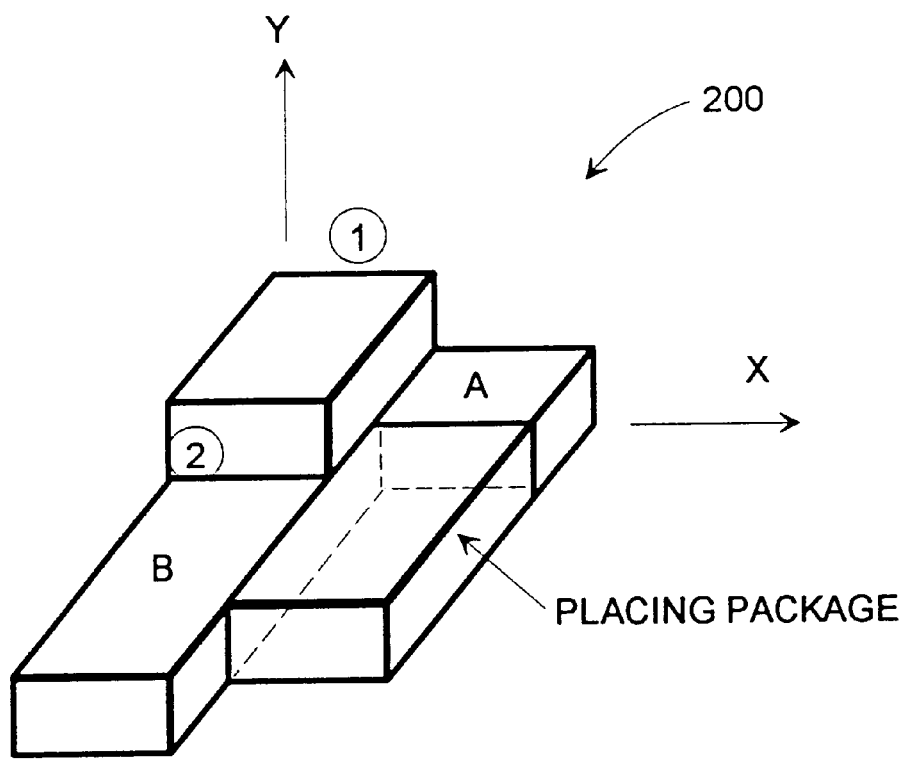
FIG. 20 is an illustration of a model 200 according to modeling technique according to one aspect of the present invention, in which a package, once placed, provides a new supporting surface for existing corners.

FIG. 20 illustrates an example of the need for updating. Before the placing package was in place, there existed two corners 1, 2, associated with the top surfaces of package A and package B, separately. The placing package generates a new surface not only for corner 1 (associated with the top surface of package A), but also for corner 2 (associated with the top surface of package B). Without enhancing this surface, each of these corners would be erroneously short of one valid surface, in the above example that being the upper surface of the "placing" package.

B) Establishment of all Possible Placements

As noted above, potential package placements evaluated for stability and other characteristics. Therefore, the need can be understood for providing a means for generating such placements, in order that their characteristics can later be evaluated.

1) General Placement Options

Under the present invention, a package may be placed in different ways or at different "placements" within a corner. These "placements" can be determined by actually placing the package onto a stack and taking resulting measurements thereform, or alternately can be made with the assistance of computers. It should likewise be noted that any computations regarding package placement is dependent upon the actual physical measurements taken of the packages.

Figure 19:
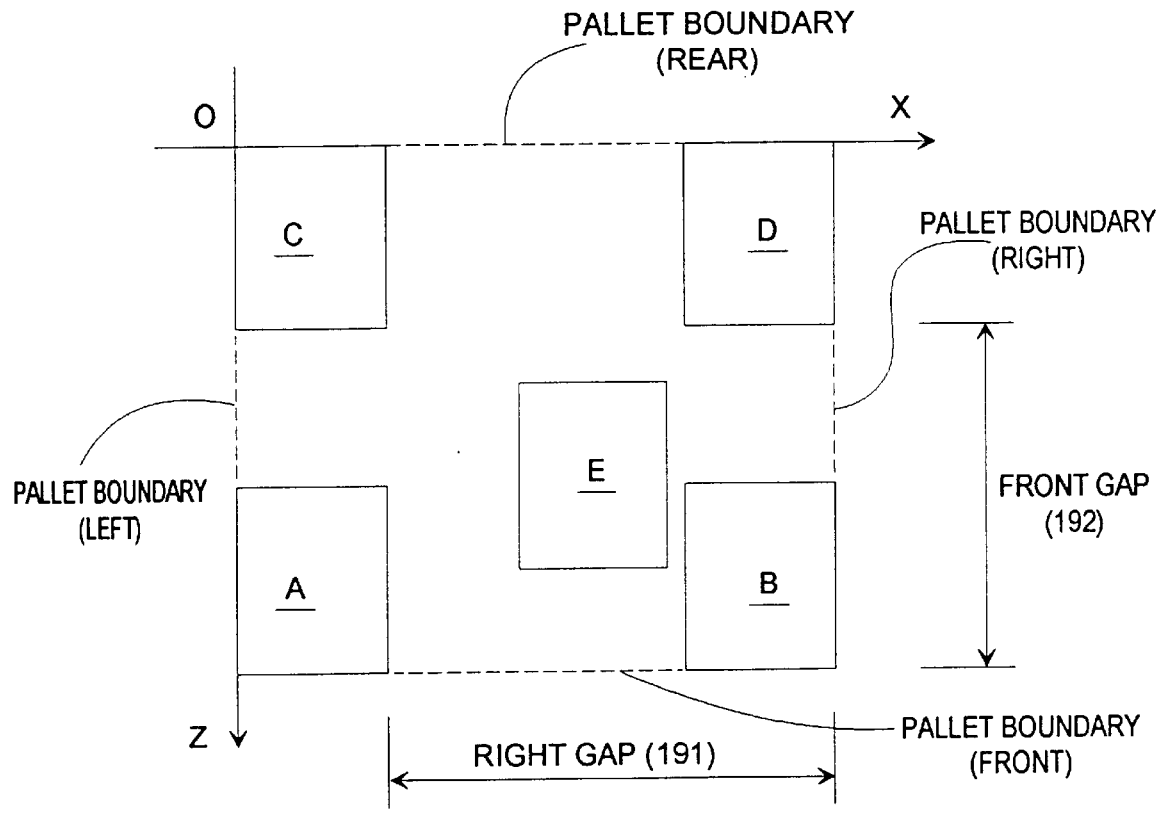
FIG. 19 is an illustration of a modeling technique according to the present invention, that being "flushing" and "shifting" to generate potential package placements.

Reference is now made to FIG. 19, which illustrates different potential package placemats within a corner which extends the entire length and width of a pallet; thus the corner boundaries are also the pallet boundaries. As shown in FIG. 19, a package can be placed "flush" against a front pallet (and corner) boundary ("front flushed") as shown by package positions "A" and "B"; it can be "right flushed" against the right pallet boundary as shown by package positions "B" and "D", or it can be shifted to a location E somewhere in the middle with or without flushing. Package "C" shows no flushing or shifting. Position A shows front flushing only. Position B shows front and right flushing. Position D shows right flushing only.

It should be understood that package flushing is conducted in order to accomplish an important part of the present invention, that being to cover as much space within the pallet boundaries as possible. Package flushing at least makes outermost package positions available for evaluation by the package stacking decisions discussed elsewhere in this application.

It may be understood that shifting is only conducted after the flushing decision is complete. Furthermore, the direction of shifting within a corner depends upon the location of the package placement after the flushing decision is complete. For example, in reference to FIG. 19, should a package placement be flushed to the "B" location (front and right shift), shifting will only be possible in the rear and left directions. Should a package not be flushed and remain in position "C", front and right shifting is only possible. From position "A", rear and right shifting is only possible, and from position "D", front and left flushing is possible.

There are criterion for flushing a package to a pallet boundary. In most cases, in order to get a tight and solid stack, it is preferable to place packages with two sides against neighbor packages or at the pallet inner boundaries. However, when a package as positioned is close to an outside boundary, the package may be flushed all the way to the front boundary, or to side boundary, or both. Under those cases if the supporting surfaces underneath do not reach the outside boundary, a package edge can still be flushed to the outside boundary of those surfaces, with some of the package overhanging and unsupported from below. The advantage of such flushing is to maximize the horizontal span of the current layer of packages being stacked (the current stacking layer), which is the foundation for the next stacking layer. Without boundary flushing, it may be understood that a tapering stack may be created, which can be disadvantageous.

Package flushing along a particular direction to a boundary depends on the boundary gap size, which is the gap between the package and the pallet boundary. If no gap exists (there is another package between the package and the pallet boundary), no flushing is done at least in that direction.

Take front flushing as an example. Again referencing FIG. 19, if the front gap 192 is large enough to allow placement of another package, a placing package should not be flushed to the front pallet boundary, because that gap is still useful for placement purposes, and to use it could prove inefficient. However, if the gap 192 is small enough to ignore, such as less than one-sixth (⅙) of average package width, then the placing package should not necessarily be flushed to the front, because flushing can have drawbacks. Whenever a package is flushed to the front, even by a small distance, mutual side contact between the front package and back neighbors tends to be broken, and stack stability will deteriorate. The present invention recognizes that only when a sizable but useless gap should a placing package be flushed to the front pallet boundary.

Additionally, the front flushing decision according to the present invention is subject to a constraint that it will not generate an unstable tower at the front. This is guarded by use of a condition according to the invention (discussed in detail later) that the supporting package(s) underneath be in contact with back neighbors or quite large in size by itself/themselves.

If the supporting package(s) of a placing package is/are in contact with its/their back neighbors or quite large in size, although flushing front will create a gap at the current layer being stacked, at least the previous layer is solid, so the stack is still stable. However, if the supporting package of the placing package is not in contact with its back neighbors, and is not quite large in size, the placing package should not be flushed to the front pallet boundary. Otherwise the new gap created by the placing package will decrease stack stability.

2) Front Pallet Boundary Flushing

Figure 21:
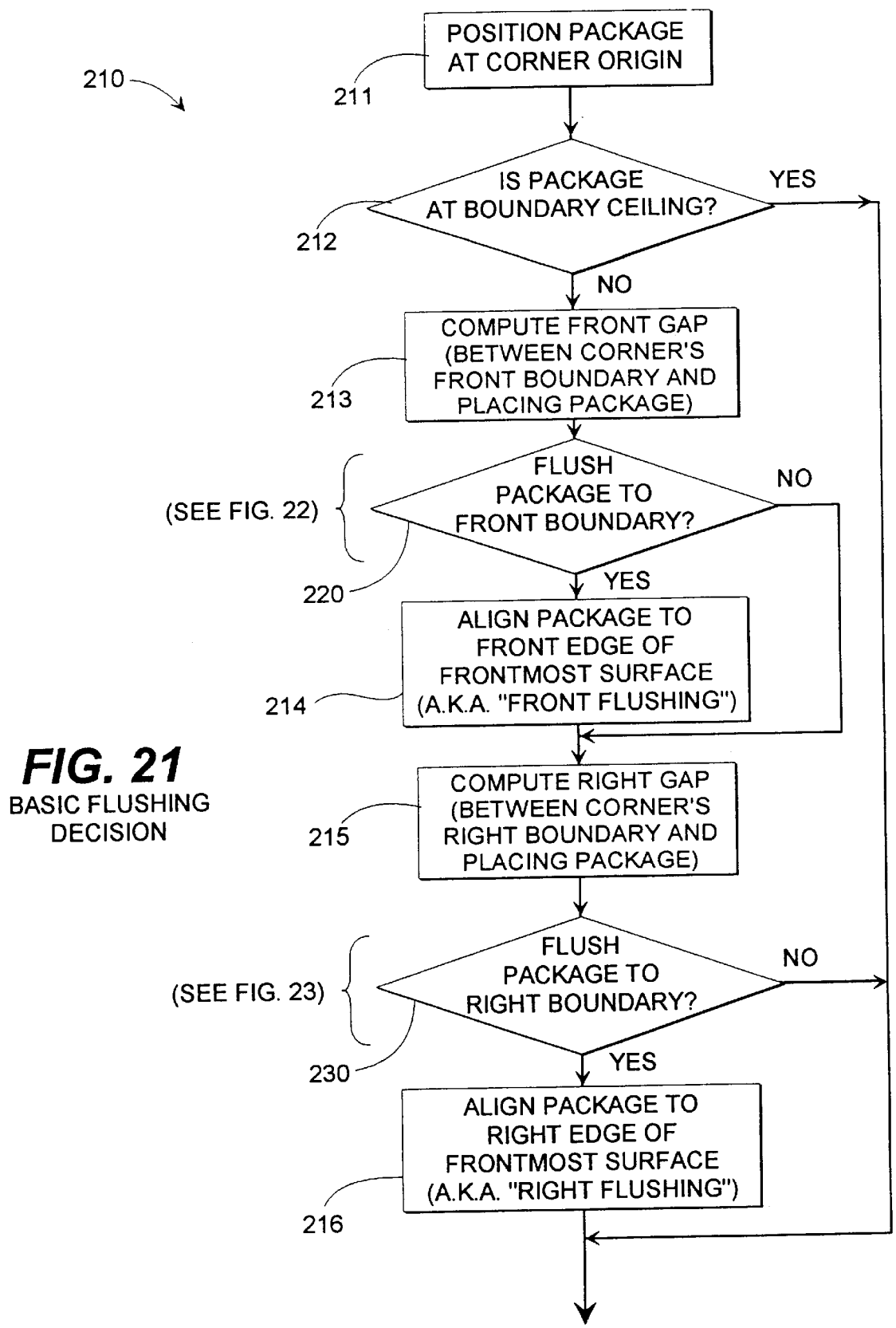
FIG. 21 is a logic flow diagram 210 illustrating the operation of a basic flushing decision according to the present invention, which essentially includes the steps of looking at top, front, and right gaps between the package and outer boundaries.

As shown in FIG. 21, a first, basic decision is made as to whether pallet boundary flushing will be conducted at all, or remain at its origin as set forth in step 211. As shown in step 212 in FIG. 21, if the package is at the pallet ceiling boundary, no flushing is done, because no packages will need to be placed atop the package.

Figure 22:
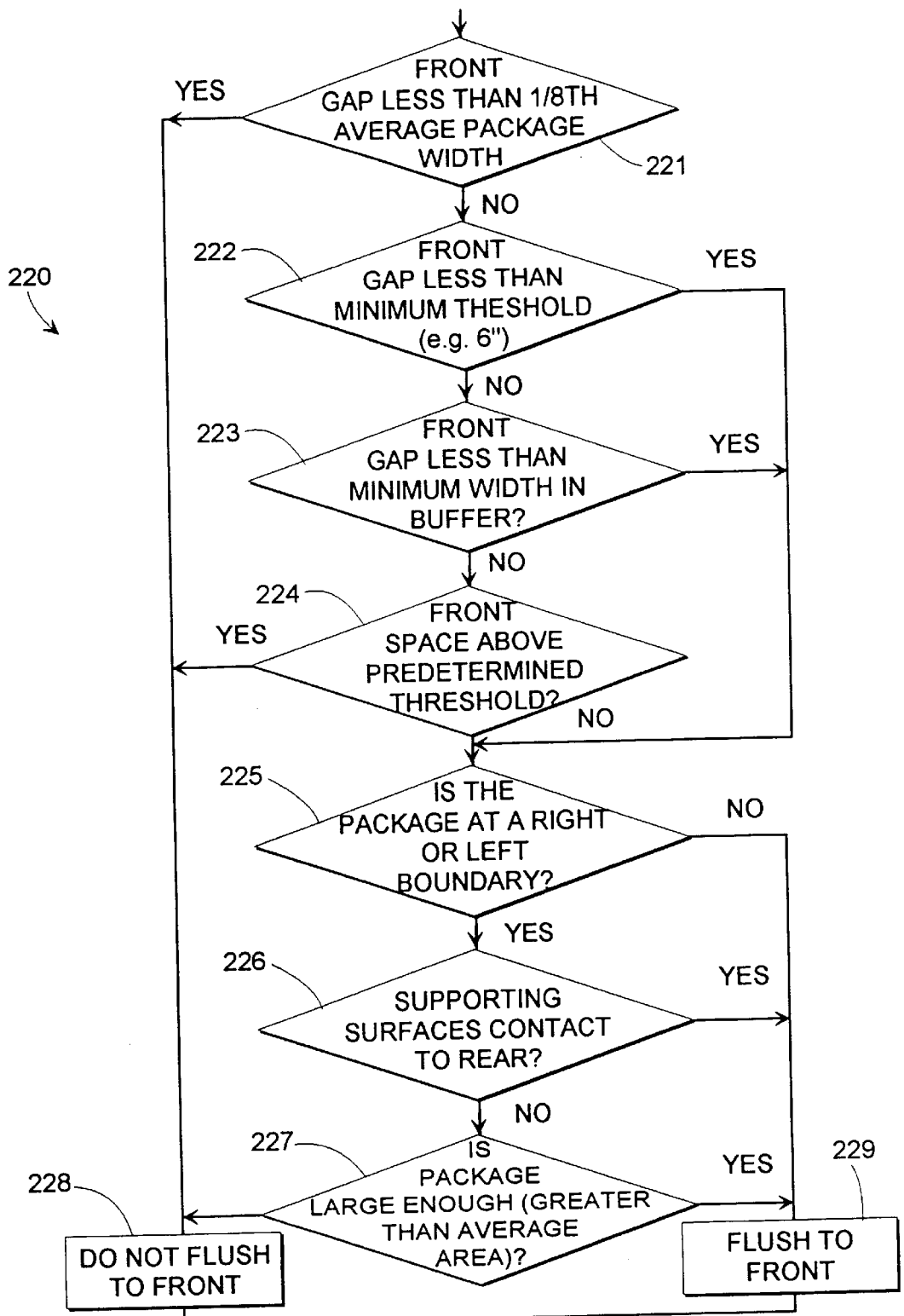
FIG. 22 is a logic flow diagram 220 illustrating a Front Flushing Decision according to the present invention, in which various considerations are made in deciding whether to "flush front", including considerations relating to average historical package dimensions as well as buffered package dimensions.

If the package is not at the boundary ceiling, at step 213 the gap (if any) between the front of the placing package and the front boundary is calculated. Based upon an analysis of this gap (discussed later in connection with FIG. 22), a decision is made at 220 (FIG. 21) whether or not to flush the package to the front boundary. This step 220 is detailed later in reference to FIG. 22. If the decision is "YES", front flushing is executed at step 214 (FIG. 21). If not, step 214 is bypassed, and the decision regarding front flushing for that particular package in that particular corner has been made final.

3) Side (or "Right") Pallet Boundary Flushing

Figure 23:
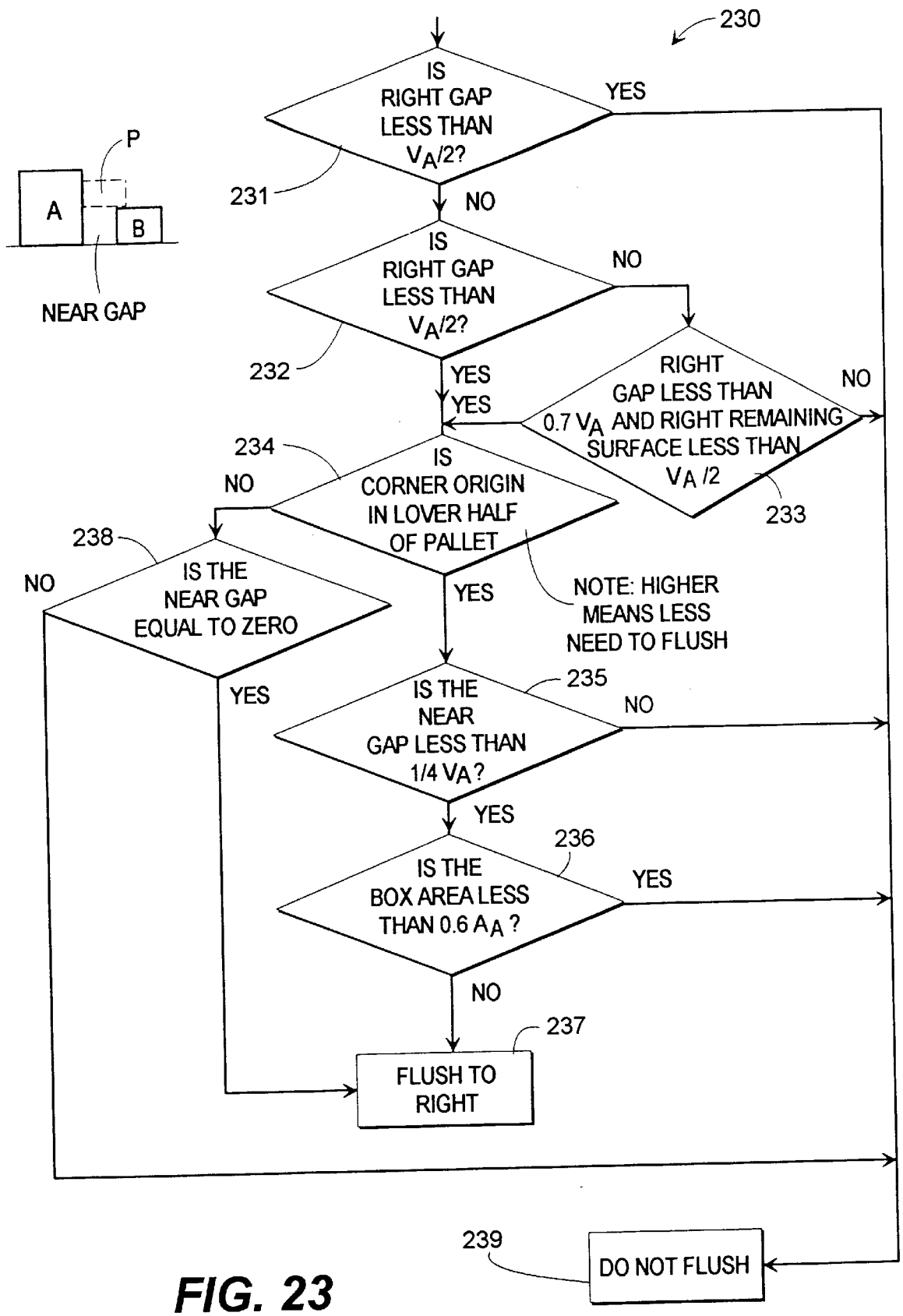
FIG. 23 is a logic flow diagram 230 illustrating a Right Flushing Decision according to the present invention, in which various considerations are made in deciding whether to "right flush", including considerations relating to average historical package dimensions as well as buffered package dimensions.

A similar decision is then made regarding whether side flushing will be done. Again through the use of a computed right gap (between the right pallet boundary and the placing package) at step 215 a "right flush" decision is made at step 230 (FIG. 21). This step 230 is explained in detail later in reference to FIG. 23. At that point the decision regarding side flushing for that particular package in that particular corner has been made final.

4) Shifting

As shown in FIG. 21, the first decision is on whether to place a package at the corner origin location or to flush it to one of the corner's (and therefore the pallet's) outside boundaries. If the corresponding placement is not stable, then successive forward shifting and/or sideward shifting in the corner will be tried. Once a stable placement is found, the decision making goes to "Placement Compare and Record" as discussed in later detail.

Package shifting within a corner is practiced according to the present invention, and can be important in order to find a stable placement. Package shifting is limited to two perpendicular direction dimensions: along the back/front dimension, and along the left/right dimension. Since methods for these shifting are similar, the right shift situation will be taken as an example, and reference is therefore made to FIGS. 24a–f.

For purposes of illustration, shifting along only one dimension will first be discussed with the aid of FIGS. 24a–f, with two-dimensional shifting (preferred) being discussed later with the aid of FIGS. 25 a–d. The group of FIGS. 24 a–f is a series of side plan views of a plurality of packages 240 including a placing package position (shown with an "X") as it is "shifted" along one direction according to the present invention.

For each surface (in this case the surface above in-place package, the six different "shifted" positions are possible:

left edge overhanging, left edge alignment, left edge overlapping, right edge overhanging, right edge alignment, and right edge overlapping.

"Left edge overhanging" means that the left edge of the placing package is overhanging with respect to the package underneath as shown in FIG. 24b.

"Left edge alignment" means that the left edge of the placing package aligns with the left edge of the package underneath as shown in FIG. 24c.

"Left edge overlapping" means that the left edge of the placing package overlaps the package underneath as shown in FIG. 24f.

"Right edge overhanging" means that the right edge of the placing package overhangs with respect to the package underneath as shown in FIG. 24e.

"Right edge alignment" means that the right edge of the placing package aligns with the right edge of the package underneath as shown in FIG. 24d.

"Right edge overlapping" means that the right edge of the placing package overlaps the package underneath as shown in FIG. 24a.

The overhanging portion of the package is assigned to be proportional to the overall width of the placing package, although if desired it could be a constant value. In one embodiment of the present invention, it will be one fifth (⅕) of the placing package's width, as shown in FIG. 24.

The overlapping portion of the package is also assigned to be proportional to the overall width of the placing package, although if desired it could be a constant value. In one embodiment of the present invention, it will be one fourth (¼) of the placing package's width, as shown in FIG. 24.

Under one embodiment of the present invention, the shifting sequence is determined by the distance of the placing package from the left cover boundary. In other words, shifting is always done in one direction for a particular dimension (two-dimensional shifting will be discussed shortly), and the next shift position selected is the next position to the right of the six positions discussed above. It may be understood that for different box sizes, the order of shifting between the above-described positions may not be the same. For example, if the placing box is wider than the box providing the supporting surface below, right edge alignment will come before left edge alignment, instead of after left edge alignment as shown in FIGS. 24(c) and 24(d).

Figure 24:
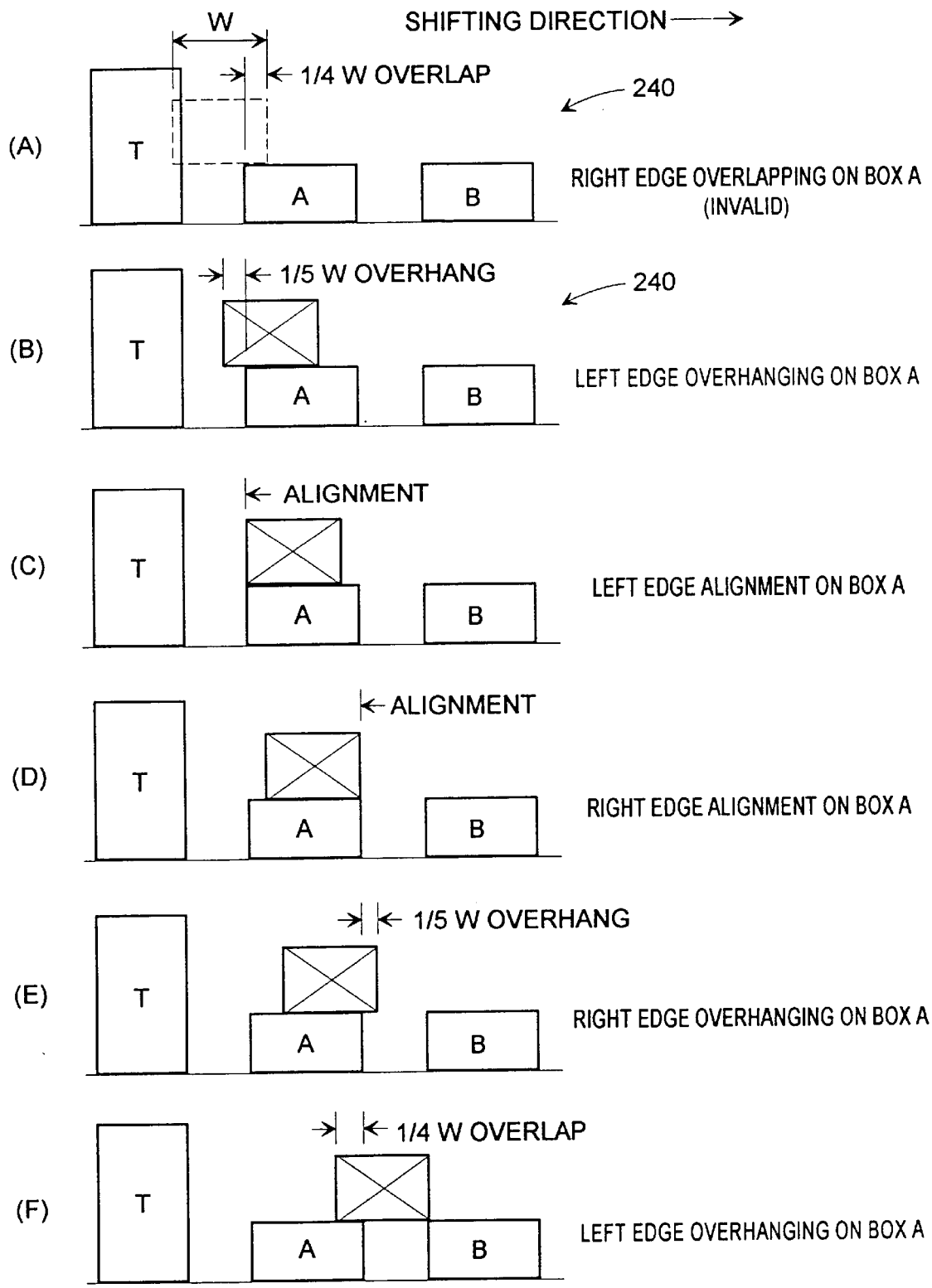
FIGS. 24 (*a–f*) illustrate one-dimensional shifting.

It should also be understood that the shifting position of FIG. 24(a) will never actually even be considered, as FIGS. 24 a–f illustrate right shifting, and the placing package position would thus be shifted from an unshown origin location (with surface contact between the left side of the placing package and the right side of the tallest box) to the right. However, FIG. 24(a) is provided to illustrate the relationship of the six shifting positions for a particular supporting package such as A. Unless a stable location is found first, the same six shifting positions shown between the placing package and box A will be tried with the placing package and box B.

Figure 25:
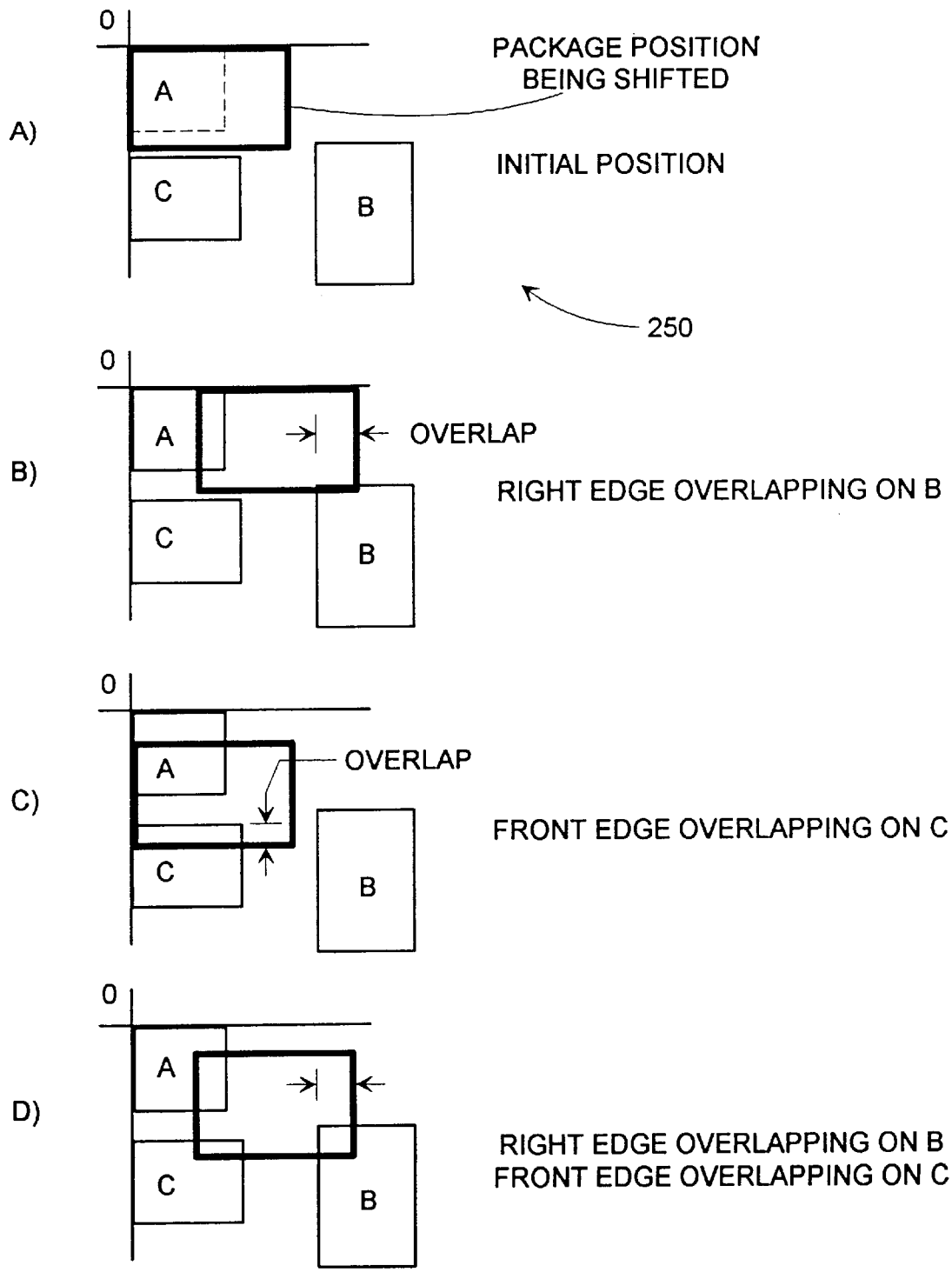
FIGS. 25 (*a–d*) illustrates two-dimensional shifting.

Referring now to FIGS. 25 a–d, it may be seen that the present invention contemplates two-dimensional shifting. In the case of two dimensional shifting, (shifting to the right and also shifting to the front), there are also the following front shift cases:

rear edge overhanging, rear edge alignment, rear edge overlapping, front edge overhanging, front edge alignment, and front edge overlapping.

Therefore it may be understood that there are 36 (six times six) possible combination for each placing package/supporting surface combination.

FIGS. 25 a–d are a series of top plan illustrative views of a plurality of packages 250 including a placing package position (shown in bold outline) with FIGS. 25b–d shown the position after being "shifted" according to the present invention. FIG. 25a illustrates the package position in its origin position, FIG. 25b illustrates the package after being shifted to the right such that its right edge overlaps supporting package B, FIG. 25c illustrates the package after being shifted to the front such that its front edge overlaps supporting package C, and FIG. 25b illustrates the package after being shifted to the right such that its right edge overlaps supporting package B, and also to the front such that its front edge overlaps supporting package C. It should be understood that there are other intermediate shifting positions not shown.

Again, shifting is only done in one direction for each dimension. The order of the shifting depends upon package dimensional characteristics. Among all possible placements, the smaller the summation of the distances between the placing box to the back corner boundary and left corner boundary, the sooner the placement will be tried.

C) Stability Checking

A "Stability Check" plays an important role in the random size package stacking procedures described herein. If the stability check standard is too restrictive, then few packages can be stacked, resulting in a pallet full of voids. Conversely, if the stability check standard is not restrictive enough, then a stacked package may be in fact be unstable and fall. The method according to the present invention attempts to from a balance between these two concerns, while still being efficient in terms of computational speed.

Figure 30:
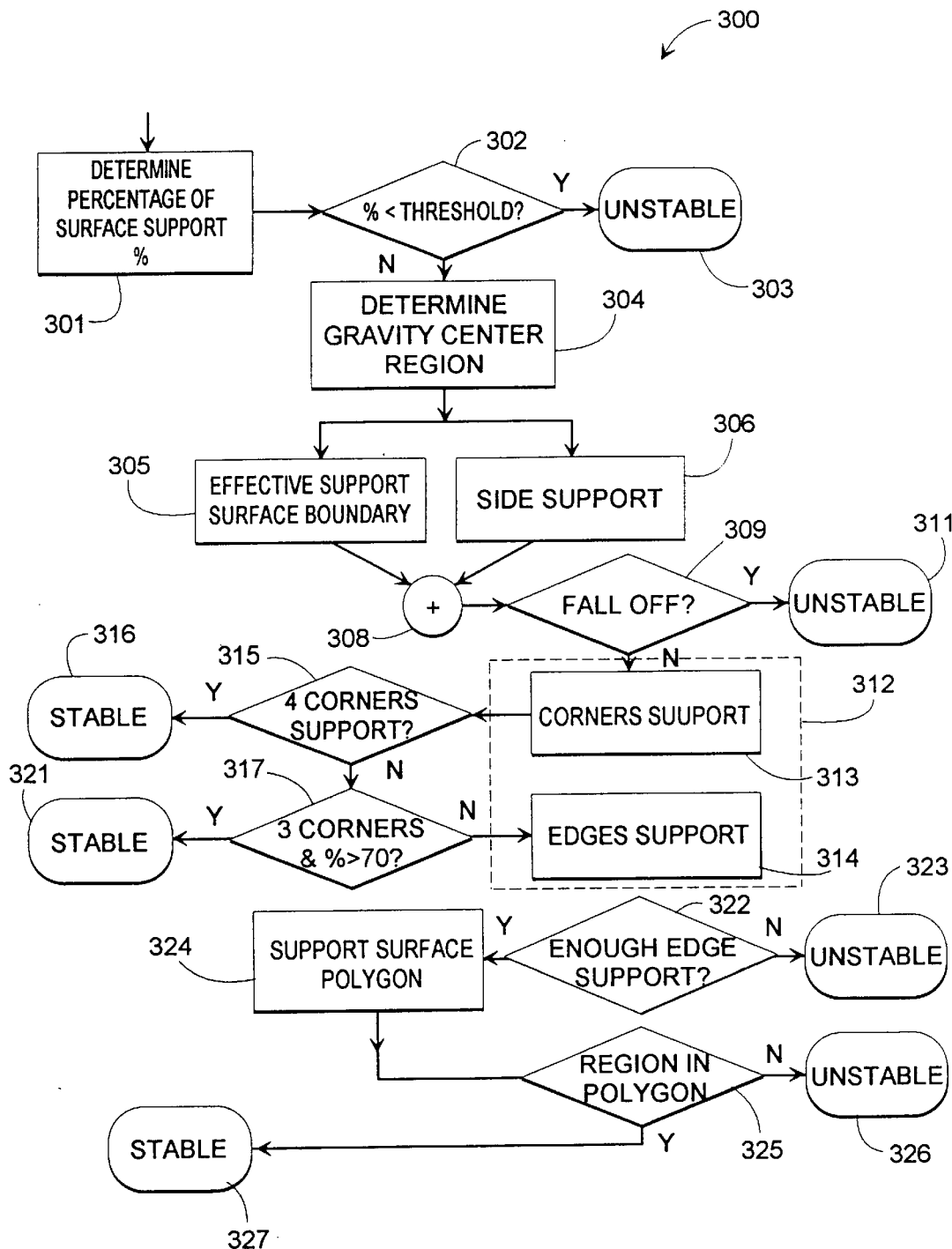
FIG. 30 is a flow chart 300 illustrating various steps included in a Stability Check according to the present invention, in which a gravity center region is defined for the package considered for placement.

The Stability Check process flow chart is as shown in FIG. 30. In the flow chart, a particular potential package location is evaluated for stability, being considered either "stable" or "unstable". The complete process includes the following determinations: 1) determining the percentage of surface support (step 301), 2) computing a gravity center region (step 304), 3) checking an effective support surface boundary (step 305), 4) checking side support (step 306), 5) checking support surface distribution, and 6) checking a support surface polygon (step 324).

1) Checking Percentage of Surface Support

When in place, a stacked package may be supported by multiple supporting surfaces provided by packages below. For a package to be stacked and stable, a threshold of sufficient surface support from below is needed. Under one feature of the present invention, such a threshold is used as part of the Stability Check. As shown in FIG. 30, when the ratio between the total area of direct supporting surfaces and that of a placing package's bottom surface is below a certain percentage, the placing package is considered unstable (step 303). When the package gets heavier, the required percentage becomes proportionally higher. Under one embodiment of the present invention, the percentage can be taken to be around 65% for a 70 pound package, and 50% for a package weighing up to 30 pounds. Linear interpolation can be made for any package weighing in between.

The area of direct supporting surfaces is computed as follows. First, a search is made for the maximum height of supporting surfaces which fall within the boundary or "footprint" of the placing package. Second, a re-evaluation is done of all supporting surfaces found, and only those whose heights are within a certain tolerance, such as 0.5", relative to the maximum height are considered direct supporting surfaces. This is similar to the "bridging" concept previously discussed.

If the area of direct supporting surfaces is less than the preselected threshold (step 302), the package is considered unstable (step 303), and the stability check is complete. If the area exceeds the threshold, the stability check proceeds to its next step.

2) Computation of Gravity Center Region

Figure 31:
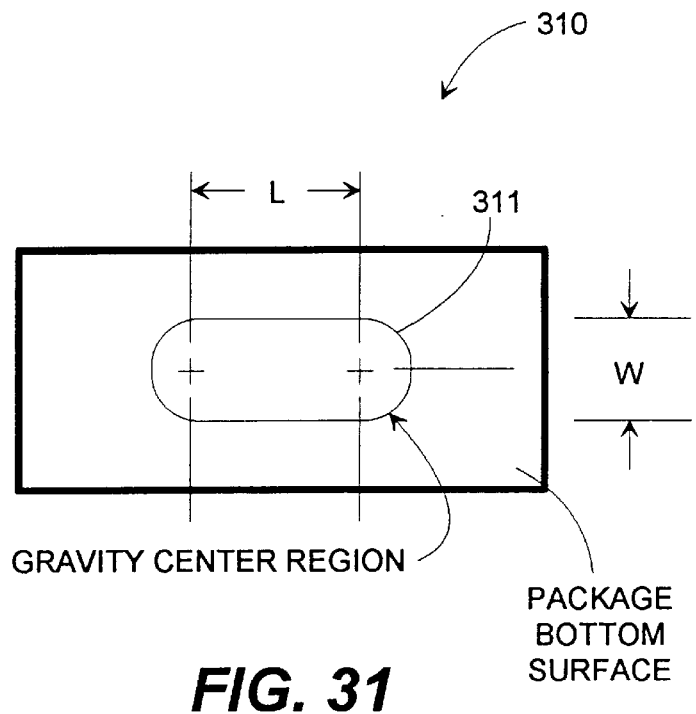
FIG. 31 is an illustration 310 of a Gravity Center Region 311 within the "footprint" of a package having a bottom surface 312.

Referring now to FIG. 30 and FIG. 31, the next step in the stability check relates to the use of an Gravity Center Region of a package. The offset of the gravity force vector from its actual gravity center from its geometric center can be estimated to pass through this Gravity Center Region, which as shown as 310 in FIG. 31 is in the form of a rectangle fitted with half circles on each short edge, centered at the geometric center of the packages bottom surface, and parallel to package's bottom surface. As shown in FIG. 31, each dimension L and W of the circumscribing rectangle can be expressed as a percentage of the corresponding dimension of package bottom surface.

In corrugated package stacking, the allowable overhang beyond supporting surface is sensitive to package weight. If a heavy package overhangs too much beyond its support boundary, the package will tend to bend over that edge and cause instability. Hence under one embodiment of the present invention, the size of Gravity Center Region increases in proportional to package weight. The heavier the package, the larger the Gravity Center Region. Under one embodiment of the present invention, the size is taken to be 50% of the package bottom surface dimension for a 70 pound package, and 30% of the package bottom surface dimension for a package whose weight is up to 20 pounds. A linear interpolation between 30% and 50% will be taken as the corresponding percentage for those packages whose weight limits are in between 20 to 70 pounds. Using FIG. 31 as an example, if a 50% percentage is used, the L and W values of the gravity center region would be half of the length and width values, respectively, of the package bottom surface.

Once the Gravity Center Region for a package is calculated, it is stored and used in later evaluations within the stability check.

3) Checking Boundary of Effective Supporting Surface

Figure 32:
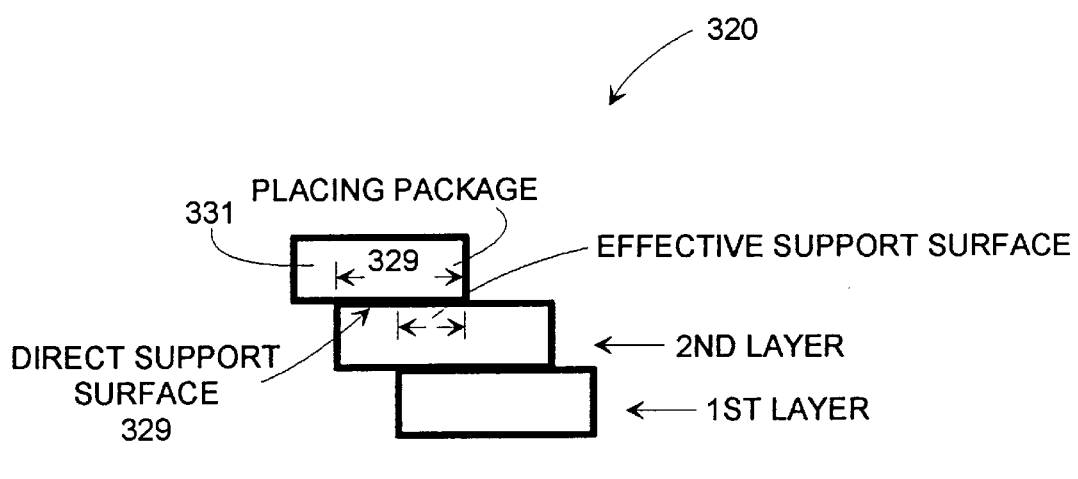
FIG. 32 is a side plan view of a package stack 320, illustrating the concept of an "effective support surface" 334 used under the present invention.

As shown at step 305 in FIG. 30, one embodiment of the present invention includes the evaluation and use of an Effective Support Surface Boundary. As shown in FIG. 32, an Effective Support Surface of a package is a supporting surface of the package which effectively has solid package support down to the pallet surface, and can thus support a larger push down force. FIG. 32 illustrates an effective supporting surface 334 for a single tower 320 of stacked packages, which in the example shown is smaller than the Direct Support Surface 329 provided by the package 332 directly beneath the placing package.

Reference is now made to FIGS. 33A–C. When a package 336 is supported by multiple packages 335 on the first layer, the effective supporting surface boundary for the placing package will be the smallest convex polygon circumscribing a group of rectangular supporting surfaces, such as those shown in the hatched area 337 in FIG. 33A. Assume this placing package is used to support a next package on the third layer, and that next package is also supported by other packages 336 on the second layer (FIG. 33B). Under this assumption, the effective support surface to the next package 337 will be the smallest convex polygon circumscribing a set of convex polygons of its supporting surfaces, as shown in dark shaded area in FIG. 33C.

As may be appreciated, the merging of multiple polygons requires relatively extensive computation and can be time consuming to conduct. To simplify calculation, the boundary of effective supporting surface can be approximated by a rectangle which circumscribes all underneath effective supporting surfaces. Under such an approximation, the effective support surface boundaries shown in FIGS. 33A–C can be converted to their approximate expressions as shown in corresponding FIGS. 34A–C. Under one embodiment of the present invention, the approximation is used as the value for the Effective Supporting Surface Boundary (designated by 349).

Figure 34:
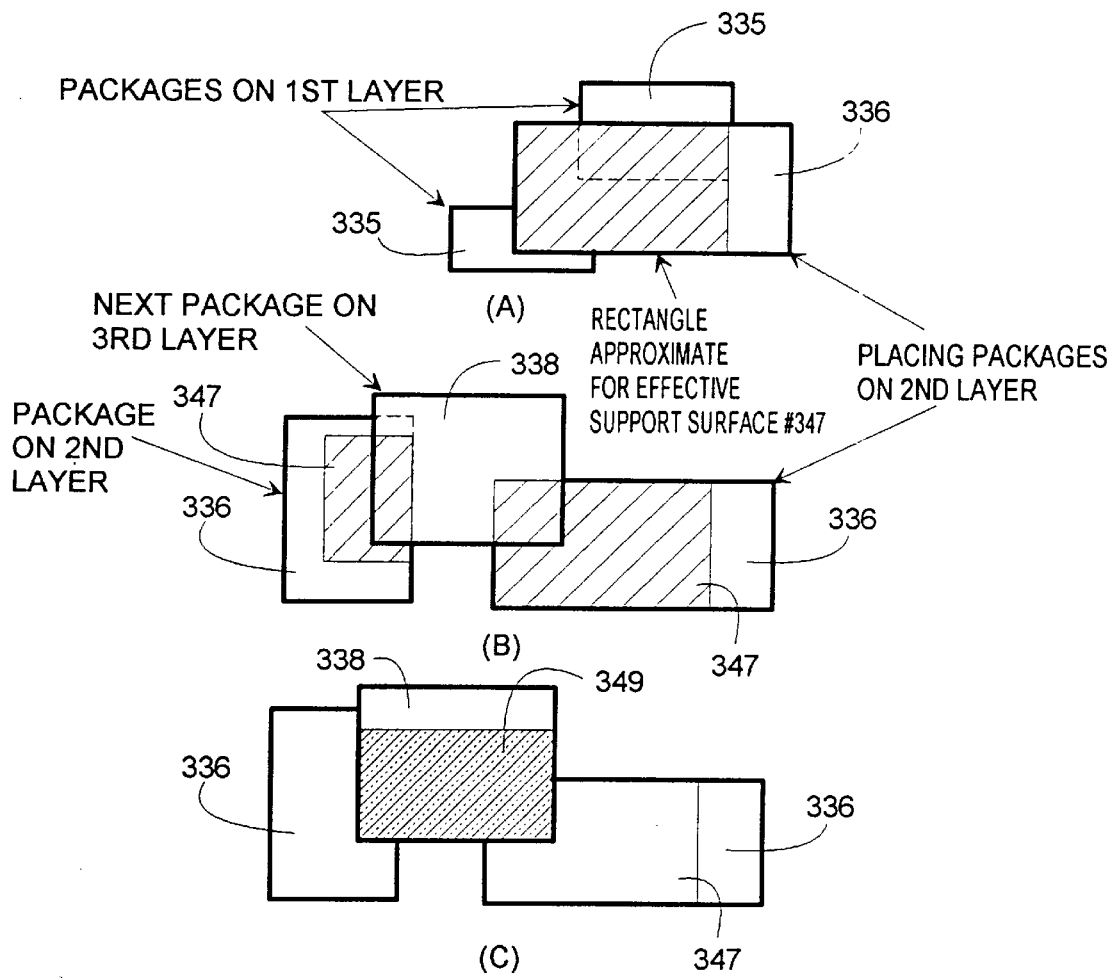
FIGS. 34A–34C are a series of top plan views of packages similar to those of FIGS. 33A–33C, except that an approximation rectangle is used for the effective support surface.

In FIGS. 34A–C, the hatched areas such as 347 are the approximate effective supporting surfaces for packages on the 2nd layer, and the dark shaded area 349 is the (approximated) Effective Supporting Surface for the next package (not shown).

In step 305, after the Effective Supporting Surface Boundary is determined, it is compared to the Gravity Center Region determined from step 304. If the Gravity Center Region falls within the Effective Support Surface, step 305 results in a "YES" value, which is passed to step 308. As also noted below, if step 308 gets a "YES" value from step 305 or a YES value from step 306 (side support) the stability check will continue. Otherwise (two NO) the package will be considered unstable at step 311.

It is recognized that the approximated rectangle could be much larger than the effective supporting surface polygon. Therefore, even if the gravity center region is within the boundary of the rectangle, it could be outside the boundary of the polygon, and the package may not be stable. To confirm package stability, direct contact surface distribution will be evaluated further in the Stability Check as discussed later.

4) Checking of Side Support

As noted above, even if the (approximated) Effective Supporting Surface Boundary does not completely contain the placing package's Gravity Center Region, the package can be stable if it has adequate side support.

A side support is a solid side contact which will prevent the placing package from falling off towards that side. There are left, right, back, and front four side supports possible for a given package. Each side support check is part of the stability check.

Figure 48A:
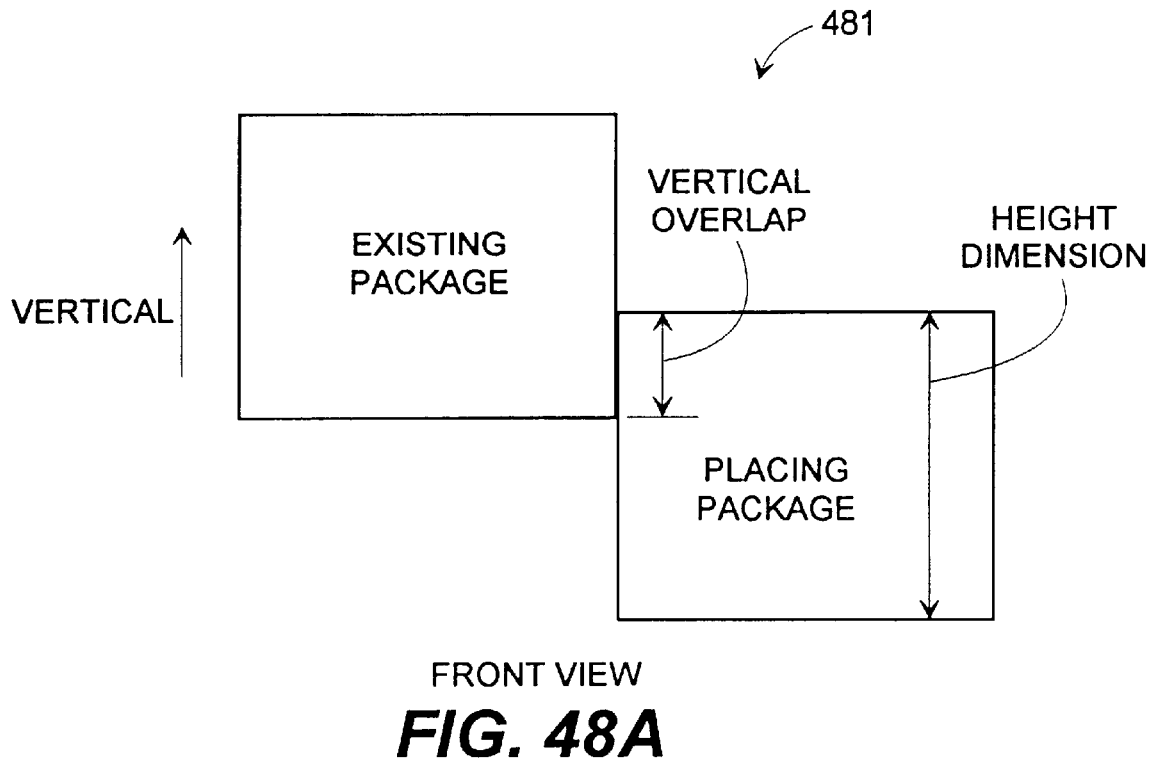
FIGS. 48A and 48B are front and top views, respectively, of package groups 481, 482, respectively, which illustrate vertical and side overlap, respectively.
Figure 48B:
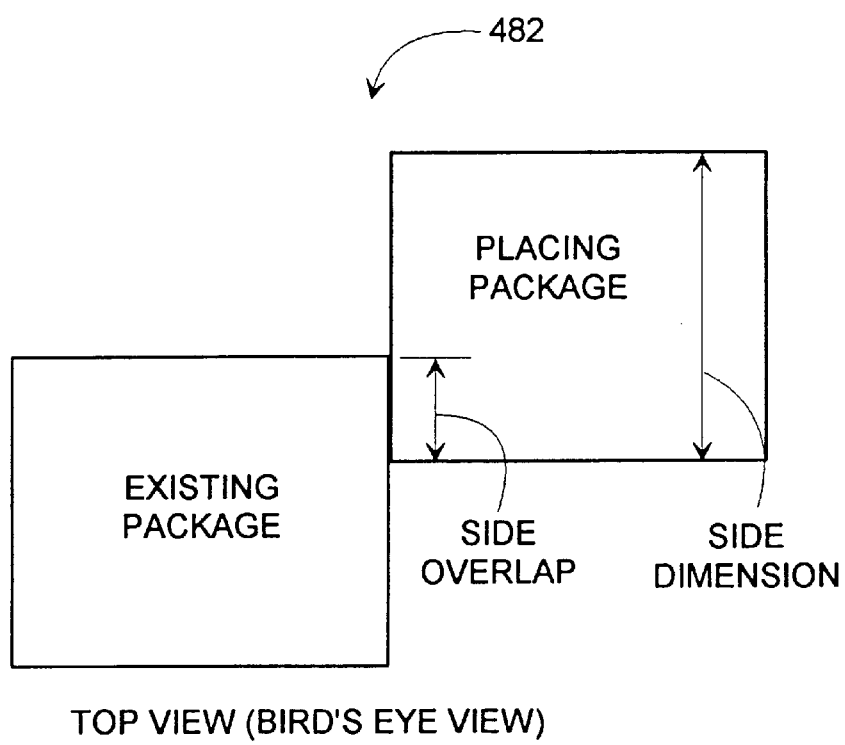

In order to determine the existence of side contact, a search is conducted among immediate neighboring packages (neighbors). As shown by FIGS. 48A and 48B, if a neighbor (existing) package has sufficient side surface overlap with the placing package, side contact is considered made. Under one embodiment of the present invention, as shown in FIG. 48A, sufficient side overlap is defined as the neighbor package having vertical overlap over a certain fraction, such as ⅓, of the height dimension of a placing package, regardless whether the placing package touching its bottom edge or top edge. In addition, as shown in FIG. 48D, the neighbor should overlap over a certain fraction, such as ⅓, of the side dimension of the placing package.

Reference is now made to FIG. 41, which illustrates the potential placement of a placing package P, considered for placement atop previously-placed packages A and B. As shown, package A provides Side Force SF against placing package P, which may be insufficient to prevent package P from "falling off" package B about Pivot Point PP.

The side supporting force provided by neighbor packages such as A is computed as a product of friction coefficient and accumulative side weight. While the friction coefficient can be chosen experimentally as around 0.2 for cardboard packages, accumulative side weight needs careful computation. Included in the accumulative side weight is the weight of all the contacting packages on that side, added to the complete or partial weight of any packages being supported on the top of those side-contacting packages. Partial weight of a package will be taken if the package is also supported by other packages from below (assuming uniform weight distribution). The side contacting packages and packages therein may contact other packages on the opposite side, even they may carry other packages on their top. Based on the same rule, the complete or partial weights of all relevant packages will be included in the computation of accumulative side weight.

Reference is made to FIG. 42 for an example. Assume a placing package P is to be considered for placement against the free vertical side of package A, partially atop package H, and above the gap between packages G and H. The accumulative side weight of package A is the summation of the weight of packages A, package C (next to package C), package B (atop package C), package E (next to package C), and package D (atop package E). Packages F and G, which have no side overlap with placing package P, provide no contribution to the accumulative side weight of package A.

It may be understood that a placing package not only affects the accumulative side weight of its contacting neighboring packages, and their contacting packages, but also affects the accumulative side weight of its supporting packages, and their supporting packages. Therefore updating is required. To improve computation efficiency, all accumulative side weights are updated each time a new package is placed in stack. The updating rule is as follows. The weight of the placing package will be added on to the accumulative side weight of all contacting packages. These packages may contact other packages on the opposite side, then the weight will be further added on to the other packages as long as they are in the influence boundary of the placing package, and so on. However, this can act like wave front propagation across a lake surface. For each round of weight propagation, there will be a threshold value assigned. A contact package visited already will be marked with a number which is the same as given threshold value. Seeing the number already reached threshold value, any following visit to the same package in this round of propagates will be stopped.

Once a side contact is found, a check on the moment of force balance over potential pivotal edges will be conducted. First, a search is conducted down the supporting packages, until the pivotal edges of rotation are found, which correspond to the nearest boundary of the effective supporting surface. Second, the moment of force against pivotal edges for all packages directly or indirectly supported is computed. In this computation, the gravity center of the current package can be assumed to be on the edge of gravity center region near to the contacting side. Third, the moment of force against the pivotal edges contributed from side contact is computed.

There may exist multiple side contacts for a column of packages, and care needs to be taken in the computation of side moment of force for those contacts. Assume there are two side contacts for a column of packages, one occurs in a higher layer and one in a lower layer. The weight of the package having contact in the higher layer and any additional weight above should be subtracted from the accumulative side weight of the contacting package in the lower layer.

If the resultant moment of force is going to cause the package to rotate against side neighbor, then the package is not stable; otherwise a side support is considered established.

Figure 38:
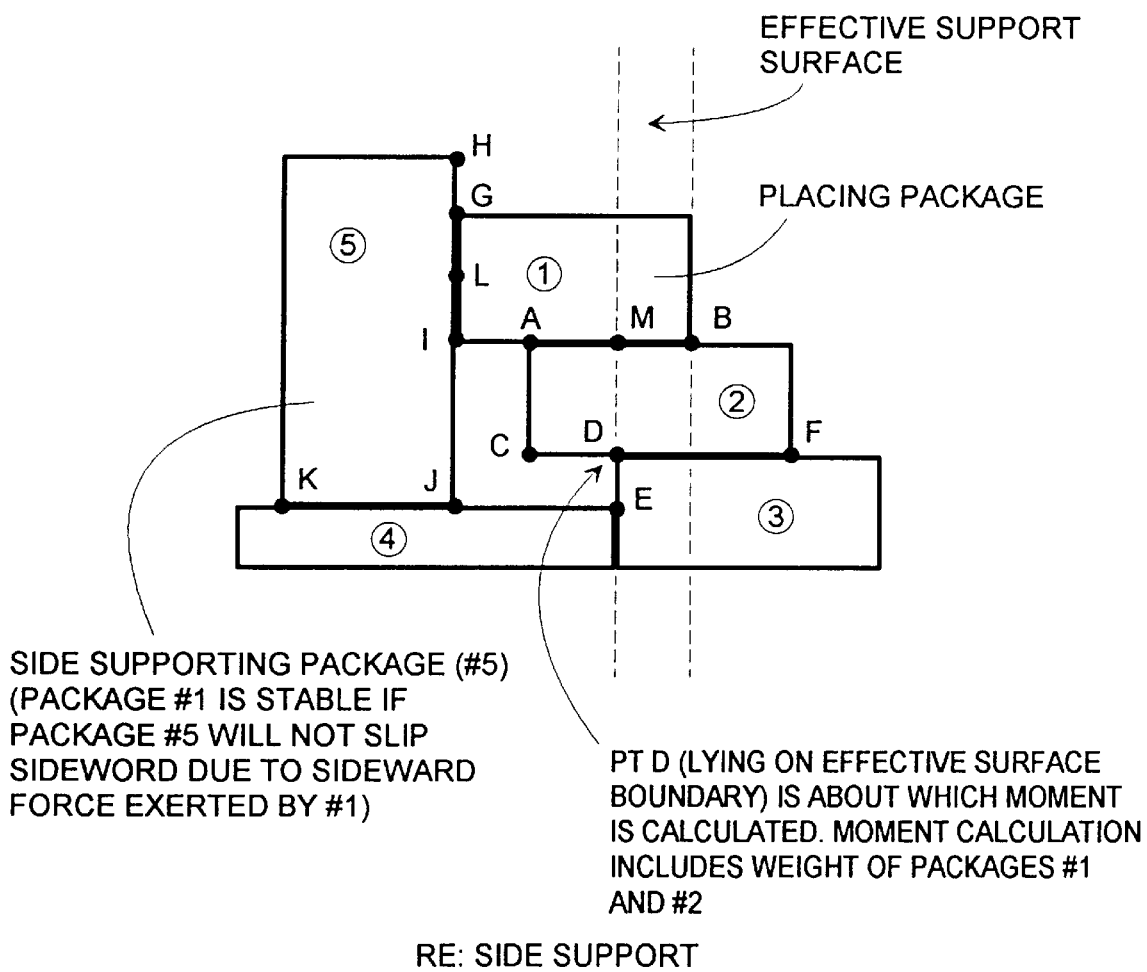
FIG. 38 is an illustrative side plan view of a plurality of stacked packages, with an additional "Placing Package" being proposed for placement as shown.
Figure 44:
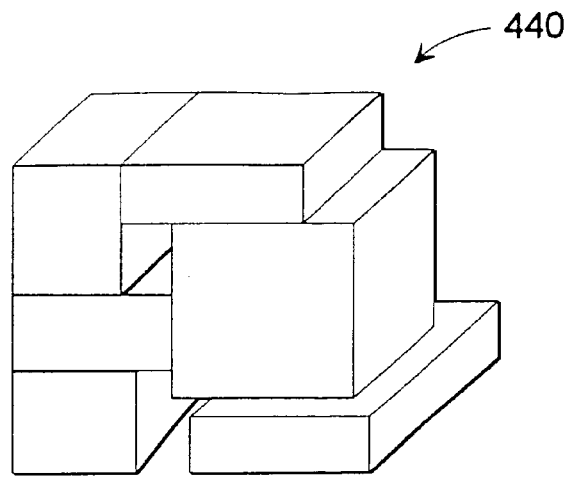
FIG. 44 illustrates a package stack 440.

An example of such calculations is set forth within FIG. 38. As shown, Packages 2, 3, 4, and 5 in FIG. 38 are already in place, and package 1 is the "placing package" being considered for placement. Packages 3 and 4 in FIG. 38 are situated atop a common support surface such as the pallet. Package 2 is atop Package 2 with some overhang. Package 5 is atop Package 4 with no overhang. Placing Package 1 also overhangs over Package 2, and is in side contact with Package 5 with the force due to such contact assumed to be focused at point L. The dotted lines show two boundaries of the Effective Support Surface of the Placing Package 1. Point D, lying on the Effective Support Surface boundary, is about which the moment is calculated. Moment calculation includes the weight of Packages 1 and 2. Package 1 is assumed to have adequate side support from Package 5 if Package 5 will not slop sideward due to the sideward force exerted by Package 1 as it tries to pivot about point D.

5) Check Distribution of Direct Supporting Surface

Figure 35:
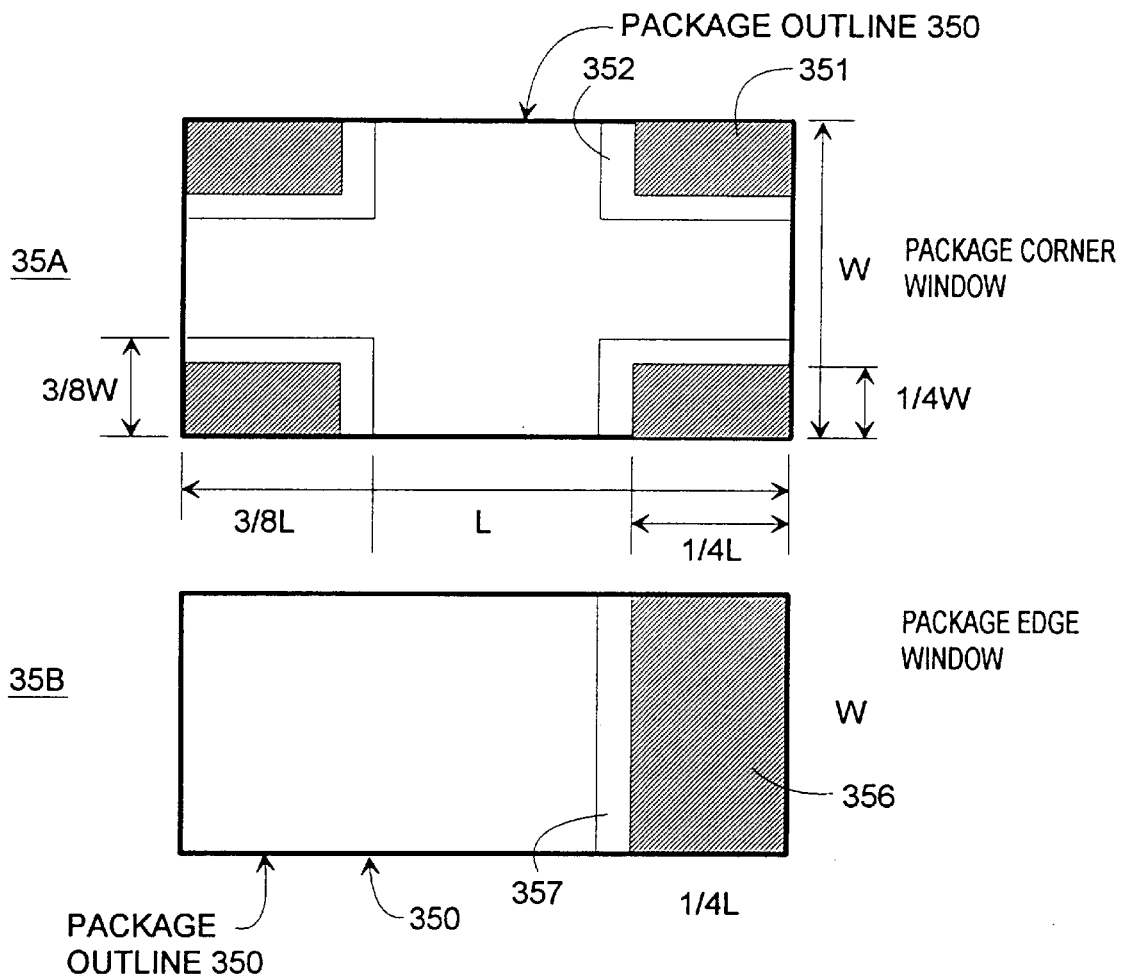
FIGS. 35A and 35B are bottom plan illustrations of placing package bottom surfaces, with FIG. 35A illustrating the use of Package Corner Windows under the present invention, and FIG. 35B illustrating the use of Package Edge Windows under the present invention.

Reference is now made back to FIG. 30. After the above-referenced "FALL OFF?" check at step 309, one process according to the invention includes a check of the distribution of a direct supporting surface of a package. The purpose of the Direct Support Surface Check is not only to check for the stability of current package, but also to ensure that the placing package has sufficient support beneath, so future packages can be stably stacked on top. The Direct Support Surface Check designated generally at 312 (FIG. 30) comprises two parts: a package corner support check (step 312) and a package edge support check (step 314), both explained in reference in FIG. 35.

As shown in FIG. 35A, under the package corner support check, four identical windows 351 on corners of the package outline are established on the bottom surface of a placing package. Each window 351 is ¼ the width, and ¼ the length of the package outline 350. As long as there is part of any direct supporting surface falling within these windows, expanded windows 352 are used to determine the overlap condition. Each expanded window is ⅜ the width, and ⅜ the length of the package "foot print". For each expanded window, its overlap is checked with all the direct supporting surfaces. If the minimum overlap dimension is above a threshold, then a solid support on package corner is considered established. For a small package, the threshold can be linked to the window dimension, such as 60% of the expanded window dimension. If desired, the aforementioned window sizes and threshold can be varied for different stability margins.

If a package has support on four corners (step 315), or three corners and the ratio between the total area of direct supporting surfaces and that of placing package's bottom surface is sufficiently big, such as 70% (see step 317), the package is considered stable (steps 316 and 321), and the Stability Check is complete. Otherwise, the package edge support check 314 is made, with the assistance of edge support calculations from step 314.

The package edge support check itself comprises two checks; a solid edge support check and a loose edge support check. As explained in detail below, in step 322, solid edge support and loose edge support will be checked and evaluated as discussed later.

Under the solid edge support check, for four edges of a placing package, an edge is considered as having solid support if (a) there exists support in two package corner windows 351 (see FIG. 35A) along this edge, or (b) there exists side support along this edge, and the underneath supporting surface is sufficiently close to the edge. "Sufficiently close" can be defined as meaning the nearest supporting surface is within a certain gap, such as about one third of the supporting surface dimension.

Referring now to FIG. 35B, the loose edge support check is similar to the package corner support check. As shown in FIG. 35B, along each edge of placing package surface is established an edge window 356, which is as long as the edge is long, and set at ¼ the other surface dimension side. If there are any supporting surfaces falling within this window, the process then computes the overlapping length of an expanded window to the supporting surfaces. The expanded window 357 is the length of the edge, and in one embodiment ⅜ the other surface dimension wide. A supporting surface is considered as having sufficient overlap with the expanded edge window if the minimum dimension of the overlapping area is above a certain clearance, such as 1.5". Therefore the overlap area will be at least 1.5" by 1.5". For a small package, the threshold can again be adjusted in proportion to the window dimension. The overlapping length is the maximum length spanned by the supporting surface. A package is considered as having a loose edge support if the overlapping length is above certain tolerance, such as ¼ of package edge length.

A placing package has a front/back dimension, and a left/right dimension. The edge support check step 322 of the package stability check requires that the package does not tip over in either dimension. In each dimension, a package should have one solid edge support, and have at least one loose edge support on the opposite edge, or it is unstable as designated by step 323. As an example, in the left/right dimension, if the left side of the placing package has solid edge support, the right side should at least have loose edge support, although it can also have solid edge support. The same must be true of the front/back dimension.

6) Comparison of Gravity Center Region to Direct Support Surface Polygon

Referring now back to FIG. 30, after the edge support check step 322 is completed, to FIG. 39, a subsequent process according to the invention includes a check that the gravity center region be completely within a direct support surface polygon (determined at step 325).

The previously-discussed package edge check does not guarantee that a package will not tip over an arbitrary edge which is not parallel to the package side surfaces. To ensure the latter, a circumscribed polygon (see the hatched polygon in FIG. 39) can be constructed from direct supporting surfaces (assumed to be rectangular). If the gravity center region (See FIG. 31) is completely within the direct surface polygon, then the package can be considered as stable under the analysis shown in FIG. 30. Otherwise, the package will be considered unstable at step 327, and the Stability Check is complete.

Figure 36:
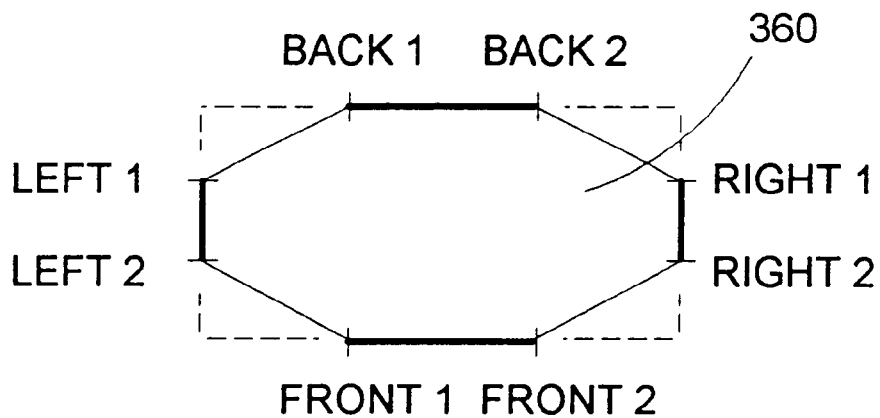
FIG. 36 illustrates the concept of the use of four boundary edges of a polygon.

The construction of a direct surface polygon from rectangular surfaces is composed of two steps. The first step scans each surface, and searches for front, back, left, and right package boundary edges. In the instance of that shown in FIG. 39, these edges are defined by lines FB, BG, DH, and DE. If two edges occur on the same line, they will be merged into one edge. After this step, maximally there could be 8 vertices, as shown in FIG. 36. If two edges are constructed from one package surface, then 2 vertices will be reduced to the intersecting point, such as the case in points B and D.

Continuing in reference to FIG. 39, it should be noted that if an additional third box such as that shown in dotted line is placed in the "corner" defined by the two Level I boxes, if point "x" extends outside the diagonal line HG, point X becomes an additional vertices.

Figure 37:
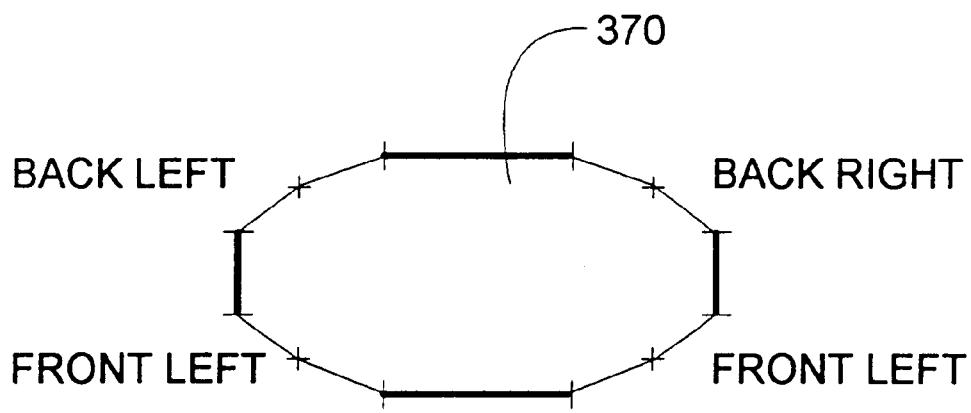
FIG. 37 illustrates the use of four additional vertices into the modeled configuration of FIG. 36.

The second step re-scans through each surface, and searches for additional 4 possible vertices which are beyond the convex polygon composed of above four edges. For example, label four corner points of each surface as the back left corner, back right corner, front left corner, and front right corner. Correspondingly, as an example, label the diagonal edge of the constructed polygon as the back left edge, back right edge, front left edge and front right edge. Now a check is made of each surface corner point against the corresponding edge. If the corner point extends beyond the corresponding edge, the corner point will be taken as an additional vertex as noted above. Theoretically there could be multiple points beyond the same diagonal edge, but the probability is low. To reduce the computational burden, only the first point is registered. After this search and construction, in actual practice to obtain a resultant polygon with all 12 different vertices is nearly impossible, as in such an instance the relevant package would have to be supported by at least 8 different packages. However, these additional four possible vertices are depicted in FIG. 37.

Once the supporting surface polygon is constructed, a check is made at step 325, whether the gravity center region is within all the diagonal edges of the polygon and the result is a final stability determination of "stable" at step 327 or "unstable" at step 326. The Stability Check is thus complete.

D) Placement Evaluation

1. General discussion

As discussed above, after the packages have been measured, corners have been defined, and assuming a plurality of stable potential package placement locations have been determined, an evaluation is made of each stable potential placement location in order to find the "best" one given preset parameters. This evaluation is done by use of a "performance index", referenced in FIGS. 45 and 46, which is assigned to the first stable potential package placement location encountered for a particular package/orientation/corner combination under the "location search" process shown in FIG. 3. Such "first encountered" stable placements will for purposes of this application be referred to as "indexed placements". The "indexed" placement with the highest performance index is chosen as the "best" placement for all package/orientation/corner combinations and the associated package is then actually picked from the accumulator conveyor and place at the chosen location as described in detail later. It could be possible to accumulate all of the performance indexes for all indexed placements and to compare all of the indices at one time. However, for computational efficiency under one embodiment of the present invention, a "compare and record" step 110 (FIG. 3) is used in order to keep the highest encountered performance index in memory, until an indexed placement higher performance index is encountered. At that point, the previous stored performance index is replaced by the higher, current, index. After all indexed placement locations within a particular package/orientation/corner combination have been evaluated, the indexed location having the highest performance index will remain in memory. This procedure is itself repeated until all package/orientation/corner combinations have been evaluated. At that time, the highest indexed placement for all possible package/orientation/corner combinations will then be in the computer's memory. That particular indexed placement is then chosen as the "best" placement for that particular package/orientation/corner, and the placement evaluation is complete.

Figure 45:
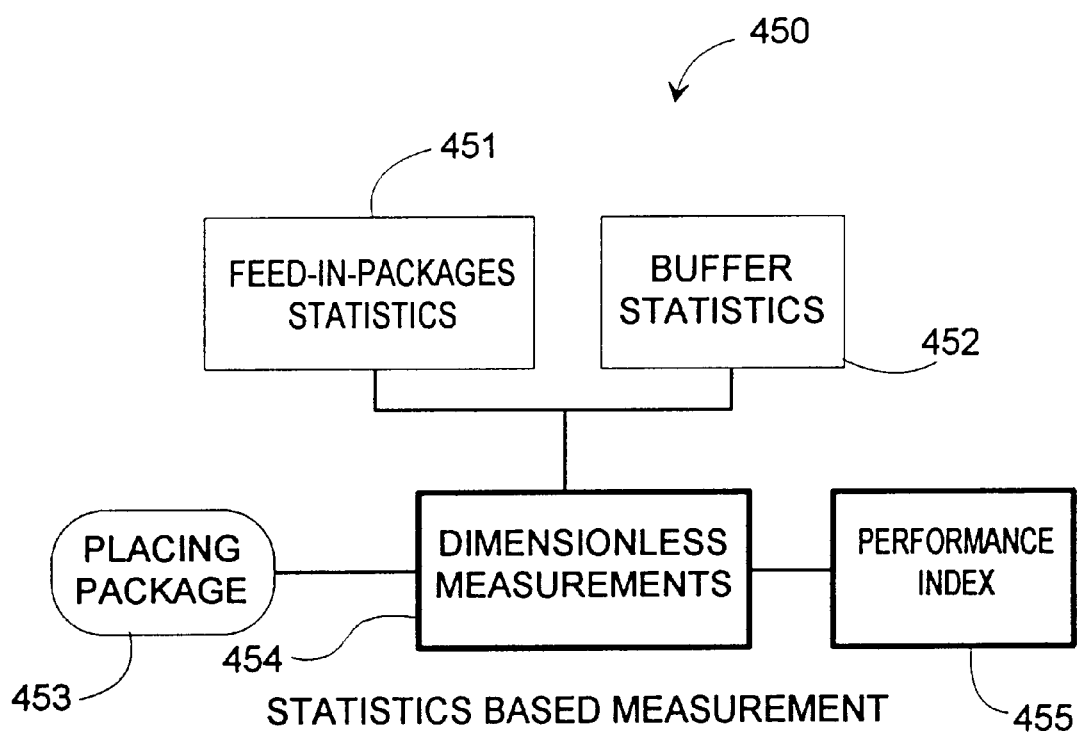
FIG. 45 is a data flow representation illustrating the benefits of statistically based measurements.

Referencing FIG. 45, it may be noted that one significant feature provided by the present invention includes the use of statistically based dimensionless measurements and decisions based thereon. Under the present invention, the invented stacking method keeps track of statistical measurements of all packages fed into and through the system, such as average package length, width, height, area, volume, etc. In addition, it keeps track of the corresponding measurements for packages presently in the buffer.

In assessing a placing package, the above statistical measurements are used to compare the same measurements of the placing package. A package dimension related measurement, such as package width, package area, is Slight penalty is given to BELOW (−600), and the penalty increases when it becomes ABOVE (−2600) or BLOCK BACK (−4000).

An above side neighbor penalty is used under the present invention. When placing a package in the middle of a stack such that it stands above immediate side neighbors, it will intersect the free space of side corners. Valley shaped corners on the sides are then created. With strict robot clearance requirement for package insertion, it is possible that no package may be inserted on those corners. Gaps on the sides are thus created, and several isolated towers will grow vertically. Such towers are inherently unstable, since they lack side support. Even though later on packages can be found to insert in such gaps, after filing the gaps some smaller gaps will remain due to clearance requirements. Hence, a severe penalty is applied.

A block back neighbor penalty is also used under the present invention. By the same reason as discussed regarding an above side neighbor, a package blocking back neighbor is also an inferior placement. This placement is especially harmful when package is only allowed to have front loading, where any area blocked by the placing package is permanently unrecoverable.

As previously discussed, a corner may have left neighbor, right neighbor, back neighbor, and/or front neighbor packages. A set of level indexes are first computed for each of the side neighbors. The computation methods for those indices are similar. In the following, focus is made on the computation of the relative height of a placing package with its left neighbors, as shown in FIG. 52.

Figure 52:
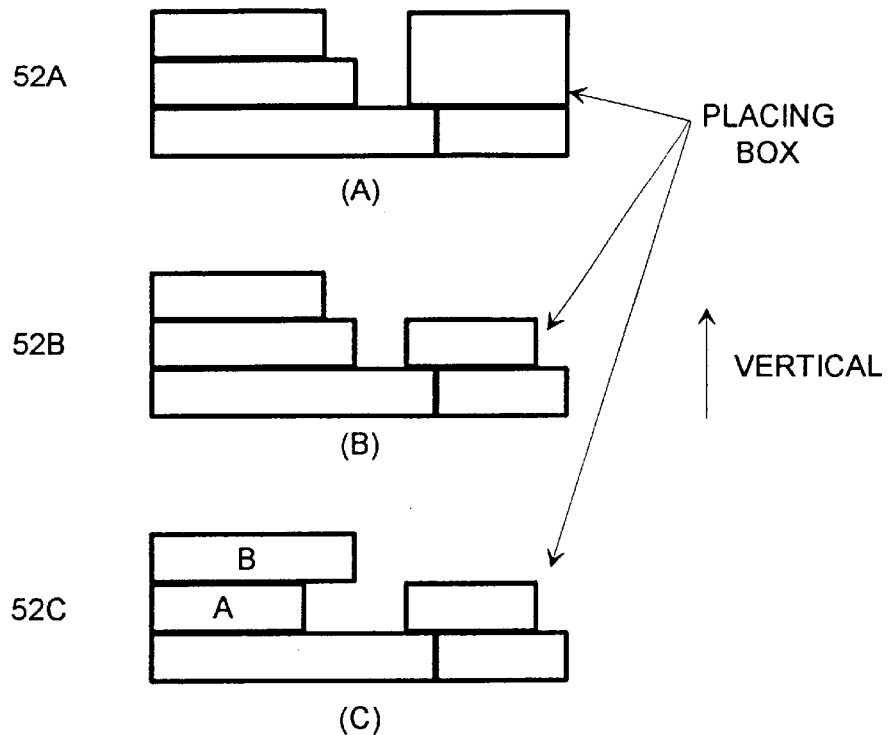
FIGS. 52A–52C illustrate the concept of a placing box leveling with a neighbor.
Figure 53:
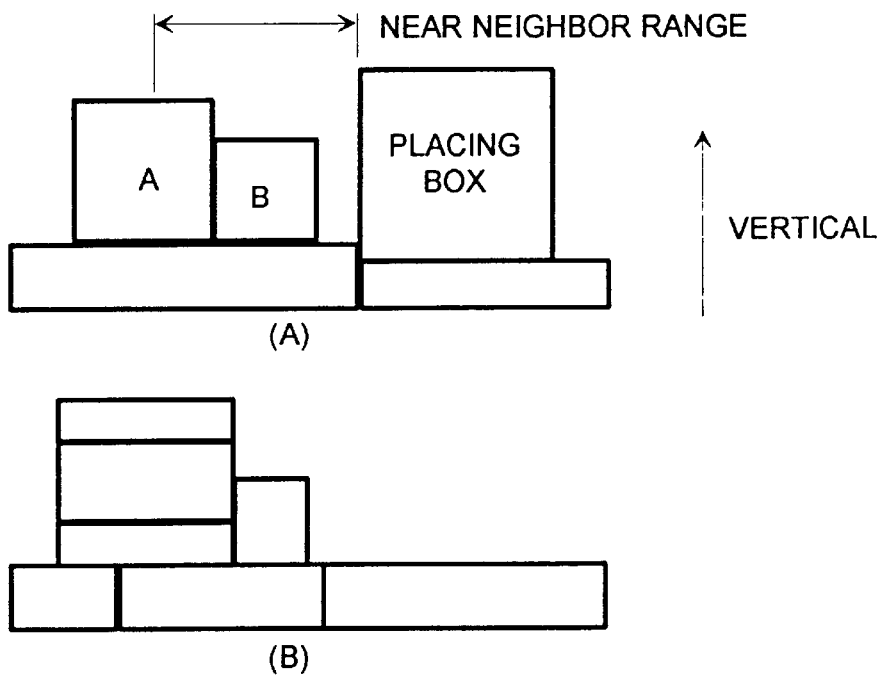
FIG. 53 illustrates neighbor height adjustment.

As shown in FIG. 52, neighbor packages can be at varying distances from the placing package. A line is drawn at a distance, which in one embodiment is chosen about 0.7 fraction of the average package width (within the statistical data), to the left boundary of the receiving corner, such that converted to a dimensionless measurement such as the ratio of the package width to the average package width, the ratio of the package area to the average package width, etc. A judgment such as whether the package is too small, too narrow, or waste too much surfaces, etc., are computed based on thresholds (either crisp or multi-valued) of those dimensionless measurements.

Such statistically based measuring and evaluation techniques provides two advantages. First, the placement evaluation method used therewith can handle different sizes of packages, since the method as a whole may not depend on specific package length or width. Second, in deciding a current placement, the stacking method includes a consideration on its effect on potential future placements. As there is very limited package data available in the buffer, statistically based measurement techniques can provide a good estimate of future incoming packages.

Figure 46:
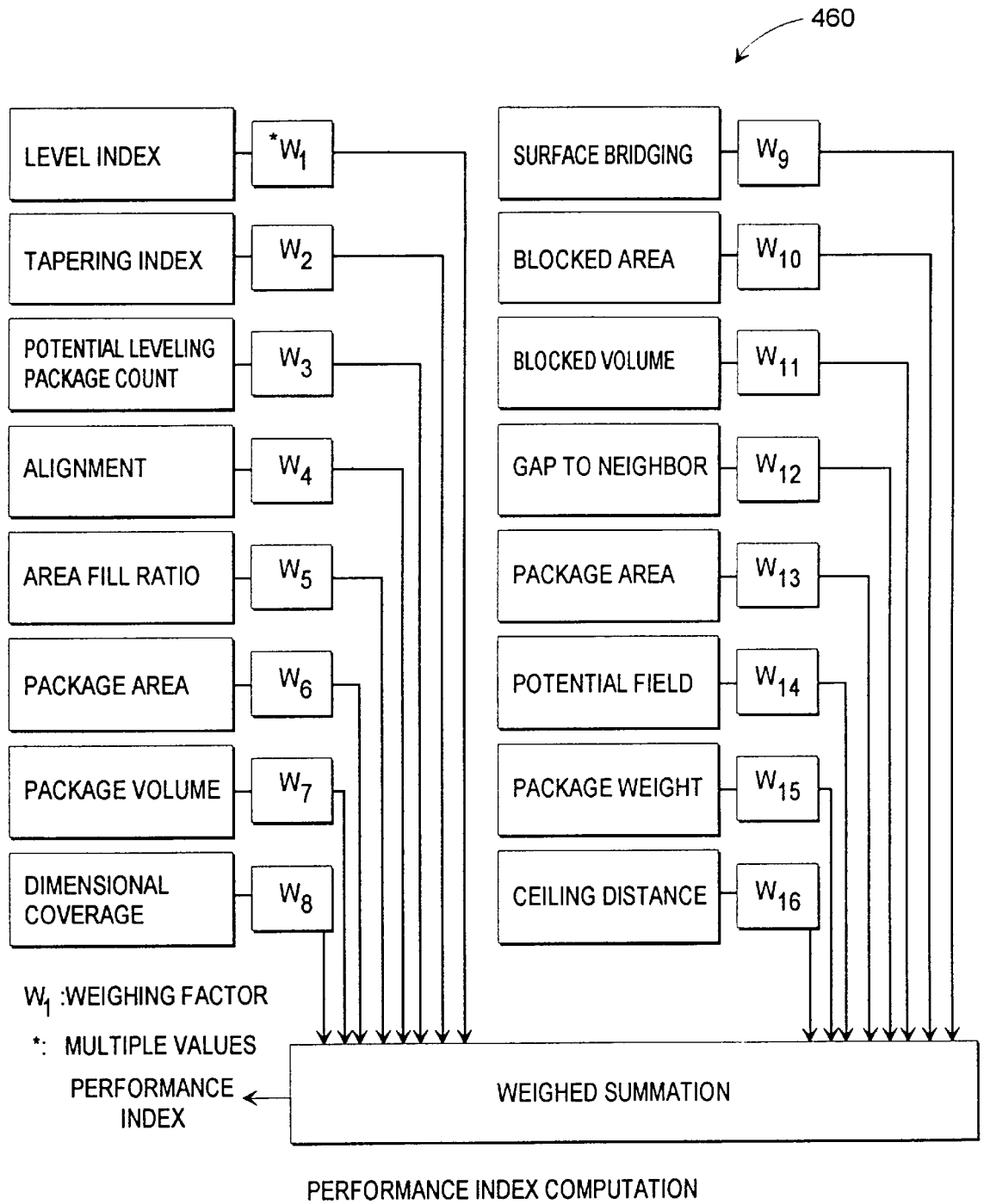
FIG. 46 is an illustration of the computation of a Performance Index according to the present invention.

Now referencing FIG. 46, a variety of factors may be used under the present invention in arriving at a performance index. These factors include Level Index, Tapering Index, Potential Leveling Package Count, Alignment, Area Fill Ratio, Package Area, Package Area, Package Volume, Dimensional Coverage, Surface Bridging, Blocked Area, Blocked Volume, Gap to Neighbor, Package Age, Potential Field, Package Weight, and Ceiling Distance. As noted below, some of these factors, themselves include multiple factors.

Each of the above-referenced factors are multiplied by corresponding weighing factors designated as $W_1$–$W_{16}$ in FIG. 46, the products of which are summed and provide the above-referenced performance index. The weighing factors are set forth in FIG. 47.

2. Level Index Factor

One embodiment of the present invention includes the use of a level index. Bonuses and penalties associated with this level index are used to encourage "shelf loading". With shelf loading, each package is preferably placed tightly against existing packages, while top surface heights follow a monotonously decreasing step profile. The highest package preferably should be placed at the inner (back and left) boundary.

The advantages of such a monotonously decreasing step profile are twofold. First, the free space for placing next package reaches all the way to the pallet outer (front and right) boundary. There can have more choices for fitting a package in the space, and it is less likely to have clearance problem for package insertion performed by a robot. Second, it has been found that a monotonously decreasing step profile is a stable configuration. Each package tends to get one side support at the time of placement, and double side supports (except at boundary) when the rest of the packages are placed. A set of individual level indexes can be established for each side. These indexes are then combined into a resultant level index, which takes on value such as LEVEL ALL, LEVEL SIDE, BELOW, ABOVE, BLOCK BACK, or NO NEIGHBOR.

LEVEL ALL means that a placing package is level with side neighbors, as well as back neighbors.

LEVEL SIDE means that a placing package is level with at least one side neighbor.

BELOW means that a placing package is below either side neighbors or back neighbors.

ABOVE means that a placing package is above side neighbors but does not block neighbors.

BLOCK BACK means that a placing package blocks back neighbors.

NO NEIGHBOR means no neighbor exists around the corner.

As shown in FIG. 47, highest bonus is given to LEVEL ALL situations (1600), second bonus is to LEVEL (1100). those members within or intersecting the line are considered as near neighbors, and those members on the far side of the line are considered as far neighbors. In computation, priority is given to the near neighbor.

Figure 51:
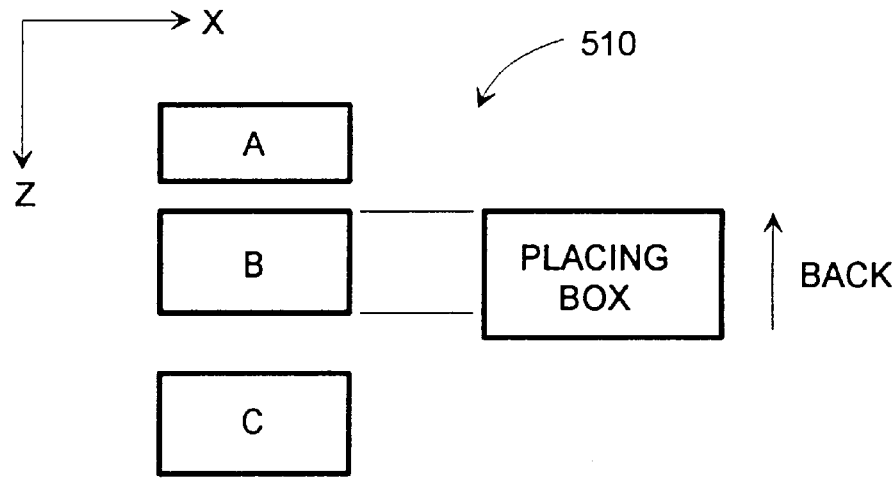
FIG. 51 shows the concept of side overlap within a package group 510.

A maximum height search is conducted through every member which has side overlap (see FIG. 51) with the placing package. Those members which do not have any overlapping are irrelevant. Those relevant packages can be at a level higher than the placing package. In the searching for the maximum height, all neighbors which are level with the placing package will be recorded. If the placing package height is greater than the maximum height, the level index will be tentatively labeled as ABOVE. If it is approximately equal to the maximum height, the level index will be labeled as LEVEL. If the height of the placing package is less than the maximum height the level index will be tentatively labeled as BELOW.

If the level index is BELOW, and there also exist neighbors having approximately the same height as the package, then a further search is conducted to verify that the leveling package is not blocked on the top. If that is the case, the level index will be changed to LEVEL.

If the level index for the placing package is ABOVE, further evaluations are made. So far the check has been based on the near neighbors. The question arises whether the corners associated with the top surfaces of near neighbors are useful ones. If they cannot be used to place a package, and insistence is made that any placement on the right is ABOVE and give in a heavy penalty, then a tower on the far neighbors will probably occur. That is not a desirable situation. Therefore, the worthiness of the corners associated with the top surfaces of near neighbors will be tested. If they cannot be used to place a package, then placing package will be compared with far neighbors. If the placing package is below the maximum height of far neighbors, then the level index will be labeled as BELOW.

A similar check is extended to right and back neighbors. In order to test whether there exists a useful corner on the left hand side of back neighbor, or on the right hand side to back neighbor, or on the immediate front of back neighbor, a search among all possible corners will be conducted. After coordinates screening a concerned corner may be selected. Then the size of the corner, as well as corner surface size will be checked. In addition, tentative placement will be attempted for packages in the buffer. As long as there can be package placement in the blocked area, then the placing package is labeled as BLOCK BACK.

3. Tapering Index Factor

Figure 54:
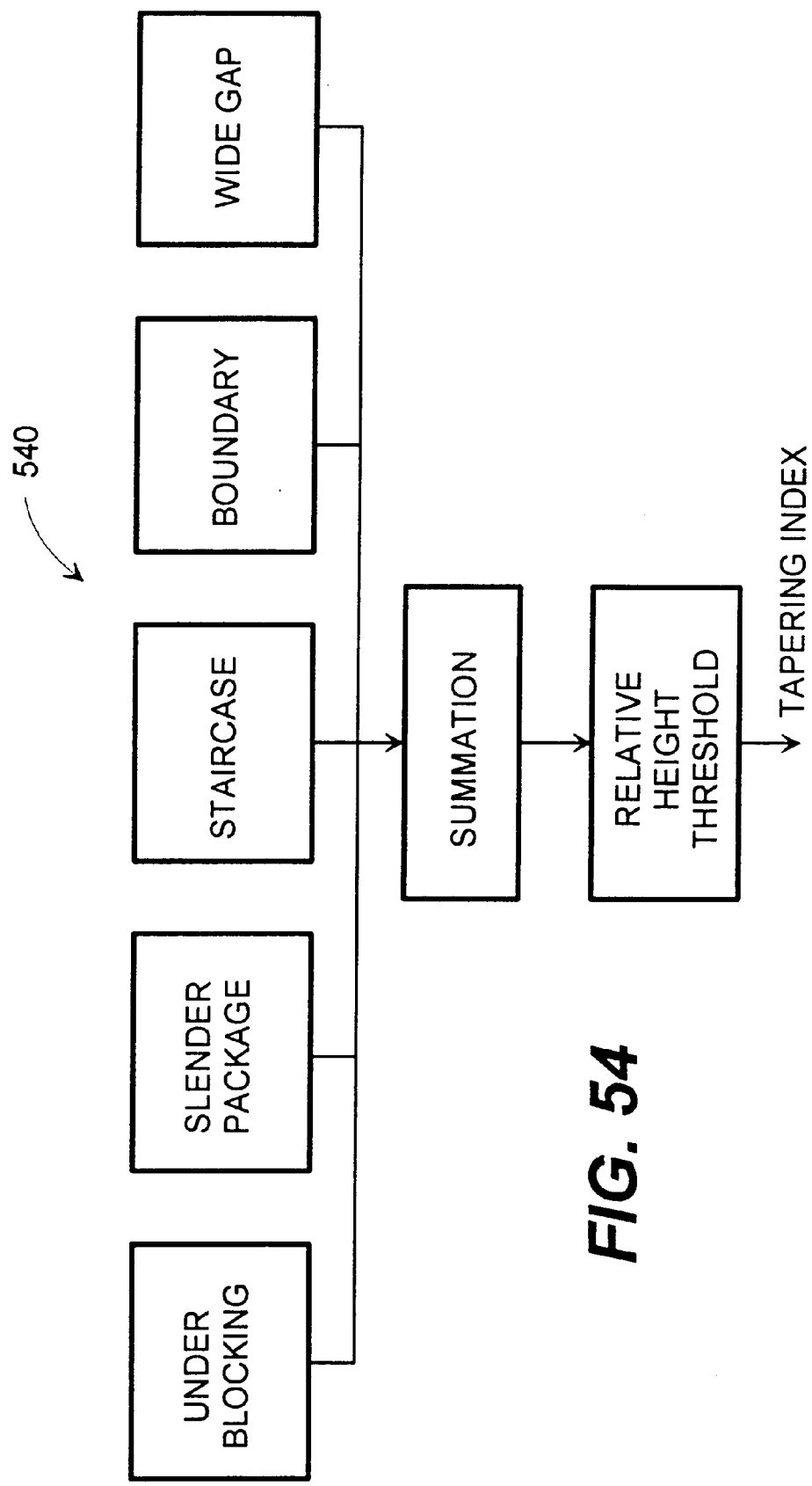
FIG. 54 is a data flow illustration 540 showing the components used in calculating the tapering index according to the present invention.
Figure 72:
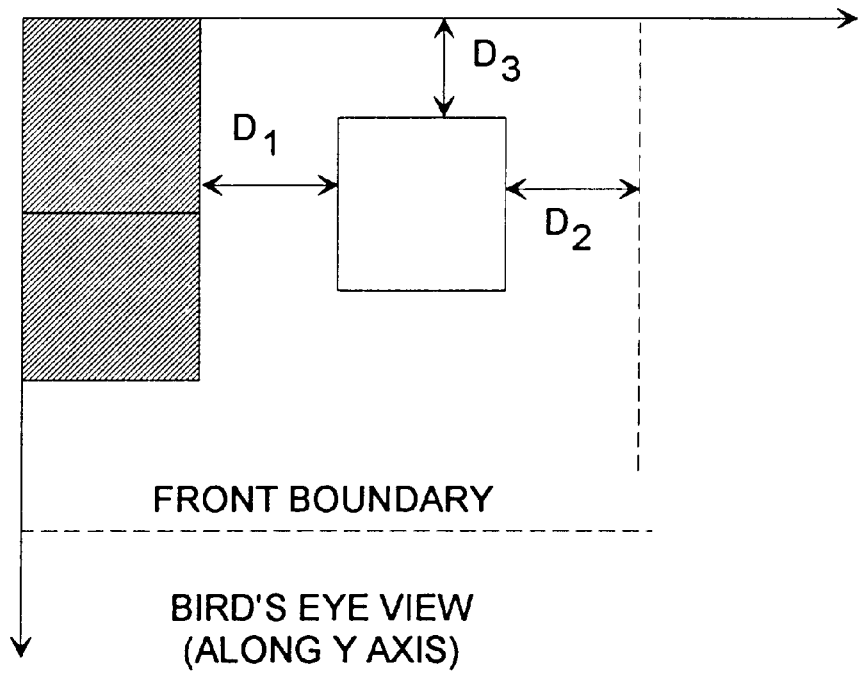
FIG. 72 illustrates the rules applying when an excessively wide gap is created when a placing package is not near the front boundary, in a configuration shown as 720.

Now referencing FIG. 46, in evaluating a package placement, a tapering index is used to discourage package placements which lead to a tapering stack. A placement which is believed to lead to a tapering stack will be applied with a penalty, which is proportional to the tapering index as described in detail below. Depending on the nature of a problem, sometimes a tapering index is proportional to a certain measurement, other times it may be one or several gross penalty points. As shown in FIG. 54, under one embodiment of the present invention, the tapering index is composed of a summation of values relating to the following factors:

Under Blocking (See FIGS. 56–58)
Slender Package (See FIGS. 59–63)
Staircase (See FIGS. 64–66)
Boundary (See FIGS. 67–70)
Wide Gap (See FIG. 72)

Figure 56:
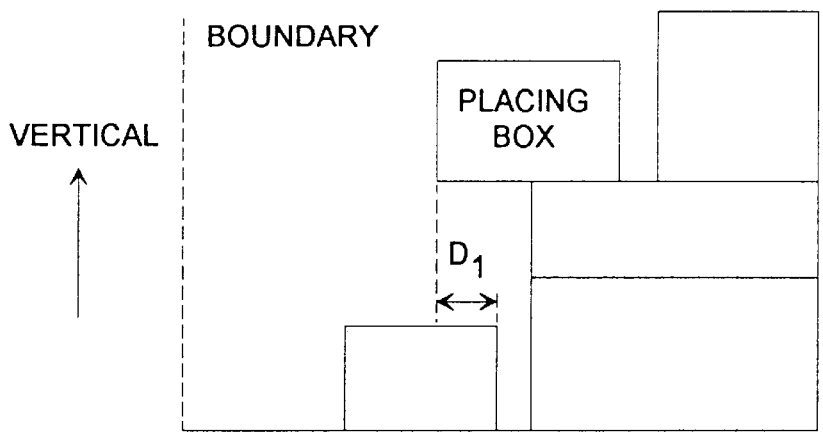
FIG. 56 is a side plan view of a plurality of stacked packages with a proposed "Placing Package" being evaluated for "Excessive Blocking". If $D_1$ (the minimum blocked horizontal length in lower corner surfaces) is greater than-one-third of $W_A$ (the average width of all boxes in the stack and the buffer) then the tapering index will be $[D_1|(W_A|3)]$.
Figure 58:
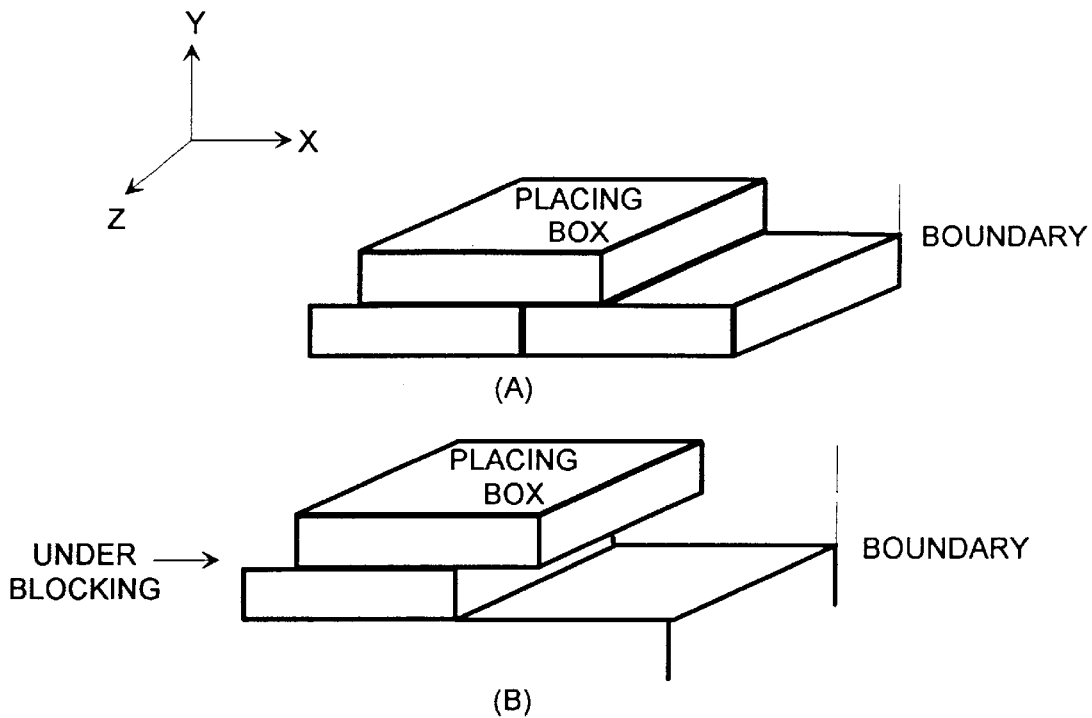
FIGS. 58A–58B illustrate the concept of boundary corner checking.

An under blocking check is made under the tapering index determination under one embodiment of the present invention. As shown in FIGS. 56–58, under blocking occurs when a placing package placed within a corner blocks another lower corner on one side, making it partially or completely blocked as unusable because of the placing package. This can occur anywhere in the stack, and can occur in all directions. As shown in FIG. 57, if it is most likely not possible to place a package in a lower corner should the package under consideration be placed, then the calculation "Taper Index 1" will be made, which means that 1 will be added to the summation of the Tapering Index values being summed in FIG. 54. If "Rule 1" also applies, as shown in FIG. 56, the value $D_1/(W_A/3)$ will also be added with $D_1$ being the minimum blocked horizontal length in lower corner surfaces, and $W_A$ being the average width of all boxes in the stack and in the buffer (accumulator).

Referring now to FIGS. 59–63, a slender package check is made under the tapering index determination under one embodiment of the present invention. As shown in FIGS. 61A–B an isolated slender package may create a narrow shoulder not usable to place any future package on top. A generated gap will hurt not only the volume efficiency, but also the stability of the stack. Two towers separated by a gap are typically less stable than a solid stack.

Under one embodiment of the present invention, a package is determined slender when its concerned dimension is much less than the average width of packages, for example, less than 0.7 fraction of the average package width. A slender package needs to be watched if it is not level with a neighbor package, or it becomes an island separated from one side neighbor. Even though a slender package does not match the height of its one side neighbor, or it becomes an island separated from one side neighbor, it may still be possible to find a matching package to place on the other side of the slender package after the slender package is placed.

Now referencing FIGS. 62A–C, a search is conducted in the buffer to see if any package can be placed on the other side to match the height of the slender package. Such height matching can occur at the same level as the current corner (FIG. 62A), at a lower level than the current corner (FIG. 62B), or a higher level than the current corner (FIG. 62C), as long as those adjacent corners are sufficiently close to the placing package. If such matching can be made, the slender package most probably will not create a gap in the future.

Figure 59:
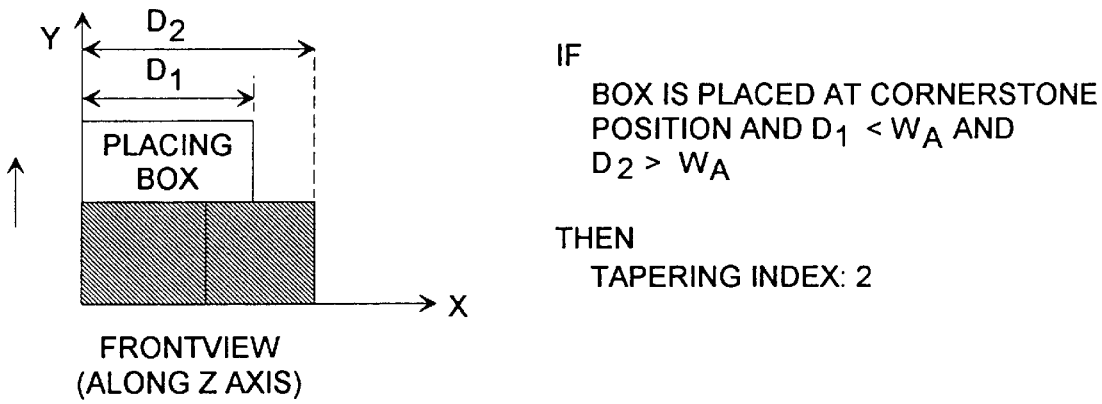
FIG. 59 illustrates slender box checking when the placing box is at a cornerstone, with a value of 2 being added to the other factors shown in FIG. 54 before a threshold is applied if certain criteria apply.
Figure 62:
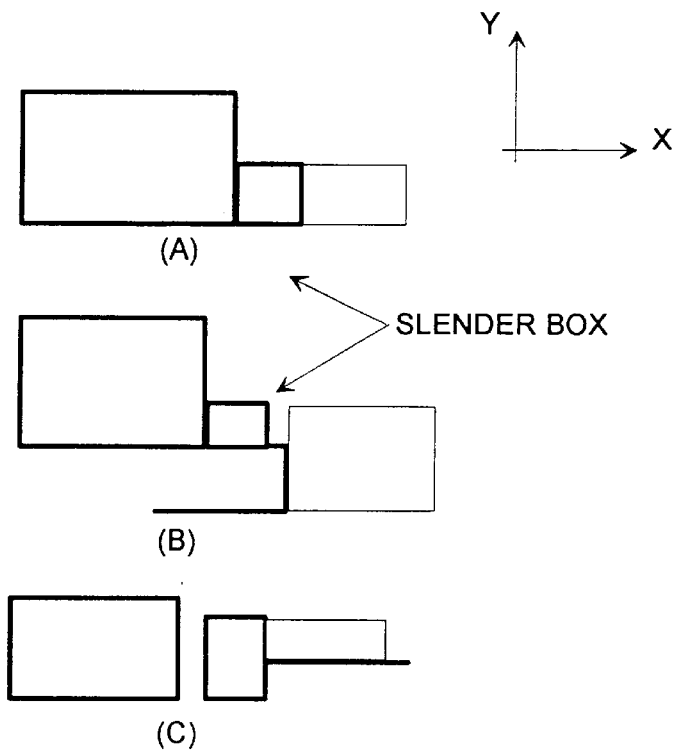
FIGS. 62A–62C illustrate the advantageous concept of finding a "matching box" for a slender box.
Figure 63A:
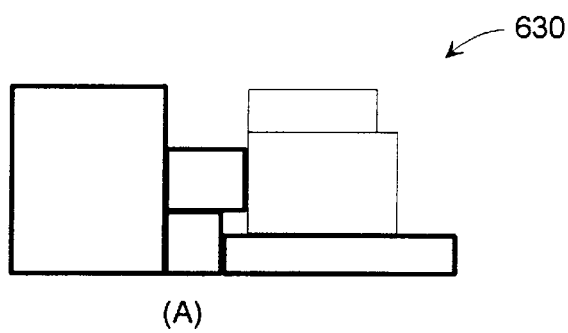
FIGS. 63A–63B illustrate the amplification of a gap within stack configurations 630, 631, respectively.
Figure 63B:
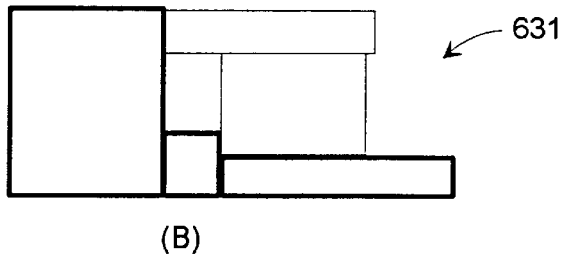

If a slender package cannot find any height matching on either side, and the corner has sufficient room which can be used to fit a big package, then the placement will be given a gross penalty, as shown in FIGS. 59 and 60.

The slender package check can also be extended to front/back dimension. With the above penalty in place, slender packages tend to be placed either as a group, or at a smaller corner.

A staircase check is also made under one embodiment of the present invention. A "staircase" situation is defined as follows in reference to FIG. 64. Placement of a placing package is being evaluated within a corner having its origin at 2. The lower corner "1" on the side has already been determined as not usable, and the placing package will further leave an unusable surface D1 in width on the side. Such situation will be penalized if the unusable surface on the side is excessive, encouraging a different placement at the corner. It should be understood that the staircase can occur not only on the left and right sides, but also on the front and back sides. Stacking rules and their associated indices are shown in FIGS. 64 and 65.

Figure 67:
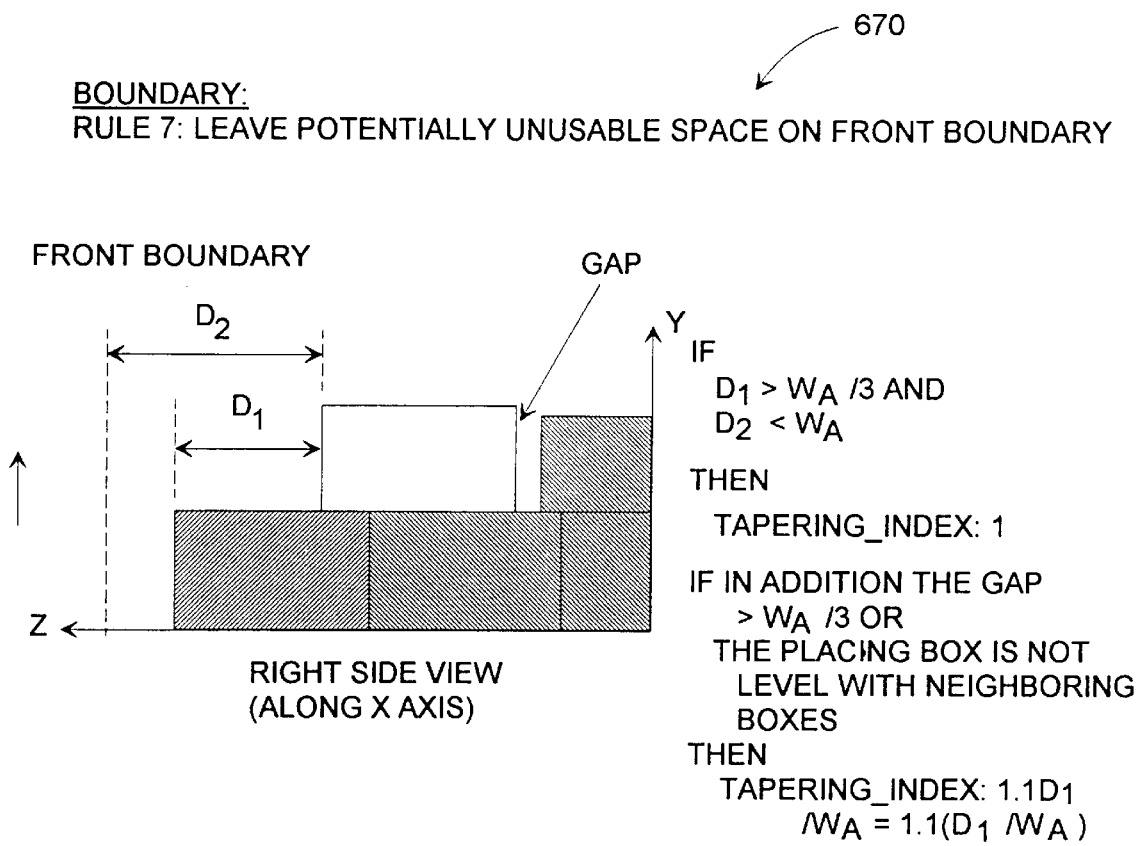
FIG. 67 illustrates the concept of stacking rules relating to front boundary spaces in the model shown as 670.
Figure 70:
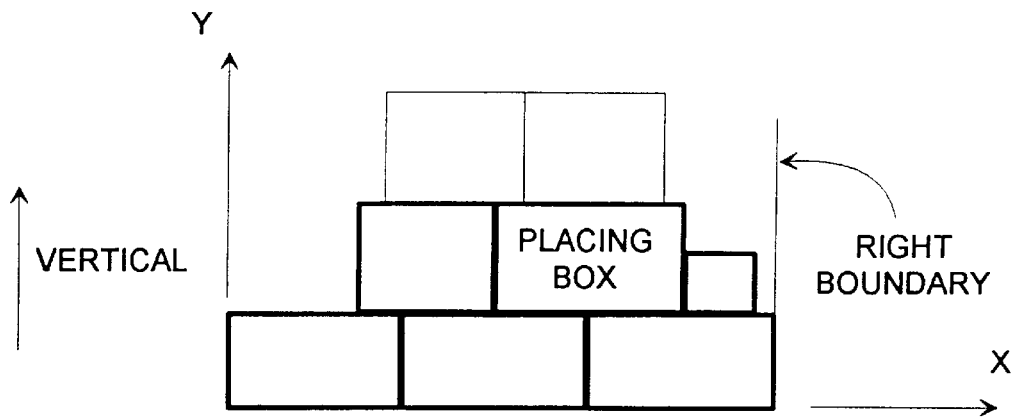
FIG. 70 illustrates an unrecoverable right boundary within a stack 700.
Figure 71:
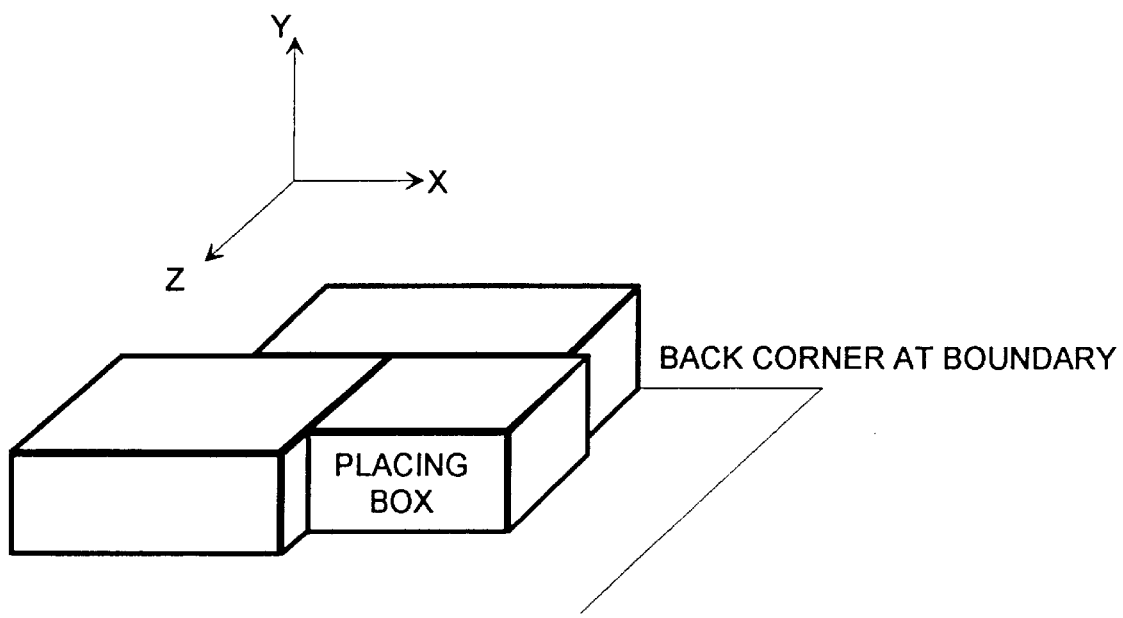
FIG. 71 illustrates a back corner at a boundary.

A boundary check is also made under one embodiment of the present invention. Reference is made to FIG. 67, FIG. 68, and FIG. 69 for purposes of this discussion.

The purpose of a boundary check is to make sure that the remaining free space (right or front) after placing a package is small, or can be used to place another package to match the same height of the placing package. Even if there exists a package which can be placed on the right but is not level with the placing package, it is not desirable since it creates a narrow shoulder and future package may not be able to place on top of it.

Referencing FIG. 67 as an example it may be seen that packages are being stacked from back to front. When the distance D2 from the front edge of a placing package is within a certain distance, such as average package width $W_A$, to the front boundary, a boundary check will be activated.

If the front space (between the front of the placing package and the boundary) is not negligible, then a heuristic judgment or a thorough search in the current buffer will be conducted to check if there is any package which can, in allowable orientations, be placed on the right and match the same height of placing package. Taking all these situations into consideration, if the current placement generates a front corner of narrow width, and the search fails to find any package to place on the right to match the height of the placing package, then a penalty point will be applied according to formula $1.1 \times (D_1 | W_A)$ A similar check is applied to the right boundary. The detailed computations are as shown in FIGS. 67, 68, and 69.

Referring now to FIG. 72, a "wide gap" check, being part of the tapering index determination, is also made under one embodiment of the present invention. An excessively wide gap will cause towering or tapering. A value of $Z(Min(D_1, D_2)/W_A)$ or 1 can be added if certain criteria shown in FIG. 72 are satisfied.

Figure 50:
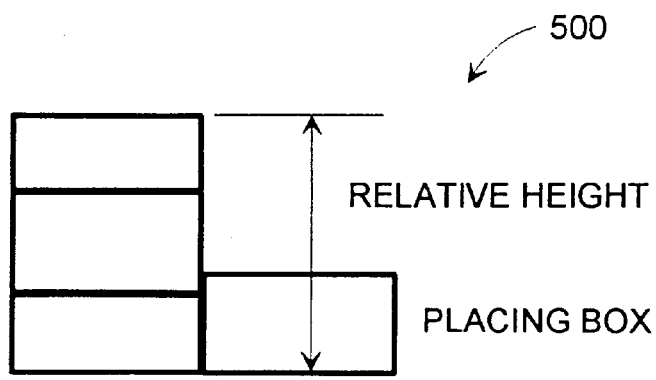
FIG. 50 illustrates a relative height check by use of a package group 500 model.

A relative height check (see FIG. 50) is also made under one embodiment of the present invention, which is the relative height of the corner bottom surface relative to the highest upper surface of the neighboring package.

The above-referenced computation in this section is not 100 percent deterministic; checking for relative height often requests an answer whether a given corner is useful or not. Typically this is done by comparing the average package size with the sizes of the concerned corners, and the supporting surfaces. In addition, checking is made of packages in the buffer, to see if there is any package which can be actually placed in the corner. This computation is inherently fuzzy; it is trying to decide whether a future package is placeable, but the information of that future package may not be available yet at that time.

Figure 55:
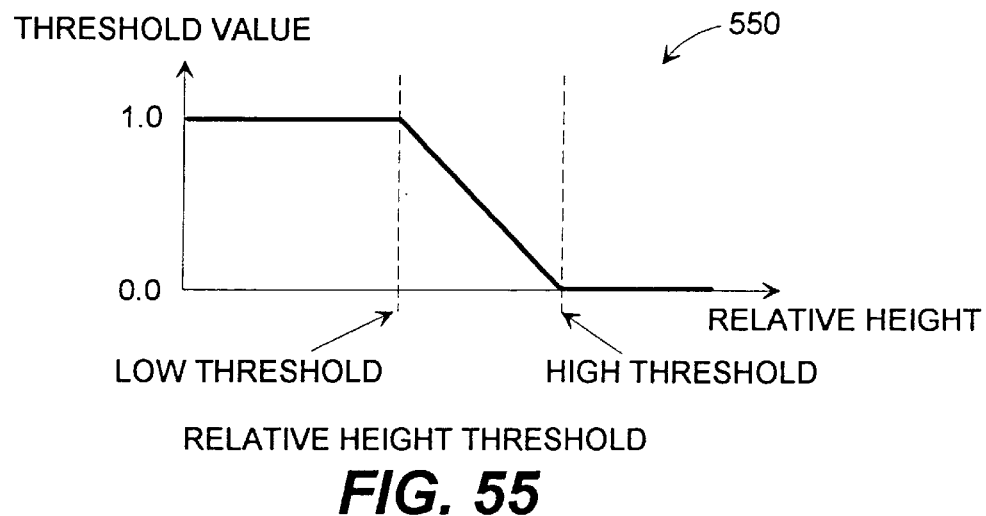
FIG. 55 is an illustration 550 of the use of a Relative Height Threshold under the present invention.

Because of such fuzziness, a relative height threshold (see FIG. 55) is used. The resulting tapering index will be multiplied with the threshold value as shown in FIG. 55. The relative height is the neighbor height relative to the placing corner. As soon as such relative height is above a high threshold, such as two times of the average package height, then the above tapering index will be eliminated. When the relative height is between a low threshold, such as one and one-half times of the average package height, and the high threshold, the tapering index will be linearly reduced. This adds to the robustness of the method.

4) Other Factors

Another factor used is a potential leveling package count. The potential leveling package count is the approximate number of packages which can be placed to match the same height as placing package. Two situations provide different types of computation. The first situation is when the placing corner has sufficient area in it to accommodate other packages besides the placing package. If so, a search in the buffer is conducted. The search will return a candidate count of packages in the buffer which share the same height (within a tolerance) as the placing package. The placing corner does not necessarily have to be able to contain so many packages. A limit count then is computed as the ratio between the remaining corner surface remaining after box placement and the average package area. Comparing the candidate count with the limit count, the smaller number will be taken as the potential leveling package count (see appendix). The second situation is when the placing package is quite close to an adjacent low or high corner, then the above computation will be based on the low or high corner in addition to the placing corner. The potential leveling count will be applied with a proportional bonus, which encourages the placement of multiple levels of packages. This is especially useful for cornerstone selection.

To speed up the computation, for each package in the buffer, and each orientation of the package, a "matching height count" is pre-calculated to determine how many packages in the buffer share the same height as the current package. After picking one package from the buffer and feeding a new package into buffer, only the corresponding count will be updated.

FIG. 49 illustrates the concept of such a "matching height count". At condition "A", it is assumed that there are four boxes, box 1 being 6" high, box 2 being 8" high. Box 3 being 6" high, and Box 4 being 9" high. At this point the matching high count for each box is 1, 0, 1 and 0. Condition B shows Box 3 removed from the buffer conveyor, such that the count for the three remaining Boxes 1, 2, and 4 is 0, 0, and 0, as no box has a box with a "matching" height. After Box 5 (having an 8" height) is added to the buffer, the matching height count for Boxes 1, 2, 4 and 5 is 0, 1, 0, and 1.

Other factors are used, each of which include the use of "package grouping". These factors are area fill ratio, package area, package volume, dimensional coverage ratio, and alignment.

Figure 74:
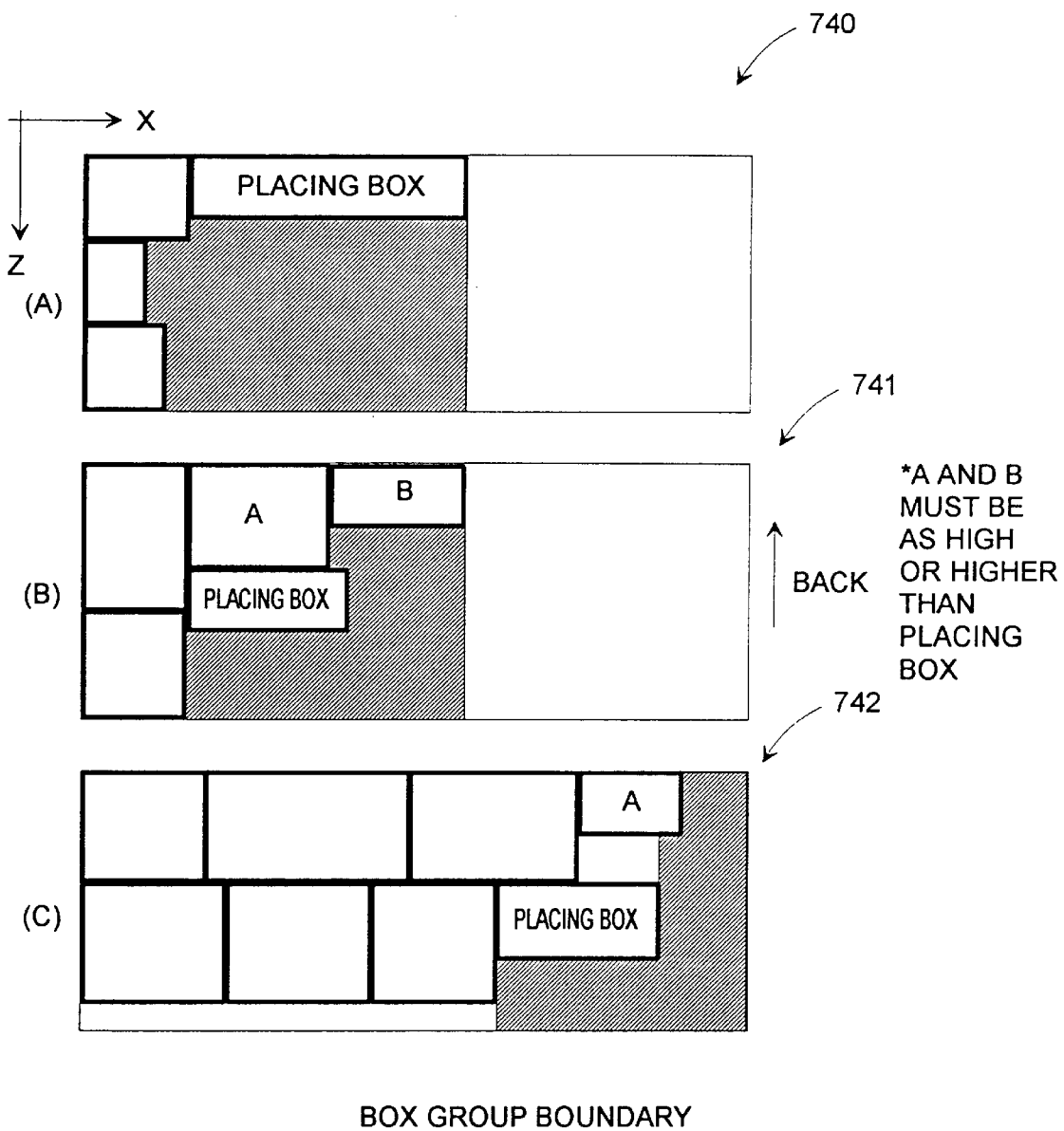
FIGS. 74A–74C illustrate the definition of box group boundaries shown in dotted line, in stacks 740, 741, and 742, respectively.

When placing a package at a given corner, an evaluation can be made of the performance of a package group. A package group is a set of packages from the buffer (including the placing package) which can be fitted into a area in the current corner, and which also match the same height as the placing package. Referring now to FIGS. 74A–C, in configuration "(a)", the geometric boundary (the shaded area in FIGS. 74A–C) of a group is limited on front to the front pallet boundary and on the right to the placing package's right edge, or as shown in FIG. 74(b) to the right edge of back neighbors (level and higher than the placing package) whichever is longer. It may also include a right pallet boundary when the package is sufficiently close to that boundary, as shown in FIG. 74(c).

Figure 77:
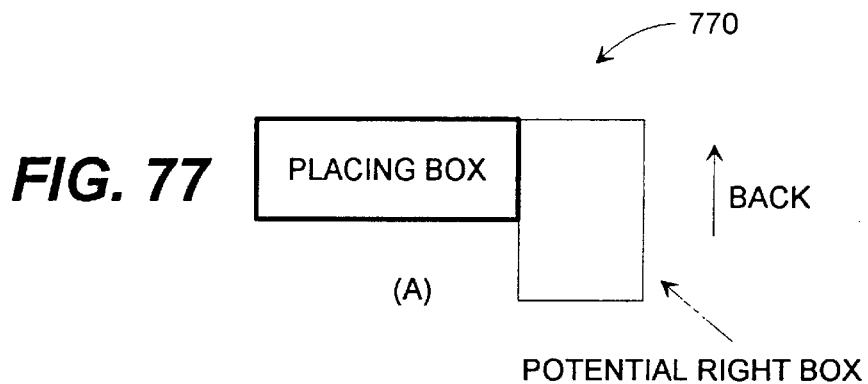
FIGS. 77, 78, illustrate stacks 770, 780, which illustrate different potential right placements.
Figure 78:
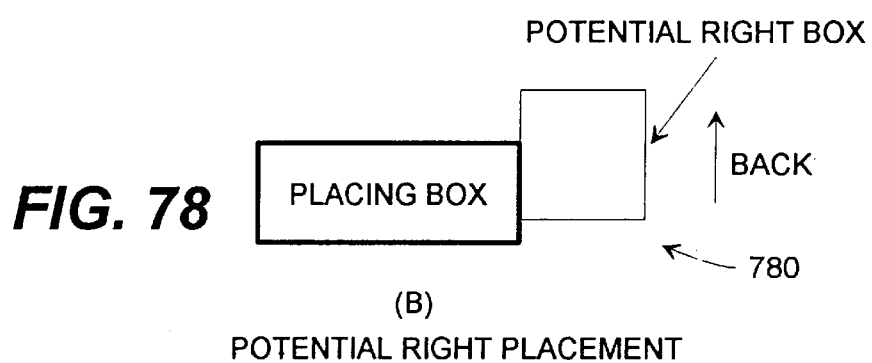
Figure 83:
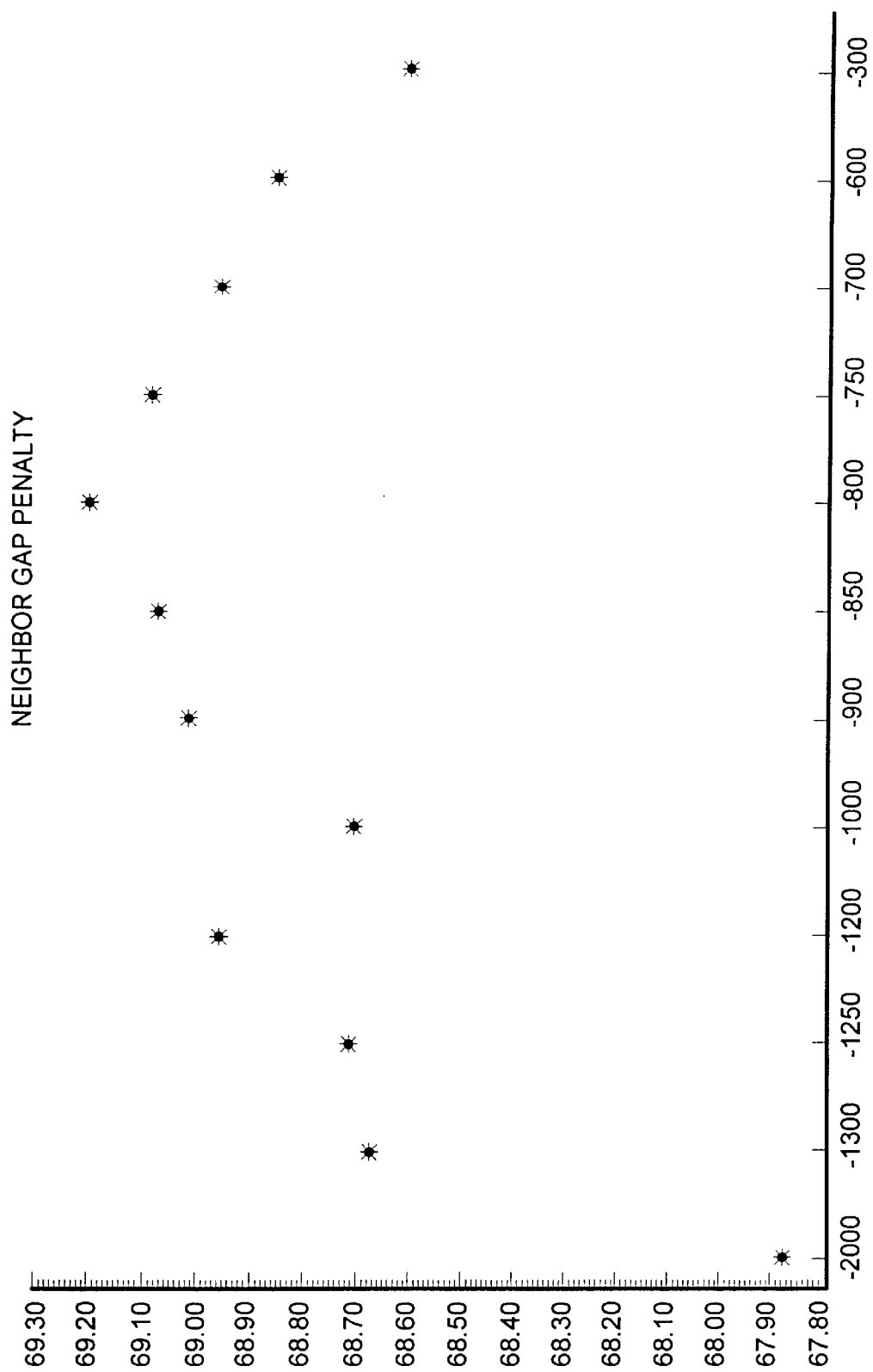
FIG. 83 shows a chart exemplifying the calculation of a neighbor gap penalty.

If the computation boundary is wider than the placing box, then a placement to the right is made, such as that shown in FIGS. 77 and 78. In addition, the right box may be placed at a lower corner than the current corner.

Figure 75:
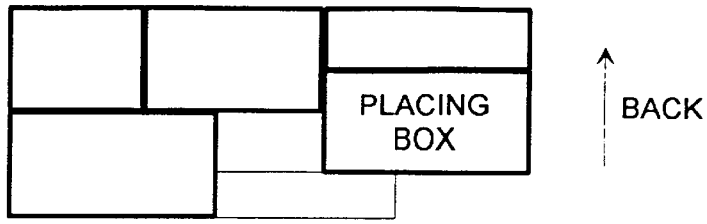
FIGS. 75, 76 illustrate stacks 750, 760, respectively, which illustrate the concept of a side front corner fit.
Figure 76:
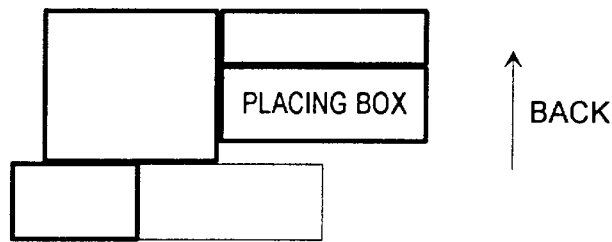

The placement at the front of the placing box will also be searched for. The front corner may have an offset to the left hand side of the placing box, as shown in FIGS. 75 and 76. In addition, the placement may be constrained by the tentative placement to the right of the placing box, as shown in FIGS. 77 and 78.

Area Fill Ratio is defined as the ratio between the total area of grouped packages to the area within the computation boundary mentioned before. A bonus to the Area Fill Ratio will encourage maximum package fitting in limited area.

Package Area is the total area of the package group. The Package Area Bonus is proportional to the ratio between the grouped package area and the average package area. Such a bonus is applied under the following situations: (a) a corner is near to a pallet boundary, and area bonus will encourage a tight fit to the boundary, (b) there exist gaps between the corner surface and the corner boundary, and big package area will encourage the coverage of those gaps, or (c) when starting a package on a new shelf.

Package Volume is the total volume of the package group. The Package Volume bonus is proportional to the ratio between the Package Group Volume and the average package volume. Under one embodiment of the invention, the Package Volume bonus is applied to the starting package of a new shelf. The height is as important as area in this case, since if a shelf is too low, then few packages can be put on the side without being above the current shelf. The Package Volume bonus will also be applied when a package is near to pallet ceiling. This will encourage the top of package to be as close to the ceiling as it can.

The Dimensional Coverage Ratio is divided into 2 indexes: Front Dimensional Coverage Ratio and Side Dimensional Coverage Ratio. The Front Dimensional Coverage Ratio is defined as the ratio between the maximum front to back dimensional span of a package group to that of the corner supporting surface. The Side Dimensional Coverage Ratio is defined as the ratio between the maximum side dimension span of a package group to that of the corner surface. The Side Dimensional Coverage is applied when a corner is close (less than the average package length) to a side boundary. The bonus to both dimension coverage ratio is to encourage the maximum dimensional filling to the boundary.

In the computation of a Dimensional Coverage Ratio, if along that dimension the placing package overhangs above a lower corner (See FIG. 80), then the overhanging portion will be penalized as a negative term.

In addition, if as shown in FIG. 79 along the front dimension the placing package overextends beyond all of its side neighbor's front edges which are higher or level with the placing package, and the free space in front of the side neighbors is useful, that overextended portion will also be penalized as a negative term. The negative term is computed as the ratio between the overextended length to the average package width.

Figure 73:
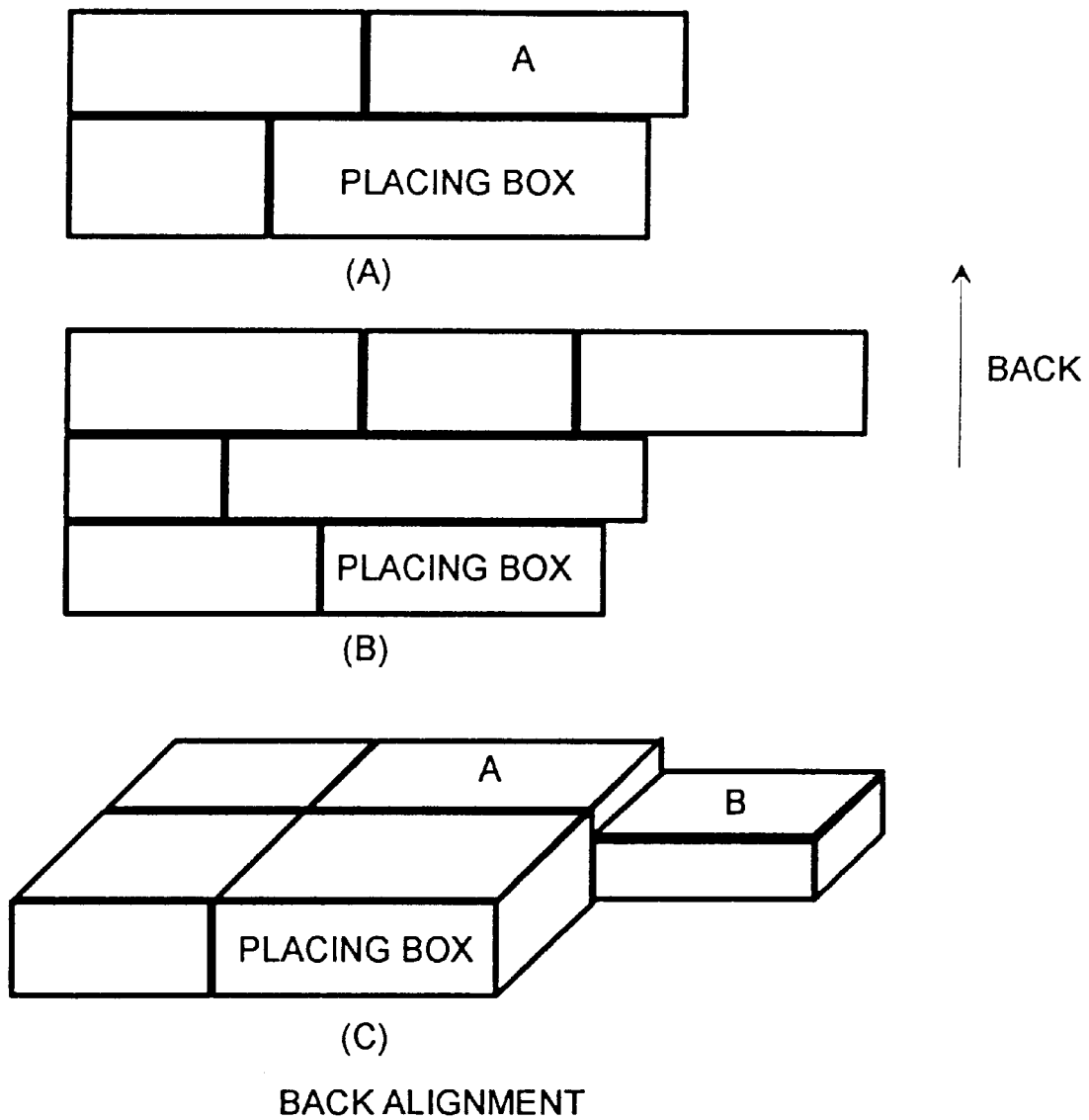
FIGS. 73A–73C illustrate the concepts of back alignment in stacks 730, 731, and 732, respectively.

An alignment factor is also used. With respect to the Alignment factor, it is desirable that a placing package can be aligned with its back neighbors and side neighbors. Back neighbor alignment is taken as an example. Referring now to FIG. 73, a placing package is considered as having alignment with back neighbors ("back alignment") if the right edge of the placing package is close to the right edge of a special back neighbor package. The special back neighbor package is the rightmost member of back neighbor packages which are close to the placing package, and are not lower than the height of the placing package. In FIG. 73(*a*), the placing box is "back aligned" with back neighbor Box A because their right edges are close enough (within a preset tolerance) to each other, and Box A is the rightmost back neighbor. In FIG. 73(*b*), the placing box is still considered as having back alignment with Box A; although Box A is no longer the rightmost box (it is now Box B), it is not the closer box although it is a neighbor. In instance 73(*c*), back alignment still exists because Box B, although close enough and a neighbor, is still lower than the placing box.

A bonus will be proportional to the number of alignments. It may be noted that there are a maximum of 3 alignment, rear, left, and right.

Figure 33:
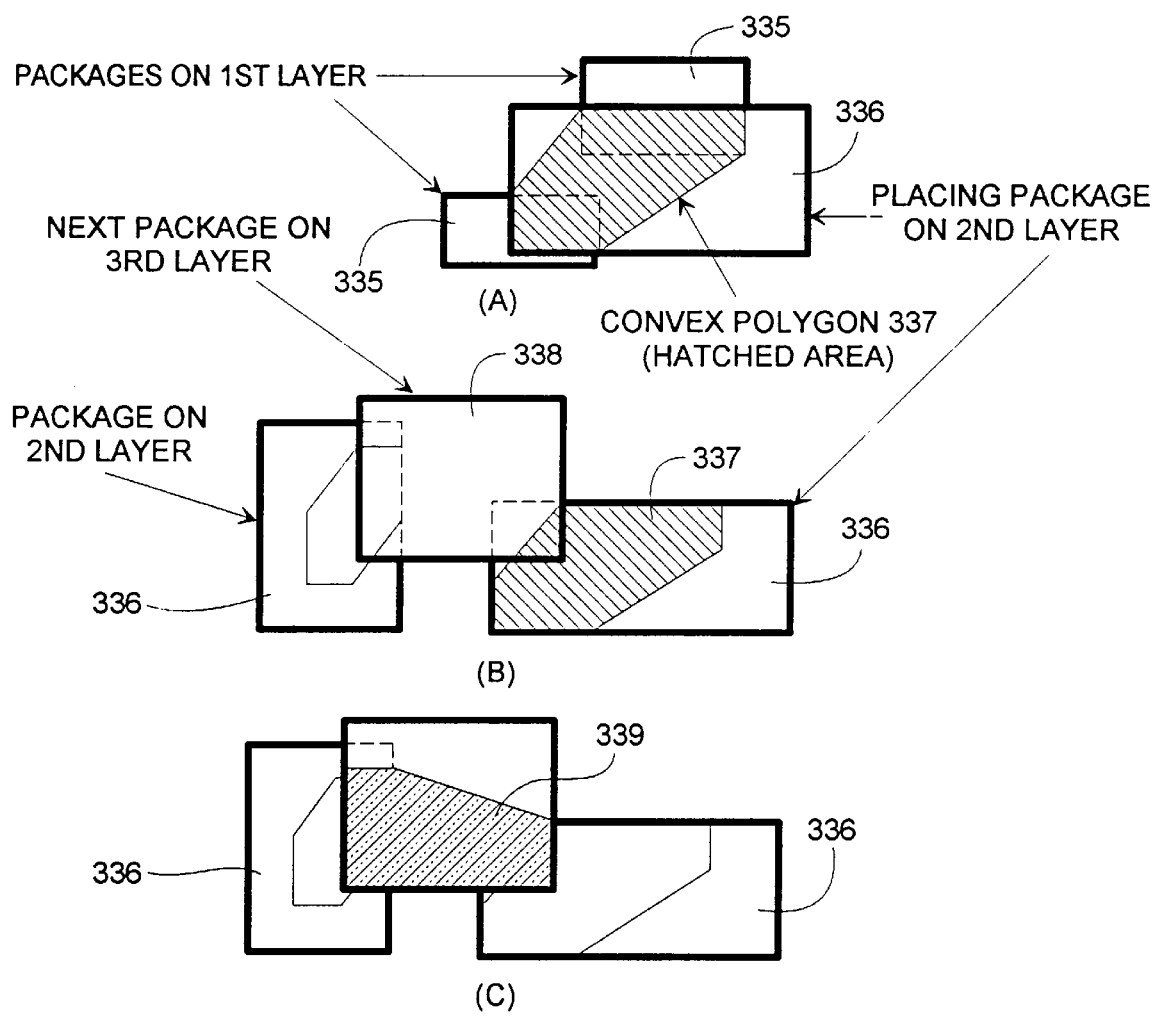
FIGS. 33A–33C are a series of top plan views of stacked packages illustrating effective package supporting surface characteristics through multiple layers of stacking.

Another factor used is Surface Bridging (see FIG. 33). A package can bridge front/back side or left/right side, or both. The bonus for bridging is proportional to the towering count of the bridged surfaces. Each surface has a tower count. The tower count is 0 when a surface bridges multiple underneath surfaces. If the surface is only supported by one surface, then the tower count will be increased by one from the tower count of the supporting surface. As tower grows, so does the tower count. The bridging bonus will be proportional to the tower count. The height the tower, the higher the bonus. This is because the bridging becomes more important as the tower height increases.

Blocked Area and Blocked Volume are also used as considerations. A placing package can block some useful area and volume of useful underneath corners. The computation of Blocked Area and Blocked Volume satisfy superposition rule. As shown in FIG. 78, a placing package can not only block a corner underneath, it at the same time can render the remaining area or volume on the side useless. Such area and volume can occur on the back, left, right or front.

A placing package usually will block some area or volume. The bigger the package surface, the more area or volume it will probably block. Taking that into consideration, a discount on the blocked area and blocked volume is given to the placing package. The discount is proportional to the area and volume of the placing package itself. The proportional factor is chosen as an eighth of those of the placing package.

The penalty is not directly applied to the blocked area or blocked volume themselves. The blocked area (volume) will be divided by the average area (volume), and a penalty will be based on the resulting ratio.

Gaps with neighbor packages are also considered. There can be two types of gaps. One gap is measured from a package to a corner boundary. This is called a corner gap, and can be due to the shifting or flushing of packages as described above. The other gap is measured between the placing package and the neighbor packages, as shown in FIG. 79. This is called a top gap. The future package to be placed on top will be affected by the top gap. The top gap is partially due to placing package height. If there is a choice, it is desired that both kinds of gaps to the side and to the back be small. Hence, a penalty will tend to be applied proportionally to the ratio of such gap to the average package width.

Package Age in the package buffer is also a factor. After each package placement, a package still staying in the buffer will increase its age count by one. A small bonus is also applied proportional to the age count of each package. The package staying in buffer for a long time usually is of odd shape (very large or very big). If for certain placement, an odd shaped package and a regular shaped package both are good candidates, then the odd shaped package should be selected first, since it will free a space in the buffer, and a more useful package can be added in.

If as under one embodiment of the present invention the package buffer mechanism allows for package rejection, then a package age threshold can be selected to screen out old packages for rejection. It may be understood that old aged packages will be near to the end of the accumulator.

Potential Field is another factor. A penalty is applied which is proportional to the distance of the corner surface to the pallet floor, the distance to back boundary, and the distance to left boundary. Such a penalty exerts a pulling force towards pallet inner origin. Along the vertical dimension, the heavy penalty will encourage a placement at a lower corner. Along horizontal dimensions, the penalty is arranged such that a placement is encouraged to be placed from inside to outside, and to fill a short dimension first before filing a longer dimension. Such a potential field penalty will help pull package placement into a tightly fit stack.

Package Weight is another consideration. To reach a stable stack, it is desirable that heavier packages be placed near bottom, and light packages be placed near top. Based on package weight distribution statistics, a weight threshold can be selected somewhere above average package weight, such as 30 pounds. A height threshold is set to the half of the pallet height, such as 2 feet for a 4 feet high pallet. When a package weight is above the weight threshold, if the package bottom is below the height threshold, a bonus will be given, otherwise a penalty will be given. The bonus or penalty is proportional to the package weight, and is proportional to the distance between the package bottom and the height threshold. For a high pallet, excessively heavy packages should be prevented from being placed near the top.

Ceiling Distance is another factor which may be considered. When a package is close to the pallet ceiling, and there is no package can be placed on the top of the placing package, a penalty will be applied based on the distance between the package top surface to the pallet ceiling. The penalty is to encourage a placement which minimizes such wasteful void.

In summary, referring now back to FIG. 46, the approximately sixteen factors shown in this figure can be used to arrive at the Performance Index as discussed below.

5) Performance Index Summation

As previously discussed, once a package placement is determined to be stable, its relative merit is assessed by the Performance Index, computed as shown in FIG. 46. As shown, the Performance Index is a weighted sum of the previously described factors. The detailed weighing factors are as shown in FIG. 47, where a positive value represents a bonus, and negative value represents a penalty.

Each potential placement has a performance index computed, and the actual placement is the one with the maximum index. Under one embodiment of the present invention, typical values of Performance Index are in the range of −4000 to +1600.

6) Parameters

Figure 84:
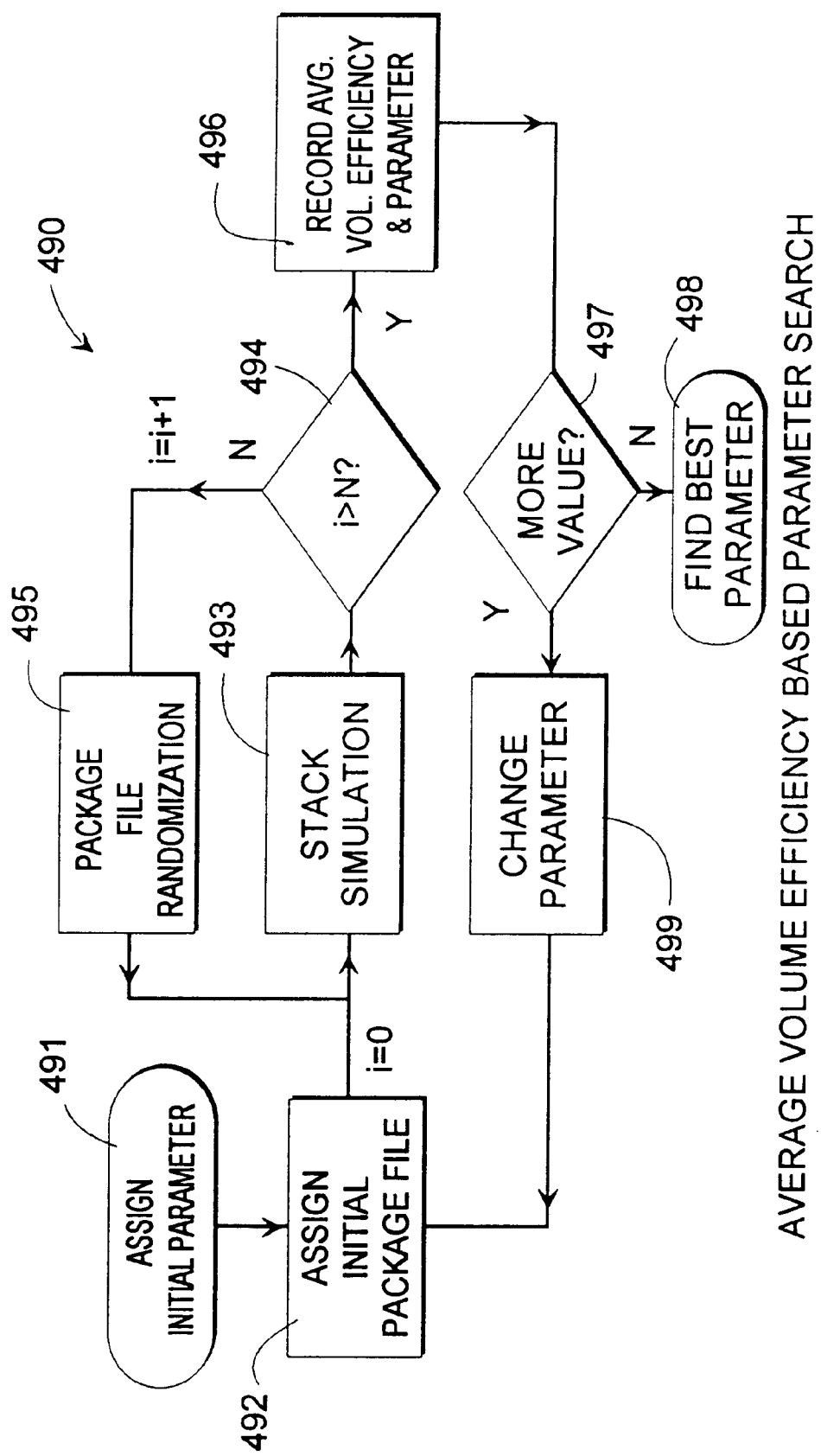
FIG. 84 is a flow chart 490 illustrating an average volume efficiency based parameter search according to the present invention.
Figure 85:
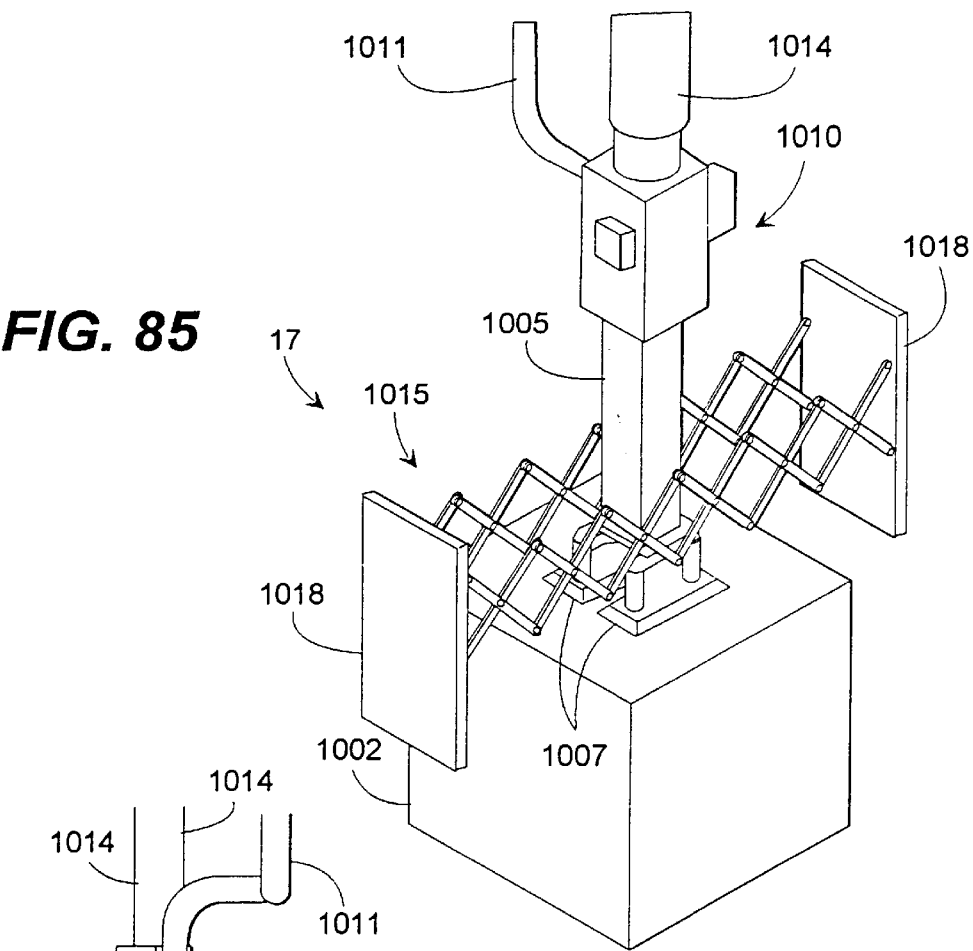
FIG. 85 shows a pictorial view of a gripping apparatus 1000 embodying the present invention.
Figure 86:
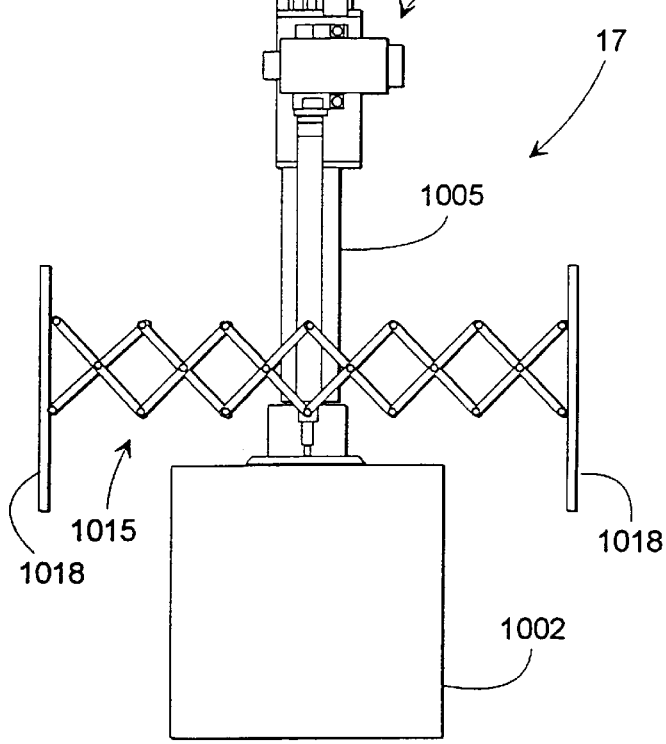
FIG. 86 is a side view of the gripping apparatus of FIG. 85.

The stacking decision making involves many parameters, such as those values in stacking rules, or weighing factors in performance index computation. The invented method uses computer simulation to tune each parameter separately. Each parameter goes through a search loop as shown in FIG. 84.

Under this search loop process, an initial value of the parameter is first assigned. In addition, a file containing a set of package data corresponding to a "test group" of exemplary packages is provided based on selected historical sequence of package data. For the given parameter, N (N can be chosen as 200) number of random-order computer stack simulations will be conducted. The corresponding average volume efficiency will be recorded along with the parameter value. The parameter then can be varied within a pre-selected range, and the package file will re-initialized. Another N times computer simulations will be conducted for the new value of the parameter. Eventually there is obtained a relation between a set of average stack volume efficiencies versus a set of parameter values. A typical parameter search chart is shown in FIG. 84. The best parameter is selected as the one which yields maximum average volume efficiency.

E) Execution of Multi-Loop Decision Process

This is the overall process which actually conducts the search through all placements and finds the best solution.

As described above, each package in the buffer, and selected allowable orientations of each package will be given an opportunity to visit each corner in the stack. At a given corner, possible shifting and boundary flushing is then attempted to see if the package can have a stable placement at the corner. A stable placement will be compared with a previously recorded placement. If the current placement is better than the recorded placement, the current placement will be recorded instead. At the end of search loop, the recorded placement will be selected as the best placement.

1) Loop Nesting Variation

Figure 26:
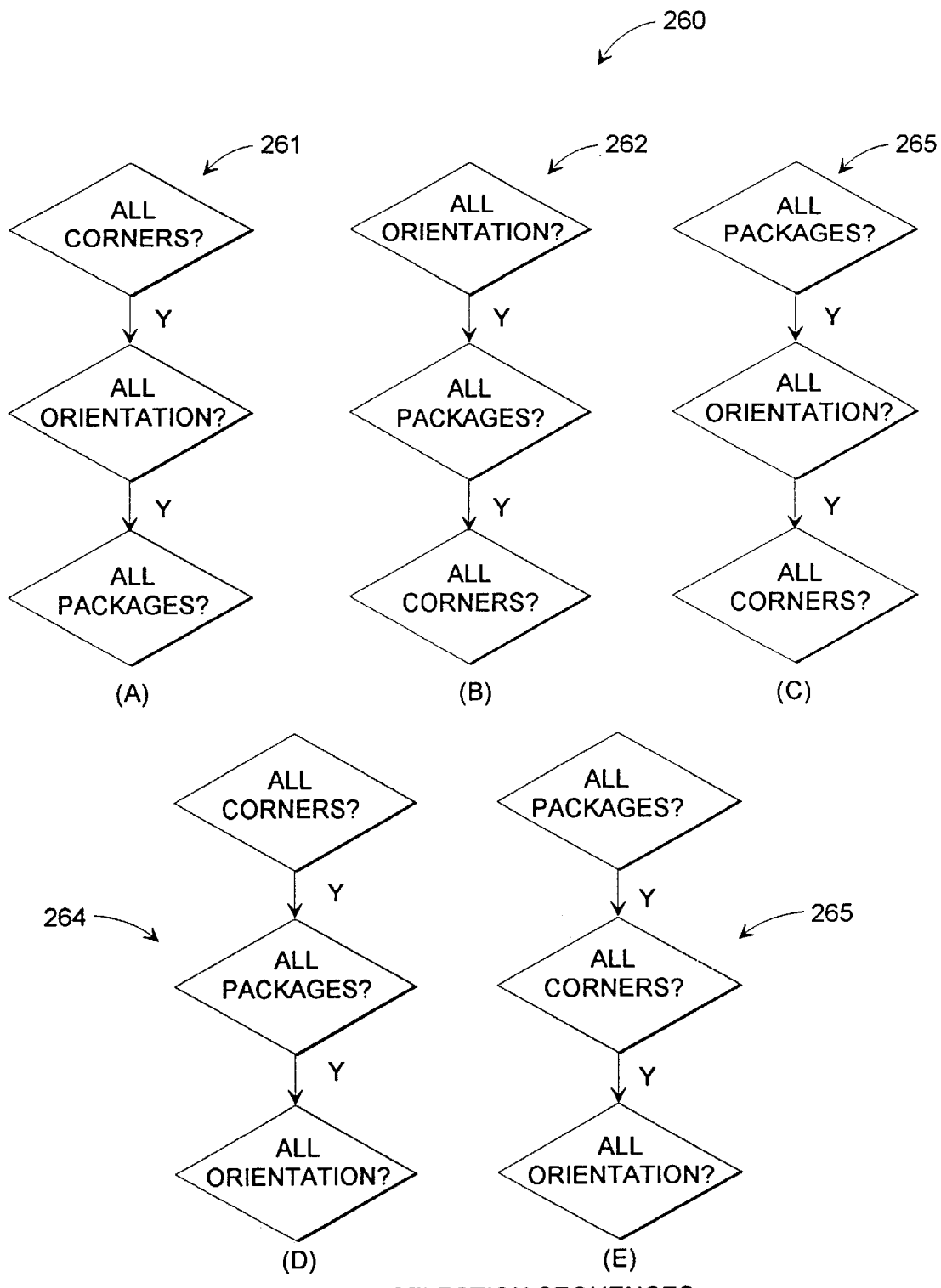
FIGS. 26A–26E illustrates flow diagrams of alternative selection sequences.
Figure 27:
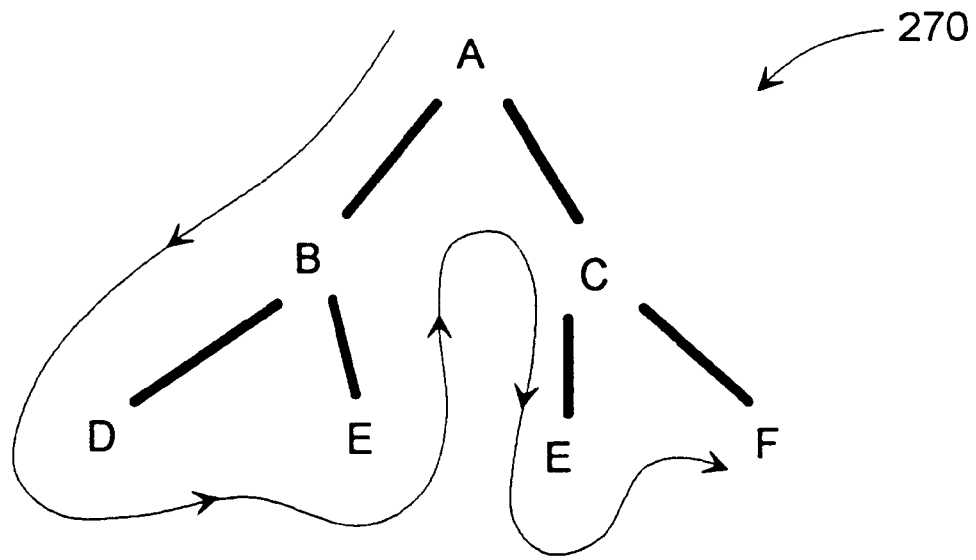
FIG. 27 illustrates a box supporting relationship tree 270.
Figure 28:
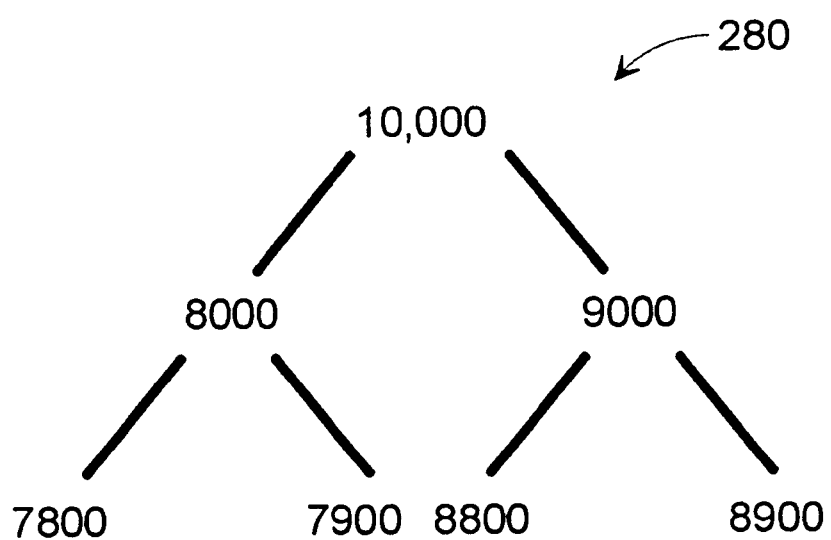
FIG. 28 illustrates values 280 placed within the relationship tree.

The selection sequence among allowable orientations, corners, and packages in FIG. 3 can be altered as shown in FIGS. 26A–26E. In FIG. 26A, the search inner loop is on corners, mid-loop is on orientations, and outer loop is on packages. In FIG. 26B, the loops are orientations, packages, and corners, respectively. In FIG. 26C, the 3 loops are packages, orientations, and corners, respectively. In FIG. 26D, the 3 loops are corners, packages and orientations, respectively. In FIG. 26E, the 3 loops are packages, corners, orientations, respectively.

2) Short Cuts

In the search, the allowable orientations are arranged such that the orientations with the shortest height dimensions will come first, and those with the longest height dimension will come last. Similarly, in the corners arrangement, the corners with the lowest surface height will come first, and those with the highest surface height will come last. Since a package tends to be more stable when its shorter dimension is positioned as its height, and it is at a lower corner, the search loop can be terminated whenever a satisfactory placement is found, such as a box which is level to its side neighbors.

In addition, when conducting package shift, the further the shift, the wider the boundary gap will be, hence the placement quality tends to deteriorate. Therefore, during one round of the placement search, whenever a satisfactory placement is found, the following searches do not need to go through further shifts.

2) Picking of Package with Gripper

As previously discussed, in reference to FIG. 1, under the present invention, a gripper 17 is used in order to grip and move packages such as P. This gripper may be such as known in the art or may be as described in this subsection which references FIGS. 85–92.

Figure 87:
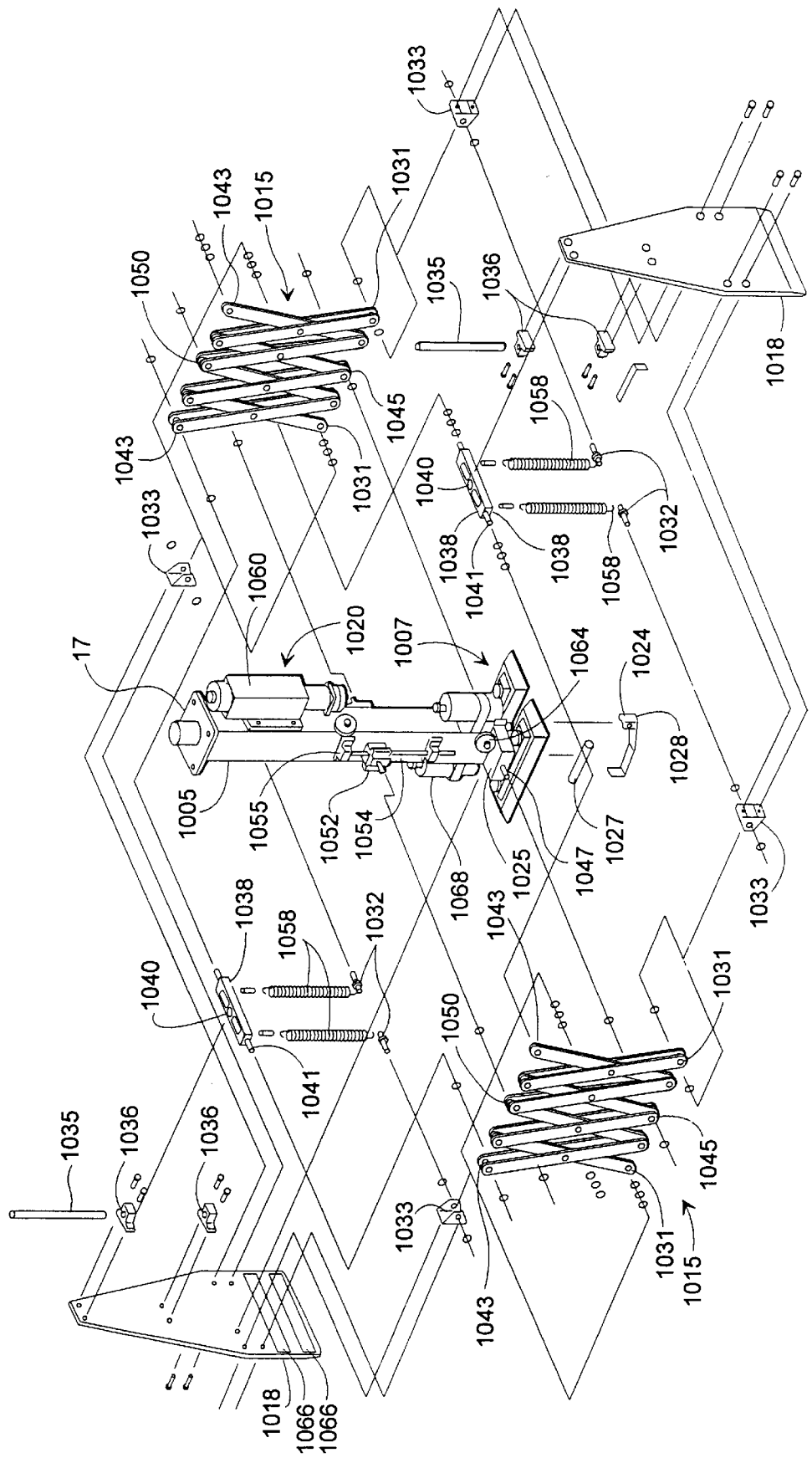
FIG. 87 is an exploded view of the gripping apparatus of FIG. 85.

The gripper 17 shown in FIGS. 85–92 includes, generally, a hollow mounting post 1005 to the bottom of which is attached a pair of suction pads 1007. Attached to the top of the post is a suction valve assembly 1010. A vacuum line 1011 extends from the valve 1010 to a vacuum pump (not shown). Another vacuum line (not shown) connects the valve 1010 to the suction pads 1007 through the hollow interior of the post 1005. The valve assembly 1010 is mounted on the end of a gantry arm 1014. A pair of scissors actuators 1015 are operatively mounted to the post 1005 to extend on opposite sides of the post, and one of a pair of side clamps 1018 is attached to each end of the scissors actuators 1015. Referring to FIG. 87, the post 1005 also supports a winch assembly 1020 for operating the scissors actuators 1015. These subassemblies and parts will now be described in more detail.

FIG. 87 shows in more detail the components carried by the support post 1005, with the elements exploded apart to show further detail. The suction pads 1007 are spaced apart and mounted on a cross bar 1025 attached to the bottom of the post 1005. Each suction pad includes a rectangular rubber skirt on a steel foot defining an opening covered by a screen (not shown) to prevent dirt from entering the vacuum system. In the space between the two suction pads 1007, a contact sensor 1027 or microswitch is positioned on the cross bar 1025. Also attached pivotally to the cross bar is an actuator arm 1028 which swings up to activate the contact sensor 1027 when the arm 1028 is raised by striking a parcel during downward movement of the gantry arm 1014. The sensor 1027 and arm 1028 extend below the level of the suction pads 1007. Furthermore, a set screw 1029 allows the position of the arm 1028 to be adjusted so that the distance between the suction pads and the contacted surface at which the contact sensor 1027 is activated can be set to a predetermined distance, such as one-half inch.

As shown in FIG. 87, each lower end 1031 of each scissors actuator 1015 is pivotally connected by a hinge pin 1032 to an end bracket 1033 which is attached to one of the side clamps 1018. Higher on the side clamps a ground shaft 1035 is mounted vertically and spaced from the clamp by a pair of shaft mounts 1036 at the ends of the shaft 1035. A transversely extending end bar 1038 includes a linear bearing 1040 through the center thereof, the bearing being fitted onto the shaft 1035 to allow vertical movement of the bar 1038 along the shaft 1035. At each end of the two end bars 1038, a hinge pin 1041 extends laterally and receives an upper end 1043 of each scissors actuator 1015. A lower center joint 1045 of each scissor actuator is pivotally mounted on a hinge pin 1047 extending from each end of the cross bar 1025. An upper center joint 1050 is pivotally attached to a pillow block 1052 slidably mounted on a vertical ground shaft 1054 that is attached to the post 1005 by shaft mounting blocks 1055 at each of its ends. Thus, it will be seen that the upper portions of the scissors actuators 1015 are slidably movable up and down along the post 1005 and the side clamps 1018, and the inward and outward movement of the scissors actuators is synchronized about the center, which is attached to the post.

Tension springs 1058 are stretched between each lower hinge pin 1032 and the end bars 1038. These springs force the scissors actuators to an extended position, that is, a release position of the side clamps 1018. The side clamps are brought toward one another to engage a parcel by the winch assembly 1020. A servo motor 1060 of the type including a built-in encoder and a brake is mounted on the side of the post 1005. To the extending drive shaft of the motor 1060 a reel 1062 is attached. A cable 1065 wound on the reel passes over a pulley 1063 and a pulley 1064 and is attached to one of the side clamps 1018. As the motor 1060 rotates the reel 1062 to draw in the cable 1065, the force on the side clamp collapses the scissors actuators 1015 against the force of the springs 1058 until the clamps 1018 engage the sides of the parcel. The interior surfaces of the clamps bear abrasive strips 1066 to provide high friction between the clamps and the sides of the parcel.

Figure 88:
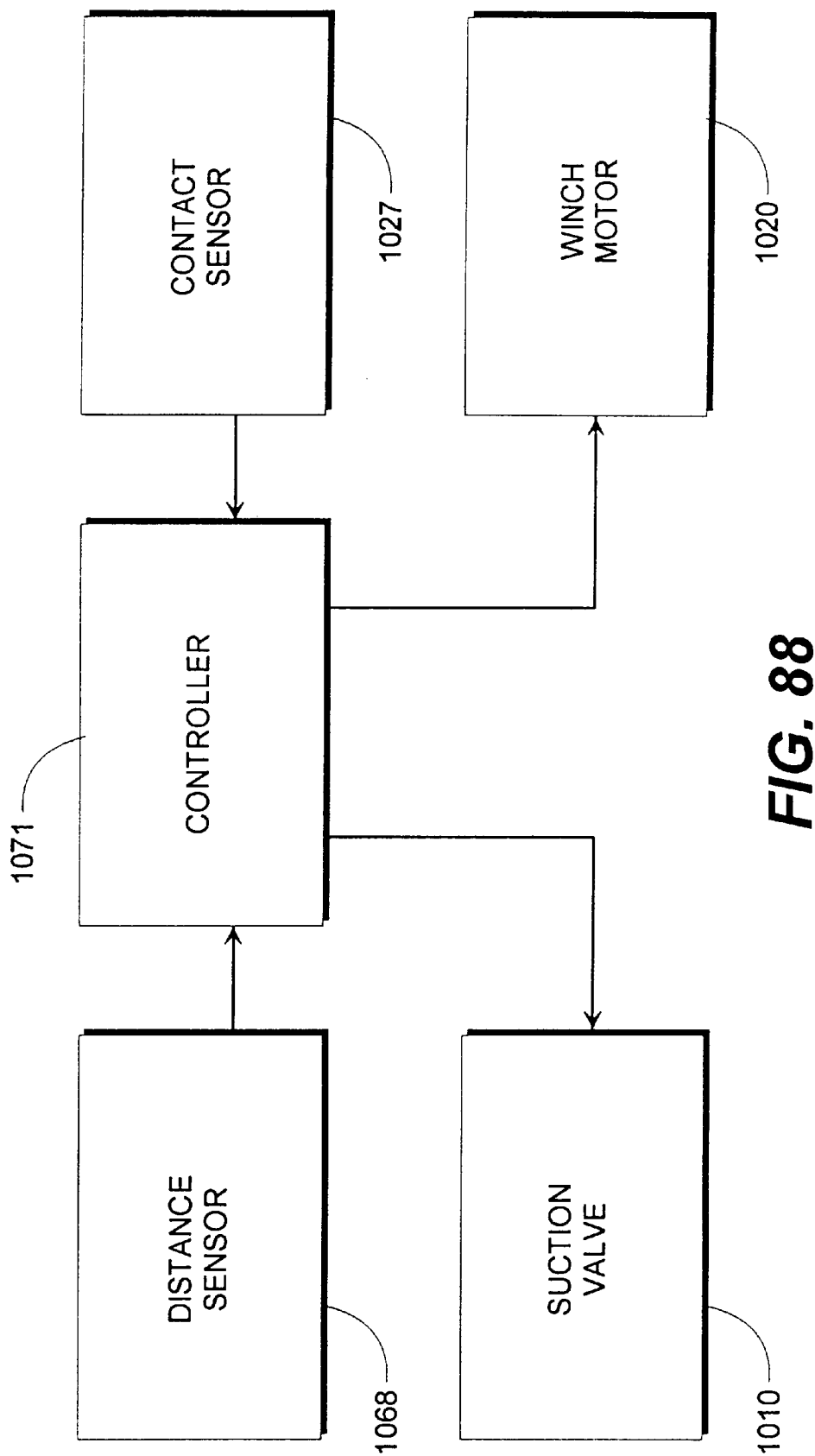
FIG. 88 is a block diagram of a control system for operating the gripping apparatus of FIG. 85.

The gripper mechanism 17 is controlled by a control circuit 1070 shown in FIG. 88. A controller 1071 may be a separate processor, but preferably is the same computer described above in reference to FIG. 1. The controller receives input signals from the contact sensor 1027 and the distance sensors 1068. In response to these signals, the controller sends control signals to the vacuum suction valve 1010 and to the reversible winch motor 1020. When the suction is turned on, the suction pads 1007 grasp a closely adjacent surface. When the winch motor rotated, the cable 1065 is either let out (opening the side clamps 1018) or reeled in (closing the side clamps) depending on the direction of rotation.

Figure 89:
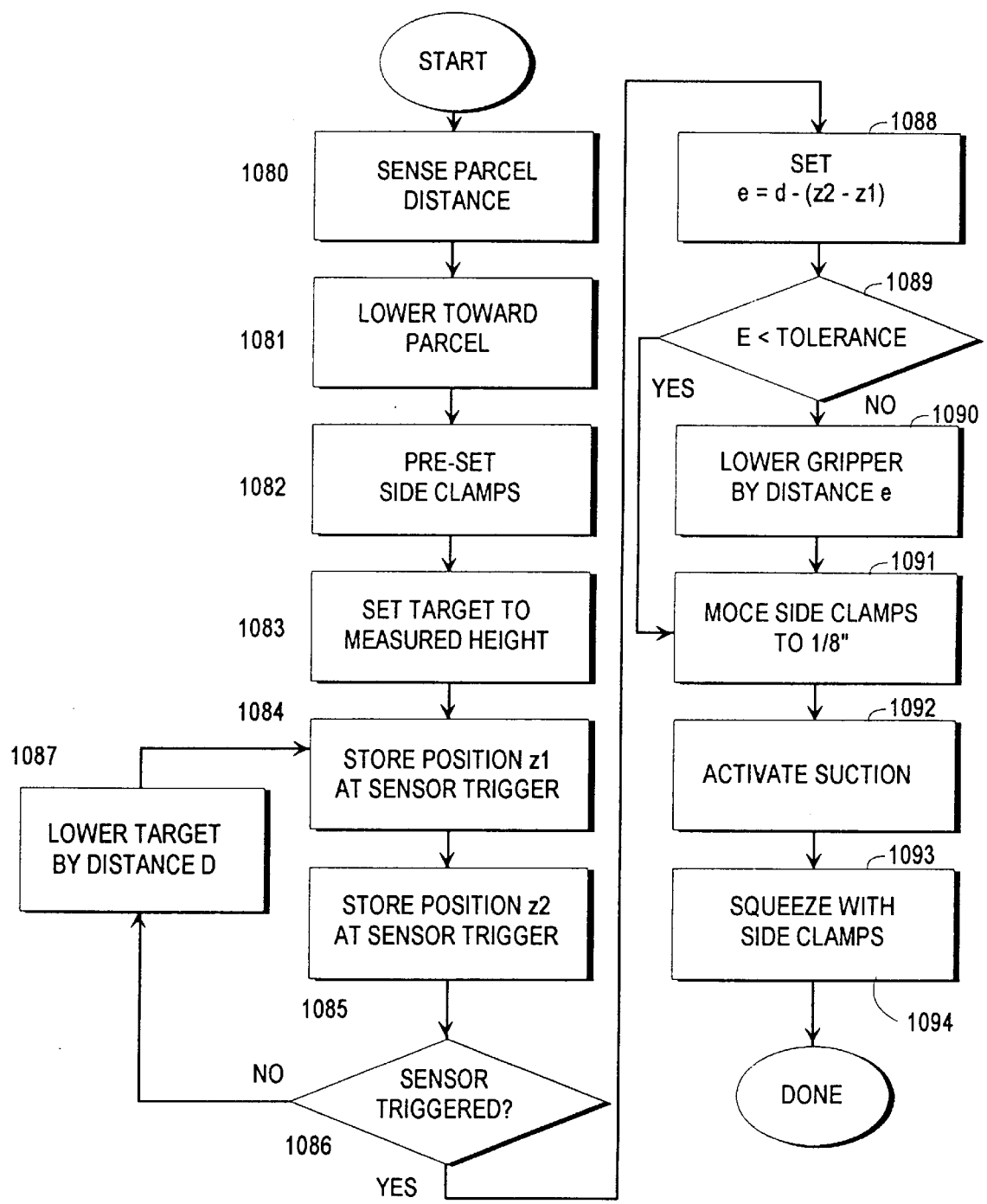
FIG. 89 is flow diagram illustrating the process of positioning the gripping apparatus adjacent to the parcel.
Figure 90:
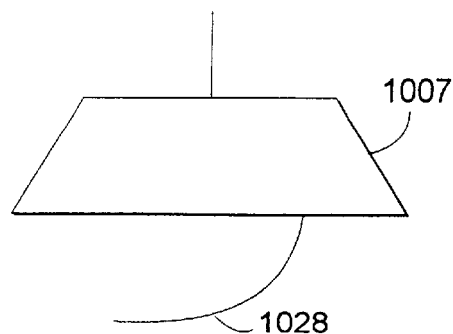
FIG. 90 is an isolated view of element 1007.

The controller brings the gripper into close proximity with the upper surface of the parcel according to a series of steps that are charted in FIG. 89. Initially, the gripper is vertically over the parcel, and the distance to the upper surface is monitored at block 1080, while the gantry arm 1014 moves the gripper toward the parcel at block 1081. During this movement, at block 1082 the side clamps 1018 are positioned to a spacing of about 1.5 inches wider than the parcel, the dimensions of which have been determined. In particular, the nominal height of the parcel, as measured by the dimensioning arch 14 described above, is set as a target position in the gantry arm's frame of reference at block 1083. However, this height represents the peak point of the upper surface, and may not be the height of the portion to be engaged by the suction pads 1007. For example, the measured height may be at an edge of the parcel, while the center portion of the upper surface may have sagged a significant amount. It is rare for an upper surface to have sunk more than one-half inch.

Figure 91A:
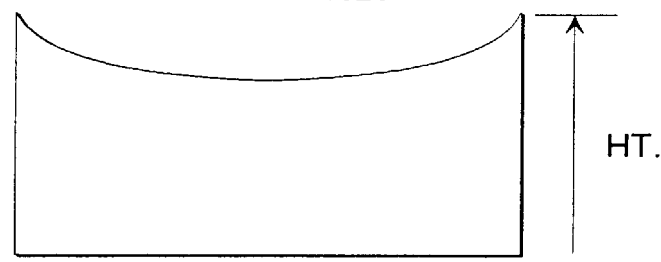
FIGS. 91A–D show diagrammatically the final approach of the gripper to a parcel.
Figure 91B:
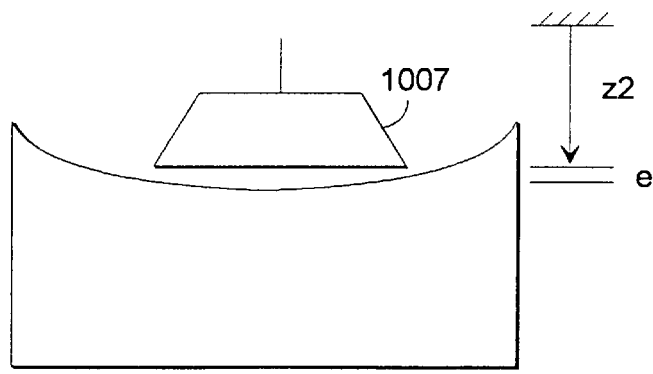
Figure 91C:
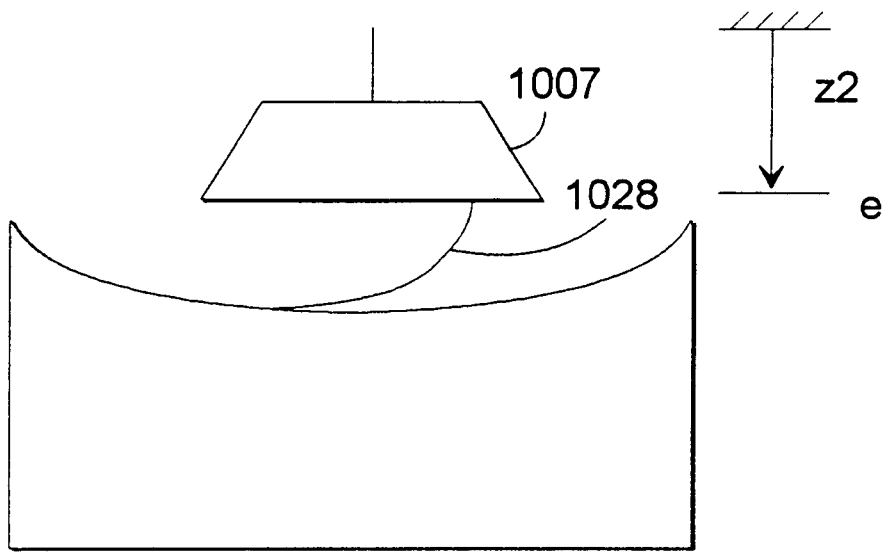

As described above, the contact sensor is set to activate at a predetermined distance from the upper surface of said parcel, preferably one-half inch. The position of this sensor approaching the parcel is shown diagrammatically in FIG. 91A. When the contact signal is received by the controller, at block 1084 the position z1 of the suction pads 1007 in the frame of reference is stored. The position of the gripper when the sensor is triggered is shown in FIG. 91B. The controller continues to lower the gripper until the suction pads reach the target position z2 (measured height of the parcel), which is stored at block 1085. However, if at block 1086 it is determined that the contact sensor 1027 has not been triggered by the time the target position z2 is reached, at block 1087 the controller lowers the target by an additional distance d equal to the predetermined distance (preferably one-half inch), and returns to block 1084. The controller continues to lower the gripper until the contact sensor is triggered. FIG. 91C shows the suction pads 1007 at the target position z2.

When the contact sensor 1027 has been triggered at position z2, the controller calculates at block 1088 the actual gap e between the suction pads and the upper surface of the parcel:

$$e = d - (z2 - z1)$$

Figure 91D:
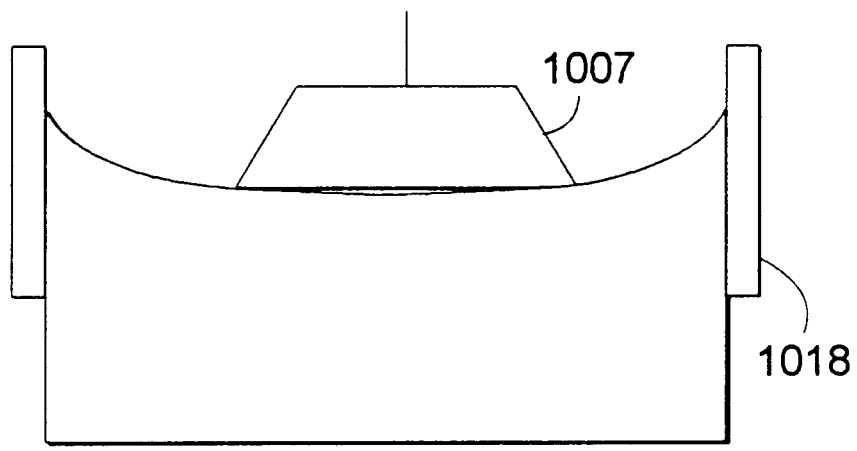

At block 1089, e is compared to a predetermined tolerance, preferably one-eighth inch. If e is not less than the tolerance, the gripper is lowered a final increment of distance equal to e. Then at block 1091, the side clamps 1018 are moved in to a position leaving only about one-eighth inch clearance on each side of the parcel. If e is less than the tolerance at block 1089, the process goes directly to block 1091. The final position of the suction pads 1007 is shown in FIG. 91D. Then at block 1092 the controller operates the vacuum valve 1010 to grasp the parcel by suction, and immediately thereafter at block 1093 the side clamps 1018 are drawn closer to one another by a predetermined distance (preferably about three-quarters of an inch) to apply gripping pressure on the sides of the parcel. Alternatively, the winch motor 1020 may be configured to apply a constant torque so as to cause the clamps to apply an approximately constant force to the parcel, proportional to the parcel weight.

Those skilled in the art will understand that the steps shown in FIG. 89 may be accomplished very quickly and, in some cases, at the same time. For example, inward movement of the side clamps 1018 may occur as the gripper is being lowered. Also, the gantry arm 1014 may begin to lift the parcel as the clamps are moving in to apply pressure.

After the parcel has been placed by the gantry arm, as described elsewhere in this application, the winch motor 1020 is operated to extend the cable 1065 enough to allow the springs 1058 to open the clamps 1018 only about one-eighth inch on each side beyond the measure parcel dimension. This avoids pushing over neighboring stacked parcels on the pallet. Again, the parcel release motion and the gantry arm's lift motion occur at the same time to eliminate delay.

The contact sensor 1027 also functions to monitor the presence of the parcel during transfer by the gantry arm 1014. If for any reason the parcel is dropped, the input signal from the sensor will cease. The absence of the signal will be noted by the controller and the gantry arm will be guided to a stop.

The gripper mechanism 1000 is preferably designed to have a very small foot print, such as seven by seven inches when the scissors actuator 1015 is fully retracted. The gripper can be used for side stacking as well as top stacking. It will be seen from the foregoing that the gripper can lift parcels of a variety of sizes. For a parcel shipping operation, the suction force and side clamps may be designed to handle parcels up to or beyond 32 by 32 inches and 150 pounds. The upper surface of the parcels need not be planar or smooth so long as the suction pads can seal sufficiently to grip the parcel.

Figure 92:
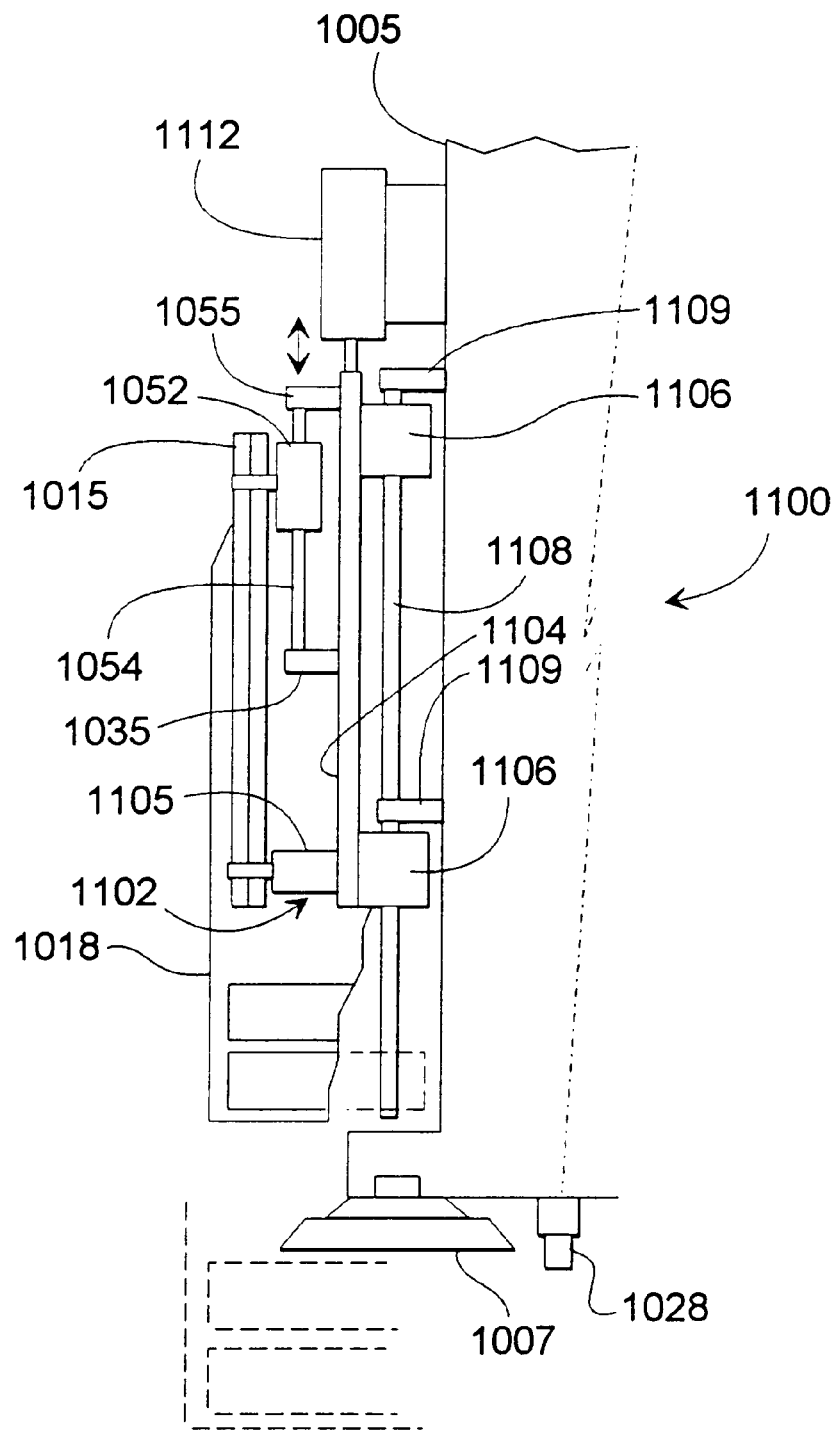
FIG. 92 is an end view of a modified gripping apparatus 1100 in which the side clamp mechanism may be selectively moved above parcel level when not needed.

A modified gripper mechanism 1100 is shown in FIG. 92. The principal difference from the embodiment described above is the inclusion of a slide mechanism 1102 which allows the side clamps 1018 to be retracted above the suction pads 1007 when the suction pads can lift a parcel safely without the assistance of the clamps. The advantage of this feature is that the side clamps will not interfere with adjacent parcels in the stack of parcels. In the embodiment shown in FIG. 87, the upper central joint 1050 of the scissors actuator 1015 is still pivotally mounted on the pillow block 1052, but the shaft mounts 1055 which hold the ground shaft 1054 are attached to the upper portion of a carriage 1104 rather than to the post 1005. At the lower end of the carriage 1104, a hinge pin 1105 is mounted for receiving the lower central joint 1045 of the scissors actuator 1015. Thus, the expansion and contraction of the scissors actuator along the vertical axis takes place relative to the carriage 1104.

The carriage 1104 also includes a pair of bearings 1106 which extend toward the post 1005. These bearings fit on a vertical ground shaft 1108 which is attached to the post 1005 by a pair of shaft mounts 1109. A solenoid actuator 1112 is mounted to the post 1005 above the carriage 1104, with its piston rod attached to the top of the carriage. When the solenoid rod is extended, the carriage 1104 moves downwardly along the shaft 1108, moving the side clamps 1018 into position (shown in dashed lines) to grasp a parcel. When the solenoid rod is retracted, the clamps are lifted to the position shown in FIG. 92, clear of the zone of activity of the suction pads 1007. Those skilled in the art will note that the solenoid actuator could be replaced with a pneumatic or hydraulic actuator.

Now referencing FIGS. 93–96, a feature according to the present invention is disclosed which allows for error compensations during the "pick" step of the gripper. This feature allows for the identification of the "center position" of the package.

Figure 93:
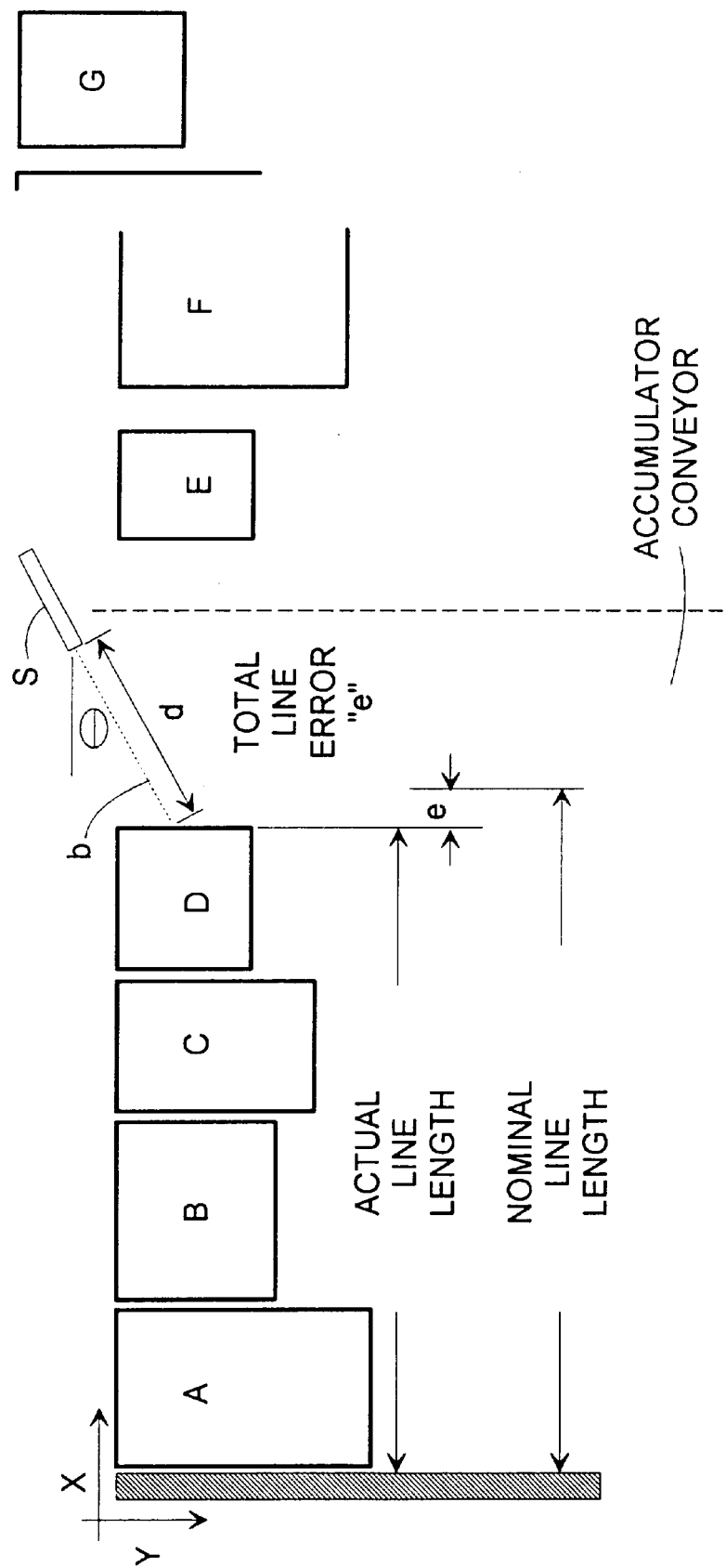
FIGS. 93–96 are packages A–G being accumulate on an accumulate conveyor.

As shown in FIG. 93, packages "A", "B", "C", and "D" are in line contact on an accumulator conveyor beginning at an origin point O. The last package on the conveyor is in the path of a distance sensor S, which is at an angle $\Theta$ from axis x, which is the axis of travel of the conveyor and the axis along which all distances are hereinafter measured from the origin O. By sensing the distance "d" of the package D from the sensor "S" and calculating the cosine of $\Theta$, the "x" component of the distance "d" can be determined. Such knowledge combined with the known dimensions of the accumulator conveyor (namely, the distance from the origin to the sensor S) allow the calculation of the Actual Line Length of the packages on the accumulator conveyor. Knowledge of the nominal lengths of individual packages as measured by the upstream dimensioning conveyor, allows the calculation of the Nominal Line Length of the packages A, B, C, and D. The difference between these two values is the Total Line Error "e". As may be understood, such an error, if not accounted for, can cause later problems in the stacking process.

This error is compared to thresholds, such as +1.2 inches and −1.5 inches, and if the error exceeds either of these thresholds it is assigned the value of the threshold crossed.

Figure 94:
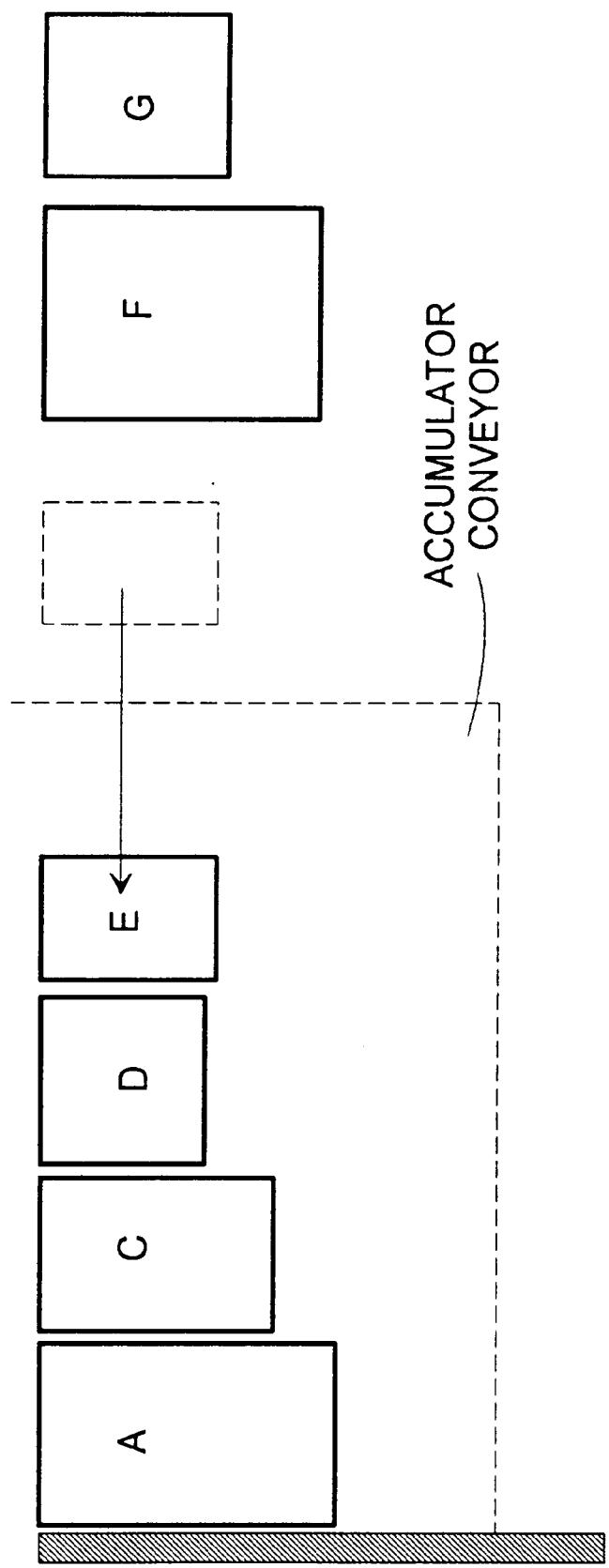
Figure 95:
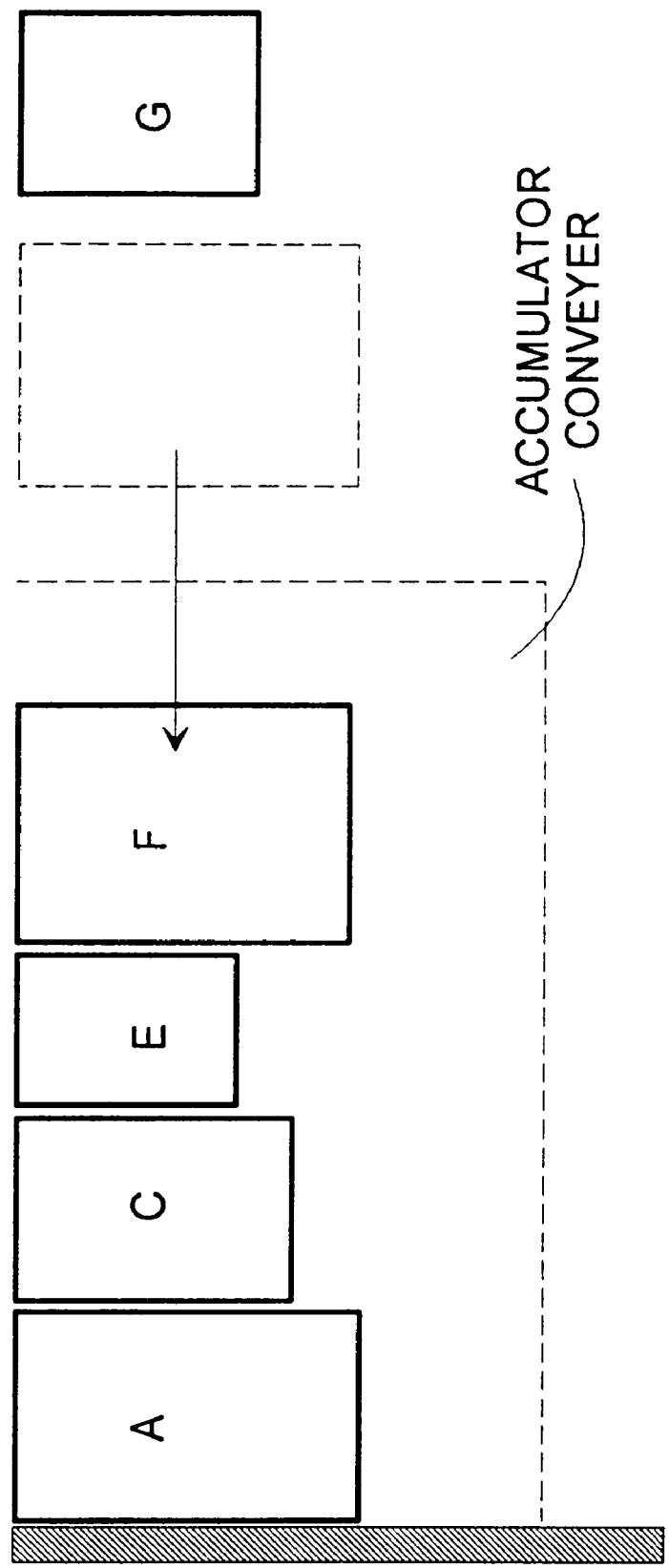

At this point, the system is prepared for the withdrawal of another package, and is therefore at the beginning of its cycle. As shown in FIG. 94, a package such as "B" can then be withdrawn from the line, and another package "E" placed into line contact with the other packages. The error "e" is then recalculated, and another package is withdrawn (e.g., package "D") and replaced with a package such as F to arrive at the configuration shown in FIG. 95.

As previously discussed, after each error "e" is calculated, the gripper then removes a package from the group of accumulated packages on the accumulator conveyor. It is desired to know as accurately as possible the center (at least in the "x" direction) of the packages for consistent downstream placement of the gripped packages. For this reason the error "e" is proportioned out to individual packages in the lines as shown in FIG. 96, where:

e=total error
i=package number (6 in FIG. 96)
N=total # of packages (7 in FIG. 96)
q=individual package error estimate $$q=(i-1)/(N-1)\ e$$

As may be understood, the above calculation basically proportionately "parcels out" the total error "e" to packages intermediate the first and last packages in the line. The individual package error q is subtracted from the Normal Distance to the center of package F to provide the x coordinate to be used by the gripper.

Figure 96:
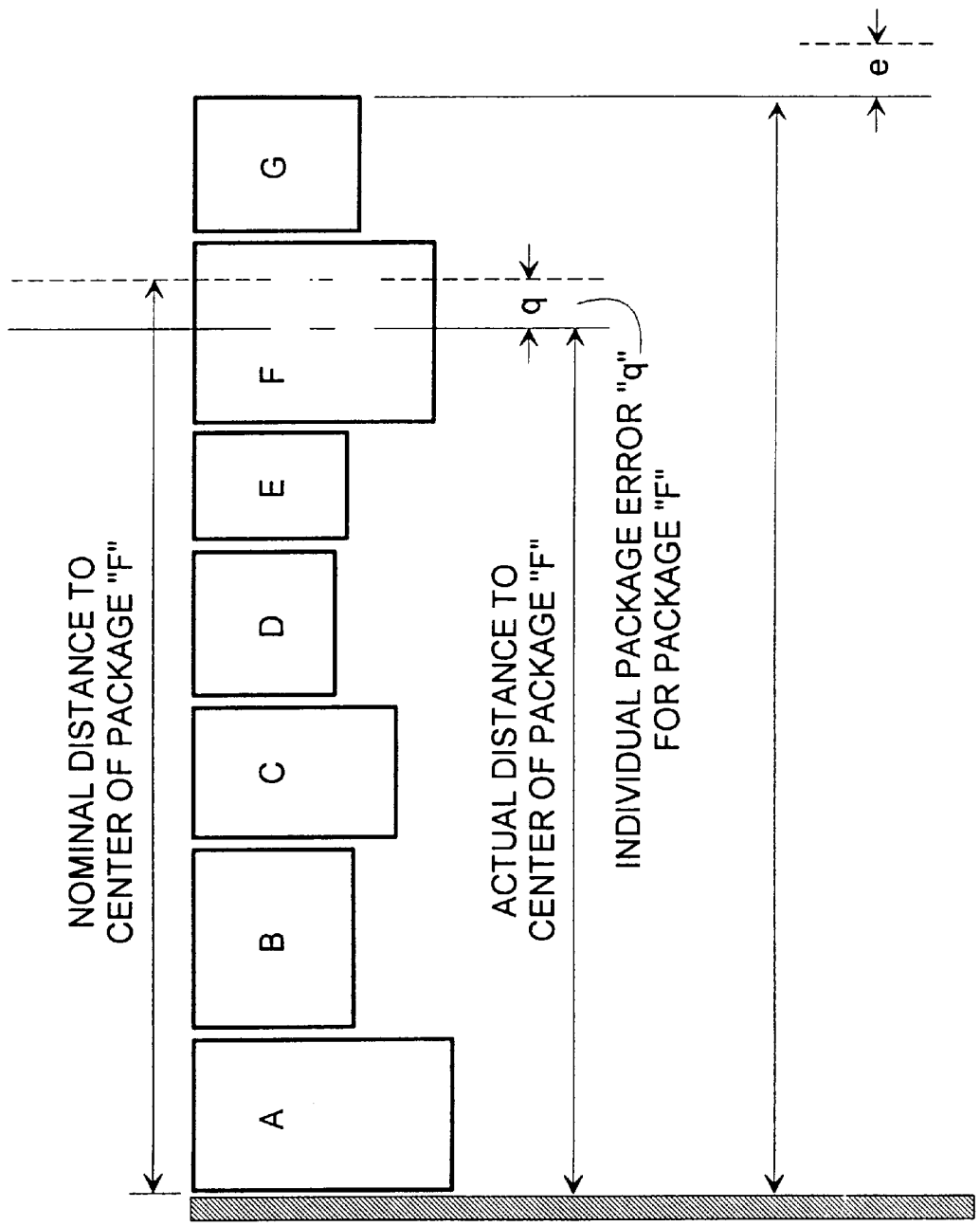

As an example, assume that as in FIG. 96, there are seven packages on the accumulator conveyor, and the sixth package has been selected for removal by a gripper. Assume that the total error e is 5 inches. Therefore the above-referenced calculation will be made as follows:

$$q=(i-1)e/N-1=(6-1)(5\ \text{inches})/(7-1)=4.17\ \text{inches}$$

Another feature of the invention is the use of a "weighting" system to calculate the error "e" shown in FIG. 93. As discussed with respect to FIGS. 93–95, a total error "e" is calculated during each operational cycle. In the case of steady-state operation, three consecutive previous errors can be used to calculate a "weighted" error e'. This e' is calculated by the following formula:

$$e'=0.2(e[t-2])+0.3(e[t-1])+0.5(e[t])$$

where e[t]=error for current cycle error e[t−1]=error for previous cycle e[t−2]=error for cycle before previous cycle As may be seen, this formula assigns more weight to the most recent error, but at the same time provides some, albeit less, weight to previous errors.

For the very first removing operation immediately after start-up, the errors e[t−2] and e[t−1] will not be available, and therefore in this case the error value e will not be weighted. For the second removing operation immediately after start-up the error e[t−2] will not be available, but the weighted error e' may be obtained by the formula:

$$0.4e[t-1]+0.6e[t]$$

3) Efficient Placement and Pick Path Planning

Under one aspect of the present invention, special attention is given to planning the "placement path" which is the route the robotic gripper takes when moving a gripped package from the accumulator to the pallet(s), as well as planning the "pick path" which is the route the gripper takes after it releases the package and goes to pick a second package designated for picking.

Figure 97:
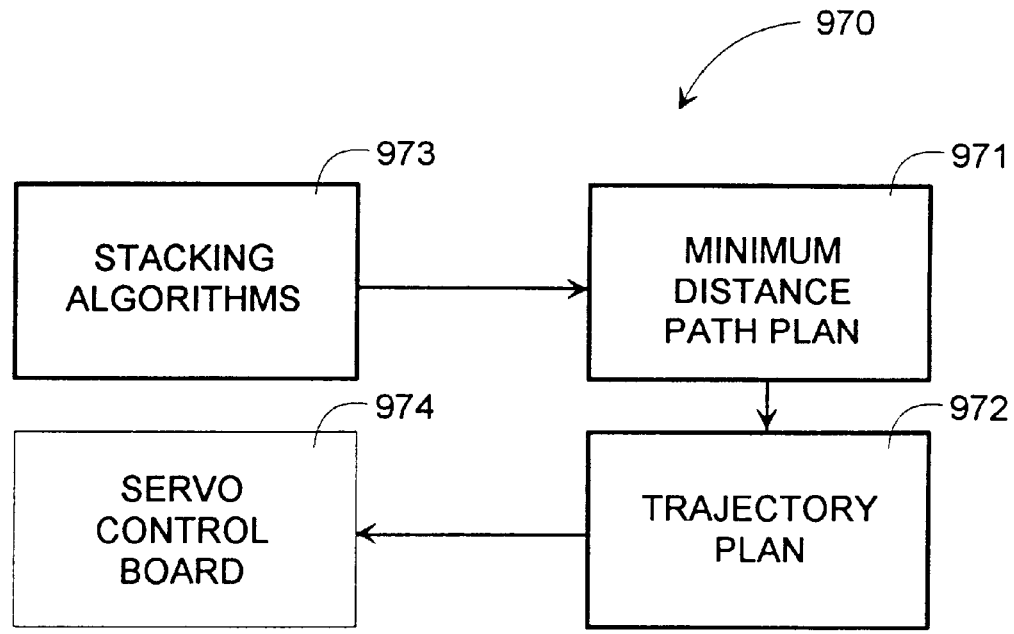
FIG. 97 is a block diagram showing software module interaction.

The near minimum-distance path planning method is implemented according to the present invention with the use of the previously-discussed hardware (e.g. the accumulator conveyor and the gripper) in conjunction with a software module, such as one written in "C" language. This module communicates with other software modules as shown by 970 in FIG. 97. As discussed elsewhere in this application, other stacking algorithms 971 under present discussion decide which package to pick from the accumulator buffer, and where to place it in the pallet. The (near) "minimum distance path plan" module 971 under present discussion determines a set of near minimum distance "via" positions (discussed in detail later), along which a minimum distance path is approximated. The "trajectory plan" module 972 (see FIG. 97) fits curves using these via positions. The planned trajectory is fed onto commercial servo control boards 974 (such as a Galil 530 series) to control a gripping robot as discussed elsewhere in this application.

As noted above, path planning includes both "placement path" planning, which is from buffer pick up position to stacking position, and "pick path" planning, which is from previous placed position to accumulator pick up position.

a) Rectangular-Based Modeling which Accommodates Rotation

Under the system according to the present invention, a rectangular model may be used to account for all package locations, whether the packages are stationary or moving.

Regarding stationary packages, as shown in FIG. 2, under a system according to one embodiment of the present invention, there can be one or more pallets 11 for stacking, and an accumulator buffer conveyor such as 16. The edges of the pallets 11 and accumulator conveyor 16 are set to be parallel or perpendicular to each other. In addition, for all the packages in the accumulator buffer or in the pallets, their edges will be parallel or perpendicular to those of the pallets and accumulator conveyor. It may therefore be seen that the stationary packages, whether they are on the accumulator buffer or on the pallets, are readily modeled by the use of discrete rectangular objects, which may be analyzed for intersection or relative spacing as known in the art or as shown in this application.

Figure 98:
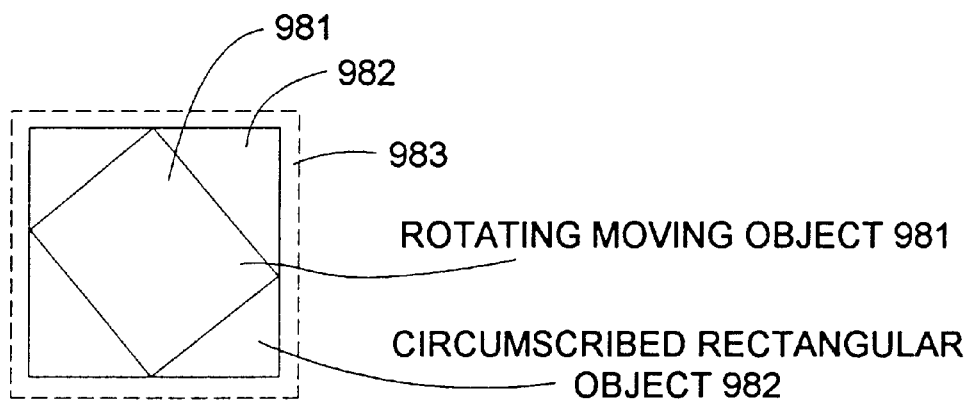
FIG. 98 is an illustrative view showing the relative sizes of an Enlarged Moving Rectangular Object, a Rotating Moving Object, and a Circumscribed Rectangular Object.
Figure 99A:
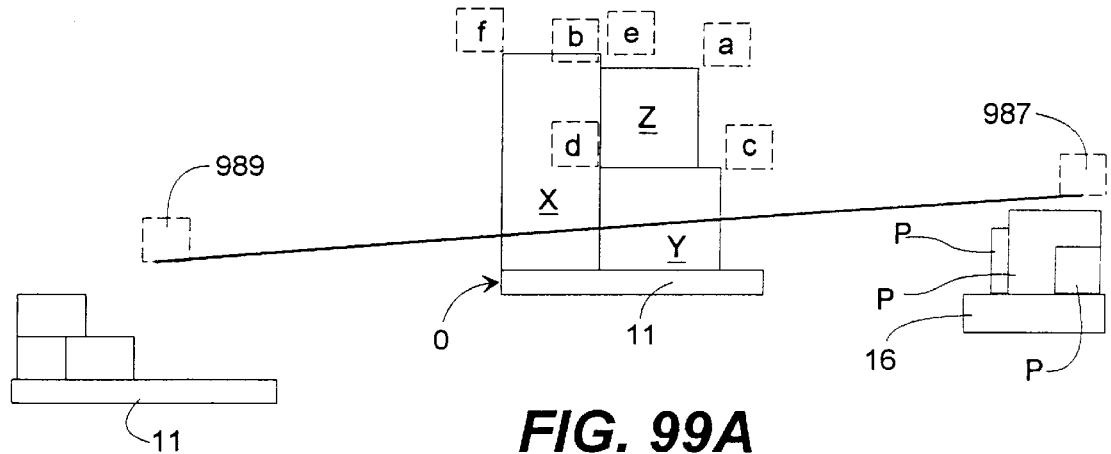
FIGS. 99A–99D illustrate the determination of positions along a placement path.
Figure 99B:
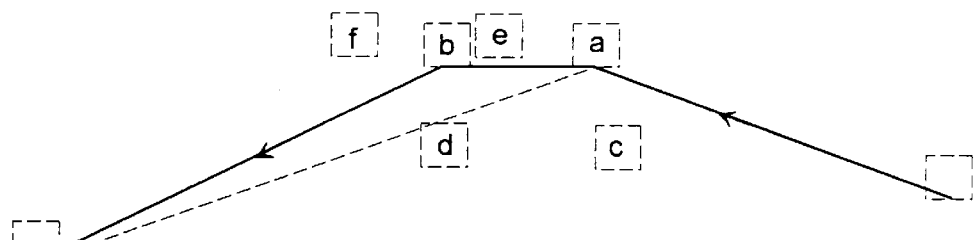
Figure 99C:
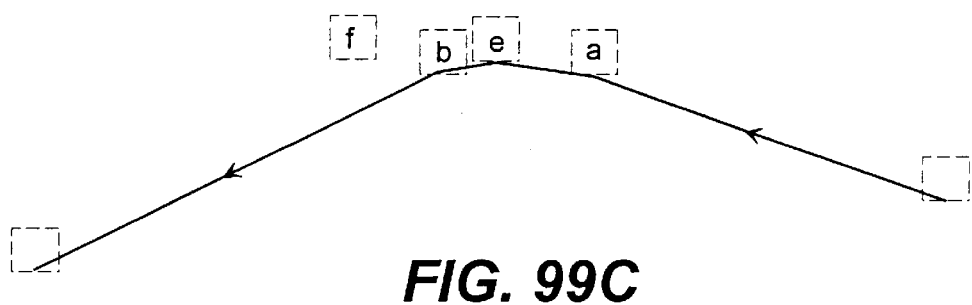
Figure 99D:
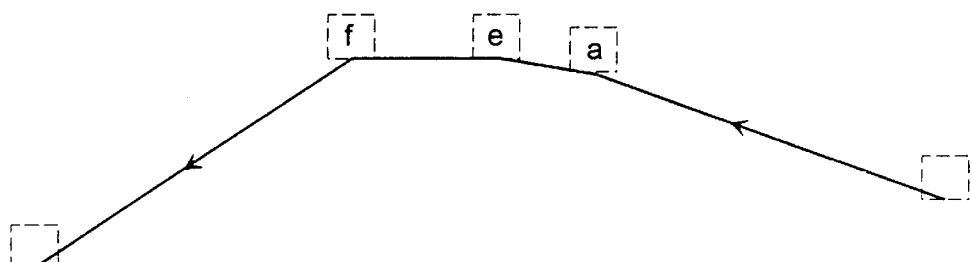

Regarding moving objects, as now shown in FIG. 98 the modeling system according to the present invention includes the use of a Circumscribed Rectangular Object 982 to represent a rotating moving object 982.

As discussed above, the package (and attached gripper 17) may be rotated from its original orientation on the accumulator conveyor to a second orientation on a pallet. Similarly, the gripper may rotate while empty when moving toward a package selected from placement. During such rotation, the edges of the moving object in general are not parallel or perpendicular to those of pallets, accumulator conveyor, or stationary packages. Therefore, a circumscribed rectangular object is constructed within the model which circumscribes all of the rotating object, be it the empty gripper or a particular gripped package. Under the present invention, therefore, the edges of the circumscribed rectangular object will be parallel or perpendicular to the boundary edges of the pallets.

FIG. 98 shows a planar rotation example where the moving object rotates around a vertical axis. As may be understood, during the rotation of the package 981, the size of a Circumscribed Rectangular Object 982 will vary along each position along the travel path, since the angle between the rectangular shapes will change.

Use of an Enlarged Moving Rectangular Object 983 is also made under the present invention. The moving rectangular object 981, whether it be the original package boundaries of a package undergoing pure translation, or be the Circumscribed Rectangular Object of a package when it undergoes rotation, will be enlarged to the size of the Enlarged Moving Rectangular Object by a pre-specified collision tolerance on each horizontal dimension. As noted above, the Enlarged Moving Rectangular Object will also vary with position if rotation is involved.

Figure 110:
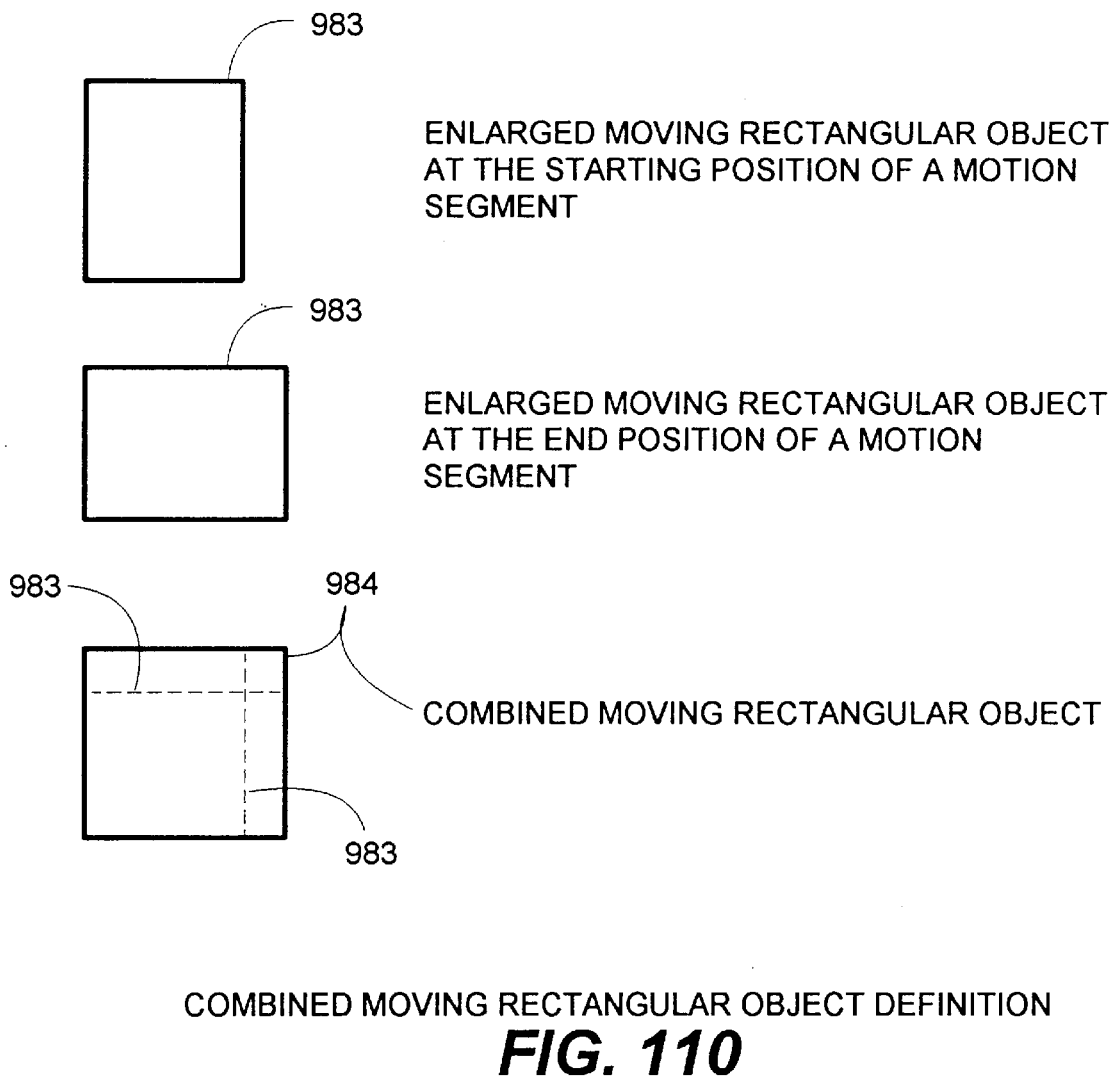
FIG. 110 illustrates Combined Moving Rectangular Object definition.

Referring now also to FIG. 110, use of a Combined Moving Rectangular Object for a motion segment is also made under the present invention. The Combined Moving Rectangular Object can be approximately computed as a minimum rectangular object which can fit the Enlarged Moving Rectangular Objects at the boundary positions of the motion segment.

In the following discussion, the size of the moving object is computed either based on an enlarged moving rectangular object (when referenced to a fixed position) or a combined moving rectangular object (when referenced to a motion segment).

Under the above-referenced model, a control point may be used as a reference point to designate the position of a traveling package or a returning gripper. Once the position of the control point, and the rotation angle of the moving object are specified, the location of any other point in the moving object is completely specified. Unless otherwise stated, in the following discussion, a position is referenced as a spatial location of this control point.

Reference is now generally made to FIGS. 99–103. During the placement path (see particularly FIG. 100), a center point on the bottom surface of the traveling package is chosen as the control point. During the pick path (see FIG. 101), a center point on bottom surface of the gripper (such as a center point in the suction cup) is chosen as control point. In fact, any other convenient point in the moving object can be chosen as control point. The invented methods are not limited to a specified control point choice.

Under one embodiment of the present invention, the placement path via positions and pick path via positions will be stored in two separate data lists. For each list, the contained via positions will be sorted based on ascending (nearest to farthest) horizontal distance from its initial via position. The computed horizontal distances will be recorded along with each position. Each position list will "bear convexity"; that is, the list will correspond to a convex via positions path. During traveling, the control point will follow a near minimum distance path. This path lies in a vertical plane, passing through a convex set of via positions.

Rotation, if it exists, will start from the initial via position, and finish at the final via position. The amount of rotation will be linearly proportional to the horizontal travel distance with respect to the initial via position. The computed via rotation angle will be added to corresponding via position.

It should be understood that the aforementioned distribution to let rotation angle be linearly proportional to horizontal travel distance is for convenience of computation. The present invention also contemplates allowing the rotation angle to be linearly proportional to the spatial travel distance.

b) Placement Path Configuration

Figure 100:
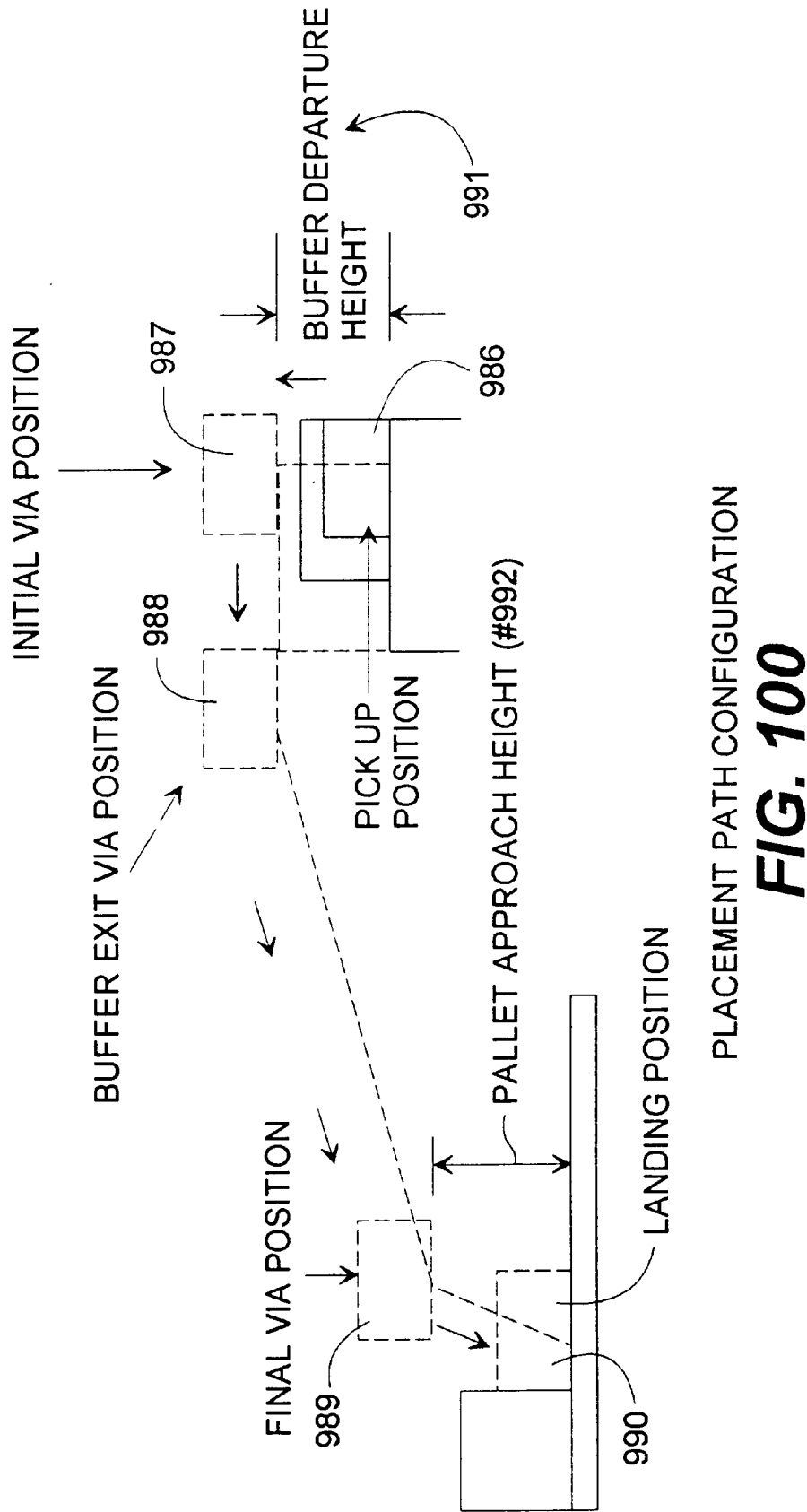
FIG. 100 shows a placement path configuration.

Reference is now made to FIG. 100, which illustrates a package being moved along a placement path. Under the model according to the present invention, the placement path is composed of a series of different positions, which include a pick up position 986, an initial via position 987, a buffer exit via position 988, a final via position 989, and a landing position 990, all such positions referencing to the control point of the moving package. Other via positions may be added later as discussed in detail below. In a complete motion path, the placing package will start from the pick up position 986, follow all the via points, and finally reach the landing position 990. Under one embodiment of the present invention, all the via positions are kept in a vertical plane.

The pick up position 986 is the position at which the package resets on the package buffer (also referenced as an accumulator), ready for stacking. The initial via position 987 is above the pick up position by a distance known as the "buffer departure height" which is variable as discussed below.

The "buffer exit position" 988 corresponds to the horizontal boundary position at the instant the traveling package leaves the buffer. The height of the buffer exit position 988 is the same as the initial via position 987. If the buffer exit position 103 is above a constructed straight line which passes through the initial via position 987 and final via position 989 (which is the case in FIG. 100), then the buffer exit position will be added to the ordered positions.

The "final via position" 989 is near and above the "landing position" 990. The final via position 989 differs from the landing position 990 horizontally by a pre-specified clearance, and vertically by a distance called the "pallet approach height" 992.

Intermediate via positions are inserted as discussed in detail below to avoid collision with any packages already stacked.

c) Pick Path Configuration

As discussed above, a pick path as defined under the present invention is defined as the path in which the gripper moves while "empty", from a previous placement position above a pallet to a buffer pick up position.

Figure 101:
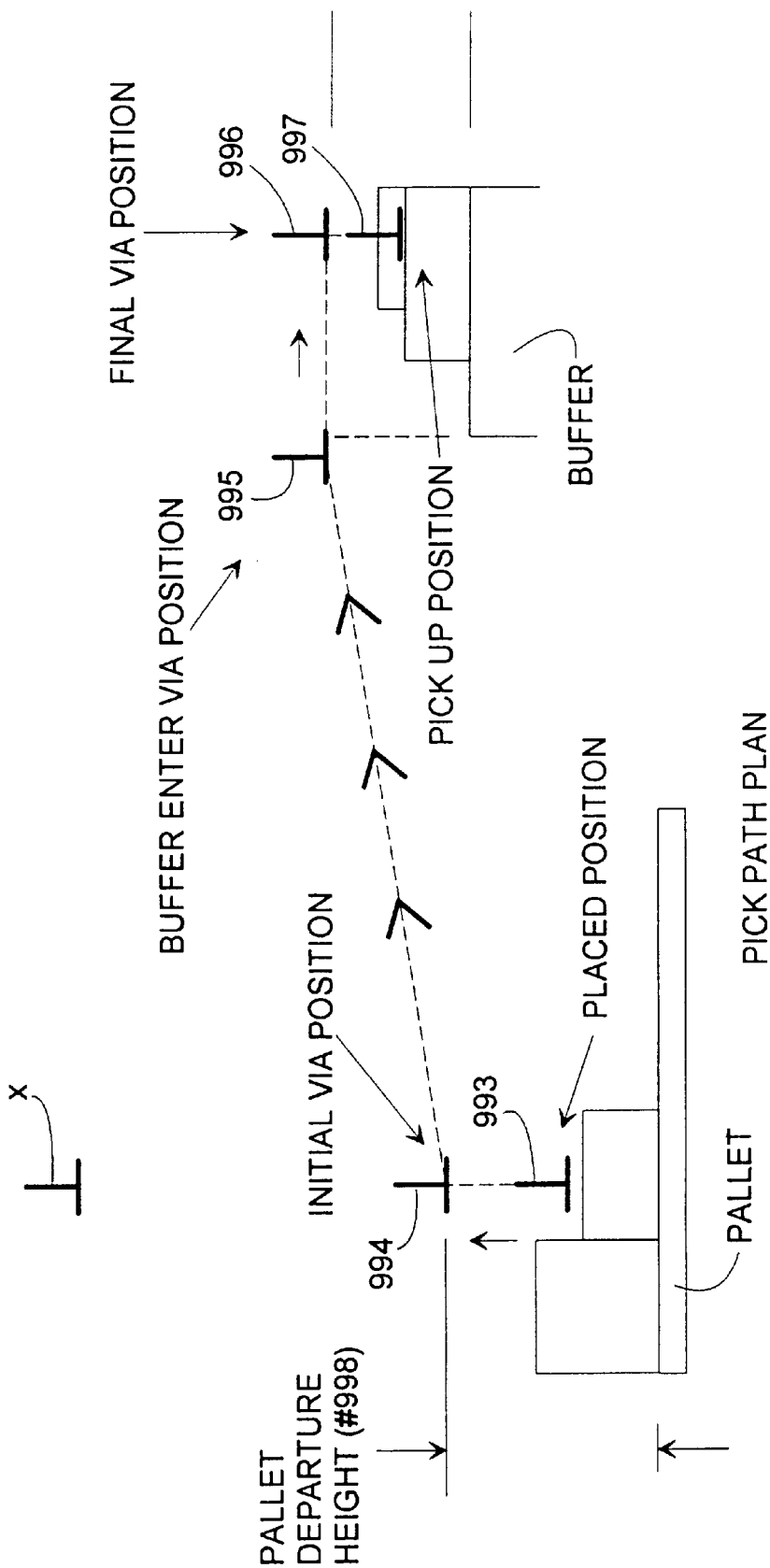
FIG. 101 shows a pick path plan configuration.
Figure 102:
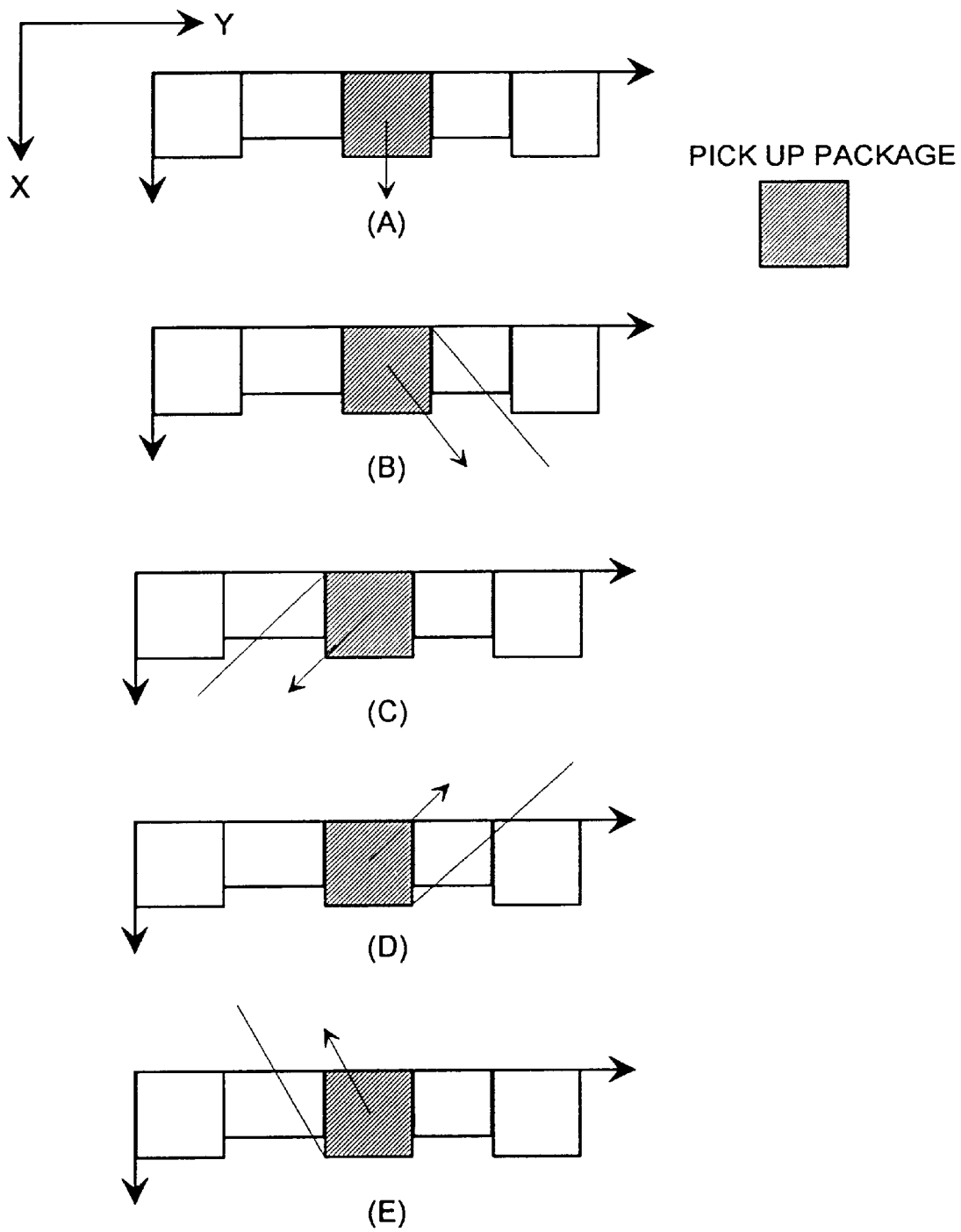
FIG. 102 shows a buffer lift height computation.

Reference is now made to FIG. 101, which illustrates an empty gripper being taken along a pick path. Under the model according to the present invention, the pick path is composed of a series of different positions, which include the original "placed position 993" at which the gripper released its last package, an "initial via position" 994, a "buffer enter via position" 995, a "final via position" 997 and a "pick up position" 997, all positions as discussed previously referencing to the control point of the moving package. Other via positions may be added later to avoid collision as discussed in detail below. In a complete motion path, the gripper will start from the placed position 993, follow all the via positions, and finally reach the pick up position 997. Under one embodiment of the present invention, all the via positions are kept in a vertical plane.

As shown in FIG. 101, after placement of a package, the initial via position 994 is at a location which goes above the placement position by a distance known as the "pallet departure height" 998.

As shown in FIG. 101, the buffer enter via position 995 corresponds to a horizontal boundary position where the traveling gripper enters the buffer. The height of the buffer enter position 995 is the same as the final via position 996. The final via position is at a location which goes above the pick up position by a distance known as the "buffer approach height" 999. If the buffer enter position is above a constructed line which goes through the initial via position and the final via position (which it is in FIG. 101), then the buffer enter position will be added to the ordered positions list.

d) Via Positions Generally

As shown in FIG. 1, a package P is positioned amongst other packages similarly situated atop a pallet 11. For purposes of this discussion, as shown in FIGS. 99A–99D, the initial via position 987 of the package P, and the final via position 989 of the box is shown. After these two positions 987 and 989 have been established, the method according to the present invention involves a determination of the preferred path intermediate positions 987 and 989. The processing computer first determines all packages which intersect a straight path SP which begins at the first position 987 and terminates at the final position 989, with the path having a width equal to that of the package, being moved. This determination can include the concepts of pallet collision checking and package collision checking as detailed below.

For purposes of this discussion, packages X, Y, and Z will be assumed to have intersected such a straight path. Each package will then be reviewed for the possible creation of a via position. It will be assumed for this discussion that package C was deposited before package B, which was deposited before package A. Therefore, under one embodiment of the present invention, package C will first be reviewed. Under one embodiment of the present invention, two "via positions" are established which, if added to the "via position" list, would allow the package P to pass over the package under evaluation, with the package just clearing the stationary package within a specified tolerance (the difference between the Enlarged Moving Rectangular Object 983 and the Circumscribed Rectangular Object 982). "Position Sorting" is then conducted under the present invention.

Under one embodiment of the present invention all of the via positions are established prior to position sorting. Then, each proposed via position is then evaluated for convexity.

e) Buffer departure height or buffer approach height

Referring now to FIGS. 100 and 101, the buffer departure height 991 and buffer approach height 999 measurements (which dictate the heights of the buffer exit position 988 and buffer enter position 995, respectively, depend upon the heights of the packages accumulated on the accumulator conveyor, and are preferably set such that no interference exists between the path of the traveling object and any packages accumulated on the accumulator conveyor. In other words, these two distances define the minimum height the traveling object will approach or depart from the accumulator conveyor.

As noted above, the traveling object size is computed as that of a combined rectangular object for a motion segment between the buffer boundary position and the pick up position. To check for such interference, a search is made for the maximum height of the top surfaces of the packages in the accumulator buffer which are within the sweeping area of the traveling object. The computation methods are discussed in reference to FIGS. 102A–102E.

If the traveling object moves in direction perpendicular to the accumulator, as shown in FIG. 102A, then the buffer approach height is taken as the height of pick up package, and-the buffer departure height taken as the maximum height of the neighboring two packages. The latter may also consider more, upstream, neighboring packages in the accumulator if they will roll to fill the gap of the picked up package immediately after it has been lifted upwardly. If those "gap-filling" neighboring packages in the gap are higher than the picked-up package, then the maximum height of those packages will be taken as the buffer lift height.

If the traveling object moves diagonally from its position on the accumulator conveyor, as shown in the FIG. 102B to 102E, an accumulator search will be conducted to determine if the moving object would collide with the packages on the accumulator. If collision would exist, then the object is raised such that it is free from collision.

f) Pallet departure height or pallet approach height

Again referring generally to FIGS. 100 and 101, the pallet departure height 994 and pallet approach height 992 are each determined based on possible collision with neighboring packages on the pallet. Each package in the pallet is checked. The maximum height of the top surfaces of packages which might have collision with the moving object will be taken as the pallet departure height or pallet approach height.

g) Single Pallet Collision Search

To search a particular pallet for possible collision with a traveling object, the enter position and exit position of the object at the pallet's boundaries are defined. The enter position is a boundary position at which the traveling object starts to have horizontal intersection with the pallet boundary, and the exit position is a boundary position at which the traveling object has almost completely left the pallet.

Generally, the traveling object will have an enter position as well as exit position on the pallet boundary when a traveling object intersects the pallet boundary. There are two exceptions. For the pick path, the enter position does not exist for the "origin" pallet (the pallet which has just received a new package). Similarly, for the placement path, the exit position does not exit for the "destination" pallet (the pallet which is about to receive a package). Except for the origin pallet in pick path planning, in general if one cannot find an enter position for a pallet, the traveling object will not have horizontal overlap with the pallet, and the pallet is free from collision with the traveling object.

The heights of the traveling object at the enter position and at the exit position are computed, if such positions exist. These heights can be obtained from linear interpolation along a line which passes through the initial via position and the final via position. The lower height of these two pallet boundary positions will be taken as the (lower) height threshold. If one boundary position is missing, then the departure height or the approach height will be used instead of in comparison. If the maximum height of the top surfaces of the packages stacked in the pallet is lower than the threshold height, the pallet is free from collision with the traveling object. The maximum height of the top surfaces of stacked packages in a pallet is recorded whenever a new package is stacked into a pallet.

When rotation is involved, the above two computations can involve iteration. Initially, the moving object size is taken as that of the combined moving object for a motion path between the initial via position and the final via position. Using this information a set of enter points and exit points are computed. A smaller size can then be obtained based on the combined moving object for a motion path between enter and exit positions. The new moving object can be used to get more accurate threshold height.

If pallet boundaries intersect with the traveling object, a search is then conducted for each package in the pallet to check for possible collision with the moving object whose size is determined above. For each package already on the pallet, there may also exist an enter position and exit position. If an enter position exists, then the enter position will be added to the travel path position list. There is one exception in the case of a placement path near to the destination position. If the collision position goes beyond the final via position along the travel path, then the collision position may be false since the traveling object is enlarged with tolerance. In that situation, the correct object shape (rather than the Enlarged Moving Rectangular Object) will be used to check for collision.

For a given stacked package, if there an enter position, there an exit position will usually exist. When considering a pick path with the package is in the vicinity of the origin position, even without an enter position, an exit position may still exist. When an exit position is found, the exit position will be also added to the travel position list.

h) Package Collision Check

The individual collision check is composed of two separate checks along two orthogonal dimensions. The two orthogonal dimensions are the front/back dimension and left/right dimensions. It may be understood that if the moving object collides with the stacked package, the collision has to occur in either on front/back dimension, or left/right dimension (FIG. 103B), but not both.

Figure 103:
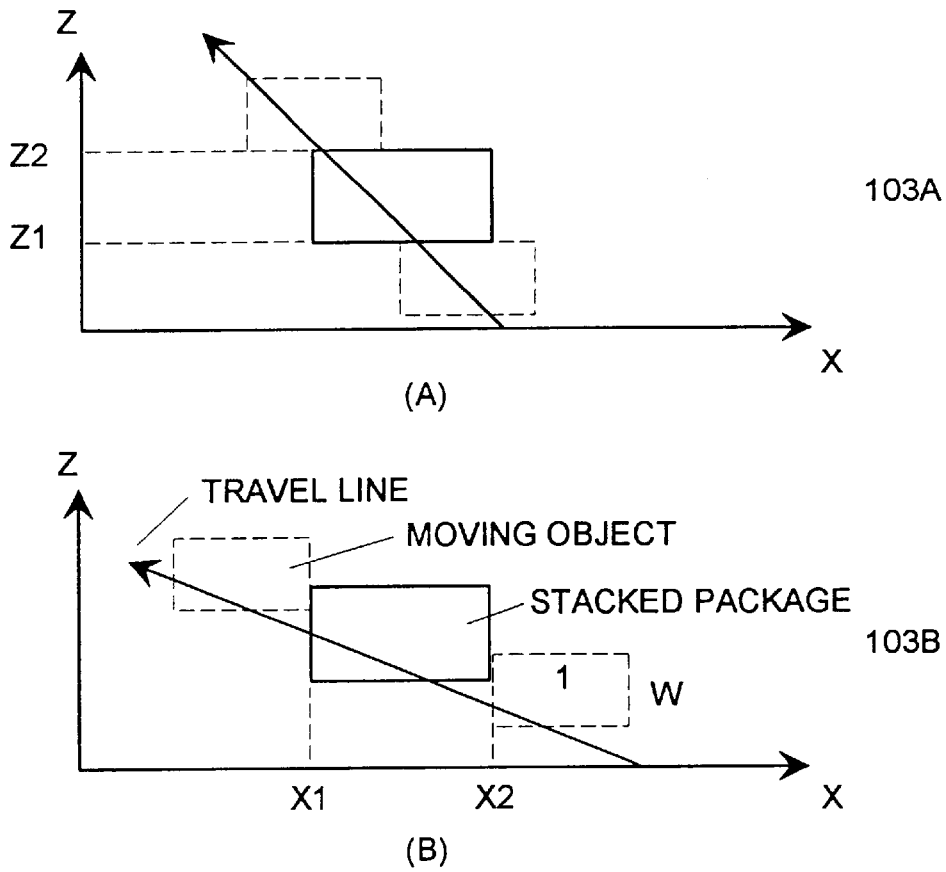
FIG. 103 shows collision checking.
Figure 104:
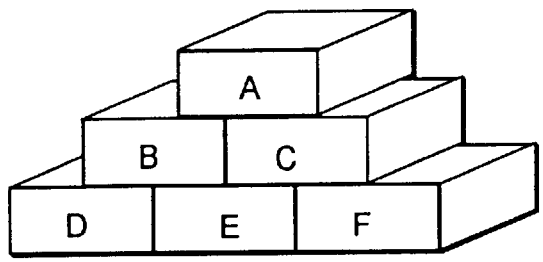
FIG. 104 shows weight being passed from layer to layer within a stack including packages A, B, C, D, E, and F.
Figure 105:
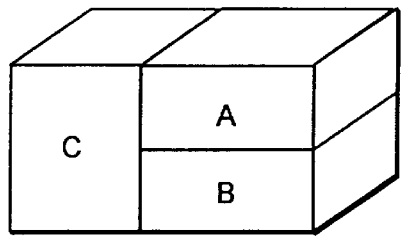
FIG. 105 shows weight propagation of packages A, B, and C within a stack.

Reference is now made to FIGS. 103A–B. For collision along the front/back dimension, the moving object can be at two boundary positions as shown in the FIG. 103A. These boundary positions can be either the enter position or exit position depending on travel direction. Based on geometry sizes of the package and the moving object one can compute the coordinate along left/right dimension for the control point of the moving object. As shown in FIG. 103, the z axis will be defined as the front/back direction, and the x axis as along left/right direction. z1 and z2 are the corresponding front and back z coordinates of the package. The z coordinate of the control point (center of bottom surface) of the moving object will be (z1–w) when the moving object is on the lower side, and z2 when the moving rectangle is on the upper side. The corresponding x coordinate of the control point can be solved from a straight line equation of the traveling path. Once the control point coordinates are obtained, the controller can compute the two boundary x coordinates along the contact lines along the x direction. If there exists any overlap length along the horizontal direction between the moving rectangle and the package, collision may be considered to exist.

For collision along the left/right dimension, the traveling box can be at two boundary positions as shown in FIG.

103B. Each boundary position can be either an enter position or exit position depending on travel direction. Based on geometry sizes of the packages and the moving object, one can compute the horizontal coordinates of the control point of the moving object. Using the same coordinate system as above, x1 and x2 are the corresponding x coordinate of the package. The x coordinate of the defined control point will be (x1−½) when the moving object is on the left side, and (x2+½) when the moving object is on the right side. The corresponding z coordinate of the control point can be solved from a straight line equation of the traveling path. Once obtained the control point coordinates have been, the controller can compute the boundary z coordinates along contact line. If there exists any overlap length along the vertical direction between the moving object and the package, then collision exists.

i) Collision Package Insertion

Initially, there are only two positions in the list, the initial via position and the final via position. The buffer enter position or exit position may be added as discussed before. Later on, for every position insertion, a consistency check will be conducted to make sure that the ordered list maintains "convexity". In other words, the upwardly convex nature of the path is maintained when new positions are added to the list.

j) Adjacent Package Check

Whenever a position is inputted, the corresponding list will be searched for an adjacent pair of positions, in which one is immediately before and one is immediately after based on horizontal travel distance.

If the new position is within a predefined tolerance to one of the existing positions in the pair in terms of horizontal travel distance, it will be handled in two ways. If the new position is lower than the existing position, the new position will be discarded. Otherwise, the existing height will be lifted to the new height, and a forward search and backward search will be conducted, as described below.

If the position is beyond the predefined tolerance, a line will be constructed which passes through the existing position pair. If the new position's height is lower or equal to that line, the new position will be discarded, otherwise, the new position will be inserted, and a forward search and backward search will be conducted.

k) Forward Searching

With the newly inserted position as a starting position, the next position is selected as a check position, and the position after the next position, if exists, is selected as a reference position. Constructing a line which passes through the starting position and the reference position, a check is made if the check position is above the line, below the line, or on the line. If it is above the line, the search is ended. Otherwise, the check position will be removed from the list. The reference position is then relabeled as the check position, and the next position, if it exists, is relabeled as the new reference position. A new check cycle will start. This will repeat until convexity is satisfied for all positions along the forward direction.

l) Backward Search

With the newly inserted position as a starting position, the previous position is selected as a check position, and the position before the previous position, if it exists, it is selected as a reference position. Constructing a line which passes through the starting position and the reference position, a check is made if the check position is above the line, below the line, or on the line. If it is above the line, the search is ended. Otherwise, the check position will be removed from the list. The reference position is then relabeled as the check position, and the position before that position, if it exists, is relabeled as the reference position, and the same cycle is started again. This will repeat until convexity is satisfied for all positions along the backward direction.

m) Vertical Tolerance

To every position in an ordered list will be supplemented with a tolerance. This is equivalent to lift the whole convex polygon segments joining the positions in the list by a specified tolerance distance, such that the traveling object has less chance to collide with stacked packages or packages on the accumulator buffer. This can also be achieved by enlarging the moving rectangle by a collision tolerance at the bottom surface.

E. Timing Efficiency

The software system includes the following components: robot motion planning software, robot trajectory interpolation software, peripheral devices control software, message display and error handling software, and stacking algorithms. The robot motion plan software plans a pick and place motion sequence based on a package stack plan, and plan each motion segment. The trajectory interpolation software executes a planned motion segment and interpolates a new position at each trajectory cycle to communicate to servo boards. The peripheral devices control software coordinates the motion of the feed belt, measuring station, and accumulator. The stacking algorithm is computer software which as discussed before generates a package stack plan. The stack plan dictates which package to pick from the package accumulator, where to place the package in pallet, and which package orientation to use.

All components under one embodiment of the invention are controlled by a VME bus based palletizing system controller. Under this embodiment, the main processor board used is a Motorola MVME167. The multi-tasking realtime operating system used is pSOS+. Control software for feeding belt, measuring station, accumulator, and robot, and stacking algorithms all can run on this board. This main processor communicates with Galil servo boards to control the gantry robot, measuring station, feeding belt, and accumulator. It also can communicate with a Matrix I/O board to collect data of load cells, which reside in the measuring station.

1. Robot Motion Planning

During a pick and place motion cycle, the robot is controlled with maximum acceleration and deceleration along all motion segments. The motion profile contains a mix of square wave acceleration/deceleration and sinusoidal wave acceleration/deceleration, both of which are well known in the control field. Given maximum acceleration, square wave profile can accomplish motion faster than sinusoidal profile. On the other hand, sinusoidal wave profile will cause less vibration than square wave profile. During a pick and place cycle, the gantry will follow square wave profile all the way except on the last segment of the placement cycle. On that segment, it is switched to sinusoidal profile. This method achieves short cycle time, while preserving placement accuracy.

2. Timing Arrangement

In the initial system setup, the measuring station and accumulator feeding processes will be executed first. After the accumulator has been filled, from then on, the package measuring and feeding processes will be executed parallel to robot motion.

As soon as the robot picks up a package from the accumulator and is free from collision with neighboring packages, the package feeding cycle starts. Package feeding continues until the accumulator is full; that is, the last package will end up partially on the measuring station.

Under the present invention, the accumulator feeding cycle time is kept less than or equal to one half of the robot pick and place cycle time. When the robot comes back to pick another package, the controller has to check if accumulator feeding is done before landing on that package. If accumulator feeding is not done, the robot will idle, and the stacking cycle will be delayed. When a relatively big package is removed from accumulator, typically the gap will be filled by one or two packages. Occasionally three packages, if they are small, are required to fill the gap; however, this is unlikely.

The next package is then introduced on the output edge of induction belt. In one preferred embodiment, there is a photo eye installed on the induction belt to serve as a deceleration sensor. The location of the deceleration sensor is positioned such that when a package starts to decelerate from that point, it will stop at the exit edge of induction belt. The computer will monitor the deceleration sensor, and stop the induction belt when a new package arrives. In this arrangement, whenever a previous package has finished measuring, there will be minimum travel as to move the next package onto measuring station.

3. One-Package-Ahead Planning

Under the present invention, stacking decision making runs in parallel with robot motion and package measuring and feeding. Stacking decision making prepares a stack plan as to which package to pick from the buffer, where to place in the pallet, as well as which orientation to use. As soon as the robot motion planner accepts the stack plan, the stacking decision making starts to compute for a next placement.

The stacking decision making uses a one package ahead geometry model for the accumulator buffer and pallet. Physically, the robot's gripper has just finished the placement of the last package, and has just started moving towards the buffer to pick a planned package. In the One-Package-Ahead model, however, the planned package is assumed to have been removed from the buffer, and is to have been placed in the pallet. The position shifting of packages in the accumulator is also assumed to have been completed. Based on this one-step-ahead model, a next stack plan is computed.

Thus, when a robot finishes placing current package, the next package selection has already been prepared, so no time delay is wasted.

4. Multi-Tasking

As may be seen, under the present invention, a multitude of different tasks are being conducted, which can pose difficulties in such a real-time operating system. As may be understood, it can be disadvantageous if the system has to "wait" for computations to occur prior to allowing a pick path or placement path to be traveled.

Under the present invention, control task priority setting can utilize computer time efficiently, hence reducing or eliminating computation delay in the stacking cycle.

Figure 106:
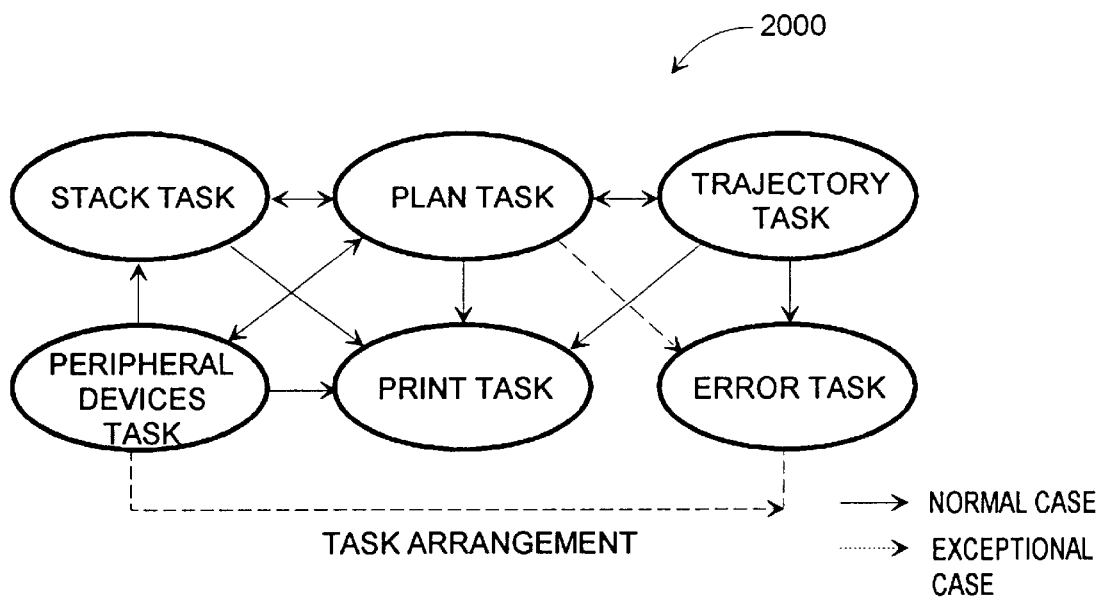
FIG. 106 shows task arrangement within a group 2000 of tasks.

Under the present invention, as shown in FIG. 106, there are 6 software tasks which can be run on one processor: stack task, plan task, trajectory task, peripheral devices task, print task and error task.

The stack task makes a package stack plan, including which package to pick from the buffer, where to place in the stack, and which orientation to use. This plan includes the stacking process previously discussed. The plan task schedules and executes the previously-discussed gantry robot pick and place motion sequence. The plan task can also be expanded to handle user interface. The trajectory task handles motion segment realtime interpolation such as discussed with respect to placement path and pick path planning. Time critical housekeeping duties such as checking if an E-STOP button has been pushed are also implemented in this task. The peripheral devices task handles control for the infeeding conveyor, the measuring station and the accumulator. The print task relays all messages to a monitor screen or LED. The error task becomes active when E-STOP button is pushed by the operator, or if hardware or software error occurs.

Under the present invention, relative priority assignment of the tasks is made. The CPU's time is allocated based on task priority: whenever a high priority task is ready for execution, a running low priority task will be interrupted, and computing time will be assigned to that high priority task. Each of the above tasks is assigned a different priority. The trajectory task carries the highest priority, followed by the error task, measuring station task, plan task, stack task, and print task. Whenever a particular high priority task is complete, the CPU time will be immediately shifted to a task having lower priority.

Execution time arrangement of the tasks is provided under the present invention. As shown in the arrangement 2000, FIG. 106, a high priority task will give up computer CPU time whenever it voluntary sleeps. It remains so until explicitly awakened by an external task. A high priority task will also give up computer CPU time when it is waiting for some event. It will remain so until receiving such event from other task.

Figure 107:
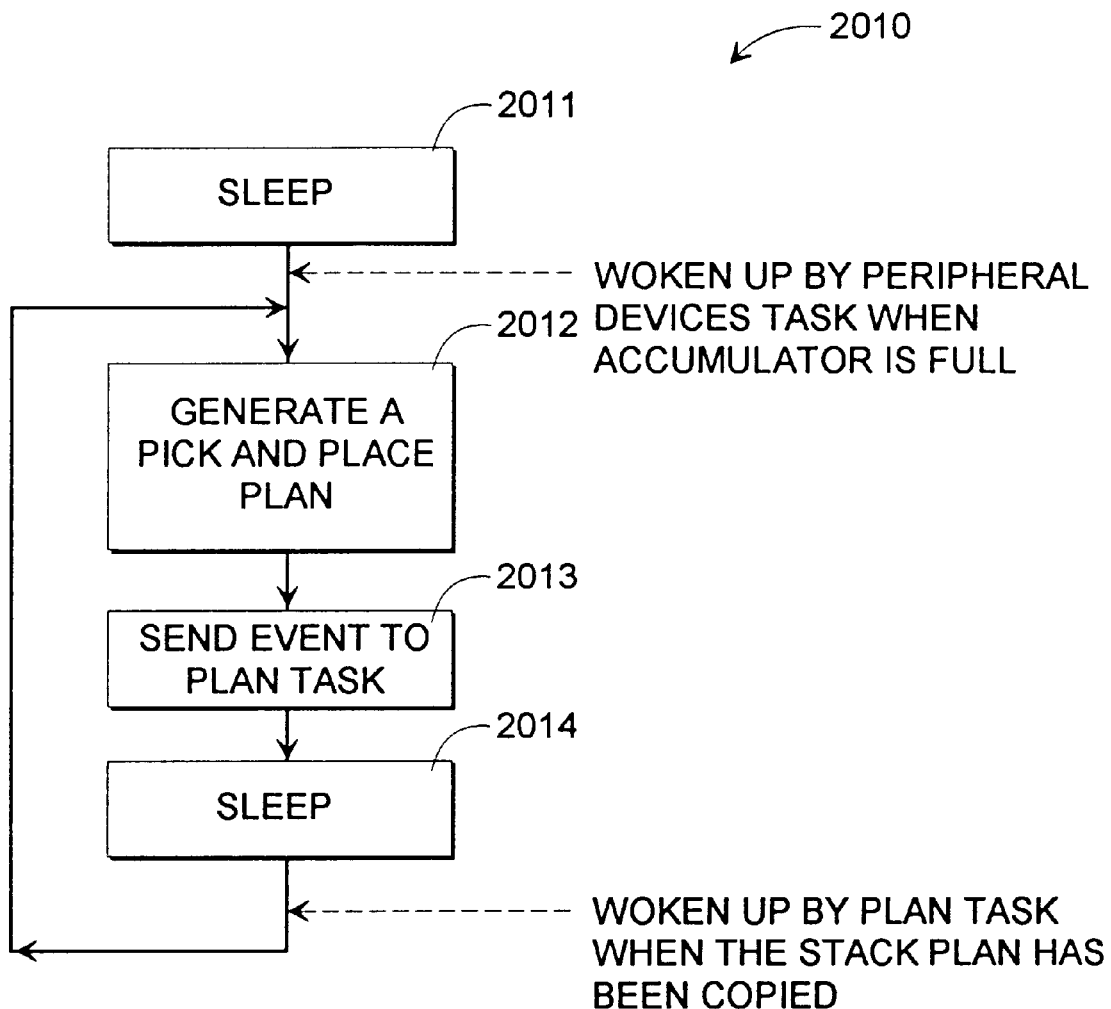
FIG. 107 shows a stack task execution flow chart 2010.

As shown by 2010 in FIG. 107, after the stack task generates a package pick and place plan at 2012, it will "send event" to plan task 2013, allowing it to run, and sleep at 2014 to give up computer time. It will resume its cycle when the plan task has taken the current stack plan.

Figure 108:
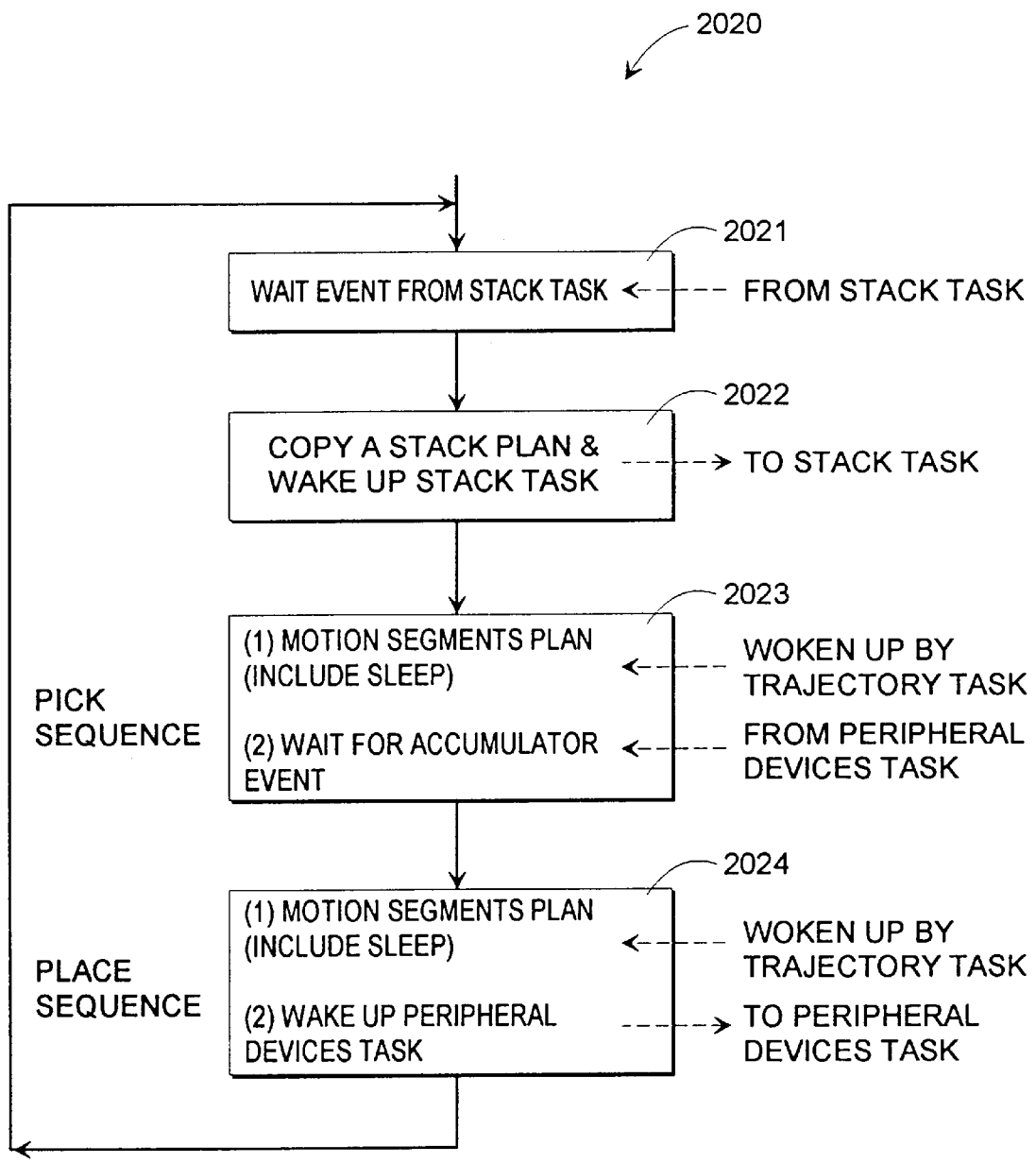
FIG. 108 shows a plan task execution flow chart 2020.

As shown in FIG. 108, the plan task will not run unless it receives a package stack plan from the stack task. After receiving the plan, the plan task will wake up the stack task to draw a next package stack plan. The plan task then plans and executes pick and place motion sequences. Each step in the sequences typically includes a motion segment planning. After planning a motion segment, the plan task will sleep until awakened by a trajectory task. Immediately before picking a package from the accumulator, the plan task will wait for an accumulator done event. Immediately after lifting a package, a plan task will awaken the peripheral task to feed the next package.

Figure 109:
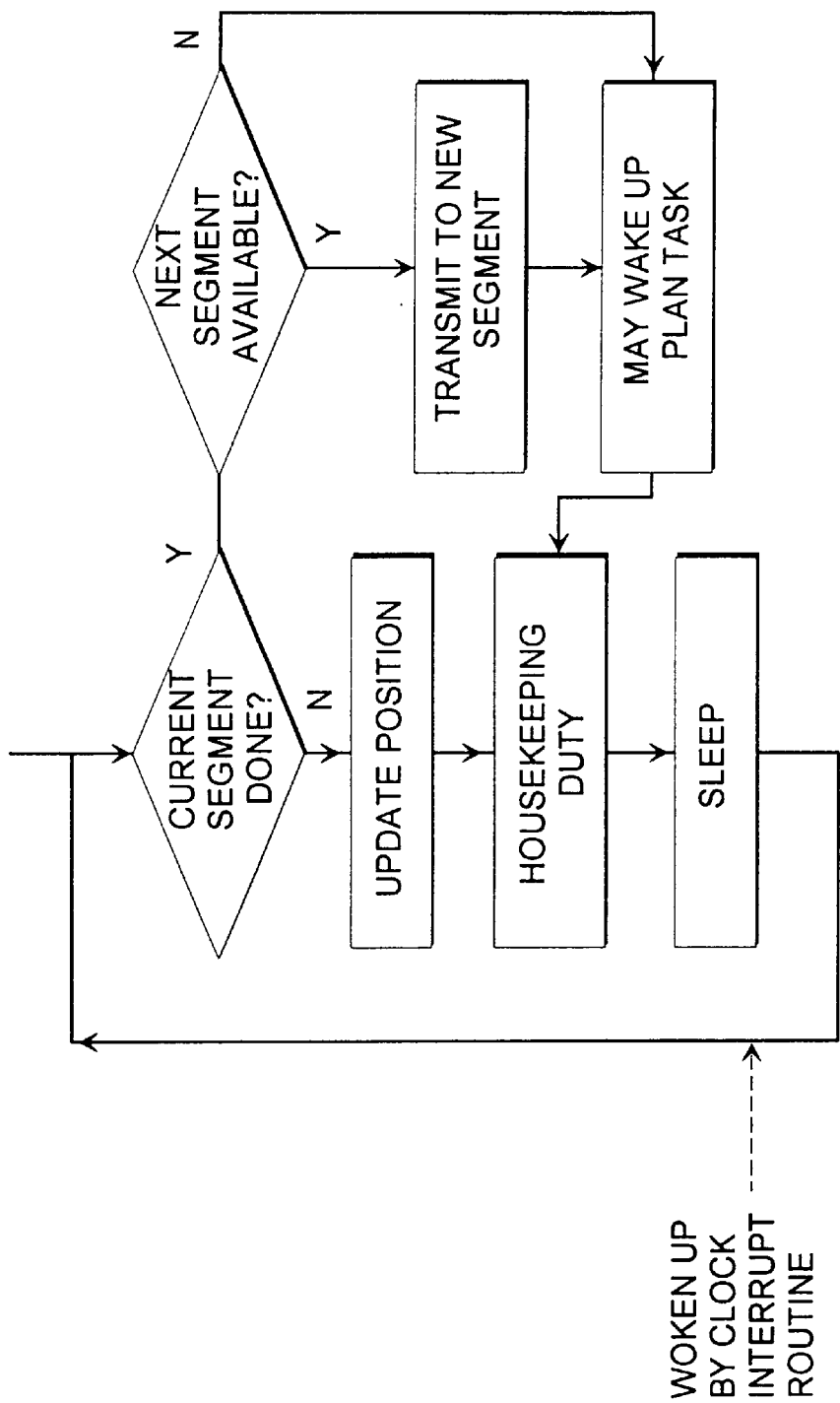
FIG. 109 shows a trajectory task execution flow chart 2030.

As shown by 2030 in FIG. 109, an interrupt clock will wake up the trajectory task at a fixed interval, such as 32 milliseconds. Once activated, the trajectory task will update robot trajectory positions if the current segment is not finished, or transit to the next planned segment. Based on the instruction (stored in computer memory) from the planned task, the trajectory task may wake up the plan task either when all planned motion segments are done or immediately after transition to the next motion segment. The trajectory task then executes various housekeeping duties, and sleeps.

Figure 111:
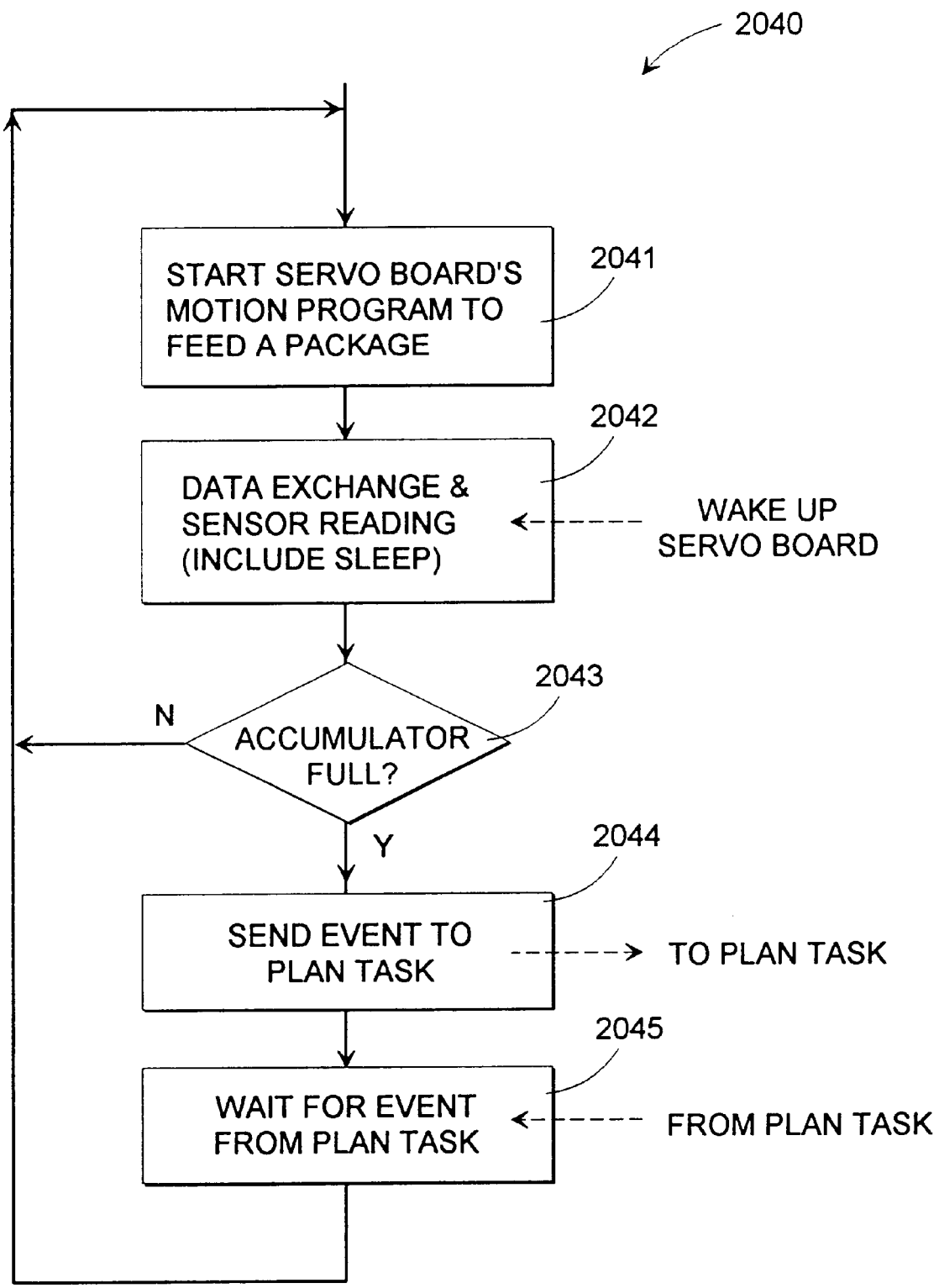
FIGS. 111, 112 and 113 are flow charts relating to peripheral devices, task execution, printing, and error handling, respectively.

As shown by 2040 in FIG. 111, the peripheral devices task will start a motion program to feed and measure a package at 2041. The motion program is running in the servo board. During the execution of the program, most of the time the peripheral devices task is in sleep mode. When reaching critical positions, it gets awakened by the servo board to exchange data with the servo board or to read sensor data at 2042. This process will repeat until accumulator is full. Then the peripheral devices task will send event to plan task at 2044, and sleep until it gets the event back from the plan task.

Figure 112:
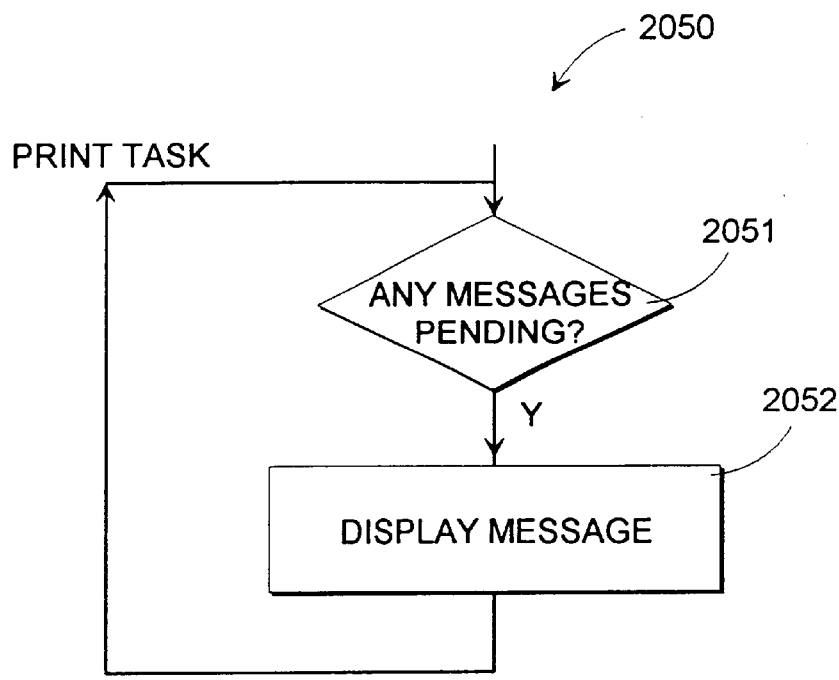

As shown in FIG. 112, the print task keeps displaying messages at 2052 as long as there are any. This task gets executed only when the rest of the tasks are not running. If the system is to include additional low priority tasks, the sleeping and wake up method used above can be extended to print task.

Figure 113:
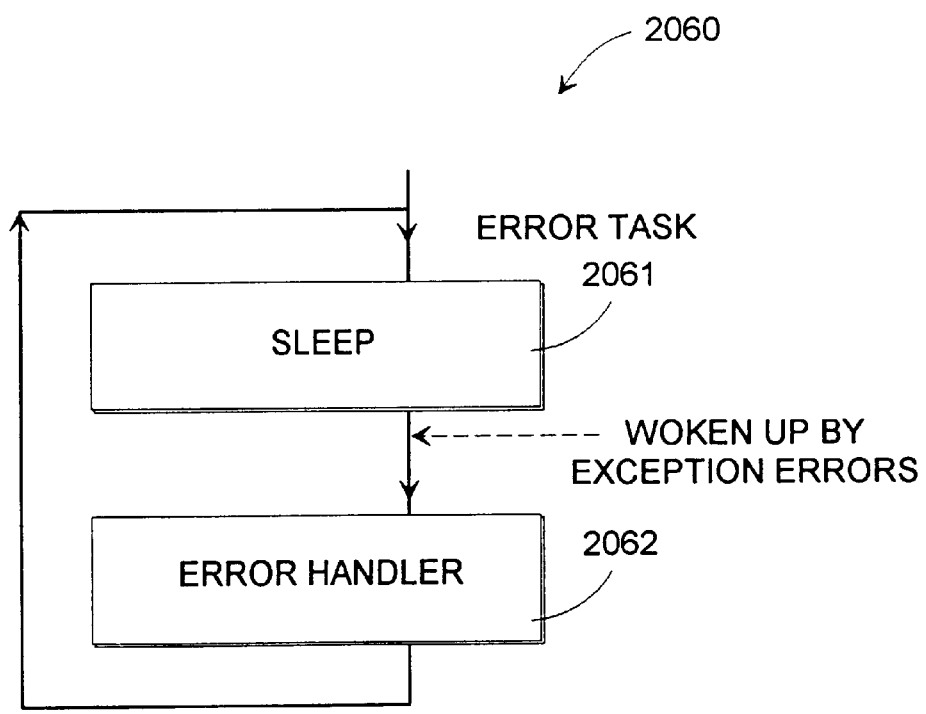

As shown in FIG. 113, the error task normally is not running. It is awakened by exceptional error to handle errors at 2062. After processing, it remains asleep at 2061.

F. Error Correction

As may be understood, when packages are placed in to line contact, they can become compressed or deformed somewhat from their original dimensions which were read further upstream. Therefore the actual accumulated line length (the actual end-to-end length of the accumulated line of packages) can differ from the summation of the previously measured "nominal lengths" of the packages. Therefore, if the gripper only relied upon the previous individual measurements to go and pick a particular package, it could disadvantageously be "off" an error distance if, for example, line compression has made the actual accumulated line length less than the sum of the nominal lengths. Reference is now made to FIGS. 114–117 to illustrate a method and apparatus according to the present invention for selecting individual packages from an accumulated package line, which includes error correction to accommodate the difference between the lengths of the packages before accumulation and their actual lengths while accumulated.

Figure 114:
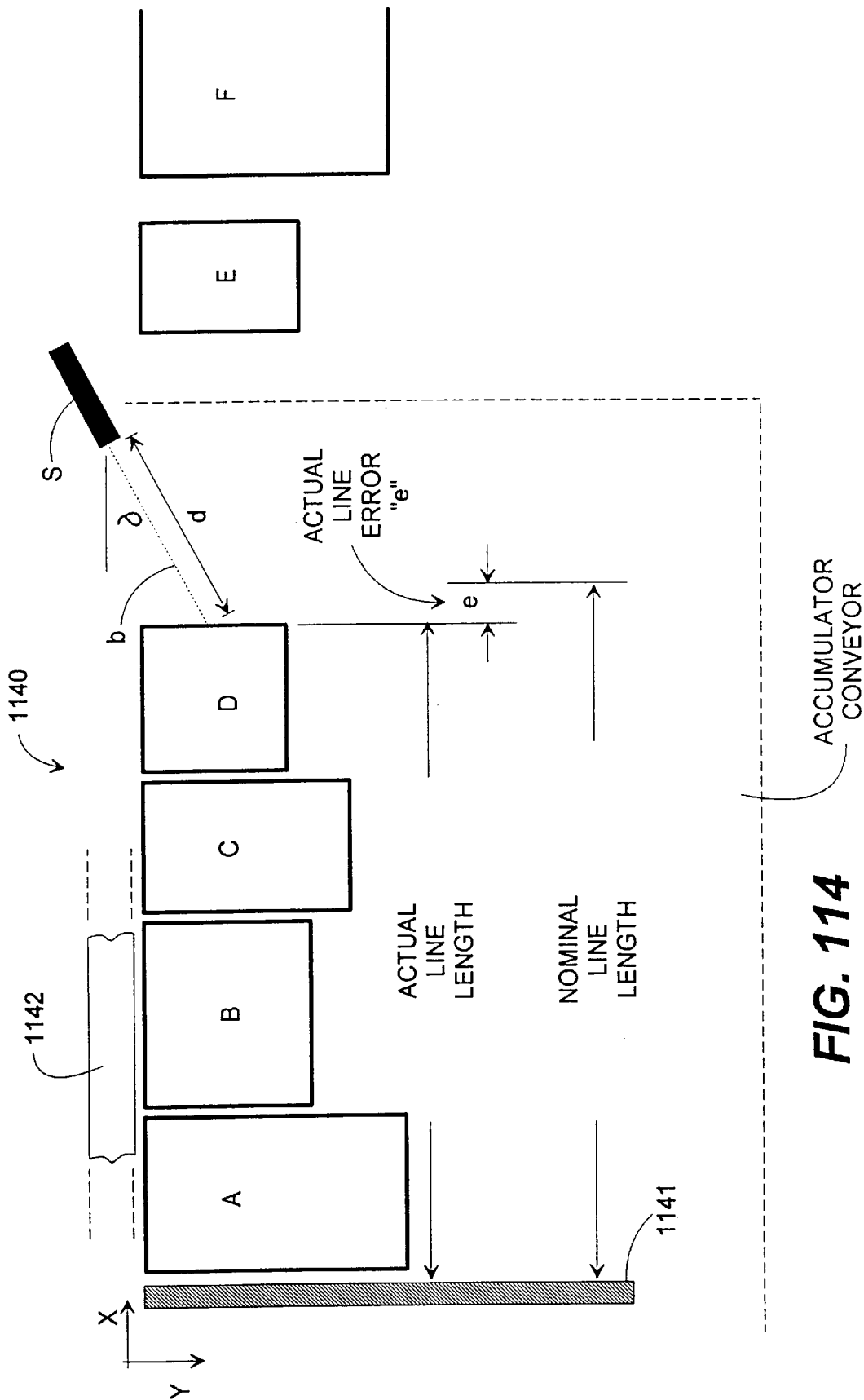
FIG. 114 illustrates a top plan view of a group 1140 of packages A, B, C, D, E, and F, being accumulated atop an accumulator conveyor, with the first-accumulated package A against a reference end stop 1142 of known location and all packages in side contact with a side-aligning side alignment guide 1142.

As shown in FIG. 114, a group 1140 of packages "A", "B", "C", and "D" are in line contact along their lengths on an accumulator conveyor, with the first-accumulated package A against a reference end stop 1142 of known location and at least packages "A", "B", "C", and "D" in side contact with a side-aligning side alignment guide 1142. It should be understood that the term "length" is relative with respect to the orientation the packages happen to be when loaded onto the accumulator. The last package D on the conveyor is in the path b of a distance sensor S, which is at an angle a from axis X, which is the axis along which all distances are hereinafter measured. By sensing the distance "d" from the sensor "S" and calculating the cosine of d, the "X" component of the distance "d" can be determined. Such knowledge combined with the dimensions of the accumulator conveyor allow the calculation of the Actual Line Length of the packages on the accumulator conveyor. Knowledge of the nominal lengths of individual packages by an upstream dimensioning conveyor (not shown), allows the calculation of the Nominal Line Length of the packages A, B, C, and D. The difference between these two values is the Actual Line Error, or total error "e". This error is compared to thresholds, such as +1.2 inches and −1.5 inches, and if the error exceeds either of these thresholds it is assigned the value of the threshold crossed.

Figure 115:
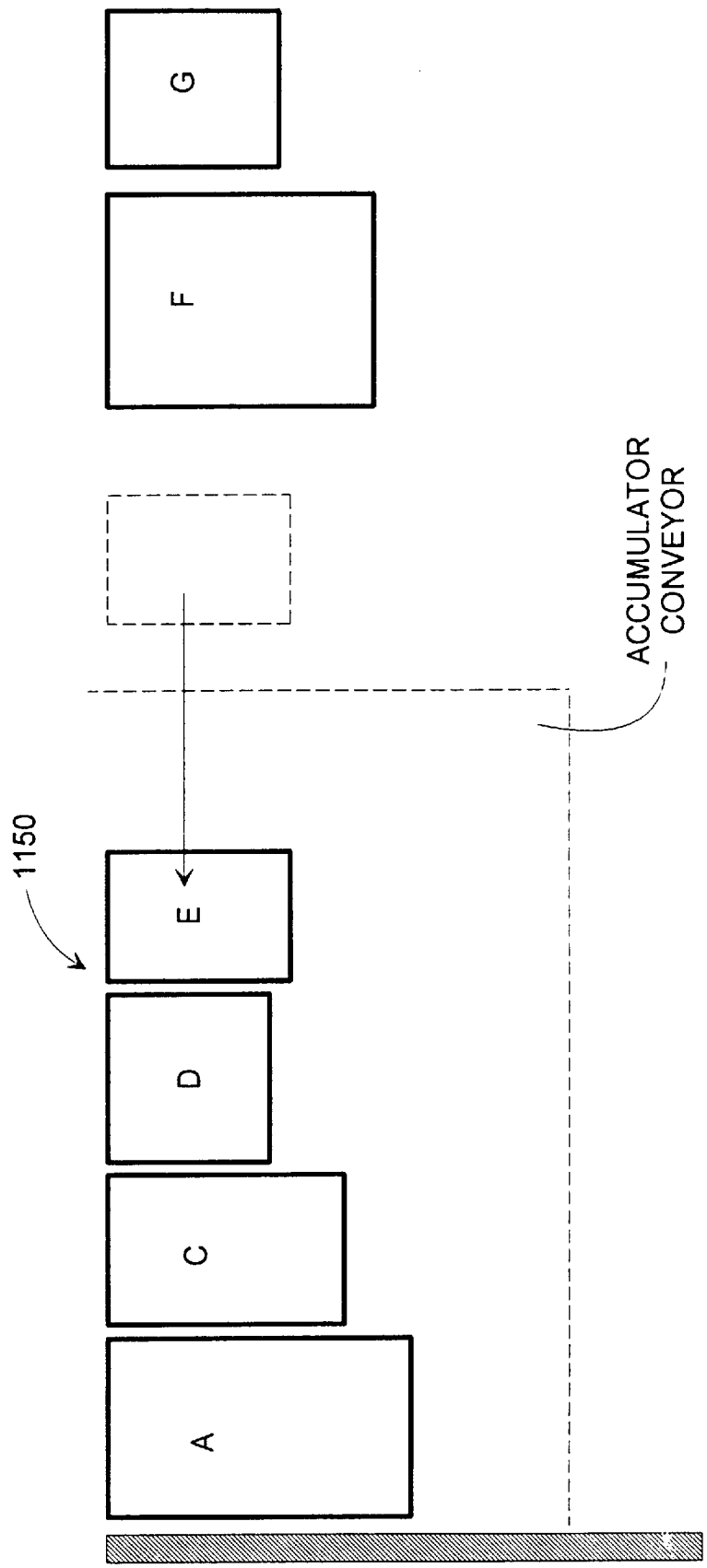
FIG. 115 illustrates a top plan view of a group 1150 of packages A, C, D, E, F, and G being accumulated atop an accumulator conveyor.
Figure 116:
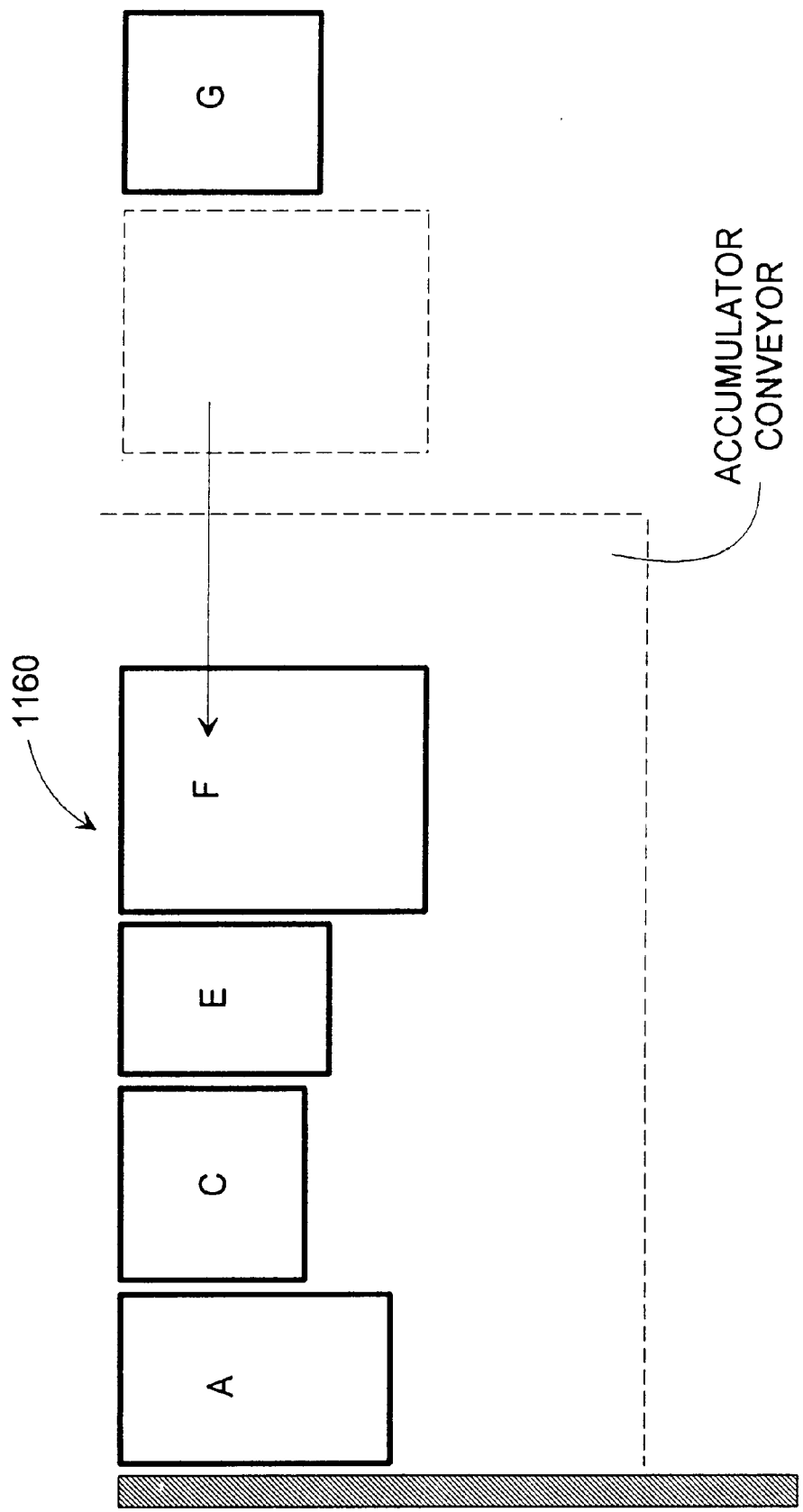
FIG. 116 illustrates a top plan view of a group 1160 of packages A, C, E, F, and G being accumulated atop an accumulator conveyor.

At this point, the system is prepared for the withdrawal of a package, and is therefore at the beginning of its cycle. As shown in FIG. 115, a package such as "B" is then withdrawn from the line, and another package "E" is placed into line contact with the other packages. The error "e" is then recalculated and another package is withdrawn (e.g., package "D") and replaced with a package such as F to arrive at the configuration shown in FIG. 116.

Figure 117:
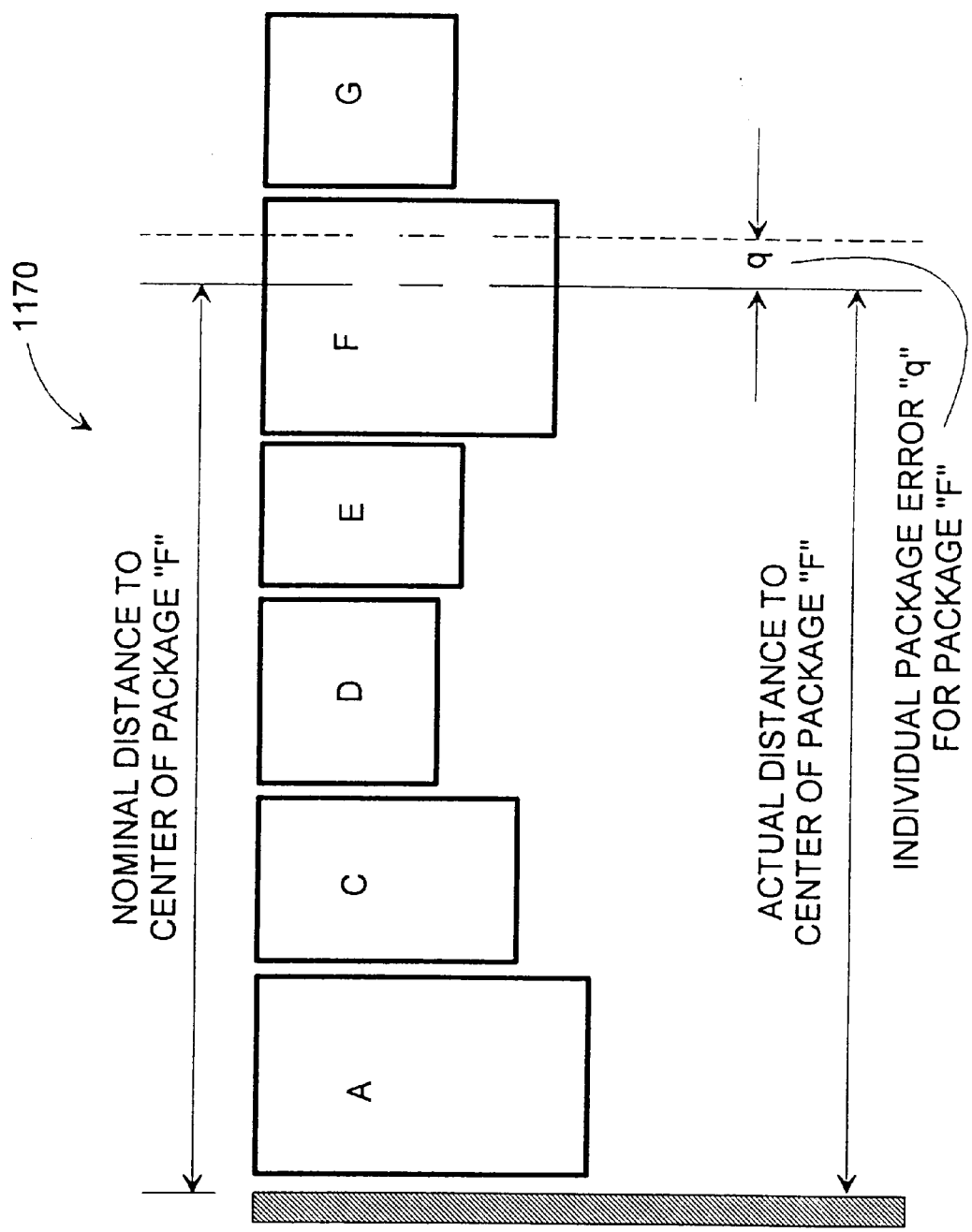
FIG. 117 illustrates a top plan view of a group 1170 of packages A, B, C, D, E, F, and G, being accumulated atop an accumulator conveyor.

As previously discussed, after each error "e" is calculated, the gripper then removes a package from the packages on the accumulator conveyor. It is desired to know as accurately as possible the center (at least in the "X" direction) of the packages for consistent downstream placement of the gripped packages. For this reason the error "e" is proportioned to the packages in the lines as shown in FIG. 117, where:

e=total error (calculated as per FIG. 114)
i=package number (#6 in FIG. 117)
N=total # of packages (#7 in FIG. 117)
q=individual package error estimate $$q=(i-1)/(N-1)\ e'$$

As may be understood, this calculation basically proportionately "parcels out" the total error "e" to packages intermediate the first and last packages in the line, without actually measuring the location of the intermediate packages.

Another feature of the invention is the use of a "weighting" system to calculate a Weighted Actual Line Error "e'". As discussed with respect to FIGS. 114–116, an Actual Line Error "e" is calculated during each operational cycle. In the case of steady-state operation, three consecutive Actual Line Errors can be used to calculate a "weighted" error "e'". This e' is calculated by the following formula:

$$e'=0.2(e[t-2])+0.3(e[t-1])+0.5(e[t])$$

where
t=current cycle
t−1=previous cycle
t−2=one cycle before previous cycle

As may be seen, this formula assigns more weight to the most recent error, but at the same time provide some, albeit less, weight to previous errors.

In summary it may be seen that the above process described in connection with FIGS. 114–117 provides a method and apparatus according to the present invention for selecting individual packages from an accumulated package line, which includes error correction to accommodate the difference between the lengths of the packages before accumulation and their actual lengths while accumulated.

Conclusion

While this invention has been described in specific detail with reference to the disclosed embodiments, it will be understood that many variations and modifications may be effected within the spirit and scope of the invention as described in the appended claims.

What is claimed is:

1. An apparatus for selecting individual packages from an accumulated package line comprised of plurality of packages in line contact along their lengths, said accumulated package line including at its opposing ends first and second end packages defining corresponding first and second outwardly opposing surfaces, the actual distance between said outwardly opposing surfaces defining said overall actual length of said accumulated package line, said accumulated package line also including at least one intermediate package located between said end packages, said apparatus comprising:

a) means for determining one common dimension of a plurality of packages as a "nominal length" of each of said packages;

b) means for accumulating said accumulated package line as a plurality of packages in line contact such that said common dimensions of said packages combine to comprise the actual line length of said accumulated package line;

c) means for measuring the actual line length of said accumulated package line by measuring the distance between said first and second outwardly opposing surfaces;

d) means for determining the difference between said actual accumulated package line length and the summation of the nominal line lengths of all the packages in the line as "actual line error";

e) means for assigning a portion of said actual line error to said intermediate package within said line;

f) gripper means for picking up said intermediate package; and g) gripper control means for instructing a gripper to move to pick up said intermediate package, said gripper control means instructions at least partially responsive to said nominal length measurements and said portion of said actual line error assigned to said intermediate package.

2. The apparatus as claimed in claim 1, further comprising a reference stop surface and wherein said the measurement of said actual line length of said accumulated package line is done by urging said first opposing surface of said first package against said reference stop surface of known location and by measuring the distance of said second opposing surface of said second package relative to said reference stop surface.

3. The apparatus as claimed in claim 2, wherein the portion of said actual line error assigned to said intermediate package is directly dependent upon the number of packages between said reference stop surface and said intermediate package.

4. The apparatus as claimed in claim 1, wherein said apparatus manipulates an accumulated package line having said intermediate package in direct contact with at least one of said end packages.

5. The apparatus as claimed in claim 1 wherein said apparatus manipulates an accumulated package line having said intermediate package not being in direct contact with either of said end packages, instead having at least one package between the intermediate package and each of the end packages.

6. A method for selecting individual packages from an accumulated package line comprised of plurality of packages in line contact along their lengths, said accumulated package line including at its opposing ends first and second end packages defining corresponding first and second outwardly opposing surfaces, the actual distance between said outwardly opposing surfaces defining said overall actual length of said accumulated package line, said accumulated package line also including at least one intermediate package located between said end packages, said method comprising the steps of:

a) determining one common dimension of a plurality of packages as a "nominal length" of each of said packages;

b) subsequent to step "a", accumulating said accumulated package line as a plurality of packages in side-justified line contact such that said common dimensions of said packages combine to comprise the actual line length of said accumulated package line;

c) measuring the actual line length of said accumulated package line by measuring the distance between said first and second outwardly opposing surfaces;

d) determining the difference between said actual accumulated package line length and the summation of the nominal line lengths of all the packages in the line as "actual line error";

e) assigning a portion of said actual line error to said intermediate package within said line;

f) instructing a gripper to move to pick up said intermediate package, said instructions at least partially dependent upon based on said nominal length measurements and said portion of said actual line error assigned to said intermediate package;

g) accumulating another package to create a modified accumulated package line;

h) measuring the actual line length of said modified accumulated package line;

i) determining the difference between said actual modified accumulated package line length and the summation of the nominal line lengths of all the packages in the modified accumulated package line as a second "actual line error";

j) determining a weighted actual line error dependent upon said original actual line error determined in step "d" and said second actual line error determined in step "i"; and k) instructing a gripper to move to pick up another intermediate package, said instructions at least partially dependent upon based on said nominal length measurements and said portion of said weighted actual line error assigned to said intermediate package.

* * * * *